(12) United States Patent
Iwasaki

(10) Patent No.: US 12,432,140 B1
(45) Date of Patent: *Sep. 30, 2025

(54) MULTI-FUNCTIONAL CIRCUITY FOR COMMUNICATIONS NETWORKS AND METHODS AND DEVICES UTILIZING SAME

(71) Applicant: Sean Iwasaki, Chicago, IL (US)

(72) Inventor: Sean Iwasaki, Chicago, IL (US)

( * ) Notice: Subject to any disclaimer, the term of this patent is extended or adjusted under 35 U.S.C. 154(b) by 399 days.

This patent is subject to a terminal disclaimer.

(21) Appl. No.: 17/897,931

(22) Filed: Aug. 29, 2022

Related U.S. Application Data

(63) Continuation-in-part of application No. 17/705,879, filed on Mar. 28, 2022, now Pat. No. 12,241,805, which is a continuation-in-part of application No. 16/839,334, filed on Apr. 3, 2020, now Pat. No. 11,290,203, application No. 17/897,931 is a continuation-in-part of application No. 16/839,260, filed on Apr. 3, 2020, now Pat. No. 11,431,625, which is a continuation of application No. 15/687,862, filed on Aug. 28, 2017, now Pat. No. 10,637,776, said application No. 16/839,334 is a continuation-in-part of application No. 15/687,862, filed on Aug. 28, 2017, now Pat. No. 10,637,776.

(60) Provisional application No. 63/298,697, filed on Jan. 12, 2022.

(51) Int. Cl.
*H04L 45/60* (2022.01)
*H04L 49/00* (2022.01)
*H04L 49/109* (2022.01)
*H04L 49/35* (2022.01)

(52) U.S. Cl.
CPC ............ *H04L 45/60* (2013.01); *H04L 49/109* (2013.01); *H04L 49/30* (2013.01); *H04L 49/355* (2013.01)

(58) Field of Classification Search
CPC ....... H04L 45/60; H04L 49/109; H04L 49/30; H04L 49/355
See application file for complete search history.

(56) References Cited

U.S. PATENT DOCUMENTS

| | | | | |
|---|---|---|---|---|
| 11,847,089 B2 * | 12/2023 | Kupershmidt | ...... | G06F 13/4282 |
| 11,967,395 B2 * | 4/2024 | Hsiao | ........................ | G11C 7/22 |
| 12,117,957 B2 * | 10/2024 | Khatri | .................... | G06V 20/56 |
| 2007/0086792 A1 * | 4/2007 | Regev | .................... | H04B 10/66 |
| | | | | 398/209 |
| 2014/0016479 A1 * | 1/2014 | Coomber | ................ | H04L 43/50 |
| | | | | 370/252 |
| 2021/0356337 A1 * | 11/2021 | Wang | ...................... | G01L 1/183 |

\* cited by examiner

*Primary Examiner* — Harry H Kim
(74) *Attorney, Agent, or Firm* — Charles T. Riggs, Jr.

(57) ABSTRACT

The present subject matter relates to methods, circuitry and equipment providing a multi-functional, cost effective, media independent, open platform for communication services using differential signaling interfaces. The methods, circuitry and equipment comprise a plurality of input amplifiers, output amplifiers, and multiplexer switches or resistive dividers. which provide the ability to monitor, provide service protection switching, provide redundant services, provide on-demand service, provide service upgrades, security, test. and troubleshoot any communication devices and services.

23 Claims, 90 Drawing Sheets

| WSFP VARIANT | SPEED | LANES | MOD | WSFP DEVICE VARIANT COMPATIBILITY PORT (CAGE – CONNECTOR) |
|---|---|---|---|---|
| SFP | 4Gb/s | 1 x 4G/s | NRZ | SFP |
| SFP+ | 10Gb/s | 1 x 10Gb/s | NRZ | SFP, SFP+ |
| SFP28 | 25Gb/s | 1 x 25Gb/s | NRZ | SFP, SFP+, SFP28 |
| SFP56 | 50Gb/s | 1 x 50Gb/s | PAM | SFP, SFP+, SFP28, SFP56 |
| SFP112 | 100Gb/s | 1 x 100Gb/s | PAM4 | SFP, SFP+, SFP28, SFP56, SFP112, SFP-DD |
| SFP-DD | 100Gb/s | 2 x 50Gb/s | PAM4 | SFP, SFP+, SFP28, SFP56, SFP112, SFP-DD |
| SFP-DD112 | 200Gb/s | 2 x 100Gb/s | PAM4 | SFP, SFP+, SFP28, SFP56, SFP112, SFP-DD |
| QSFP | 16Gb/s | 4 x 4Gb/s | NRZ | QSFP |
| QSFP+ | 40Gb/s | 4 x 10Gb/s | NRZ | QSFP, QSFP+ |
| QSFP28 | 100Gb/s | 4 x 25Gb/s | NRZ | QSFP, QSFP+, QSFP28 |
| QSFP56 | 200Gb/s | 4 x 50Gb/s | PAM4 | QSFP, QSFP+, QSFP28, QSFP56 |
| QSFP112 | 400Gb/s | 4 x 100Gb/s | PAM4 | QSFP, QSFP+, QSFP28, QSFP112, QSFP-DD |
| QSFP-DD | 200Gb/s | 8 x 25Gb/s | NRZ | QSFP, QSFP+, QSFP28, QSFP112, QSFP-DD |
| QSFP-DD | 400Gb/s | 8 x 50Gb/s | PAM4 | QSFP, QSFP+, QSFP28, QSFP112, QSFP-DD |
| QSFP-DD800 | 800Gb/s | 8 x 100Gb/s | PAM4 | QSFP, QSFP+, QSFP28, QSFP112, QSFP-DD, QSFP-DD800 |
| OSFP | 400Gb/s | 8 x 50Gb/s | PAM4 | OSFP |
| OSFP-800 | 800Gb/s | 8 x 100Gb/s | PAM4 | OSFP, OSFP-800 |
| OSFP-XD | 1600Gb/s | 16 x 100Gb/s | PAM4 | OSFP, OSFP-800, OSFP-XD |

FIG. 53

MULTI-FUNCTIONAL CIRCUITY FOR COMMUNICATIONS NETWORKS AND METHODS AND DEVICES UTILIZING SAME

RELATED APPLICATION(S)

This application is a continuation-in-part of U.S. application Ser. No. 16/839,260 entitled Multi-functional Circuity for Communications Networks and Methods and Devices Utilizing Same, filed Apr. 3, 2020, now U.S. Pat. No. 11,431,625 issued Aug. 30, 2022, which is a continuation of U.S. application Ser. No. 15/687,862 entitled Multi-functional Circuity for Communications Networks and Methods and Devices Utilizing Same, filed Aug. 28, 2017, now U.S. Pat. No. 10,637,776 issued Apr. 28, 2020, the entire disclosures of which are herein incorporated by reference.

This application also claims priority to U.S. Application Ser. No. 17/705,879 entitled Circuitry for Remote Optical Communications Devices and Methods Utilizing Same, filed Mar. 28, 2022, which is a is a continuation-in-part of U.S. application Ser. No. 16/839,334 entitled Circuitry for Remote Optical Communications Devices and Methods Utilizing Same, filed Apr. 3, 2020, now U.S. Pat. No. 11,290,203 issued Mar. 29, 2022, which is a continuation-in-part of U.S. Application Ser. No. 15/687.862 entitled Multi-functional Circuity for Communications Networks and Methods and Devices Utilizing Same, filed Aug. 28, 2017. now U.S. Pat. No. 10,637,776. issued Apr. 28, 2020. the entire disclosures of which are herein incorporated by reference.

This application also claims benefit to U.S. Provisional Application Ser. No. 63/298,697 entitled Circuitry, Devices(s), System(s), and Method(s) to Automatically Align and Lock CDR Circuitry, filed Jan. 12, 2022 the entire disclosure of which is herein incorporated by reference.

BACKGROUND

The telecommunication network is based on numerous standards, which collectively define the framework for an interoperable and reliable telecommunication infrastructure. These standards define the specifications and requirements for the communication services. the equipment used, and their operations. Although these standards have been instrumental in the success of the telecommunication network, the telecommunication network is comprised with an abundance of proprietary equipment and complex network management systems, which require significant costs, time, and effort to manage. Communication equipment is typically design with specific functionality with dedicated media interfaces, such as wired and optical Ethernet. Examples are a Router with five RJ45 Ethernet ports and two optical SC fiber port, or an Ethernet switch with twenty optical LC fiber ports. Although these examples of specific design communication equipment are cost effective, the fixed functionality and dedicated media interfaces cannot address all service applications such as monitoring or TAP, redundancy, on-demand, security and testing or troubleshooting.

Prior art communication equipment used for monitoring services is designed with dedicated media interface, such as wired or optical Ethernet. The telecommunication market is very competitive, which the market demands more cost effective and efficient services. To achieve competitiveness, the telecommunication network must simplify and become a unified platform of services and equipment. The telecommunication network is slowing evolving towards this optimization model. The optimization in services involves standardizing on Ethernet as the telecommunication services. The optimization in equipment is to use commercial off-the shelf (COTS) equipment or white boxes. White boxes are equipment with generic standard hardware, but the equipment functionality is upgradable and provisionable with software. Software defined networks (SDN) and network function virtualization (NFV) provide the framework to achieve this optimization.

Small Form-factor Pluggable (SFP) units are standardized units adapted to be inserted within a chassis. A suite of specifications, produced by the SFF (Small Form Factor) Committee, describe the size of the SFP unit, so as to ensure that all SFP compliant units may be inserted smoothly within one same chassis, i.e. inside cages, ganged cages, superposed cages and belly-to-belly cages. Specifications for SFP units are available at http://www.sffcommittee.com/ie/index.html.

SFP units may be used with various types of exterior connectors, such as coaxial connectors, optical connectors, and various other types of electrical connectors. By way of further background, small form factor pluggable modules are used to provide a flexible means of providing communication services for the telecommunication network. The mechanical form factor and electrical interface are defined by an industry standard multi-source agreement (MSA). The pluggable module is typically deployed on communication network equipment such as an Ethernet switch, a fiber multiplexer, or media converters. SFP transceivers are designed to support optical and wired Ethernet. TDM SONET, Fibre Channel, and other communications standards. Due to its small and portable physical size, SFP's are defined through multisource agreements (MSAs). MSAs are agreements for specifications of pluggable transceivers agreed to by vendors and service providers or users. MSAs allow other vendors to design transceivers to the same specifications reducing risk for vendors and operators, increasing flexibility, and accelerating the introduction of new technology. MSAs for SFP pluggable modules are define for XFP, XPAK, XENPAK, X2, XFP-E, SFP, SFP+, QSFP, QSFP+, and CXP technologies. MSA define the SFP pluggable modules electrical, mechanical, and software characteristics fur the applicable functionality. MSA-compliant pluggable transceivers are standardized among equipment vendors and network operators to support multiple sources for pluggable transceivers and interoperability. As such. MSA-compliant SFP pluggable transceivers have become the dominant form of optical transmitters and receivers in the industry.

MSA-compliant SFP pluggable modules ensure product interoperability between various applications and end-equipment. Due to the low cost, size, and interoperability, small pluggable modules are used extensively in all communication service applications (cell backhaul, metro, and core network applications).

As discussed above, small form-factor pluggable (SFP) devices are standardized. hot-pluggable devices used to provide communication services for the communication market. The SFF (Small Form Factor) Committee defines the mechanical, electrical, and software specifications of the SFP device to ensure interoperability among SFP devices and chassis. SFT Committee document INF-8074i Rev 1.0 provides the initial specifications for SFP (Small Formfactor Pluggable) Transceiver. The SFP+(or SFP10) devices were later introduced to address higher transmission speeds. SFP devices further evolved to other variants, SFP28, SFP56, SFP-112, SFP-DD, and SFP-DD112 to address much greater speeds, while adhering to the SFP devices mechanical form factor. The SFP devices also evolved into the quad small form-factor pluggable (QSFP) devices, which is larger in mechanical size and capacity than SFP devices. The QSFP devices also had other variants. QSFP+. QSFP28, QSFPS6, QSFP-DD, and QSFP-DD800 to address higher speed transmission and SFP variant applications. The octal small format pluggable (OSFP) device is still another variant to the SFP devices.

By way of further background, the SNIA SFF Technology Affiliate (TA) Small Form Factor (SFF) and various other Multi Source Agreement (MSA) Committees defines the mechanical, electrical, and software specifications of the SFP devices, their variants, and associated port connectors (edge connector and cage). and management. INF-8074i. Revision 1.0, May 12, 2001, SFP (Small Form factor Pluggable) Transceiver provide specifications for SFP devices. SFF-8083, Revision 3.1. Sep. 13, 2014. SFP+1X 10 Gb/s Pluggable Transceiver Solution (SFP10) provide specifications for the required SFF documents to define and implement the SFP+(SFP10) and SFP+variant devices. SFF-8402, Revision 1.1, Sep. 13, 2014, SFP+1X 28 Gb/s Pluggable Transceiver Solution (SFP28) provides the SFF specifications to define and implement a SFP28 device. SFF-418, Revision 1.4, Jul. 30, 2015. SFP+10 Gb/s Electrical Interface provide specifications for SFP+ devices. SFF-8419 Revision 1.3, Jun. 11, 2015, SFP+Power and Low Speed Interface provide specifications for SFP+ devices. SFF-8431, Revision 4.19 Jul. 6, 2009, SFP+10 Gb/s and Low Speed Electrical Interface provide archived specifications for Small Form Factor Pluggable Plus (SFP+) devices. SFP-DD MSA. SFP-DD/SFP-DD112/SFP112, Revision 5.0, Oct. 1, 2021, provide hardware specifications for SFP112 and SFP Double Density (SFP-DD, SFP-DD112, SFP112) devices and their respective variants. This specification defines the electrical and optical connectors, electrical signals and power supplies, mechanical and thermal requirements of the pluggable SFP112 module, Double Density SFP-DD module, and Double Density SFP-DD112 connector and cage system.

INF-8438i, Revision 1.0, November 2006, QSFP (Quad Small Formfactor Pluggable) Transceiver provide specifications for QSFP devices. SFF-8436, Revision 4.9, Aug. 31, 2018, QSFP+4X 10 Gb/s Pluggable Transceiver provide specifications for QSFP- and QSFP+variant devices. SFF-8635, Revision 0.6, Jun. 29, 2015, QSFP+4X 10 Gb/s Pluggable Transceiver Solution (QSFP10) provide specifications for the required SF documents to define and implement the QSFP+(QSFP10) and QSFP+variant devices. SFF-8661, Revision 2.5, Jun. 22, 2018, QSFP+4X Module provide specifications for the mechanical housing for a QSFP+4X and QSFP+4X variants devices. SFF-8665, Revision 1.9, Jun. 29, 2015, QSFP+28 Gb/s 4X Pluggable Transceiver Solution (QSFP28) provide specifications for the required SFF documents to define and implement the QSFP28 and QSFP28 variant devices. SFF-8679, Revision 1.8, Oct. 4, 2018, QSFP+4X Hardware and Electrical Specification provide specifications for the electrical requirements on QSFP+(QSFP10), QSFP28, and QSFP+variant devices.

QSFP-DD MSA. QSFP-DD/QSFPDD800/QSFP112, Revision 6.2, Mar. 11, 2022 provide hardware specifications for QSFP Double Density (QSFP-DD) and QSFP112 pluggable devices and their variants. This specification defines and characterizes high-speed/density 4 and 8 electrical lanes (4x. 8x) modules, cage and connector system. The QSFP-DD and QSFP112 both supports up to 400 Gb/s in aggregate respectively over 8 lanes of 50 Gb/s and over 4 lanes of 100 Gb/s electrical interfaces. QSFP-DD devices doubles the number of high-speed electrical interfaces or lanes supported. The QSFP-DD800 supports up to 800 Gb/s in aggregate over 8 lanes of 100 Gb/s electrical interface. The QSFP-DD and QSFP-DD800 cage and connector designs with 8 lanes are compatible with the 4 lanes QSFP28 and QSFP 112 devices. The QSFP-DD800 cage and connector is backwards compatible to 8 lanes QSFP-DD and 4 lanes QSFP28. The QSFPI12 cage and connector is backwards compatible to 8 lanes QSFP-DD and 4 lanes QSFP28, QSFP+ devices and their respective variants. The QSFP-DD800 and QSFPI12 supports up to 112 Gb/s (56 GBd) per lane electrical operation based on PAM4 signaling. The QSFP-DD and QSFP-DD800 module edge connector consists of a single paddle card with 38 pads on the top and 38 pads on the bottom of the printed circuit board (PCB) assembly for a total of 76 pads. The pads are defined in such a manner to accommodate insertion of a classic QSFP+/QSFP28/QSFP112 module into a QSFP-DD and QSFP-DD800 receptacles.

OSFP MSA, OSFP Module Specification, Revision 4.1, August 2, 2021 provides specifications for the OSFP device mechanical form factor, cage connector, electrical interface, thermal requirements, electrostatic discharge (ESD) requirements, and the management interface. OSFP-400 device support 8 lanes of 50 Gb/s (400 Gb/s) using 56G-PAM4 signaling. OSFP-800 device support 8 lanes of 100 Gb/s (800 Gb/s) using 112G-PAM4 signaling. OSFP MSA is working on an OSFP-XD (Extra Dense) specification which doubles number of channels and capacity of an OSFP-800. The OSFP-XD will support 16 lanes of 100 Gb/s to support 1.6 Tbps.

SFP devices are designed to be inserted within a cage and connector, which the cage and connector are attached to the host, typically a communication equipment. INF-8074i, Revision 1.0, May 12, 2001, SFP (Small Formfactor Pluggable) Transceiver provide cage and connector specifications for SFP devices. SFF Committee document SFF-8432 Rev 5.1 SFP+provides specifications for the SFP+module and cage. SFF-8071, Revision 1.10, Dec. 13, 2019, SFP+1X 0.8 mm Card Edge Connector provide specifications on the 0.8 mm card edge connectors for SFP+. SFP28, and other SFP device variants. SFP-DD MSA, SFP-DD/SFP-DD112/SFP112, Revision 5.0, Oct. 1, 2021, provide cage and connector specifications for SFP112 and SFP Double Density (SFP-DD, SFP-DD112, SFP112) devices.

SFF-8682, Revision 1.1, Jun. 8, 2018, QSFP+4X Connector provide specifications on the physical requirements for the mating interface and physical embodiment of the 0.8 mm connector for QSFP+ and QSFP+variant devices. SFF-8662, Revision 2.9. Jun. 8, 2018, QSFP+4X 28 Gb/s Connector (Style A) provide specifications on the physical requirements for the mating interface and physical embodiment of the 28 Gb/s 0.8 mm connector for QSFP28 and QSFP28 variant devices. SFF-8672, Revision 1.2, Jun. 8, 2018, QSFP+4X 28 Gb/s Connector (Style B) provide specifications on the physical requirements for the mating interface and physical embodiment of the 28 Gb/s 0.8 mm connector for QSFP28 and QSFP28 variant devices. Style B 0.8 mm connector addresses backward compatibility when mated to a connector QSFP-DD MSA, QSFP-DD/QSFP-DD800/QSFP112, Revision 6.2, Mar. 11, 2022 provide hardware specifications for QSFP Double Density (QSFP-DD) and QSFP112 pluggable devices and their variants.

SFF-8663, Revision 1.7, October 19, 2017, QSFP+28 Gb/s Cage (Style A) provide specifications on the mechanical requirements on a 1 x "n" ganged and 2 x "n" stacked cage for a QSFP28 and QSFP28 variant devices. SFF-8683, Revision 1.3, Oct. 19, 2017, QSFP+Cage provide specifications on the mechanical requirements on a 1 x "n" ganged and 2 x "n" stacked cage for a QSFP+ and QSFP+variant devices. QSFP-DD MSA, QSFP-DD/QSFP-DD800/ QSFP112, Revision 6.2, Mar. 11, 2022 provide hardware specifications for QSFP Double Density (QSFP-DD) and QSFP112 pluggable devices and their variants. OSFP device mechanical form factor, cage connector, electrical interface, thermal requirements, electrostatic discharge (ESD) requirements, and the management interface. OSFP-400 device support 8 lanes of 50 Gbs (400 Gb/s) using 56G-PAM4 signaling. OSFP-800 device support 8 lanes of 100 Gb/s (800 Gb/s) using 112G-PAM4 signaling.

Management Interface for SFP+provides specifications for the management of SFP, SFP+, SFP28, and other SFP variant devices. This describes a register and memory map which provides alarms, warnings, vendor identity, SFP description and type, SFP real time diagnostic, and vendor specific registers. This information is to be used by the SFP host equipment. SFF-8636, Rev 2.10a, Sep. 24, 2019. Management Interface for 4-lane Modules and Cables provide specifications for the management of 4-channel pluggable transceivers (QSFP, QSFP+, QSFP28, QSFP56, and QSFP variants) and 4-channel managed external cables. Common Management Interface Specification (C MIS), Revision 5.1, Nov. 2, 2021 provide specifications for the generic management of SFPT Double Density (SFP-DD), QSFP Double Density (QSFP-DD), OSFP, COBO, and QSFP devices, and their respective variants.

Presently, communication equipment using SFP devices prevent the use of other vendors SPF devices. This restriction prevents the Service Provider the ability to use more cost-effective SFP devices. This restriction also prevents the Service Provider from using more available SFP devices, and this restriction can prevent the Service Provider from deploying or restoring services.

In general, different prior art communication equipment can provide different functionality such as monitoring, security, and protection switching. The following prior art references provide general background information regarding the monitoring of communications networks, and each are herein incorporated by reference:
- U.S. Pat. No. 5,715,293 entitled Method and Apparatus for Monitoring Telecommunication Signals, issued to Mahoney on Feb. 3, 1998.
- U.S. Pat. No. 6,233,613 entitled High Impedance Probe for Monitoring Fast Ethernet LAN Links, issued to Walker et al. on May 15, 2001.
- U.S. Pat. No. 6,975,209 entitled In-Line Power Tap Device for Ethernet Data Signal, issued to Gromov on Dec. 13, 2005.
- U.S. Patent Publication No. 200610159008 entitled System and Method for Monitoring End Nodes Using Ethernet Connectivity Fault Management (CFM) in an Access Network, published to Sridhar, et al. on Jul. 20, 2006.
- U.S. Patent Publication No. 2005/0257262 entitled Zero-lnterrupt Network Tap, published to Matityahu, et al. on Nov. 17, 2005.

The following prior art reference provides general background information regarding the security of communications networks, and is herein incorporated by reference:
- U.S. Pat. No. 8,000,682 entitled Apparatus and Method for Restricting Access to Data, issued to Tischer, et al. on Aug. 16, 2011.

The following prior art references provide general background information regarding protection switching for communications networks, and each are herein incorporated by reference:
- U.S. Pat. No. 7,443,789 entitled Protection Switching Mechanism, issued to Glaser, et at. on Oct. 28, 2008.
- U.S. Patent Publication No. 2008/0031129 entitled Smart Ethernet Edge Networking System published to Arseneault, et al. on Feb. 7, 2008.

SUMMARY

Multi-functional circuitry for communications networks is provided in cost effective, media independent communication equipment capable of providing the functionality of service monitoring, service protection switching, redundancy, on-demand service, security, testing, troubleshooting and/or service upgrades. The presently disclosed circuitry and equipment provide the ability to provide these various functionalities using small pluggable devices.

The circuitry and equipment of the present disclosure address the optimization of the network by providing an open hardware platform for monitoring services, for providing service protection switching, providing on-demand service delivery services and other functionality. Media independence is realized by using COTS equipment small form-factor pluggable (SFP) units.

The presently disclosed methods of providing monitoring services using SFP devices allow service monitoring with any desired physical medium. The Service Provider or Customer can monitor services using single-mode fiber, multi-mode fiber, 10/100/1G or 10G wired Ethernet or any other physical medium type. By providing monitoring services with any desired physical medium, this allows the Service Provider or Customer no limitations on distance, and the flexibility to monitor services with any type of equipment and installation.

The methods. circuitry and equipment of the present disclosure provide the functionality of monitoring or tapping, including the ability to:
  monitor or tap any service type.
  monitor or tap any physical media type.
  monitor or tap any connector type.
  monitor or tap the service without interfering with the service.
  monitor or tap the full content and bandwidth of the service.
  monitor or tap the service without any distance limitation,
  monitor or tap the service if the service is not connected.
  provide security when monitoring or tapping the service.
  inject signal into the uplink service with any physical media type.
  inject signal into the downlink service with any physical media type.

The methods. circuitry and equipment of the present disclosure provide the functionality of accessing or cut-through, including the ability to:
  access any service type.
  access any physical media type.
  access any connector type.
  access the full content and bandwidth of the service.
  access the service without any distance limitation.
  access the service if the service is not connected.
  provide security when accessing the service.

The methods, circuitry and equipment of the present disclosure provide the functionality of redundancy, including the ability to:

provide redundancy of the uplink path (or path 1) with any media type.

provide redundancy of the downlink path (or path 2) with any media type.

provide redundancy of both paths with any media or connector types.

provide monitoring of the secondary path during uplink path (or path 1) redundancy (i.e. during a protection switch operation).

provide monitoring of the secondary path during downlink path (or path 2) redundancy (i.e. during a protection switch operation).

provide cut-thru of the secondary path during uplink path (or path 1) redundancy (i.e. during a protection switch operation).

provide monitoring of the cut-thru secondary path during downlink path (or path 2) redundancy (i.e. during a protection switch operation).

The methods. circuitry and equipment of the present disclosure provide on-demand functionality, including the ability to:

provide on-demand service from a monitoring, cut-through, or redundancy operation.

provide on-demand service with any media type.

The methods, circuitry and equipment of the present disclosure provide the functionality of security, including the ability to:

1. limit access to the communications network service to approved devices.
2. limit access to the communications network service to approved users.

The methods, circuitry and equipment of the present disclosure provide flexibility in providing the communications network service, including the ability to:

3. provide service for any media type or mix of media types; wire, coax, fiber, or wireless services.
4. extend wireline, fiber, or wireless services.

The methods, circuitry and equipment of the present disclosure provide flexibility in providing the communications network service, including the use of SFP device variants; SFP+, SFP28, SFP-56. SFP-112, SFP-DD, SFP-DD112. QSFP+, QSFP28, QSFP56, QSFP-DD, QSFP-DD800, OSFP, OSFP-800, and OSFP-XD devices. QSFP devices are mechanically large in size and can be electrically greater in service capacity than SEP device variants. QSFP devices can support eight (8) to sixteen (16) signal channels or lanes in each direction, hence the name "Quad" or "DIouble Density", respectively. OSFP devices are mechanically large in size and electrically similar in capacity than QSFP-DD variant devices. OSFP variant devices support eight (8) to sixteen signal channels or lanes in each direction or a total of sixteen (16) channels or lanes for both directions, transmit and receive.

The methods, circuitry and equipment of the present disclosure provide flexibility in providing the communications network service, including the use of differential and single-ended signal connections between and among the input broadband differential amplifiers (A), the multiplexer switches (M), the high speed output differential amplifiers (Y), and on applicable embodiment 100*i*-100*ah* the clock data recovery circuitry (CDR). These signal interconnection types are represented as exclusively single-ended, a combination of single-ended and differential, or exclusively differential. Single-ended connections are input and/or output connections using an analog signal referenced to a ground. Differential connections are input and/or output connections using two complementary analog signals, typically two complementary analog signals.

The methods, circuitry and equipment of the present disclosure provide flexibility in providing the communications network service, including with respect to the port to connections. Connection (CXN) is defined as any medium to interface other circuitry, devices, or equipment. A Connection (CXN) can be defined as printed circuit board (PCB) traces on a PCB assembly or metal interconnects within an integrated circuit to interface other circuitry to process the communication signal. Connection (CXN) additionally is defined as an SFP port to interconnect and house SFP variant devices.

BRIEF DESCRIPTION OF THE DRAWINGS

FIG. 48aa is a block diagram illustrating a twenty seventh version 100aa of the preferred embodiment of the present disclosure.

FIG. 48ab is a block diagram illustrating a twenty eighth version 100ab of the preferred embodiment of the present disclosure.

FIG. 48ac is a block diagram illustrating a twenty ninth version 100ac of the preferred embodiment of the present disclosure.

FIG. 48ad is a block diagram illustrating a thirtieth version 100ad of the preferred embodiment of the present disclosure.

FIG. 48ae is a block diagram illustrating a thirty first version 100ae of the preferred embodiment of the present disclosure.

FIG. 48af is a block diagram illustrating a thirty second version 100af of the preferred embodiment of the present disclosure.

FIG. 48ag is a block diagram illustrating a thirty third version 100ag of the preferred embodiment of the present disclosure.

FIG. 48ah is a block diagram illustrating a thirty fourth version 100ah of the preferred embodiment of the present disclosure.

FIG. 48ai is a block diagram illustrating a thirty fifth version 100ai of the preferred embodiment of the present disclosure.

FIG. 48aj is a block diagram illustrating a thirty sixth version 100aj of the preferred embodiment of the present disclosure.

FIG. 48ak is a block diagram illustrating a thirty seventh version 100ak of the preferred embodiment of the present disclosure.

FIG. 53 is a table illustrating SFP Device variants, speeds, technology, and SFP port compatibility.

DETAILED DESCRIPTION

Figure 1:
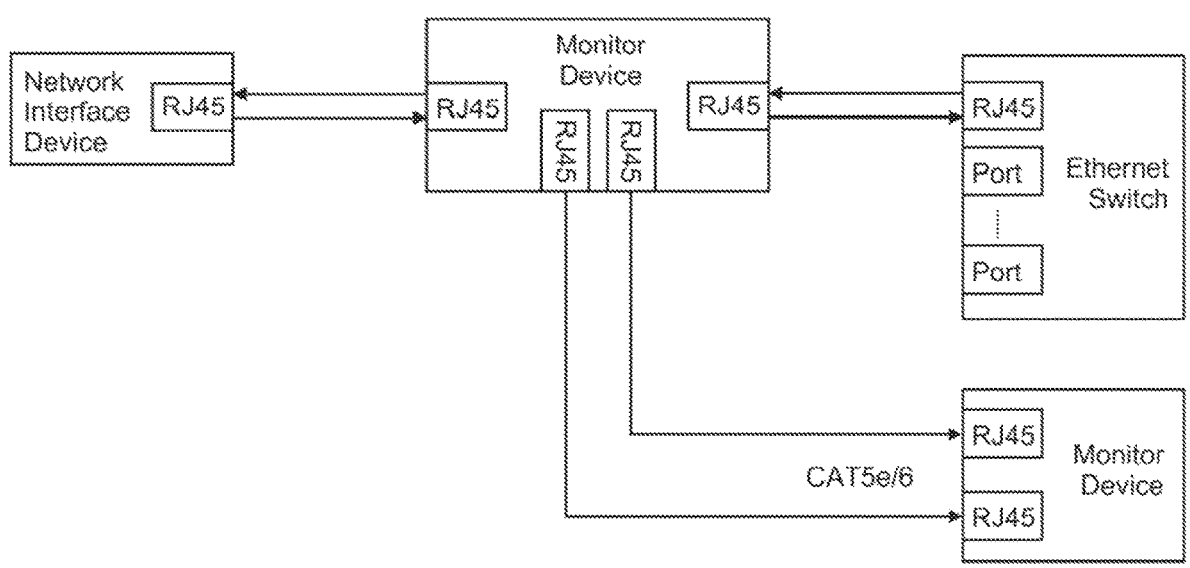
FIG. 1 is a schematic diagram illustrating the use of prior art monitoring equipment designed to monitor communications network service.

The methods, circuitry and equipment of the present disclosure are based on a circuit architecture comprising a plurality of input amplifiers, output amplifiers, and multiplexer switches. The number of input amplifiers, output amplifiers, and multiplexer switches are determined from the number of differential signal paths. The circuitry and equipment of the present disclosure comprises an open hardware platform using COTS equipment small form-factor pluggable (SFP) units.

The methods, circuitry and equipment of the present disclosure also provide the ability to monitor, provide protection switching and redundant services, provide on-demand service, provide service upgrades, security, test, and troubleshoot any devices and services. Accordingly, a multifunctional and cost effective open platform for communication services using small pluggable form factor (SFP) devices, integrated circuits with SERDES interfaces, or any other devices, equipment, or integrated circuits using difemrntial signaling interfaces, is provided herein. This open platform will not restrict the use of Service Providers' SFP devices for providing communication services.

The methods, circuitry and equipment of the present disclosure allow the user flexibility to tap and access communication services using any physical medium such as a wire, wireless, fiber, or coax medium. Thus the user may require any specific medium for monitoring or other communication services. The user will also have the flexibility to use any interface connector type for monitoring and accessing communication services. Thus the user may require any specific interface connector for monitoring and accessing communication services.

Accordingly, the methods, circuitry and equipment of the present disclosure provide numerous advantages, novel features and/or improvements in providing various communication services for communication networks, including but not limited to providing the functionality of service monitoring, service protection switching, redundancy, on-demand service, security, testing, troubleshooting and/or service upgrades. Discussed below and shown in the drawings are some of these advantages, novel features and/or improvements. Additional advantages, novel features and/or improvements will become apparent to those skilled in the art upon examination of the disclosure herein and the accompanying drawings, or may be learned by production or operation of the examples.

The methods, circuitry and equipment of the present disclosure provide this ability and functionality in a manner which is media independent. As such, the methods, circuitry and equipment of the present disclosure are suitable for use in instances where the user may require specific cable mediums and cable interface connectors to monitor or perform other services due to service application or installation.

Figure 2:
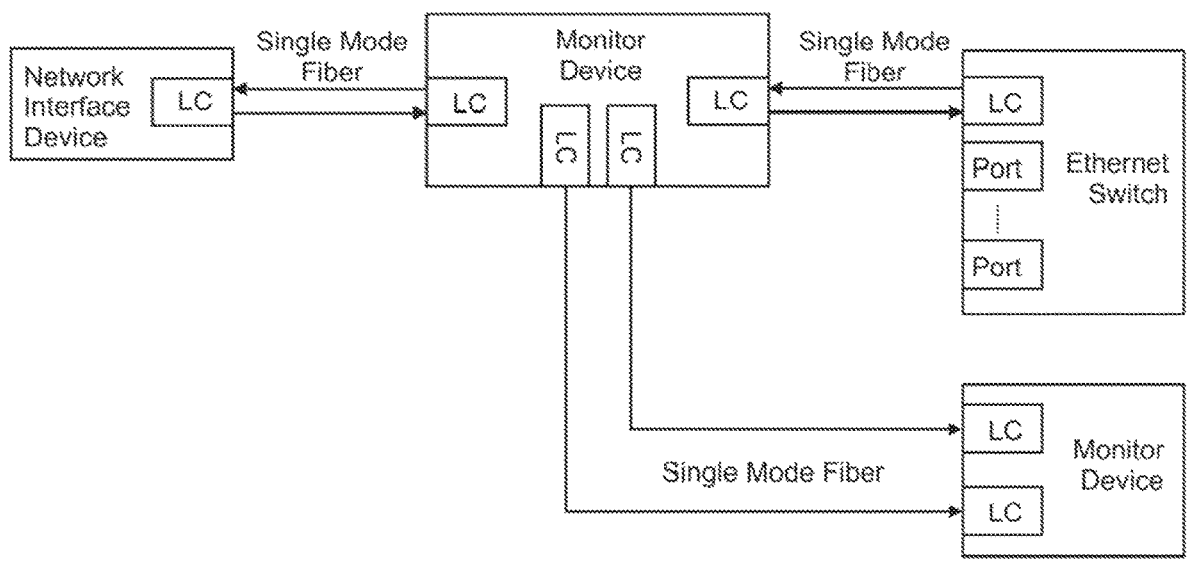
FIG. 2 is a schematic diagram illustrating the use of alternate prior art monitoring equipment designed to monitor communications network service.
Figure 3:
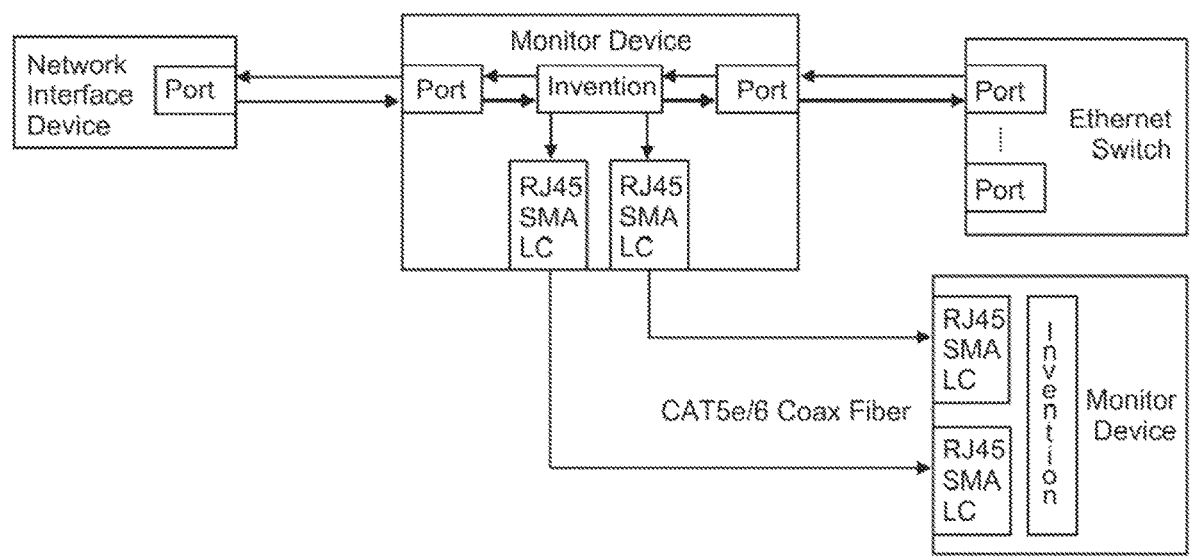
FIG. 3 is a schematic diagram illustrating an embodiment of the communication equipment of the present disclosure providing monitoring functionality.

Referring to FIGS. 1 and 2, as illustrated, prior art devices are designed to monitor service using a fixed connector type; RJ45 jack, LC fiber connector, or SMA coax connector, FIG. 1 (Prior Art). This prior art equipment is also designed to monitor service using fixed connection mediums, such as Cat5e, Cat6, multi-mode fiber, single-mode fiber, or RG59 coax cables, FIG. 2 (Prior Art). For example, the user monitoring the service may only have equipment with fiber connections. If the monitoring equipment has a dedicated wire interface, the user must media convert the wired to fiber interface. However, there are no such limitations with respect to the methods, circuitry and equipment of the present disclosure, and, no such conversions would be necessary. As illustrated in FIG. 3, the methods, circuitry and devices of the present disclosure allow monitoring of services using any media type and connections, as SFP ports are provided such that, the user can insert an appropriate SFP unit having any desired or required external connector.

Figure 4:
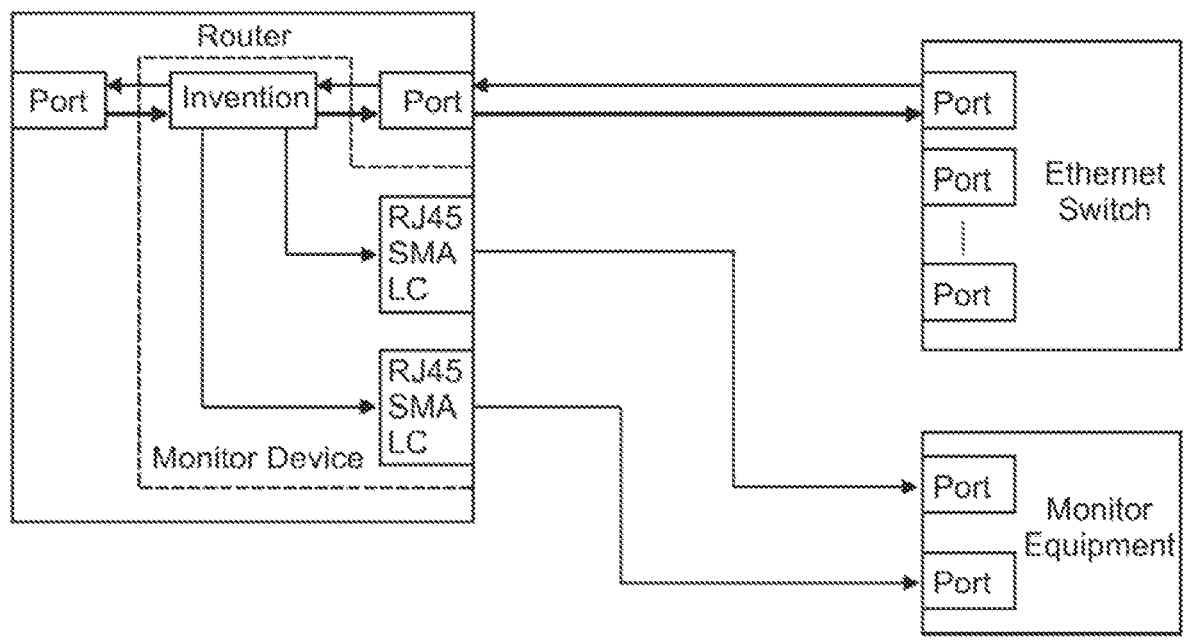
FIG. 4 is a schematic diagram illustrating an alternate embodiment of the communication equipment of the present disclosure providing monitoring functionality.

Use of the prior art monitoring equipment shown in FIGS. 1 and 2 involves the added cost of purchasing and installing expensive monitoring equipment, or dedicated monitoring circuitry must be connected with existing communication equipment. The circuitry of the present disclosure can be easily integrated into other communication equipment such as a Network Interface Device (NID), Router, or Ethernet Switch, which would allow any such equipment to monitor services cost effectively. For example, FIG. 4 is a schematic illustration of the circuitry of the present disclosure integrated into a router. In addition to cost savings, integration of the presently disclosed circuitry into other communications equipment may be beneficial where the installation location or area is space restricted, such that the user may not be able to install additional monitoring equipment.

Figure 5:
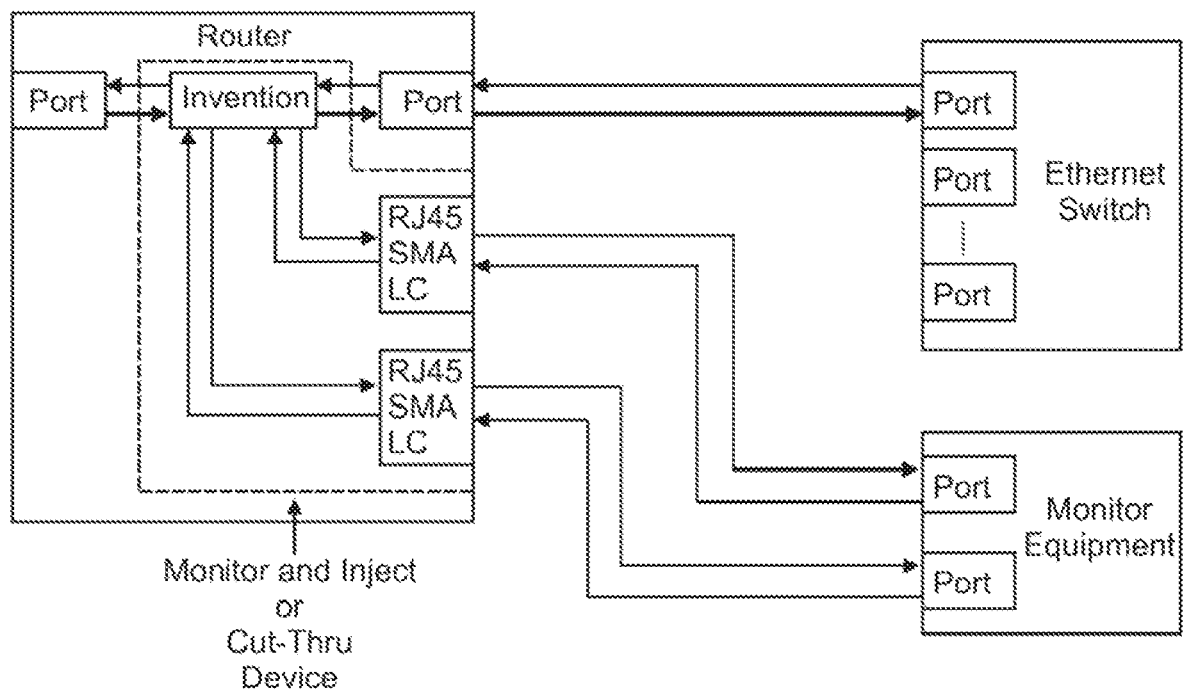
FIG. 5 is a schematic diagram illustrating the alternate embodiment of the communication equipment of FIG. 4 providing cut-through functionality.

FIG. 5 is a schematic diagram of the circuitry of the present disclosure integrated into a router, and illustrating the additional functionality of providing the ability for the user to cut-through and fully access the communication service. In this embodiment, the cut-through function allows the user to transmit and receive signals for testing and other service operation and maintenance functions.

Figure 6:
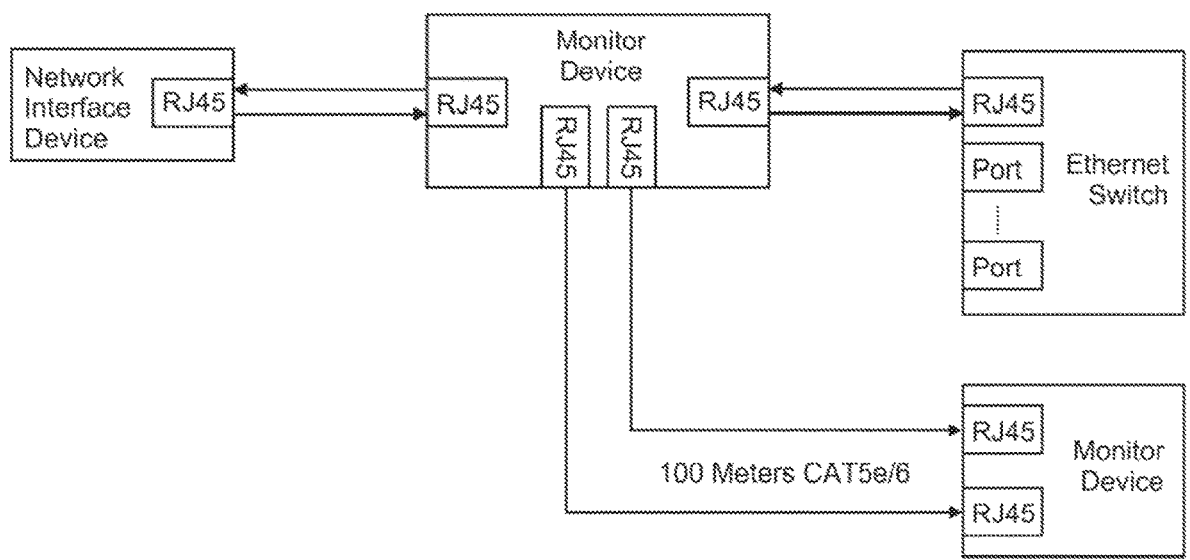
FIG. 6 is a schematic diagram illustrating distance limitations of the prior art monitoring equipment of FIG. 1.

Additionally, certain applications may require monitoring equipment to be located an appropriate distance away from the transport equipment. Privacy, security, and convenience are examples of such applications. If the monitoring equipment is designed using a short distance fiber connector, a fiber splitter, or RJ45 Ethernet, the monitoring equipment must be located within the distance limitation of the monitored service connection. As such, the user may require monitoring services at a specific distance. For example, if the monitoring equipment is designed using RJ45 Ethernet connector, the monitoring equipment must be located within 100 meters of the monitoring service, as illustrated in FIG. 6 (Prior Art). Because of its open platform, the methods, circuitry and equipment of the present disclosure will allow the user to monitor and access services at any distance the user requires, without any distance limitation.

Figure 7:
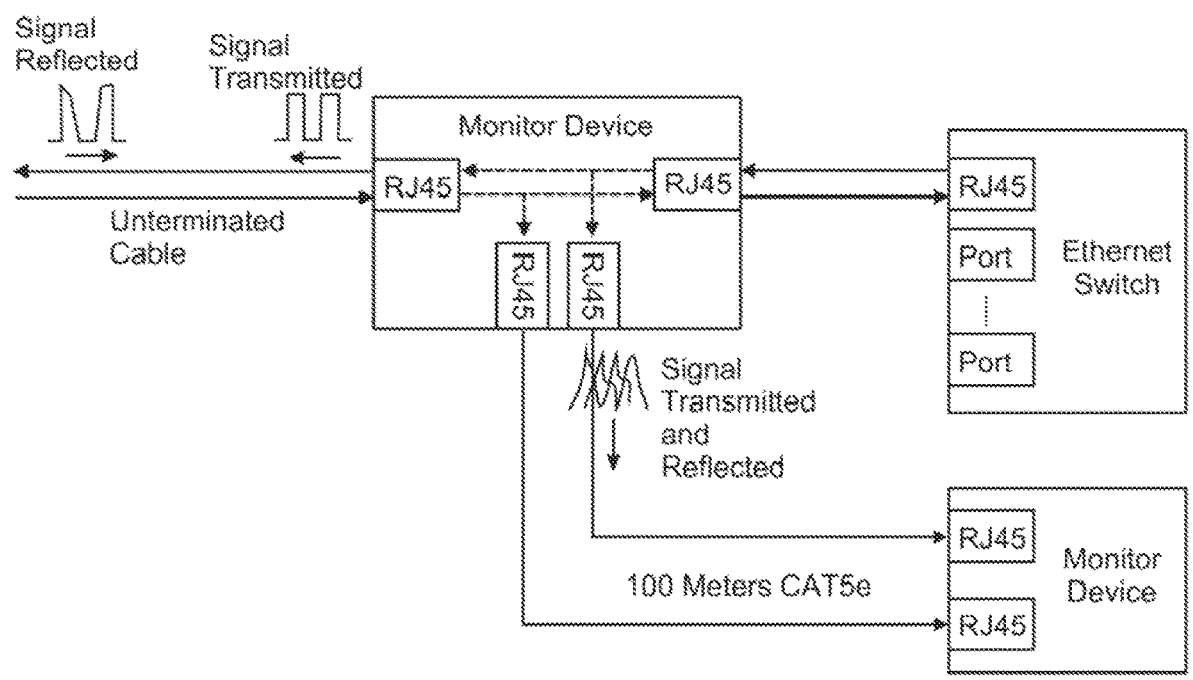
FIG. 7 is a schematic diagram illustrating signal distortion limitations of the prior art monitoring equipment of FIG. 6.

Another advantage or benefit is that the methods, circuitry and equipment of the present disclosure allow the monitoring of communication, services when the wired service connection is not terminated or not terminated properly. Monitoring equipment using high impedance bridging may not be able to monitor services if the connection is not terminated or not terminated properly. An un-terminated or improperly terminated connection will cause signal reflections on the service. This signal reflection will distort the service and prevent the service from being monitored, as illustrated in FIG. 7 (Prior Art). The methods, circuitry and equipment of the present disclosure will allow no disruption of the monitoring the uplink services when the downlink service connection is not connected properly or is disconnected.

Referring back to FIG. 1 (Prior Art), it should be understood that prior art monitoring equipment can allow anyone to monitor service simply by connecting to the port of the monitor device. The methods, circuitry and equipment of the present disclosure provide the ability to restrict the monitoring of services.

Figure 8:
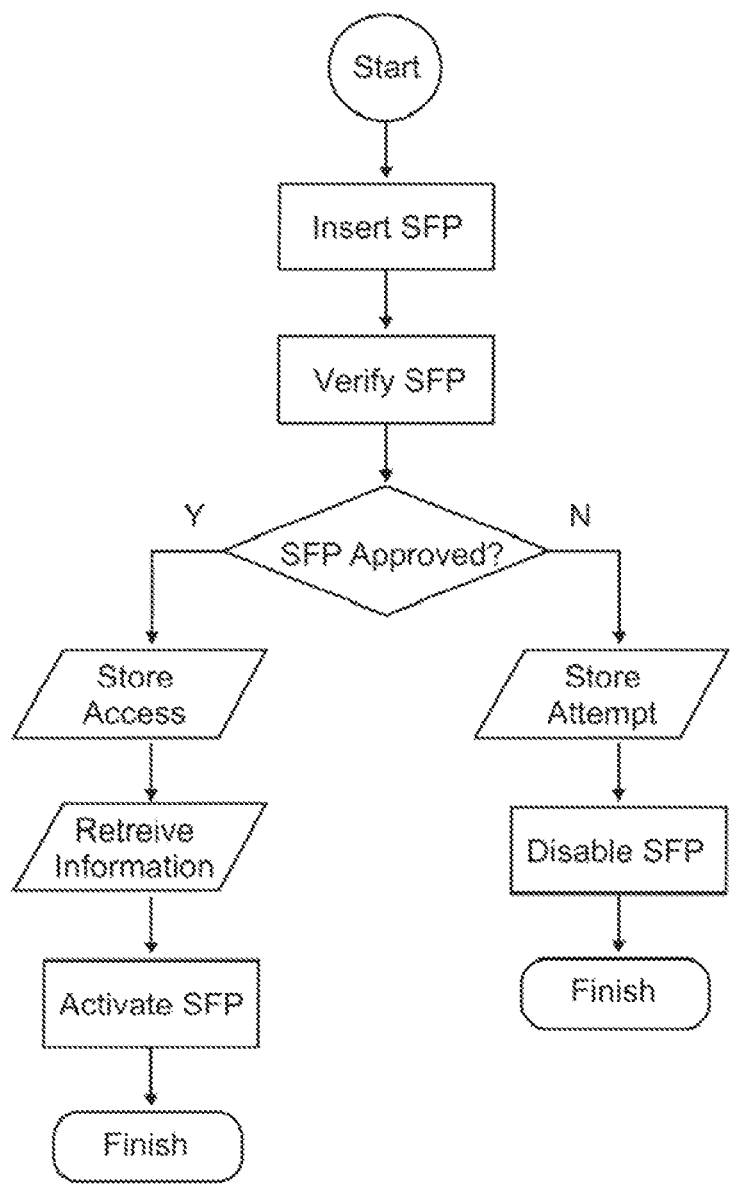
FIG. 8 is a flow chart illustrating the implementation of security measures in the communication equipment of the present disclosure to limit access to the communications network service to approved devices.
Figure 9:
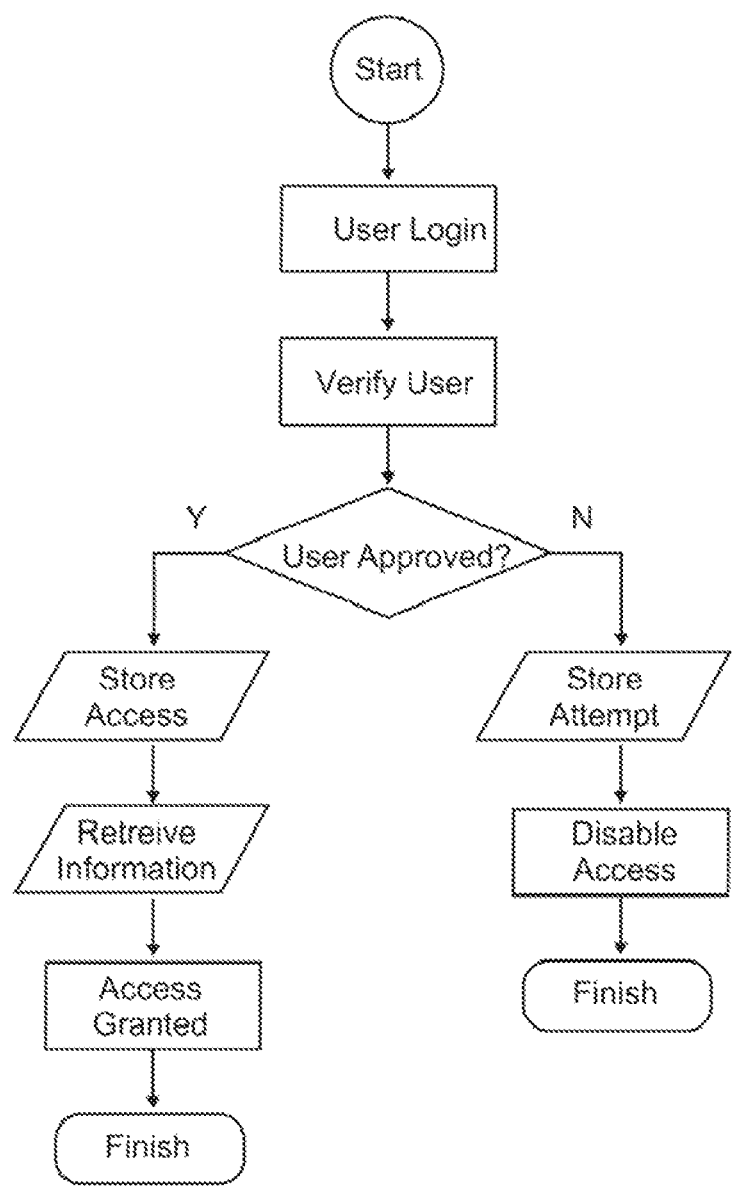
FIG. 9 is a flow chart illustrating the implementation of security measures in the monitoring equipment of the present disclosure to limit access to the communications network service to approved users.

As shown in the flow charts of FIGS. 8 and 9, security monitoring is accomplished by allowing specific type of devices for monitoring, e.g., only approved or authorized SFPs, as in FIG. 8, and/or by allowing specific users to monitor, e.g., only approved or authorized users, as in FIG. 9. The methods, circuitry and equipment of the present disclosure provide the ability to provide security by restricting the monitoring and accessing of services. The user can restrict the monitoring services for specific users or guidelines. Any suitable authentication or authorization procedures can be used in connection with the steps illustrated in FIG. 8 and FIG. 9 as is or may be known in the art of authentication/authorization of users and equipment.

The methods, circuitry and equipment of the present disclosure also improve the security of the Service Provider's equipment by preventing the uplink device or connection from removal. This is accomplished by the position and orientation of the SFP unit, which improves service reliability by ensuring that the uplink service is inaccessible from tampering or accidental removal. By preventing the uplink service device or connection from removal, the security of the Service Provider's equipment is improved.

Figure 10:
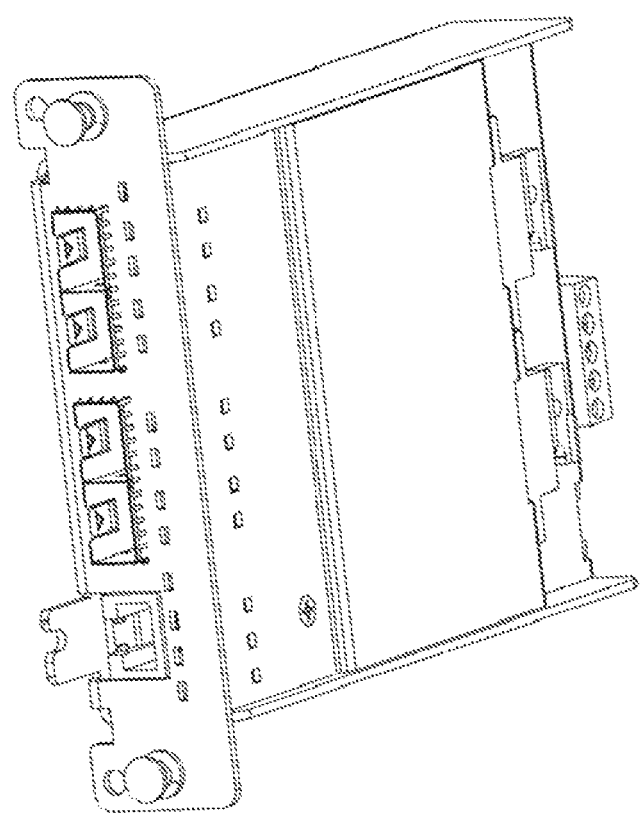
FIG. 10 is a front view of an embodiment of the communication equipment of the present disclosure.

FIG. 10 illustrates a front perspective view of an embodiment of an exemplary communication equipment of the present disclosure. As illustrated, four SFP ports are aligned or positioned in a two by two, front to front orientation. An RJ45 jack provides an RS232 craft interface for communication equipment and service status, and equipment provisioning.

Figure 11:
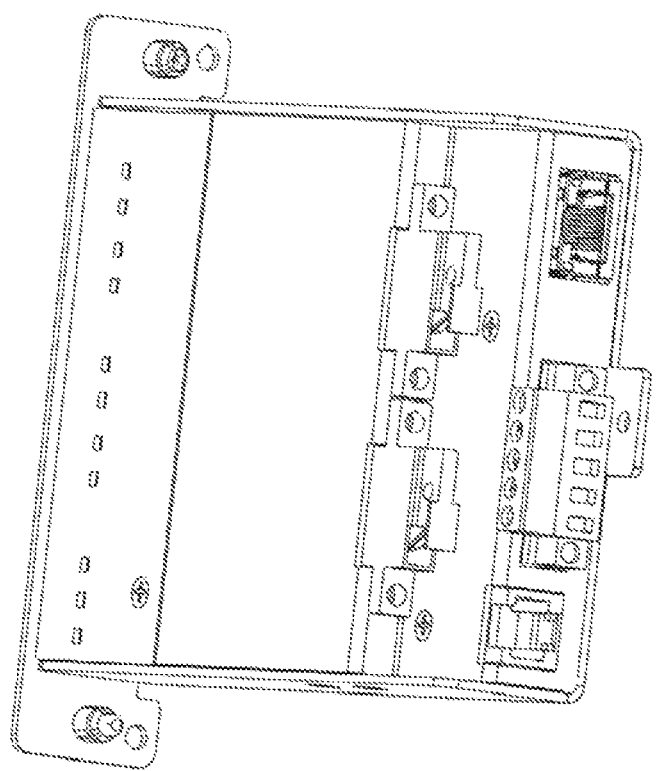
FIG. 11 is a rear view of an embodiment of the communication equipment of the present disclosure.

FIG. 11 illustrates a rear perspective view of an embodiment of an exemplary communication equipment of the present disclosure. As illustrated, two GMT type indication fuses are positioned horizontally. The two GMT type indication fuses provide redundant A-B input power feeds for the communication equipment. The GMT type indicator fuse provides a mechanical indicator when the fuse is opened during overcurrent conditions. A five position removable terminal block provides the dual input power connections and an electrical contact for GMT fuse alarm. A shielded RJ45 10/100BaseT Ethernet jack provides remote access for the communication equipment and service status and equipment provisioning. An RJ14 jack provides a communications interface for an external controller module.

Figure 12:
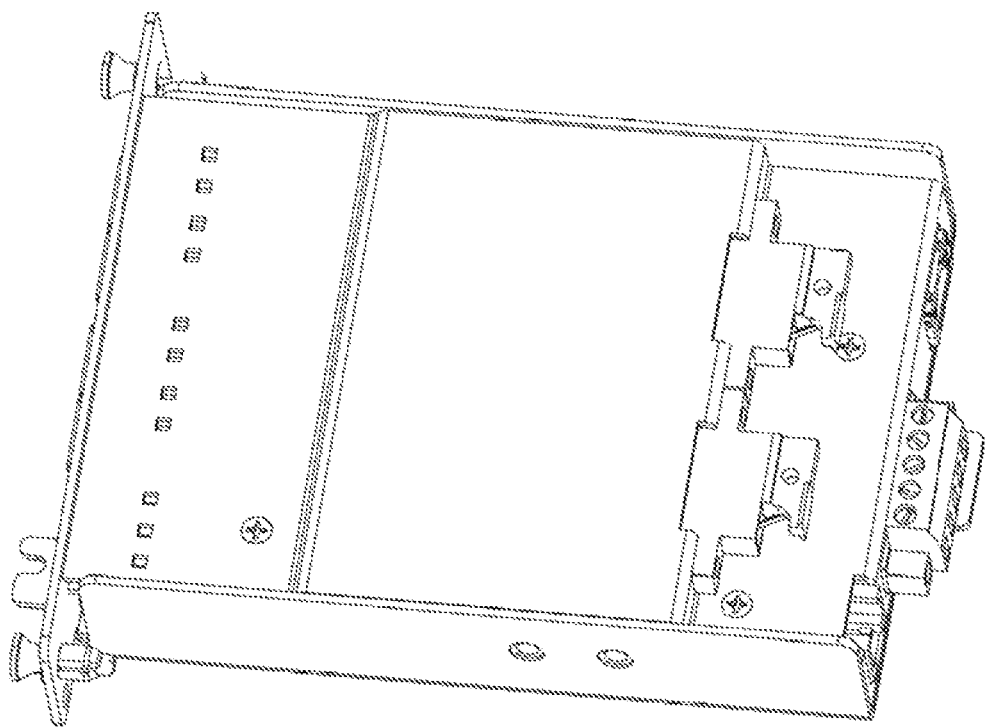
FIG. 12 is a top view of an embodiment of the communication equipment of the present disclosure.

FIG. 12 illustrates a top perspective view of an embodiment of an exemplary communication equipment of the present disclosure. As illustrated, a top cover is used to protect the electronic circuit assembly. The top cover provides LED indicators for equipment and service status when the communication equipment is horizontally installed on a wall.

Figure 13:
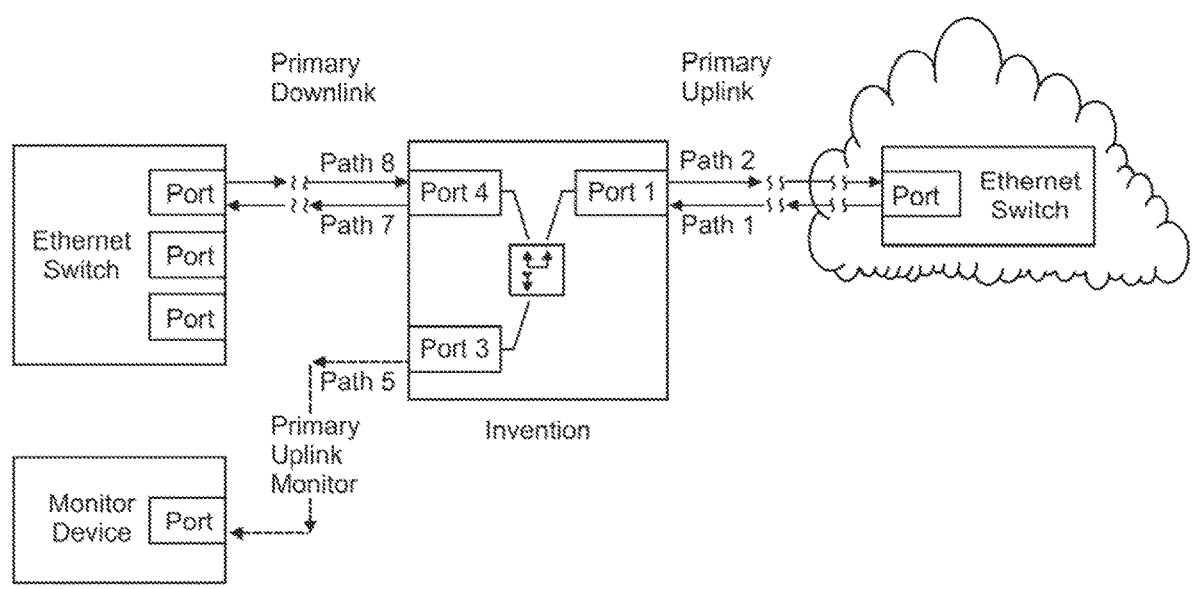
FIG. 13 is a schematic diagram illustrating the communication equipment of the present disclosure providing the functionality of monitoring of the uplink path (or path 1).
Figure 14:
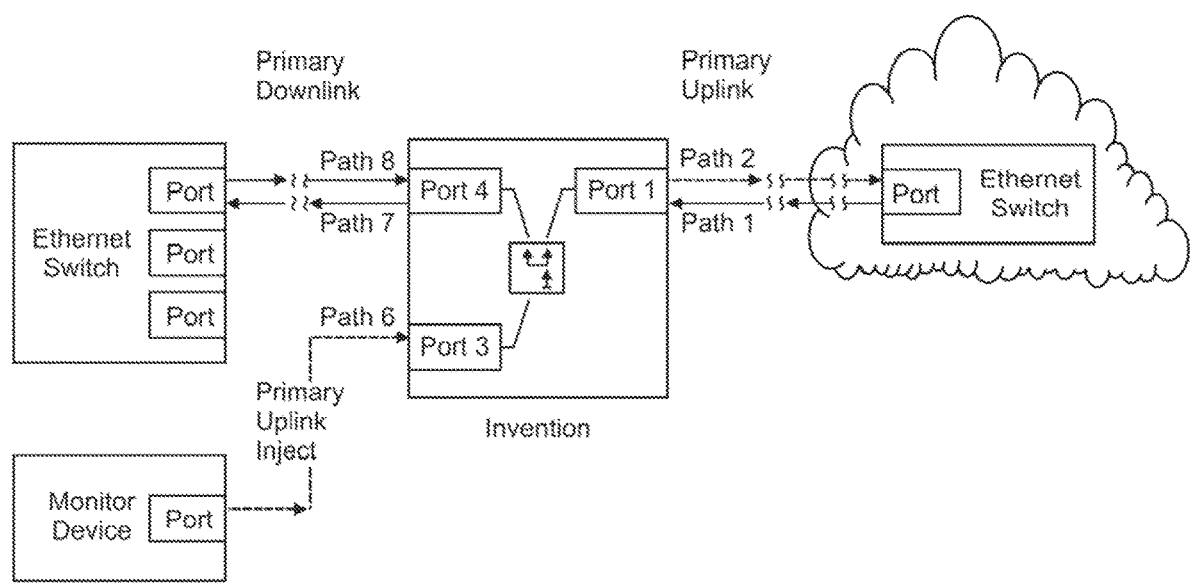
FIG. 14 is a schematic diagram illustrating the communication equipment of the present disclosure providing the functionality of injecting from path 6 into the uplink path (or path 2).
Figure 15:
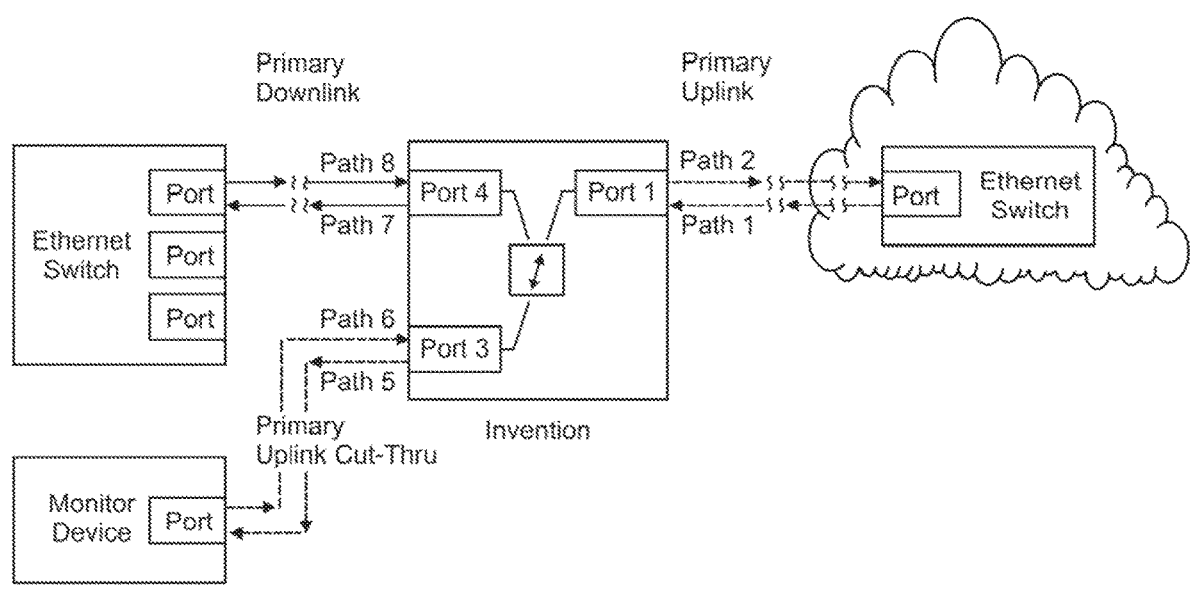
FIG. 15 is a schematic diagram illustrating the communication equipment of the present disclosure providing the functionality of cut-thru of the secondary paths (or path 5 and path 6) into the uplink paths (or path 1 and path 2).
Figure 16:
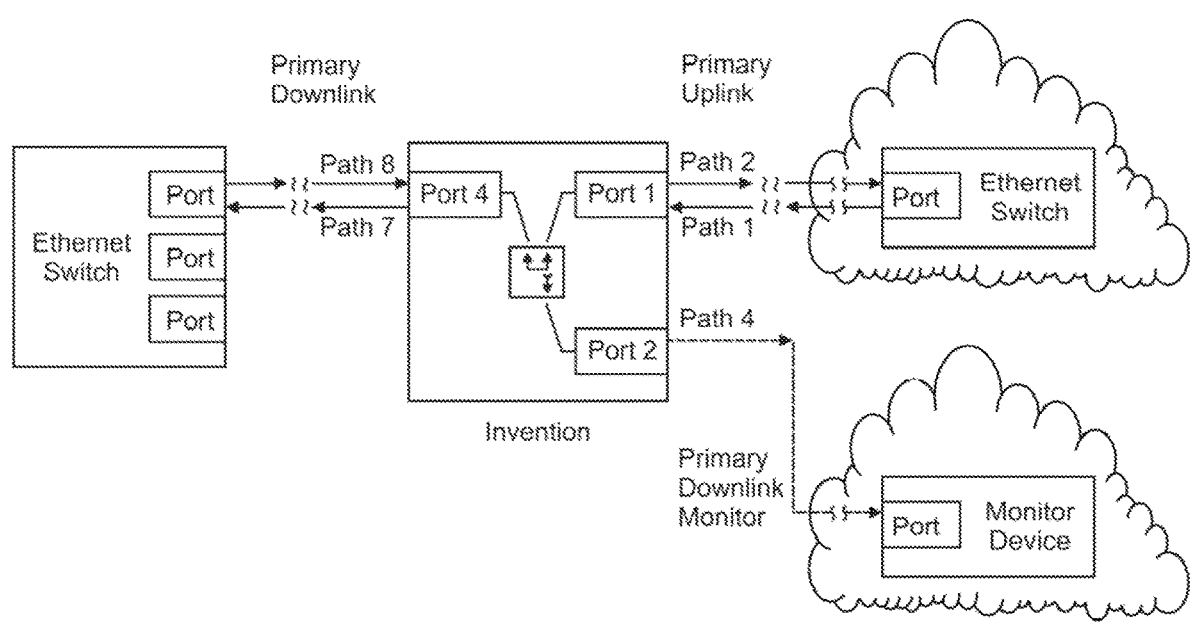
FIG. 16 is a schematic diagram illustrating the communication equipment of the present disclosure providing the functionality of monitoring of the downlink path (or path 8) through path 4.
Figure 17:
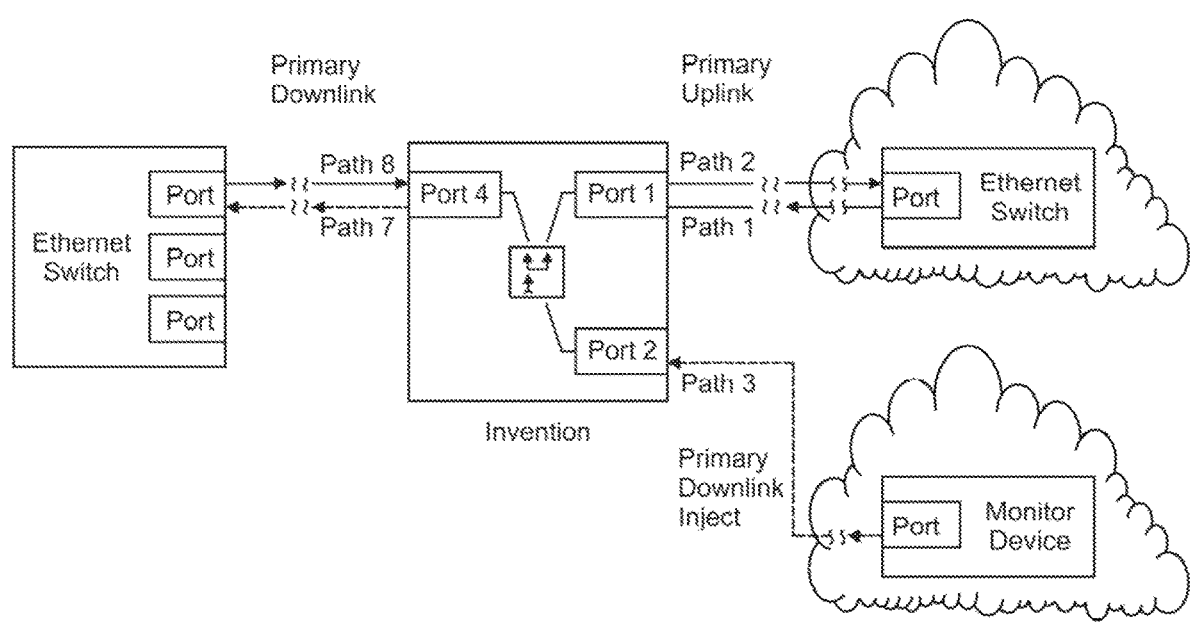
FIG. 17 is a schematic diagram illustrating the communication equipment of the present disclosure providing the functionality of injecting from path 3 into the downlink path (or path 7).
Figure 18:
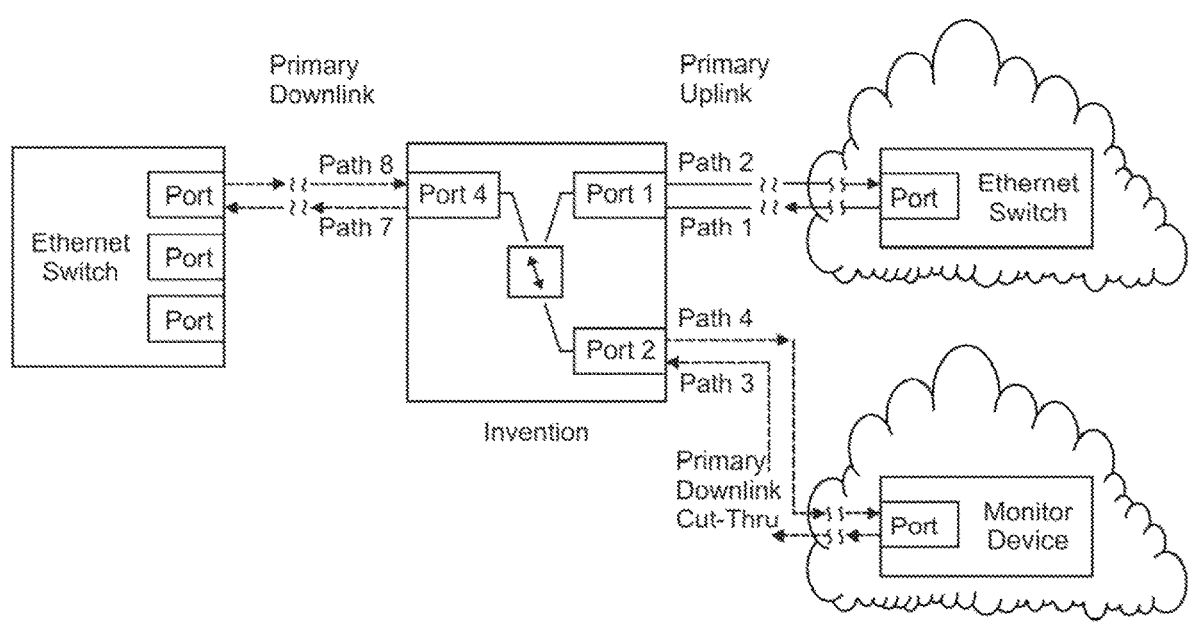
FIG. 18 is a schematic diagram illustrating the communication equipment of the present disclosure providing the functionality of cut-thru of the secondary paths (or path 3 and path 4) into the downlink paths (or path 7 and path 8).
Figure 19:
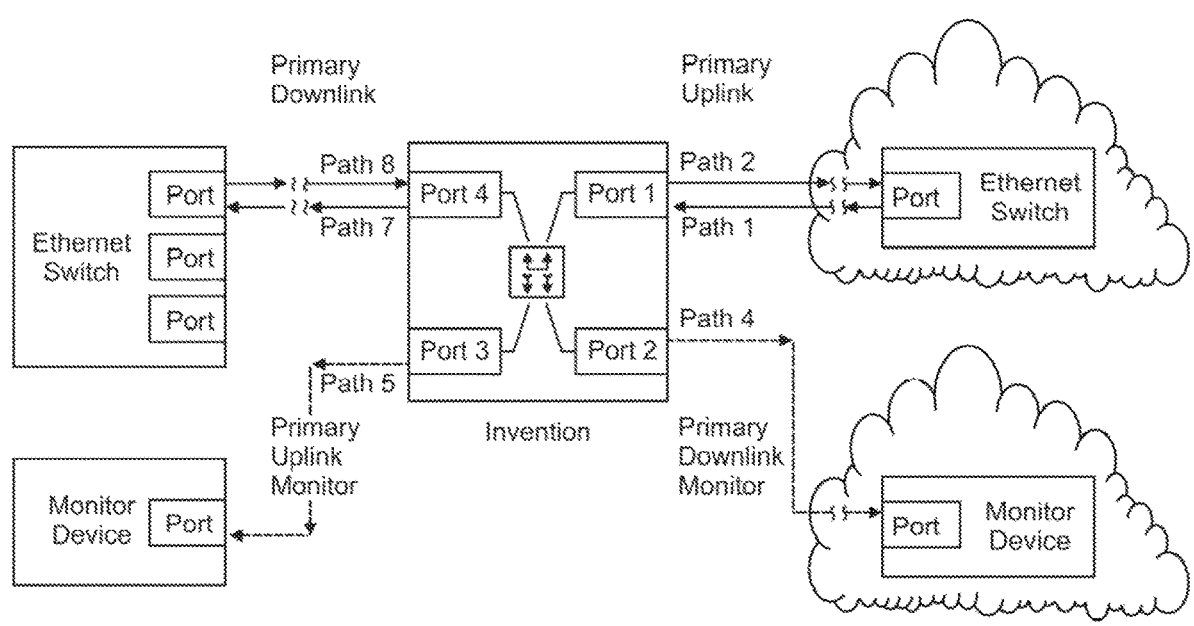
FIG. 19 is a schematic diagram illustrating the communication equipment of the present disclosure providing the functionality of monitoring of the uplink path (or path 1) through path 5 and the downlink path (or path 8) through path 4.
Figure 20:
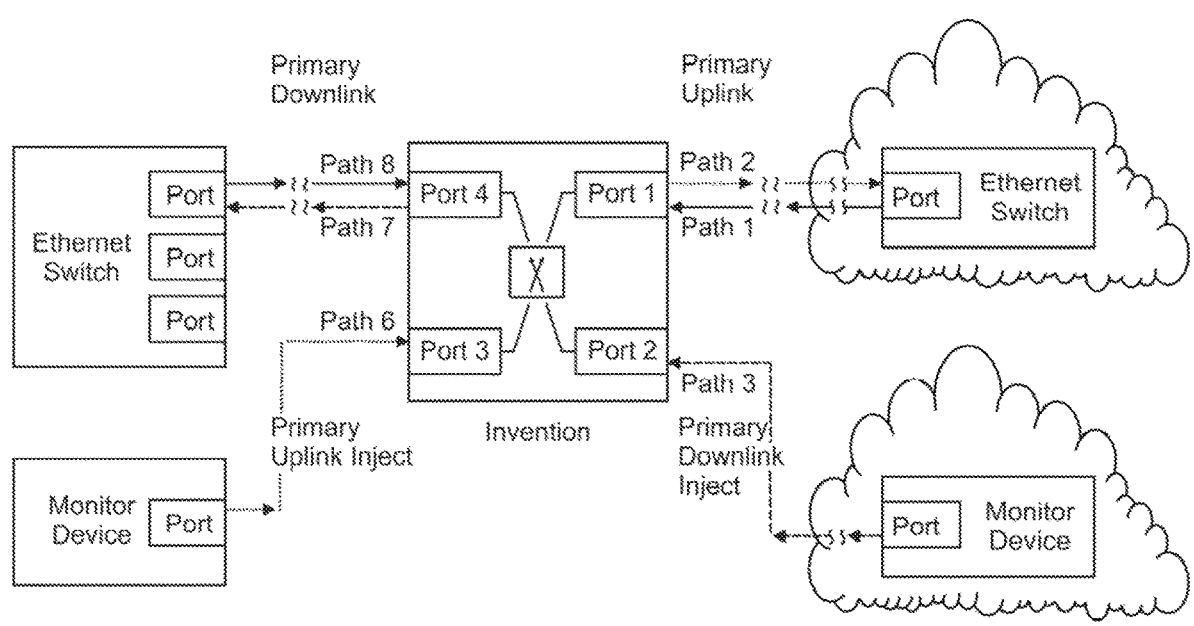
FIG. 20 is a schematic diagram illustrating the communication equipment of the present disclosure providing the functionality of injecting from the secondary path (path 6) into the uplink path (path 2) and of injecting from the secondary path (or path 3) into the downlink path (or path 7).
Figure 21:
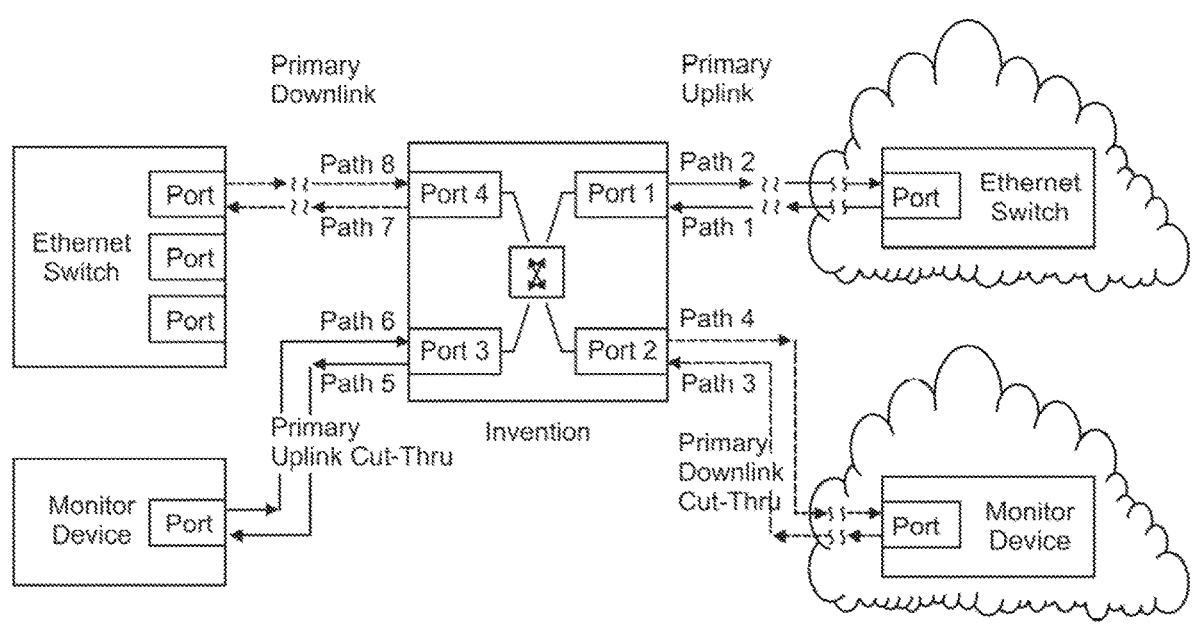
FIG. 21 is a schematic diagram illustrating the communication equipment of the present disclosure providing the functionality of cut-thru of the secondary paths (or path 5 and path 6) into the uplink paths (or path 1 and path 2) and cut-thru of the secondary paths (or path 3 and path 4) into the downlink paths (or path 7 and path 8).

With respect to monitoring, the methods, circuitry and equipment of the present disclosure provide the ability and functionality of injecting and cut-thru using any media type. The user has the flexibility to provide injecting and cut-thru in the primary uplink, primary downlink, or both ports. In FIG. 13, the port 3 path 5 monitors of the primary uplink (port 1) secondary path 1. In FIG. 14, port 3 path 6 can inject into the primary uplink (port 1) path 2 for testing. In FIG. 15, port 3 paths (path 5 and path 6) can cut-thru into the primary uplink (port 1) paths (path 1 and path 2) for testing. In FIG. 16, port 2 path 4 monitors the primary downlink port 4 path 8. In FIG. 17 the port 2 path 3 can inject into the primary downlink port 4 path 7 for testing. In FIG. 18, port 2 paths (path 3 and path 4) can cut-thru into the primary downlink port 4 paths (path 7 and path 8) for testing. In FIG. 19, port 3 path 5 monitors the primary uplink port 1 path 2, and port 2 path 4 monitors the primary downlink port 4 path 8. In FIG. 20, port 3 path 6 can inject into the primary uplink port 1 path 2, and port 2 path 3 can inject into the primary downlink port 4 path 7. In FIG. 21, port 3 paths (path 5 and path 6) can cut-thru into the primary uplink port 1 paths (path 1 and path 2) for testing. In addition, port 2 paths (path 3 and path 4) can cut-thru into the primary downlink port 4 paths (path 7 and path 8) for testing.

With respect to redundancy, the methods, circuitry and equipment of the present disclosure provide the ability and functionality of service protection switching (i.e. redundant services) using any media type. The user has the flexibility to provide redundancy in the uplink or downlink paths for reliability. The user also has the ability to provide redundant service simultaneously from the uplink or downlink path. The ability to provide redundant services in any direction or in both directions will allow the user to ensure the service reliability in all applications.

Figure 22:
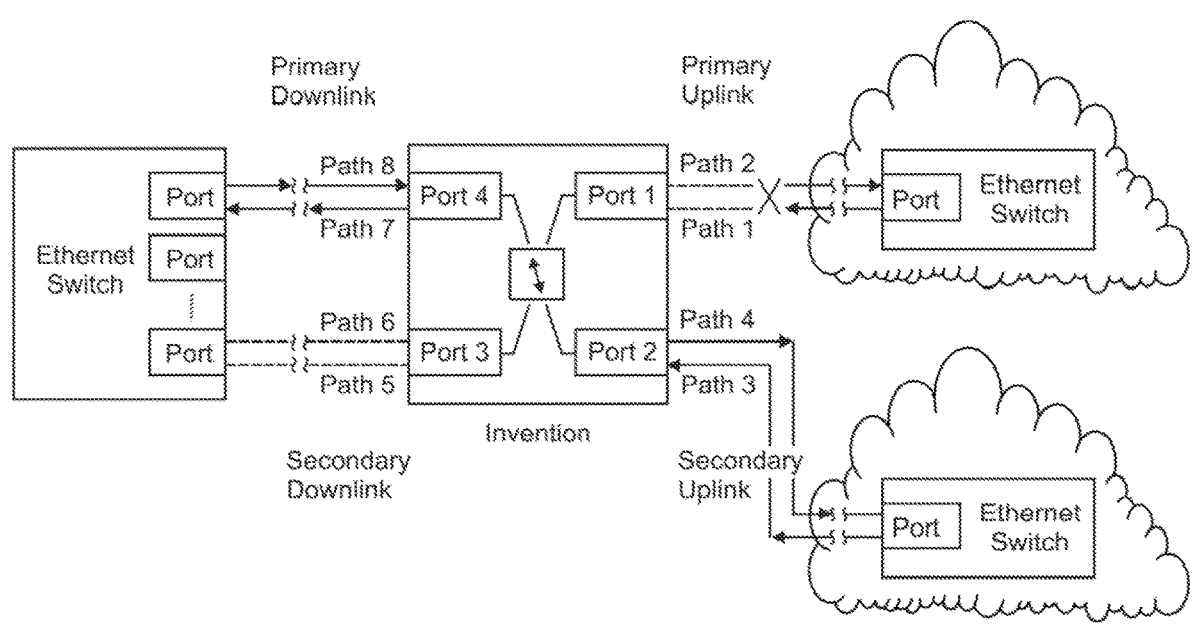
FIG. 22 is a schematic diagram illustrating the communication equipment of the present disclosure providing the functionality of redundancy of the uplink paths (or path 1 and path 2).
Figure 23:
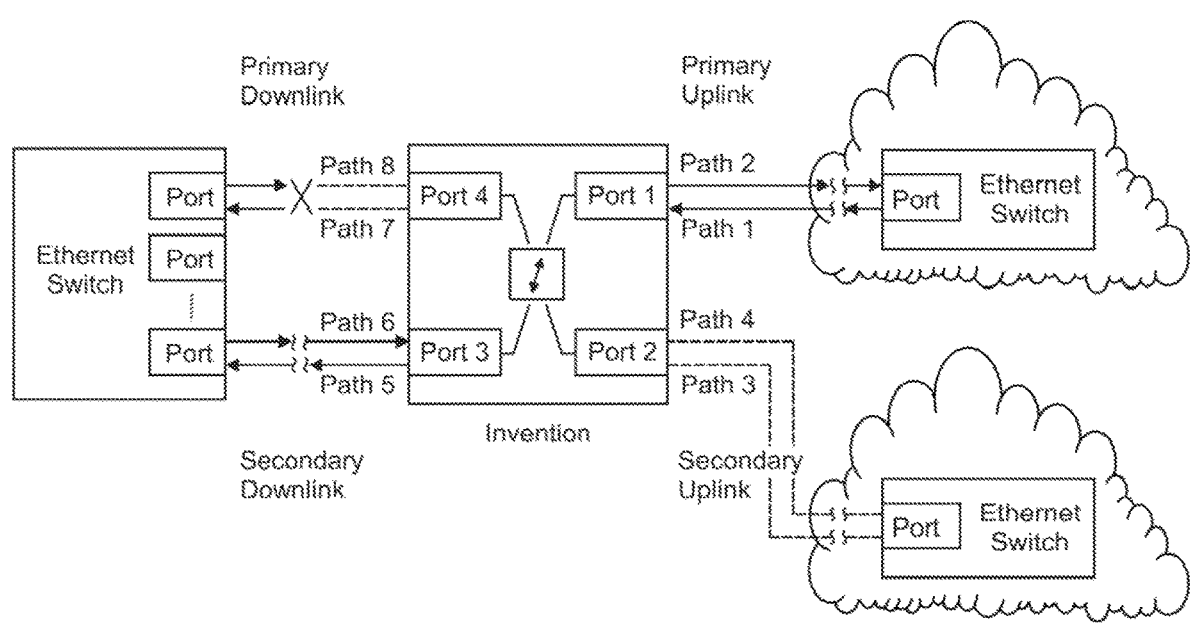
FIG. 23 is a schematic diagram illustrating the communication equipment of the present disclosure providing the functionality of redundancy of the downlink paths (or path 7 and path 8).
Figure 24:
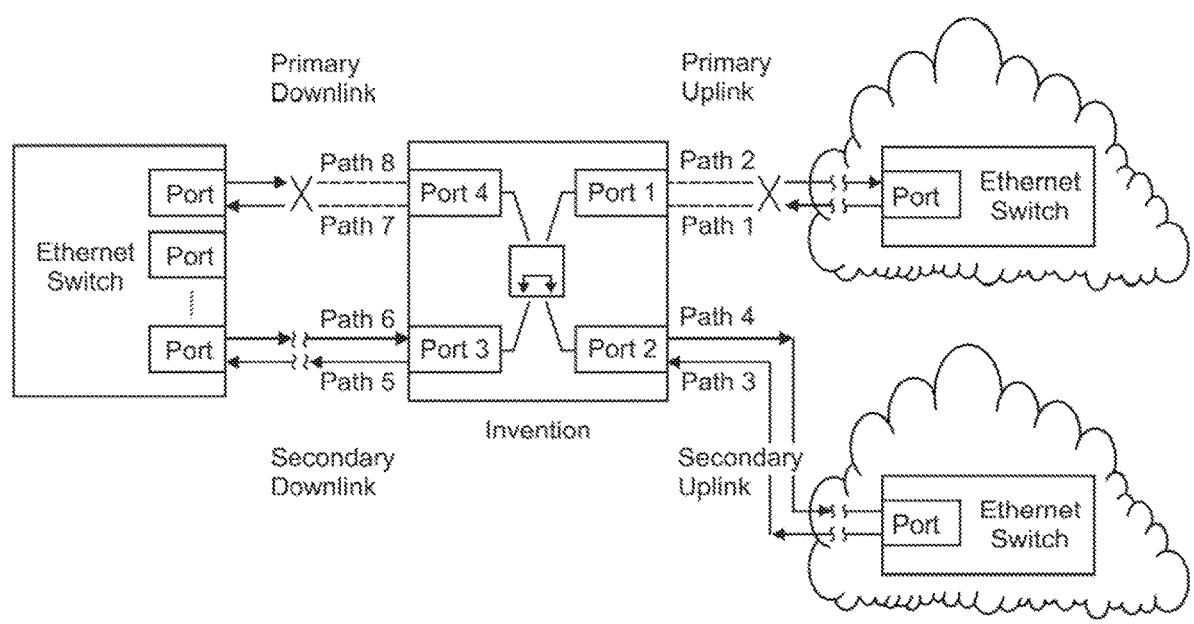
FIG. 24 is a schematic diagram illustrating the communication equipment of the present disclosure providing the functionality of redundancy of both the uplink paths (or path 1 and path 2) and the downlink paths (or path 7 and path 8).

FIGS. 22-24 illustrate the flexibility of the methods, circuitry and equipment of the present disclosure to provide redundancy in one or both paths for reliability. FIG. 22 illustrates the provision of redundancy of the primary uplink port 1 paths (path 1 and path 2) with the secondary uplink port 2 paths (path 3 and path 4) with any media type. The primary downlink port 4 paths (path 7 and path 8) maintain service. FIG. 23 illustrates the provision of redundancy of the primary downlink port 4 paths (path 7 and path 8) with the secondary downlink port 3 paths (path 5 and path 6) with any media type. The primary uplink port 1 paths (path 1 and path 2) maintain service. FIG. 24 illustrates the provision of redundancy of both primary uplink port 1 path (path 1 and path 2) and primary downlink port 4 paths (path 7 and path 8) with any media type. The secondary uplink port 2 paths (path 3 and path 4) and the secondary downlink port 3 paths (path 5 and path 6) maintain service.

Further, the methods, circuitry and equipment of the present disclosure can provide multiple functionality at the same time. For example, the functionality of monitoring or the functionality of cut-thru can be provided at the same time that the functionality of redundancy is being provided. FIGS. 13-21 are illustrative of this. In FIG. 13, the port 3 path 5 monitors the primary uplink port 1 path 1. In FIG. 14, port 3 path 6 can inject into the primary uplink port 1 path 2 for testing. In FIG. 15, port 3 paths (path 5 and path 6) can cut-thru into the primary uplink port 1 paths (path 1 and path 2) for redundancy (i.e. during a protection switch operation) as illustrated. In FIG. 16, port 2 path 4 monitors the primary downlink port 4 path 8. In FIG. 17, the port 2 path 3 can inject into the primary downlink port 4 path 7 for testing. In FIG. 18, port 2 paths (path 3 and path 4) can cut-thru into the primary downlink port 4 paths (path 7 and path 8) for redundancy (i.e. during a protection switch operation) as illustrated.

Figure 25:
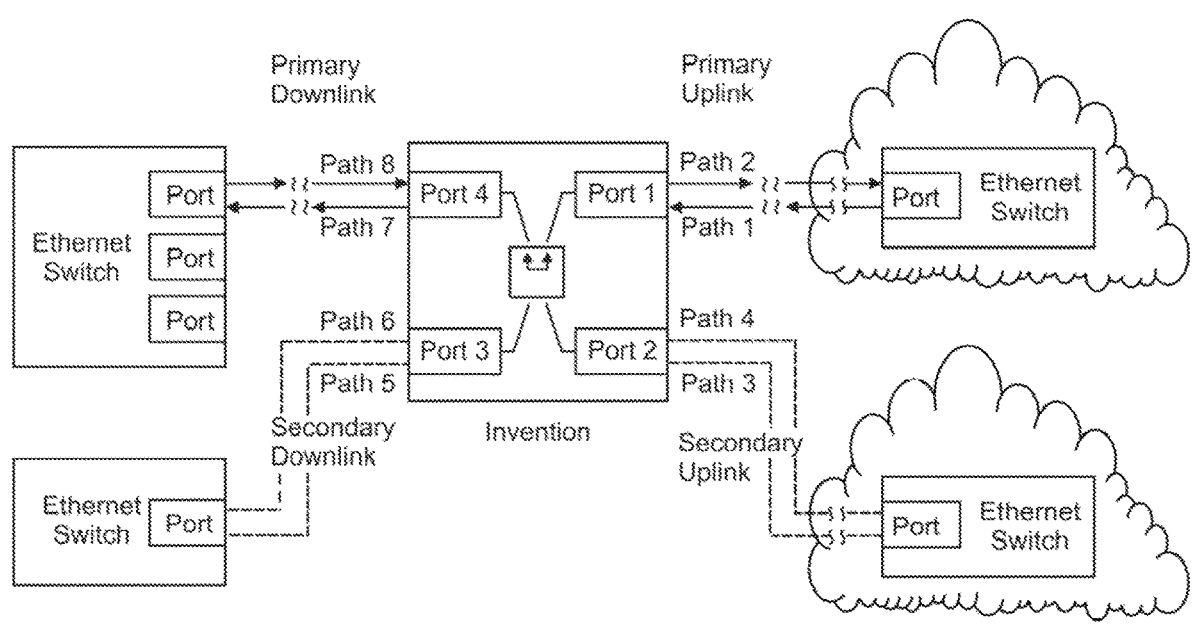
FIG. 25 is a schematic diagram illustrating the communication equipment of the present disclosure provisioned for the functionality of on-demand service.
Figure 26:
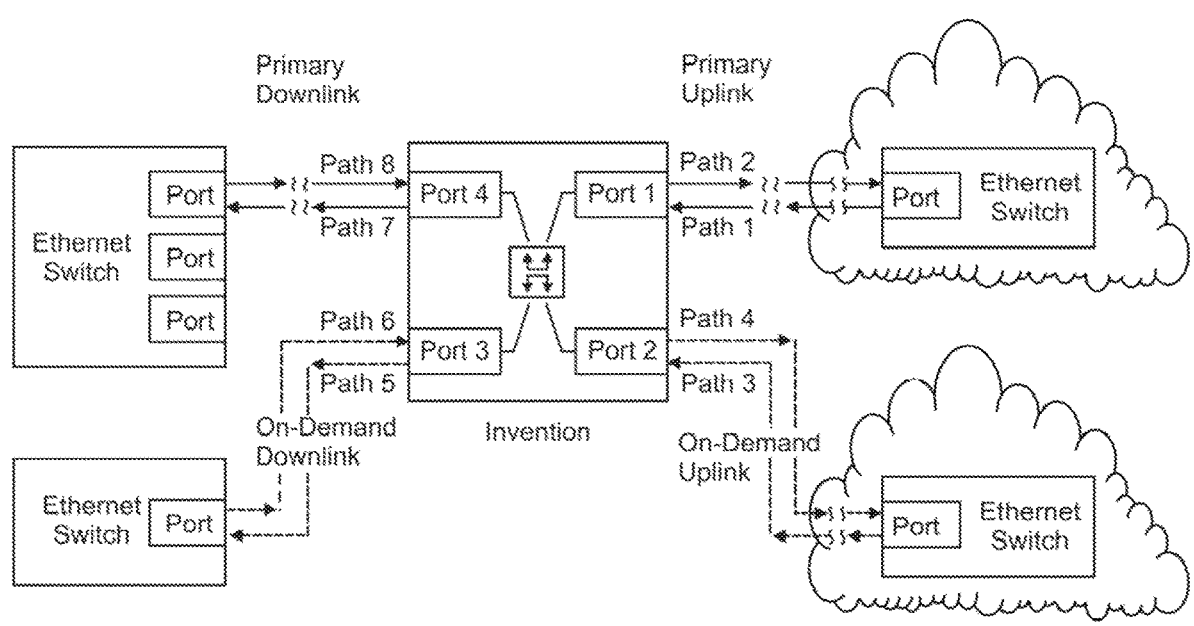
FIG. 26 is a schematic diagram illustrating the communication equipment of the present disclosure providing the functionality of on-demand service.

Still further, the methods, circuitry and equipment of the present disclosure can provide the user with On-Demand, additional service when provisioned for a redundant, monitor, or cut-thru operation. The user can add an additional service without the need to install additional equipment or travel to the facility to add service. As illustrated in FIG. 25, this On-Demand service can be added when the circuitry and equipment of the present disclosure is provisioned in "normal", "monitor", "cut-thru", or "redundant" operations. FIG. 26 illustrates an On-Demand service being provided via the circuitry and equipment of FIG. 25. This on-demand service can be provided with any media type.

Figure 27:
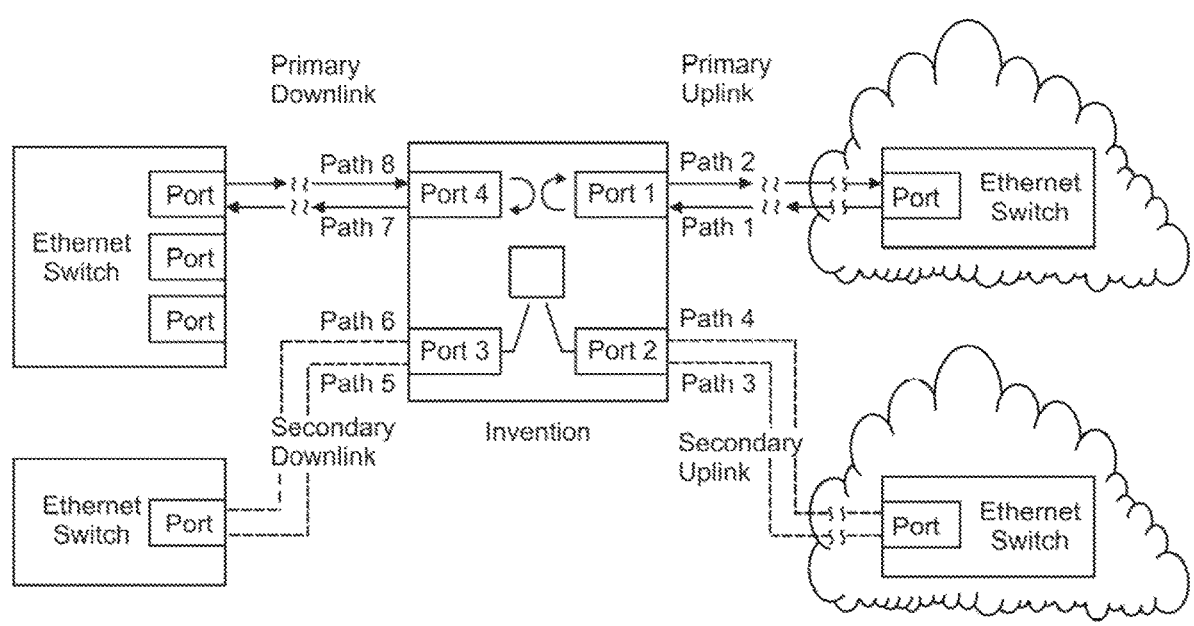
FIG. 27 is a schematic diagram illustrating the communication equipment of the present disclosure providing the functionality of testing the service by routing the signal back to its source.

The methods, circuitry and equipment of the present disclosure also allow the user to test the service by routing the communication signals back to their source. FIG. 27 illustrates this primary method of testing the service path. For the primary uplink port 1, path 1 routes back to path 2. For the primary downlink port 4, path 8 routes back to path 7. Overall, the methods, circuitry and equipment of the present disclosure will allow the use the ability to fully access (transmit and receive) the communication service, 10/100/10GE, SAN, SONET, Video, etc., to perform diagnostic, troubleshooting, or other functions from a monitoring or tap function.

Figure 28:
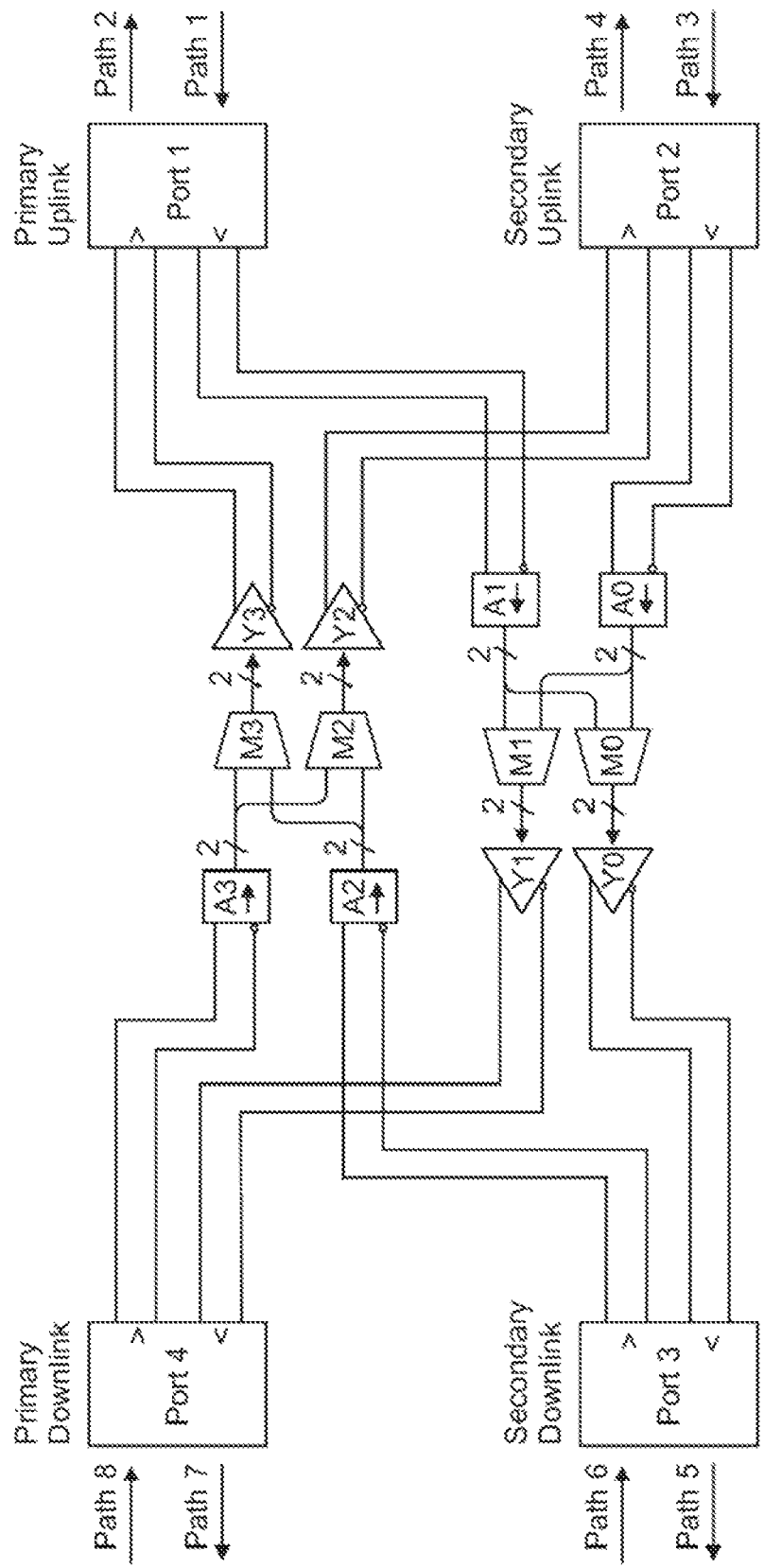
FIG. 28 is a block diagram illustrating one embodiment of the present disclosure.

FIG. 28 illustrates a block diagram of circuitry of the present disclosure involving four ports; Port 1, Port 2, Port 3, and Port 4 and eight differential signal paths. Port 1 has two differential signal paths, P1 and P2. Port 2 has two differential signal paths P3 and P)4.

Port 3 has two differential signal paths P5 and P6. Port 4 has two differential signal paths P7 and P8.

There are four input broadband differential amplifiers A0, A1, A2, and A3. The broadband differential amplifiers provide amplification and conditioning of the input signal.

There are four multiplexer switches M0, M1, M2, and M3. The multiplexer switches functions as a crosspoint switch, demultiplexer, or multiplexer for routing the signals. There are four high speed output differential amplifiers Y0, Y1, Y2, and Y3. The high speed output differential amplifiers provide fixed or variable output voltages with and without pre-emphasis.

Port 1 comprises a Path P1 representing an input differential signal and a Path P2 representing an output differential signal. Port 2 comprises a Path P3 representing an input differential signal and a Path P4 representing an output differential signal. Port 3 comprises a Path P6 representing an input differential signal and a Path P5 representing an output differential signal. Port 4 comprises a Path P8 representing an input differential signal and a Path P7 representing an output differential signal.

Path P1 input differential signals connect to the input differential amplifier A1. The output signal from differential amplifier A1 can be a differential or common-mode signal. This output signal from differential amplifier A1 connects to the input of Multiplexer Switch M1 and M0.

Path P2 output differential signals connect to the output differential amplifier Y3. The input signal to differential amplifier Y3 can be a differential or common-mode signal. This input signal to differential amplifier Y3 connects to the output of Multiplexer Switch M3.

Path P3 input differential signals connect to the input differential amplifier A0. The output signal from differential amplifier A0 can be a differential or common-mode signal. This output signal from differential amplifier A0 connects to the input of Multiplexer Switch M0 and M1.

Path P4 output differential signals connect to the output differential amplifier Y2. The input signal to differential amplifier Y2 can be a differential or common-mode signal. This input signal to differential amplifier Y2 connects to the output of Multiplexer Switch M2.

Path P5 output differential signals connect to the output differential amplifier Y0. The input signal to differential amplifier Y0 connects to the output of Multiplexer Switch M0.

Path P6 input differential signals connect to the input differential amplifier A2. The output signal from differential amplifier A2 can be a differential or common-mode signal. This output signal from differential amplifier A2 connects to the input of Multiplexer Switch M2 and M3.

Path P7 output differential signals connect to the output differential amplifier Y1. The input signal to differential amplifier Y1 connects to the output of Multiplexer Switch M1.

Path P8 input differential signals connect to the input differential amplifier A3. The output signal from differential amplifier A3 can be a differential or common-mode signal. This output signal from differential amplifier A3 connects to the input of Multiplexer Switch M3 and M2.

Figure 29:
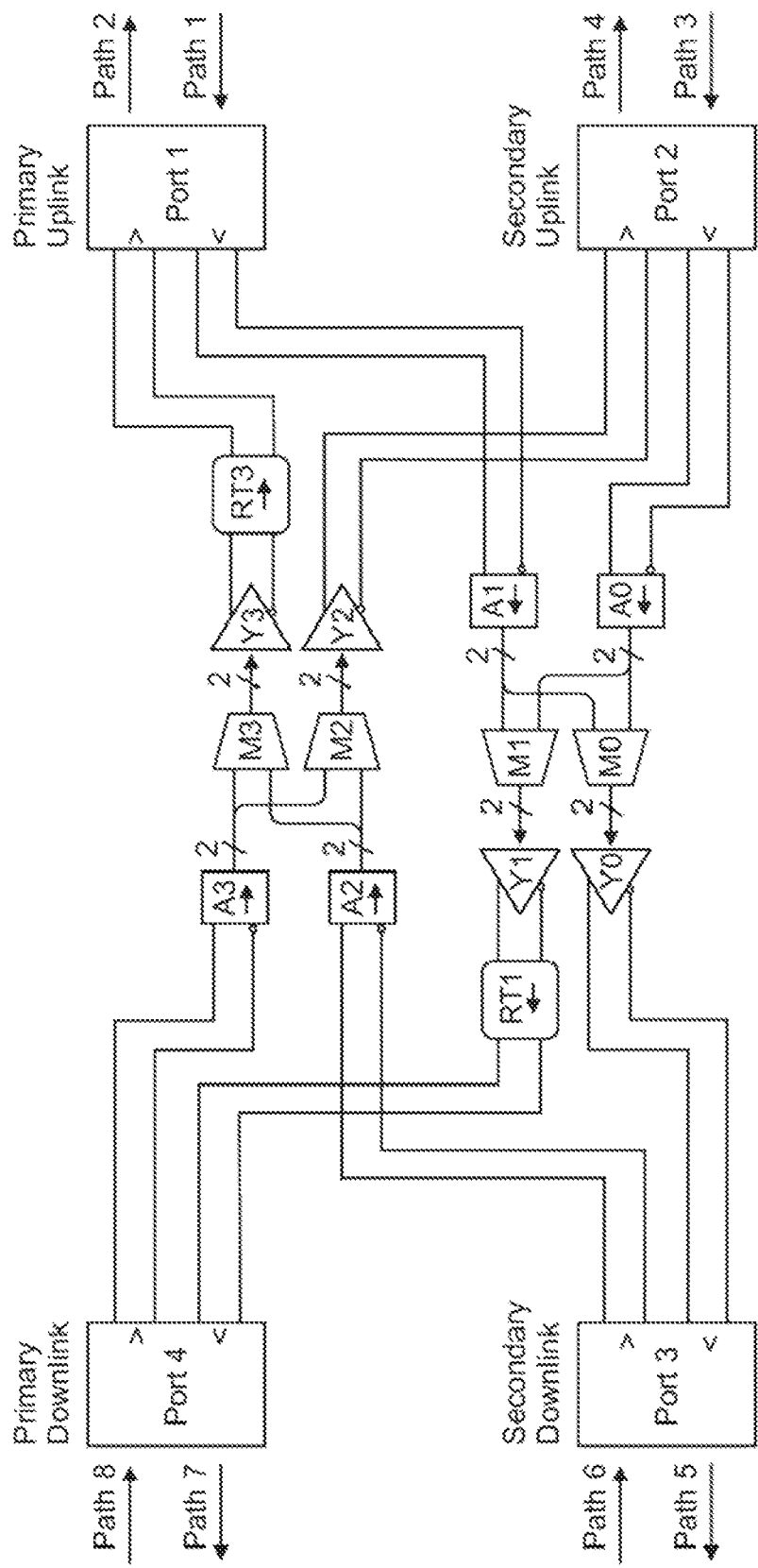
FIG. 29 is a block diagram illustrating another embodiment of the present disclosure with retimers on port 1 path 2 and port 4 path 7.

FIG. 29 illustrates a block diagram of an alternate embodiment of the circuitry of the present disclosure. The circuitry includes differential input amplifiers A0, A1, A2, and A3, multiplexers M0. M1, M2, and M3, retimers RT1 and RT3, and differential output amplifiers Y0, Y1, Y2, and Y3. The RT1 retimes the primary downlink signal to port 4 path 7 and RT3 retimes the primary uplink signal to port 1 path 2. RT1 and RT3 remove high-frequency jitter from the input signal and producing an output signal with reduced jitter.

Figure 30:
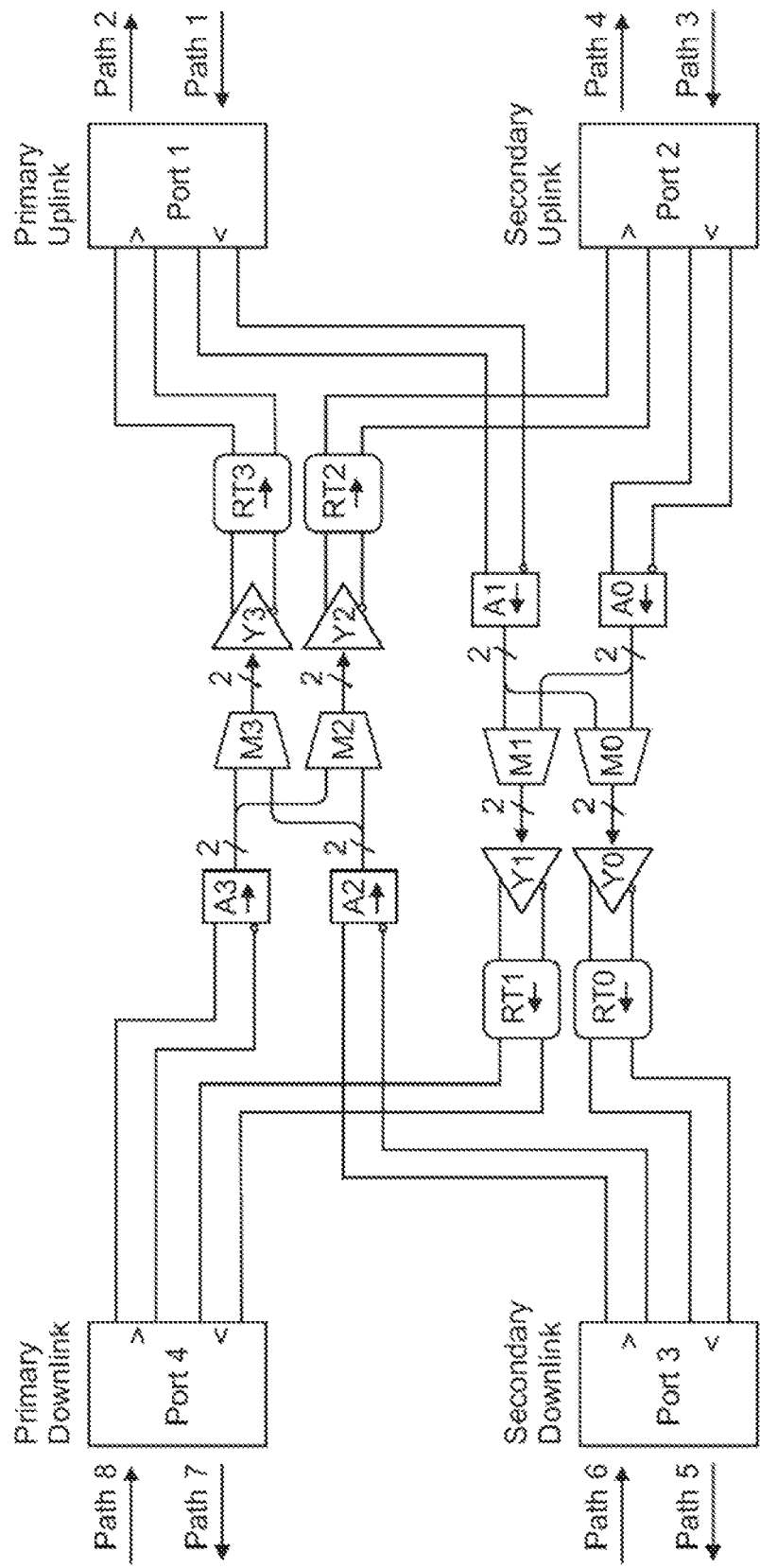
FIG. 30 is a block diagram illustrating another embodiment of the present disclosure with retimers on port 1 path 2, port 2 path 4, port 3 path 5, and port 4 path 7.

FIG. 30 illustrates another block diagram of the circuitry or the present disclosure. The circuitry includes amplifiers A0, A1, A2, and A3, multiplexers M0, M1, M2, and M3, retimers RT0, RT1, RT2, and RT3, and differential output amplifiers Y0, Y1, Y2, and Y3. This embodiment includes retimers on port 1 path 2, port 2 path 4, port 3 path 5, and port 4 path 7 to remove high-frequency jitter from the input signal and produce an output signal with reduced jitter.

Figure 31:
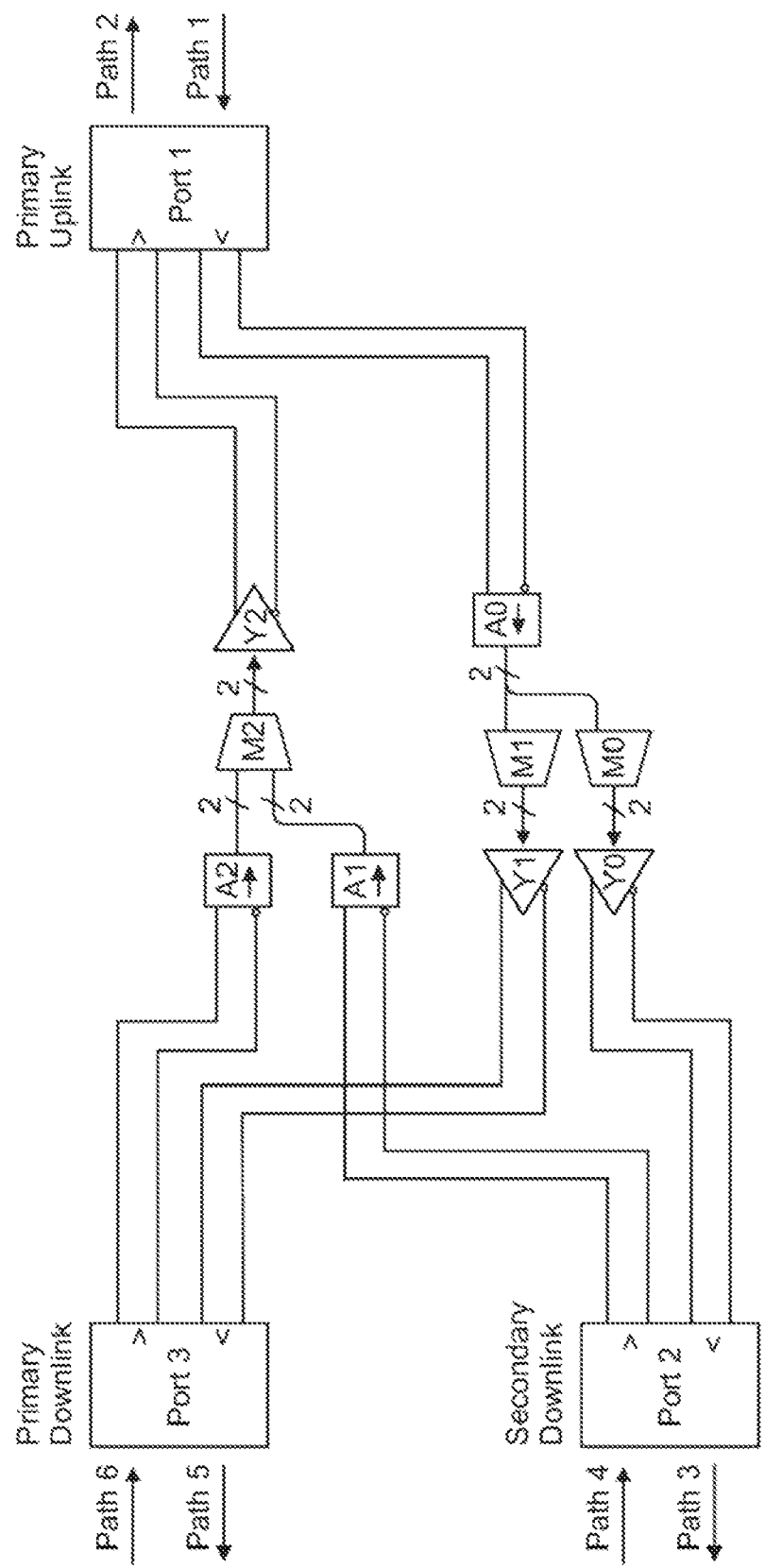
FIG. 31 is a block diagram illustrating another embodiment of the present disclosure with three ports.

FIG. 31 illustrates a block diagram of the circuitry of another embodiment of the present disclosure having three ports (Ports 1-3) and six paths (Paths 1-6). The circuitry includes differential input amplifiers A0, A1, A2, multiplexers M0, M1, and M2, and differential output Y0, Y1, and Y2. This embodiment provides monitoring, cut-thru, and redundancy using three ports. On-demand functionality is not supported in this embodiment due to the implementation of only three ports.

Figure 32:
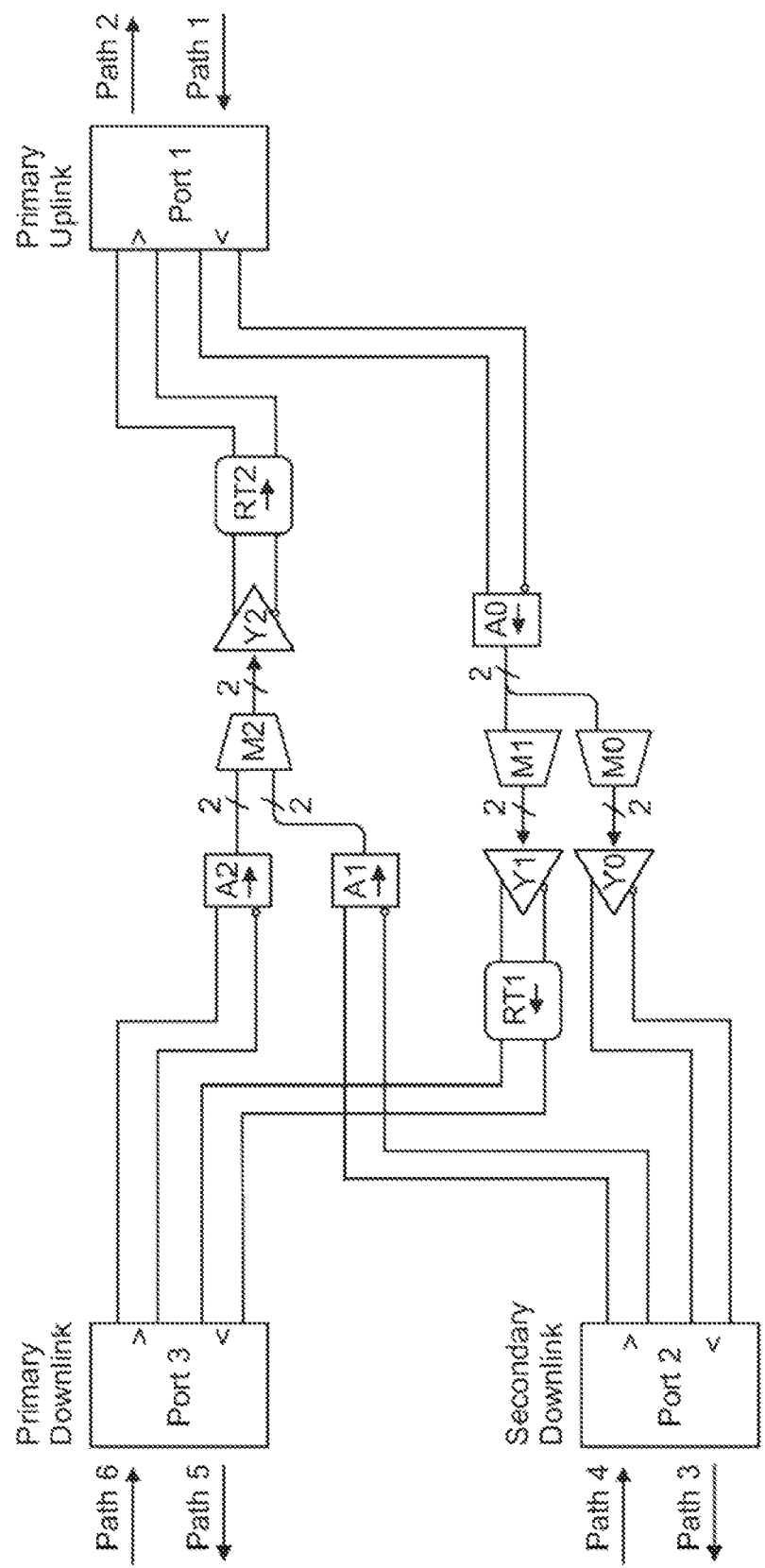
FIG. 32 is a block diagram illustrating another embodiment of the present disclosure with three ports and retimers.

FIG. 32 illustrates a block diagram of the circuitry of another embodiment of the present disclosure. The circuitry includes differential input amplifiers A0, A1, A2, multiplexers M0, M1, and M2, retimers RT1 and RT2, and differential output Y0, Y1, and Y2.

The retimers function to remove high-frequency jitter from the input signal and produce an output signal with reduced jitter. This embodiment provides monitoring, cut-thru, and redundancy using three ports. On-demand functionality is not supported in this embodiment due to the implementation of only three ports.

Figure 33:
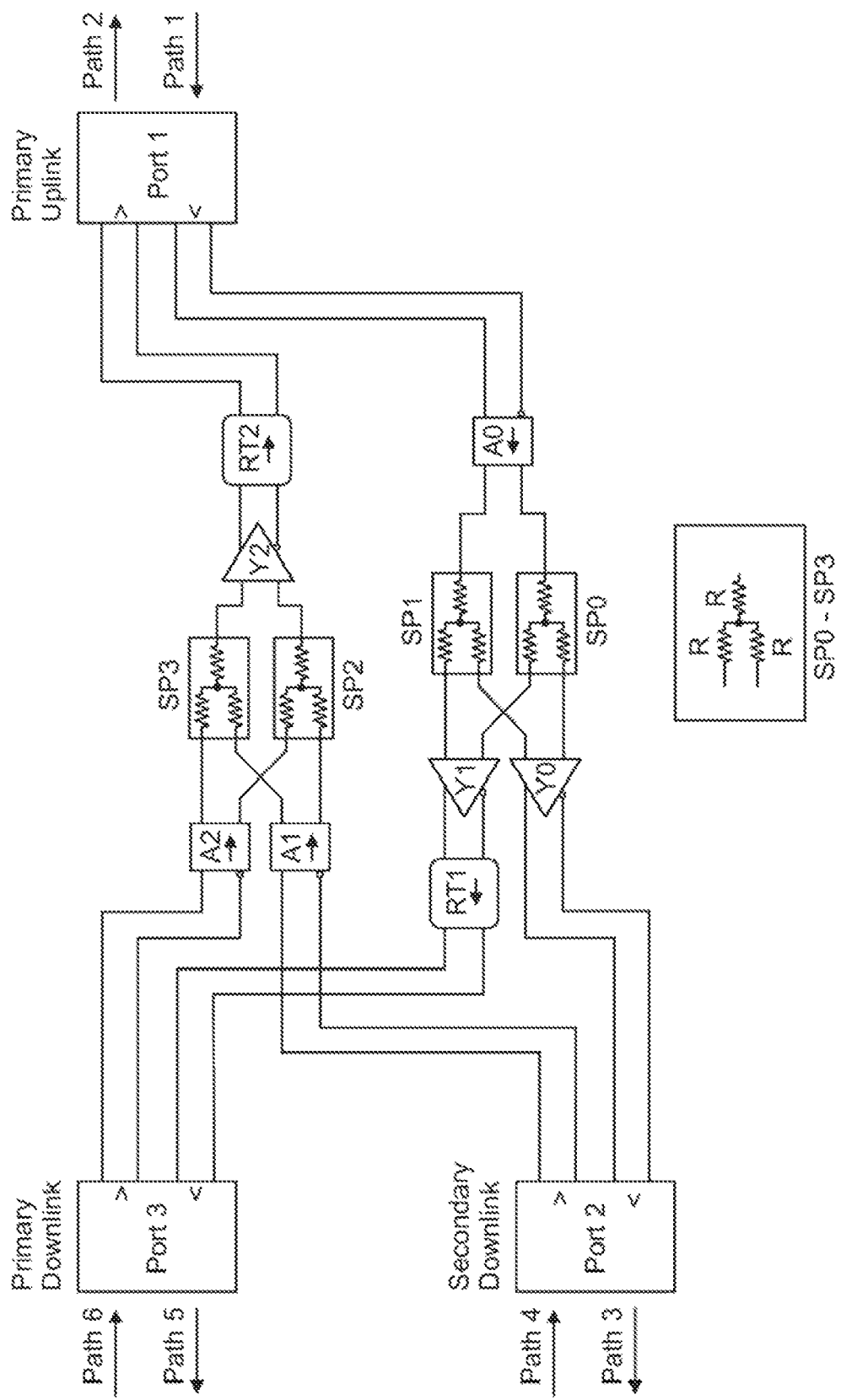
FIG. 33 is a block diagram illustrating another embodiment of the present disclosure with three ports and retimers and using resistive dividers.

FIG. 33 illustrates a block diagram of the circuitry of another embodiment of the present disclosure. The circuitry includes differential input amplifiers A0, A1, A2, splitters SP0, SP1, SP2, and SP3, retimers RT1 and RT2, and differential output Y0, Y1, and Y2, ln this embodiment, the splitters SP0-SP3 take the place of the multiplexer switches M0-M2 in the previous embodiment of FIG. 32. The splitter SP0-SP3 impedance must match the differential impedance of the signal lines, which is 100Ω. Each splitter SP0-SP3 will have a resistor value R of 16.5Ω1%. This embodiment provides monitoring, cut-thru, and redundancy using three ports. On-demand functionality is not supported in this embodiment due to the implementation of only three ports.

Figure 34:
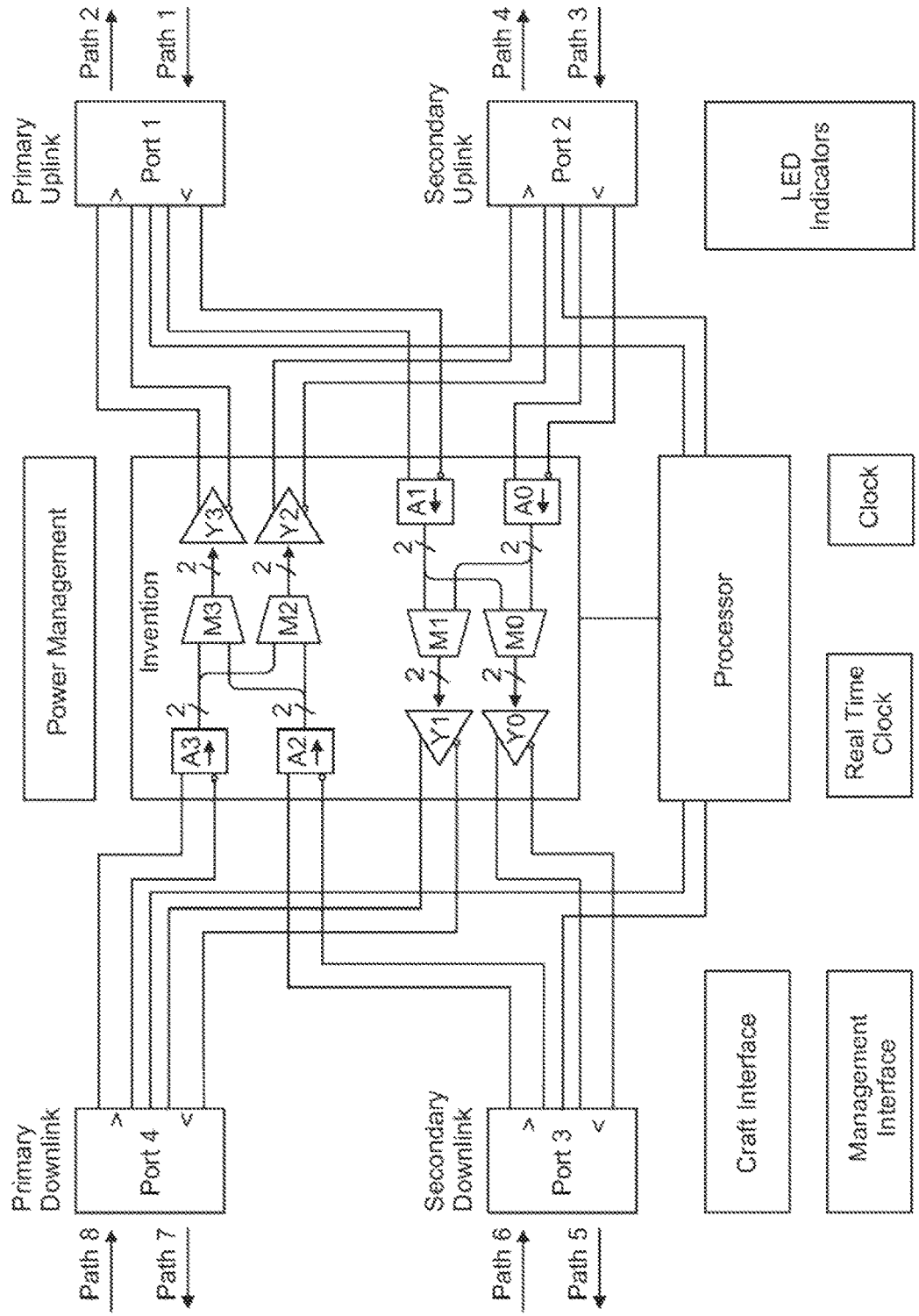
FIG. 34 is a block diagram illustrating exemplary communication equipment incorporating one or more aspects or features of the present disclosure.

FIG. 34 is a detailed block diagram of an exemplary embodiment of the communication equipment of the present disclosure providing the functionality described above. The communication equipment is illustrated as having four ports (Ports 1-4), eight paths (Paths 1-8), four input broadband differential amplifiers A0-A3, four multiplexer switches M4-M3, and four high speed output differential amplifiers Y0-Y3. The equipment also comprises a processor, a clock, a real time clock, LED indicators, a craft interface, a management interface, and power management.

Figure 35:
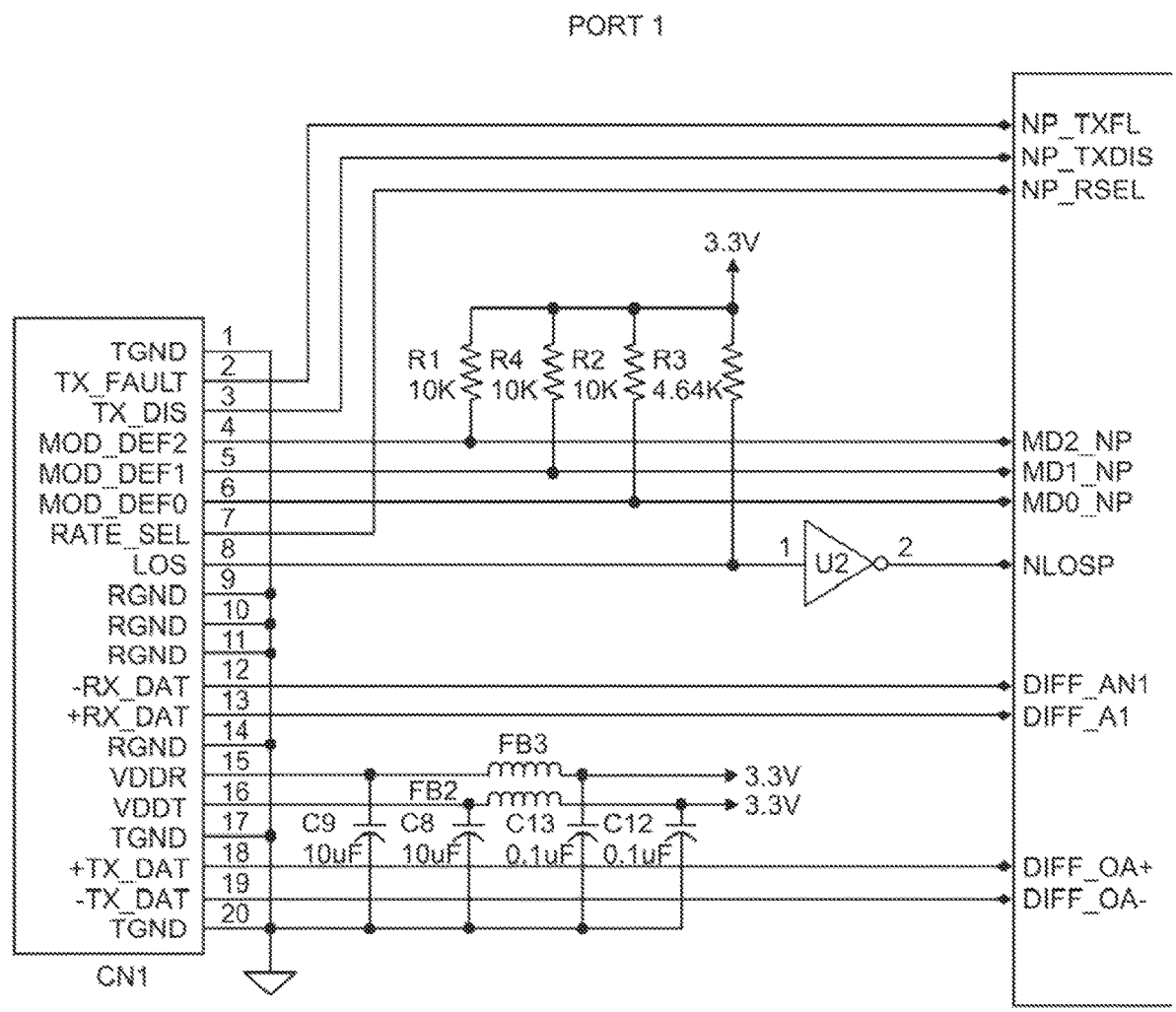
FIG. 35 is a circuit diagram of Port 1 (Primary Uplink) of the communication equipment of FIG. 34.

FIG. 35 is a circuit diagram of the primary uplink port 1. Connector CN1 accepts SFP+ pluggable devices, resistors R1, R2, R3 and R4 are pullup resistors for open impedance connections. Integrated circuit U2 is an inverter for the primary uplink SFP+ device open drain loss-of-signal (LOS) connection. Capacitors C8, C9, C12, and C13 and Ferrite beads FB2 and FB3 provide power supply filtering for the SFP+ device.

Figure 36:
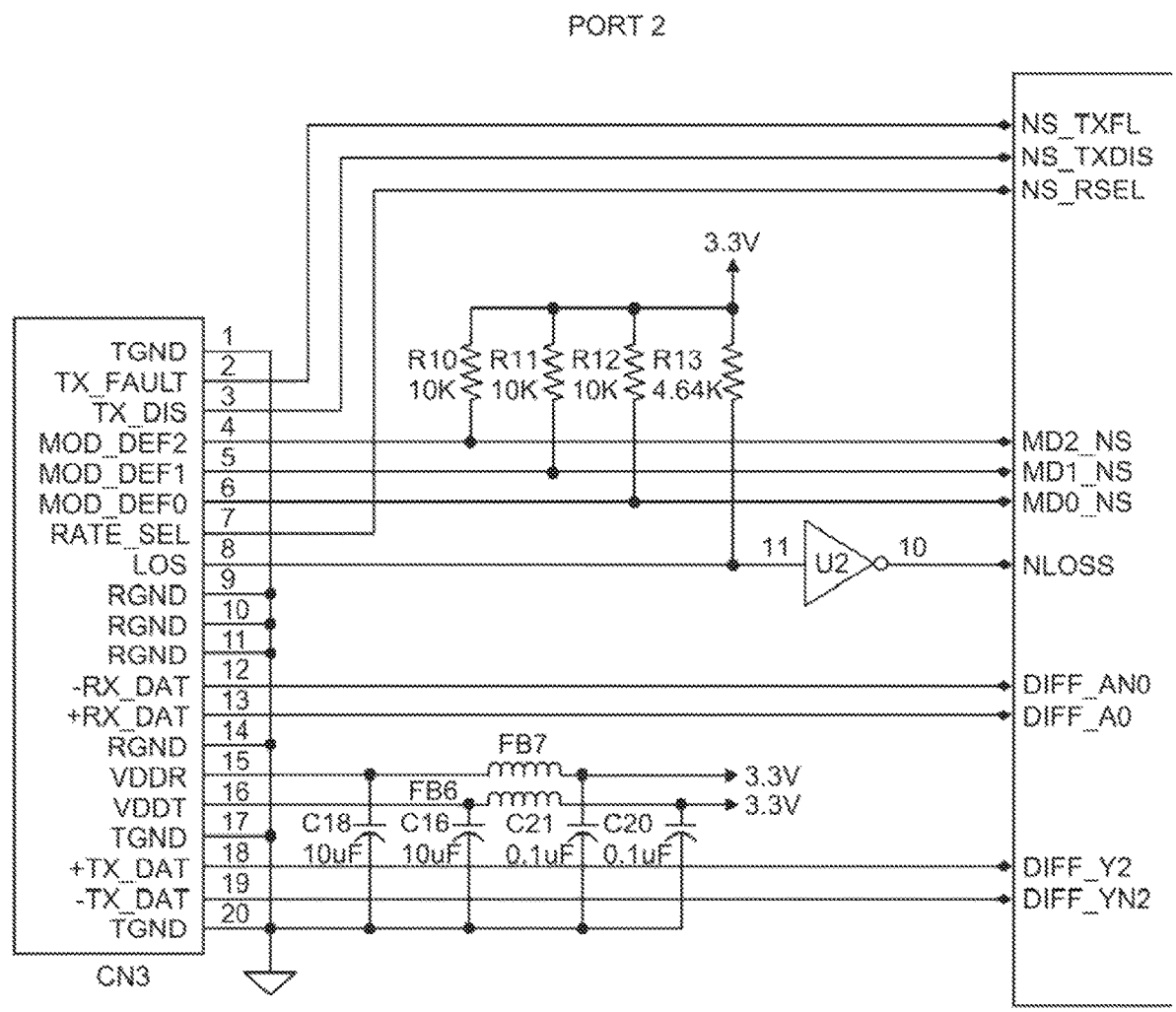
FIG. 36 is a circuit diagram of Port 2 (Secondary Uplink, Downlink Monitor/Inject, or Downlink Cut-Thru) of the communication equipment of FIG. 34.

FIG. 36 is a circuit diagram of the primary downlink monitor, inject, and cut-thru, secondary port 2 (as illustrated in FIGS. 16-18 respectively), which is also the secondary uplink port for On-demand services (as illustrated in FIG. 25). Connector CN3 accepts SFP+ pluggable devices, resistors R10, R11. R12, and R13 are pullup resistors for open impedance connections. Integrated circuit U2 is an inverter for the primary uplink SFP+ device open drain loss-of-signal (LOS) connection. Capacitors C16, C18, C20, and C21 and Ferrite beads FB6 and FB7 provide power supply filtering for the SFP+ device.

Figure 37:
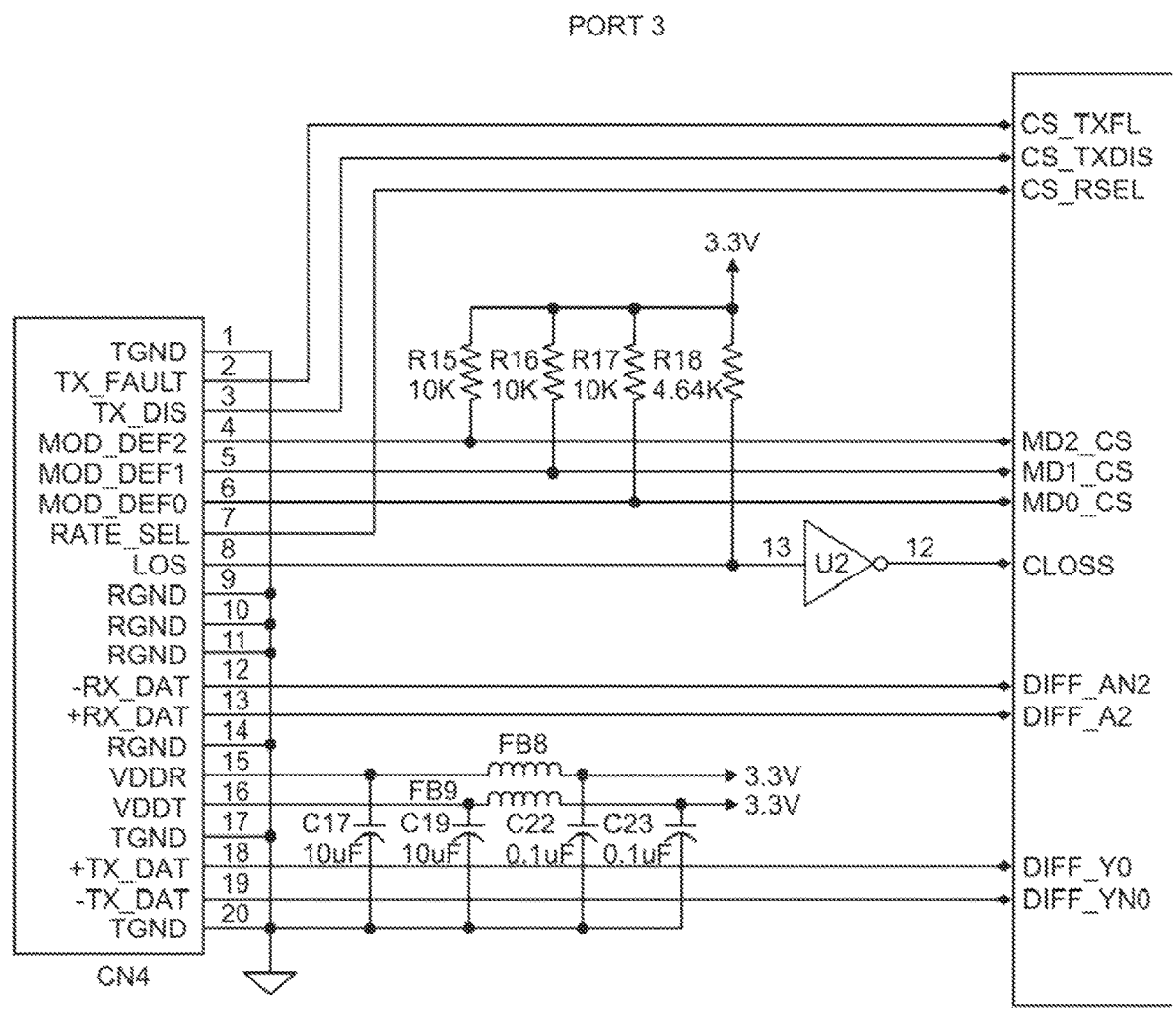
FIG. 37 is a circuit diagram of Port 3 (Secondary Downlink, Uplink Monitor/Inject, Uplink Cut-Thru) of the communication equipment of FIG. 34.

FIG. 37 is a circuit diagram of the primary uplink monitor, inject, and cut-thru, secondary port 3 (as illustrated in FIGS. 19-21 respectively), which is also the secondary downlink port for On-demand services (as illustrated in FIG. 25). Connector CN4 accepts SFP+ pluggable devices, resistors R15, R16, R17, and RIS are pullup resistors for open impedance connections. Integrated circuit U2 is an inverter for the primary uplink SFP+ device open drain loss-of-signal (IOS) connection. Capacitors C17, C19. C22, and C23 and Ferrite beads FB8 and FB9 provide power supply filtering for the SFP+ device.

Figure 38:
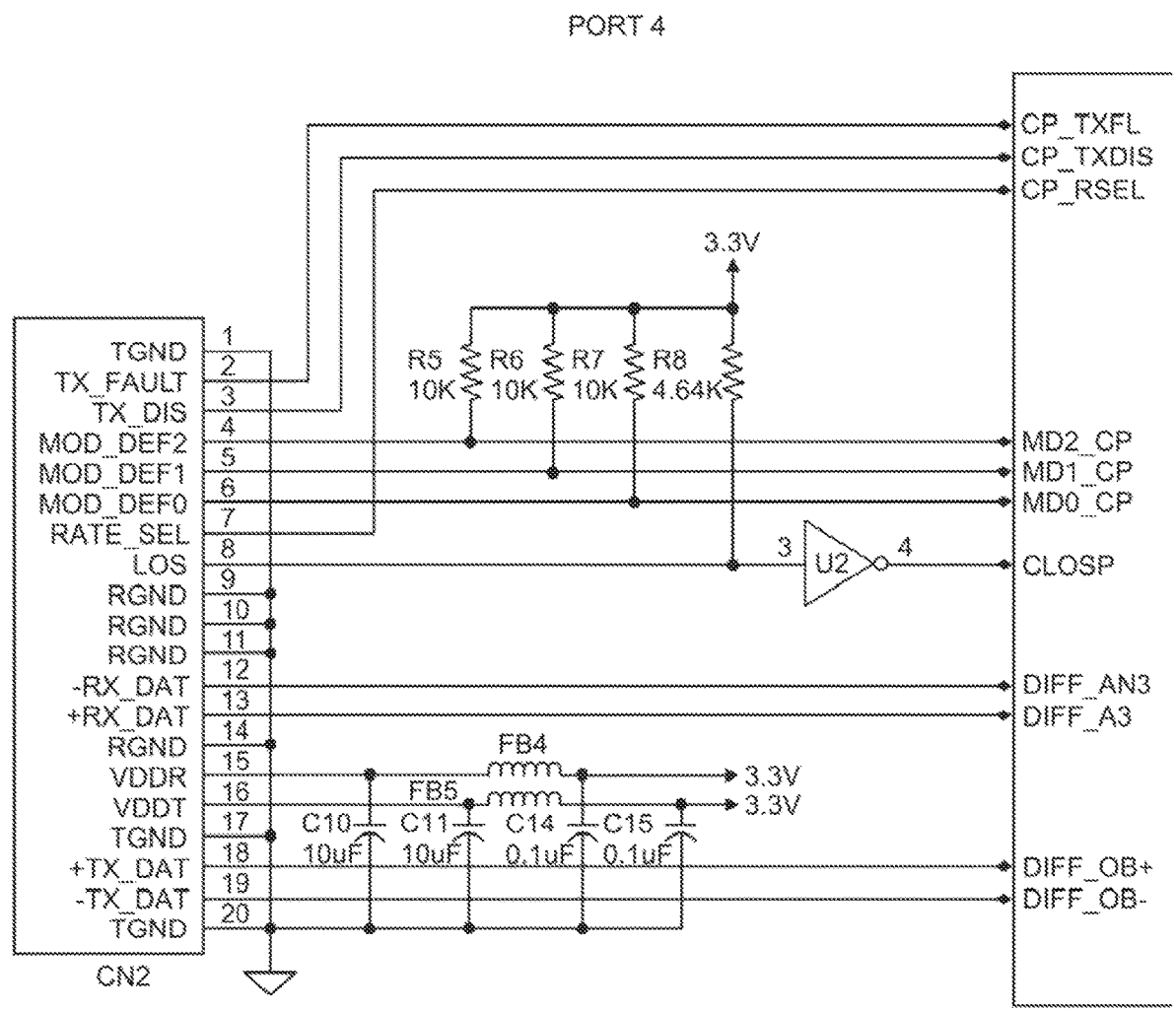
FIG. 38 is a circuit diagram of Port 4 (Primary Downlink) of the communication equipment of FIG. 34.

FIG. 38 is a circuit diagram of the primary downlink port 4. Connector CN2 accepts SFP+ pluggable devices, resistors R5, R6, R7, and R8 are pullup resistors for open impedance connections. Integrated circuit U2 is an inverter for the primary uplink SFP+ device open drain loss-of-signal (LOS) connection. Capacitors C10, C11. C14, and C15 and Ferrite beads FB4 and FB5 provide power supply filtering for the SFP+ device.

Figure 39:
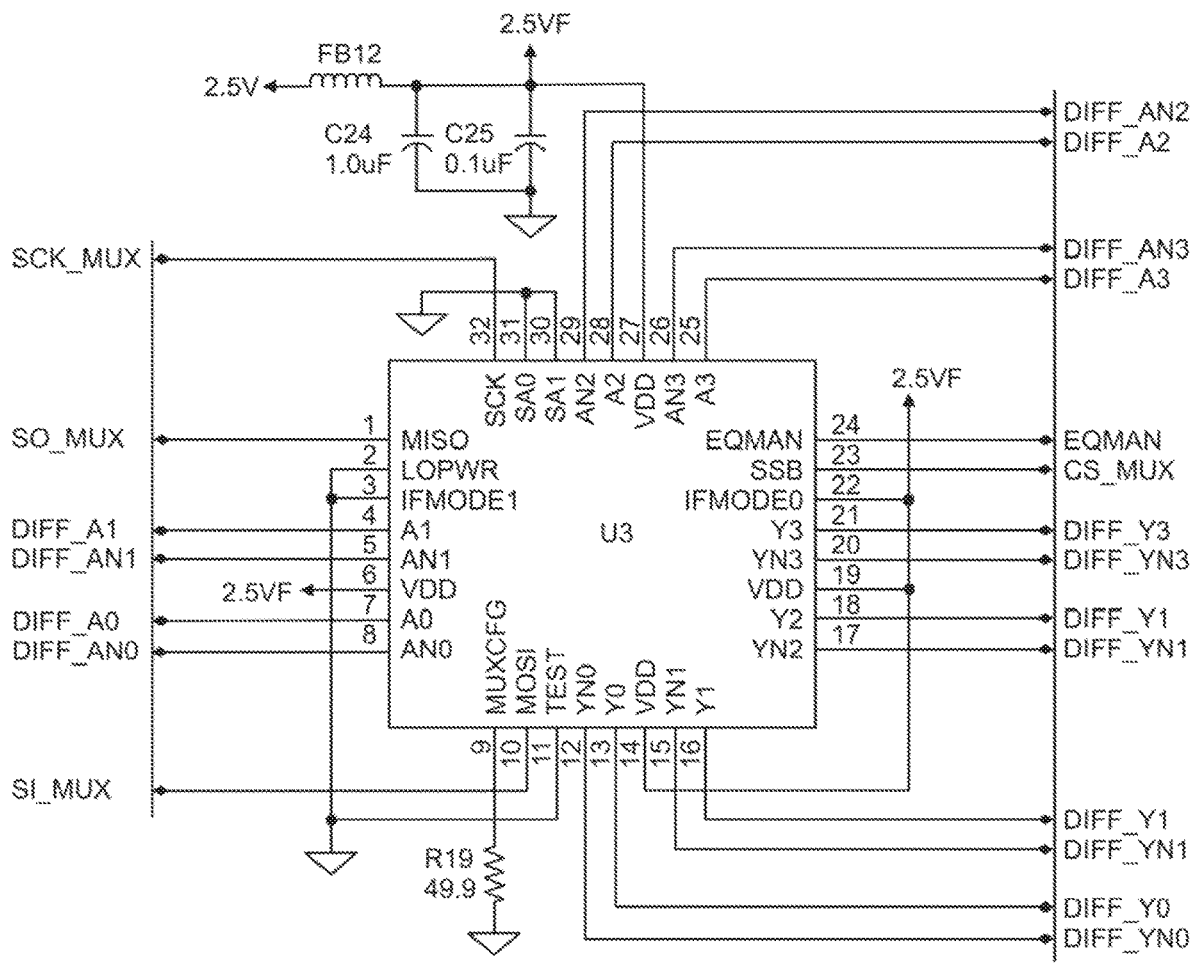
FIG. 39 is a circuit diagram of an integrated chip of the present disclosure functioning as a Multiplexer and Amplifier.
Figure 39:
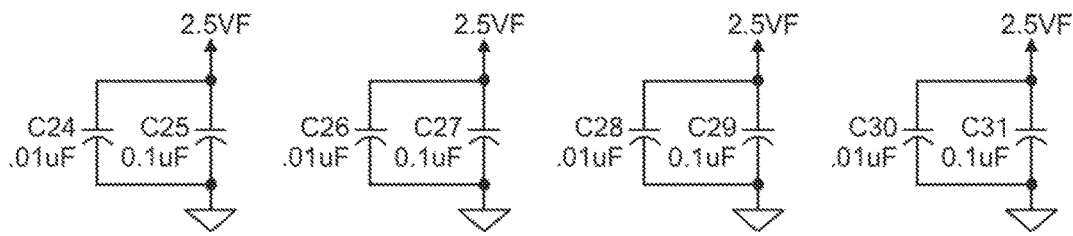

FIG. 39 is a circuit diagram of an integrated circuit U3 providing the input broadband amplifiers, output broadband amplifiers, and the 2-1 multiplex-demultiplexer circuitry. U3 is represented by a Microsemi VSC7111 11.5 Gbps Quad Signal Conditioner Mux/Demux or VSC7113 10.3 Gbps Quad Signal Conditioner Mux/Demux part. The VSC7111 and VSC7113 devices operate at a maximum frequency of 11.5 Gb/s and 10.3 Gb/s, respectively. The VSC7113 device is cost optimized for IAN 10G Ethernet services, whereas the VSC7111 device can also support WAN 10G Ethernet.

Figure 40:
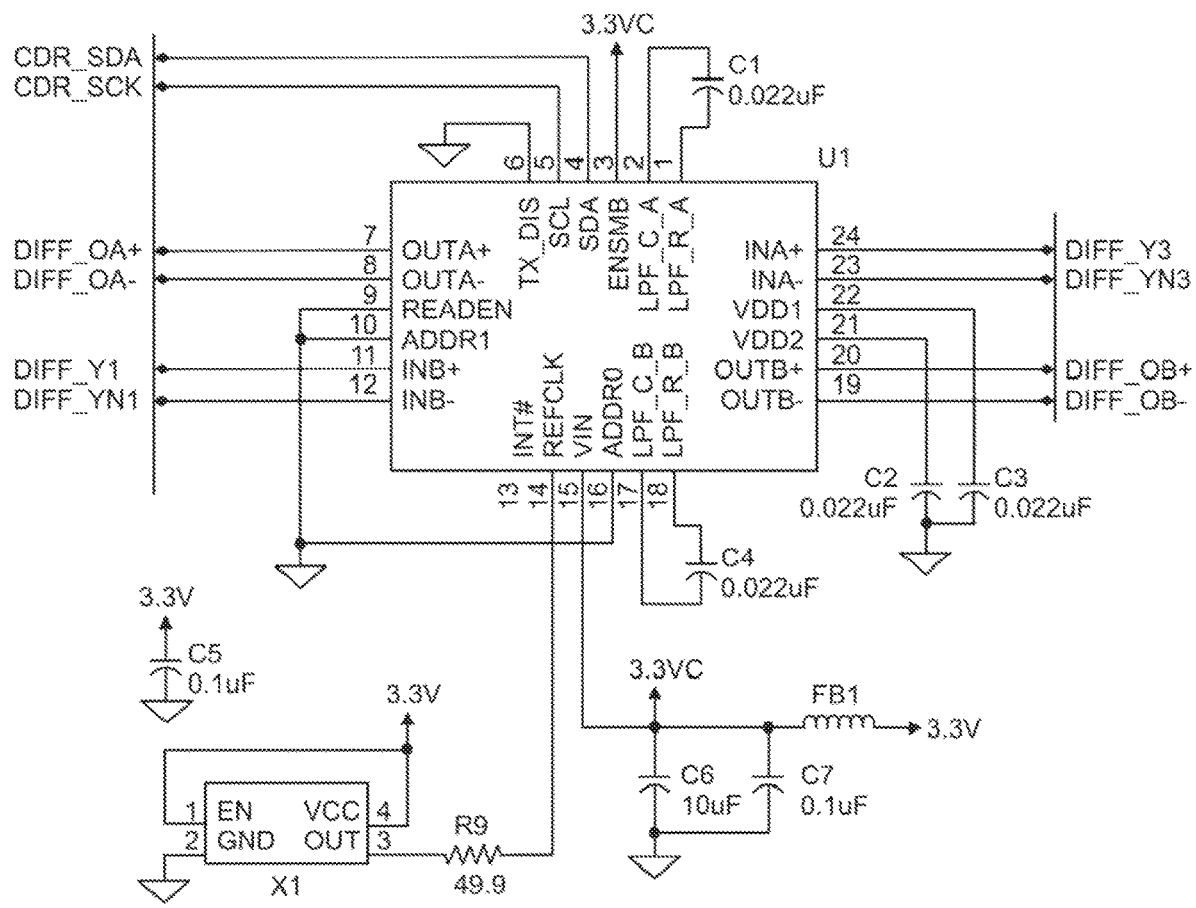
FIG. 40 is a circuit diagram of an integrated chip of the present disclosure functioning as a retimer.

FIG. 40 is a circuit diagram of the retimer circuitry, an integrated circuit U1. The retimer is required for customer applications requiring low jitter and to meet the requirements of SFF-8431 Enhanced Small Form Factor Pluggable Module SFP+, Revision 4.1, July 6, 2009. UI is represented by a Texas Instrument DS110DF111 Multi-Protocol 2-Channel 8.5-11.3 Gb/s Retimer or DS110DF125 Multi-Protocol 2-Channel 9.8-12.5 Gb/s Retimer part. A 25 MHz clock oscillator X1 provides a stable reference to the U1 device.

Figure 41:
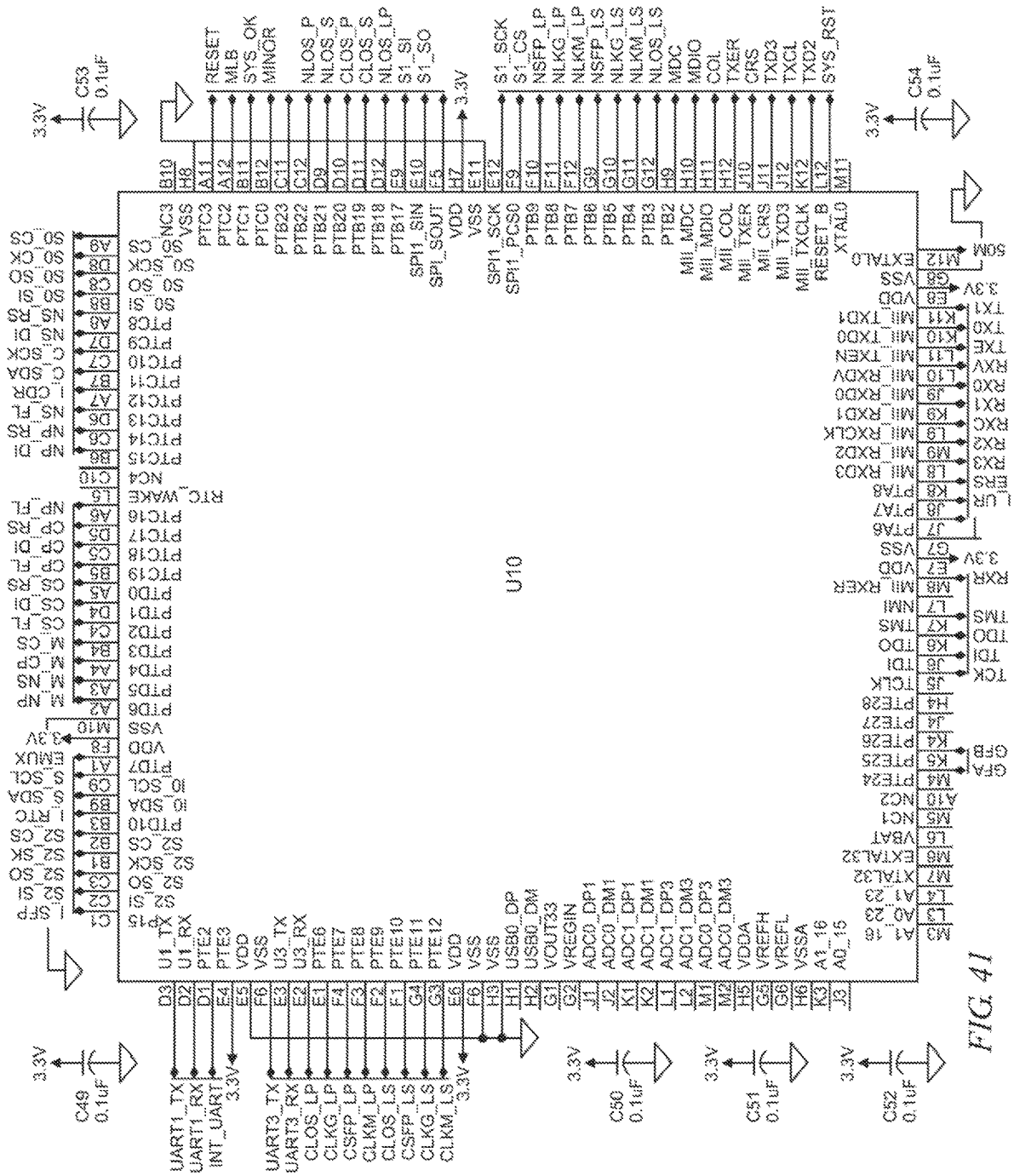
FIG. 41 is a circuit diagram of an integrated chip of the present disclosure functioning as a microprocessor of the communication equipment.

FIG. 41 is a circuit diagram of an integrated circuit U10 which will provide the communication, control, and management of the communication equipment. U10 is represented by a Qualcomm NXP Kinetis K66PI44MB80SFSV2 processor. The K66144M180F5V2 processor is a highly integrated processor with an ARM M4-Cortex processing core for multitasking. The K66144M180SF5V2 processor supports an Ethernet controller with Mll and RMIU interface to connect an Ethernet PHY for the remote management interface. The K66144M180SF5V2 processor supports two Universal Asynchronous Receiver Transmitter UARTs to connect a RS232 transceiver for the local craft interface and the controller port interface. For internal communications within the communication equipment, the K66144M180SFSV2 processor supports the Serial Peripheral Interface (SPI) and Inter-Integrated Circuit (I2C) modules. The K66144M180F5V2 processor has IMB program flash memory and 256 kB of SRAM for storage and processing of equipment and service status and provisioning.

Figure 42:
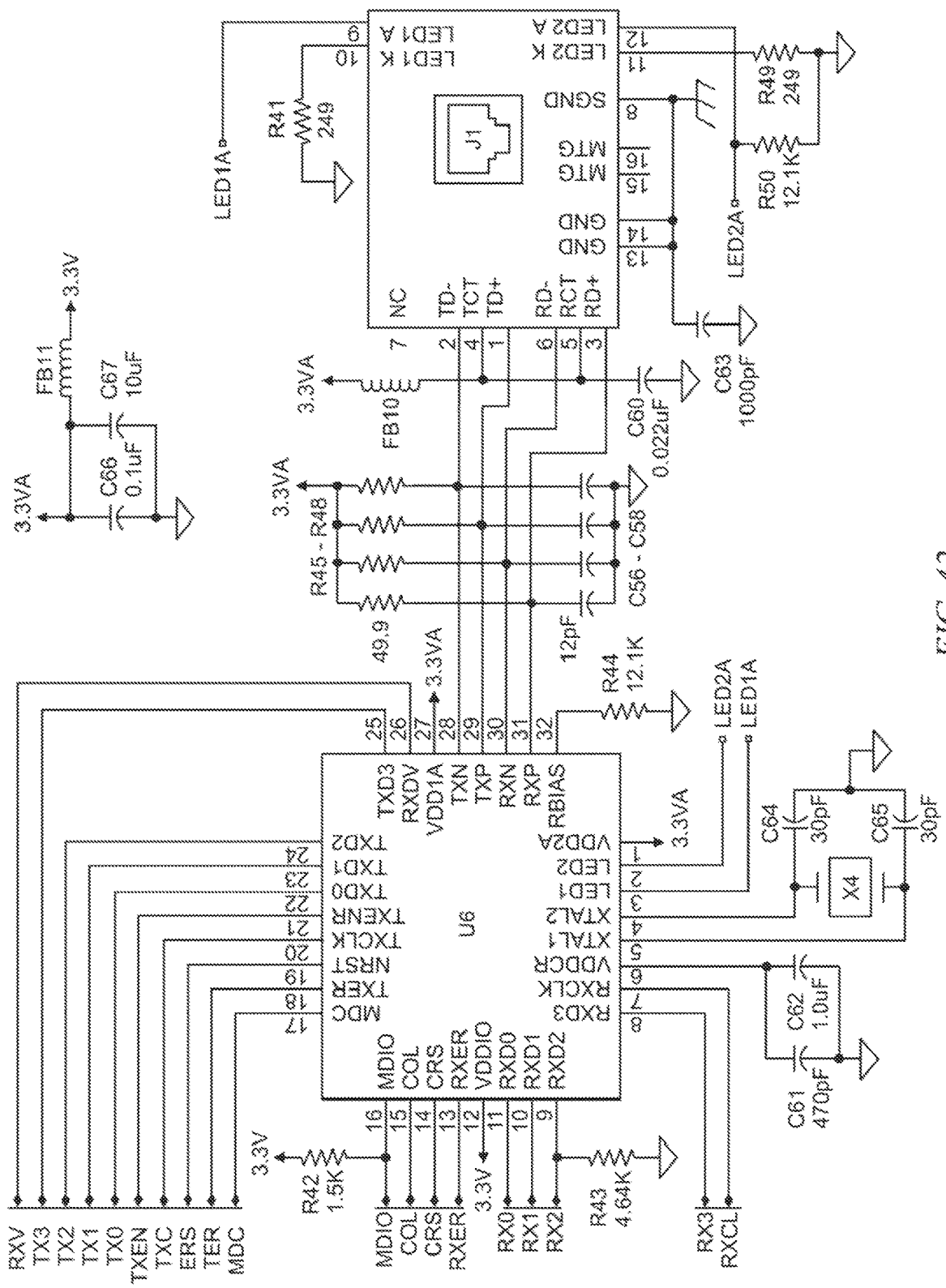
FIG. 42 is a circuit diagram of an integrated chip of the present disclosure functioning as an 10/100 Ethernet interface of the communication equipment.

FIG. 42 is a circuit diagram of the remote management interface, which provides an external remote connection for communication equipment and service status and provisioning. The remote management interface is an Ethemct 10/100BaseT connection. Integrated circuit U6 is an Ethernet 10/100BaseT physical interface (PIHY) and 31 is an integrated RJ45 connector, which incorporated the RJ45 connector, transformer, passive termination, and LED status indicators. A 25 MHz crystal X4 is provided for the Ethernet device U6.

Figure 43:
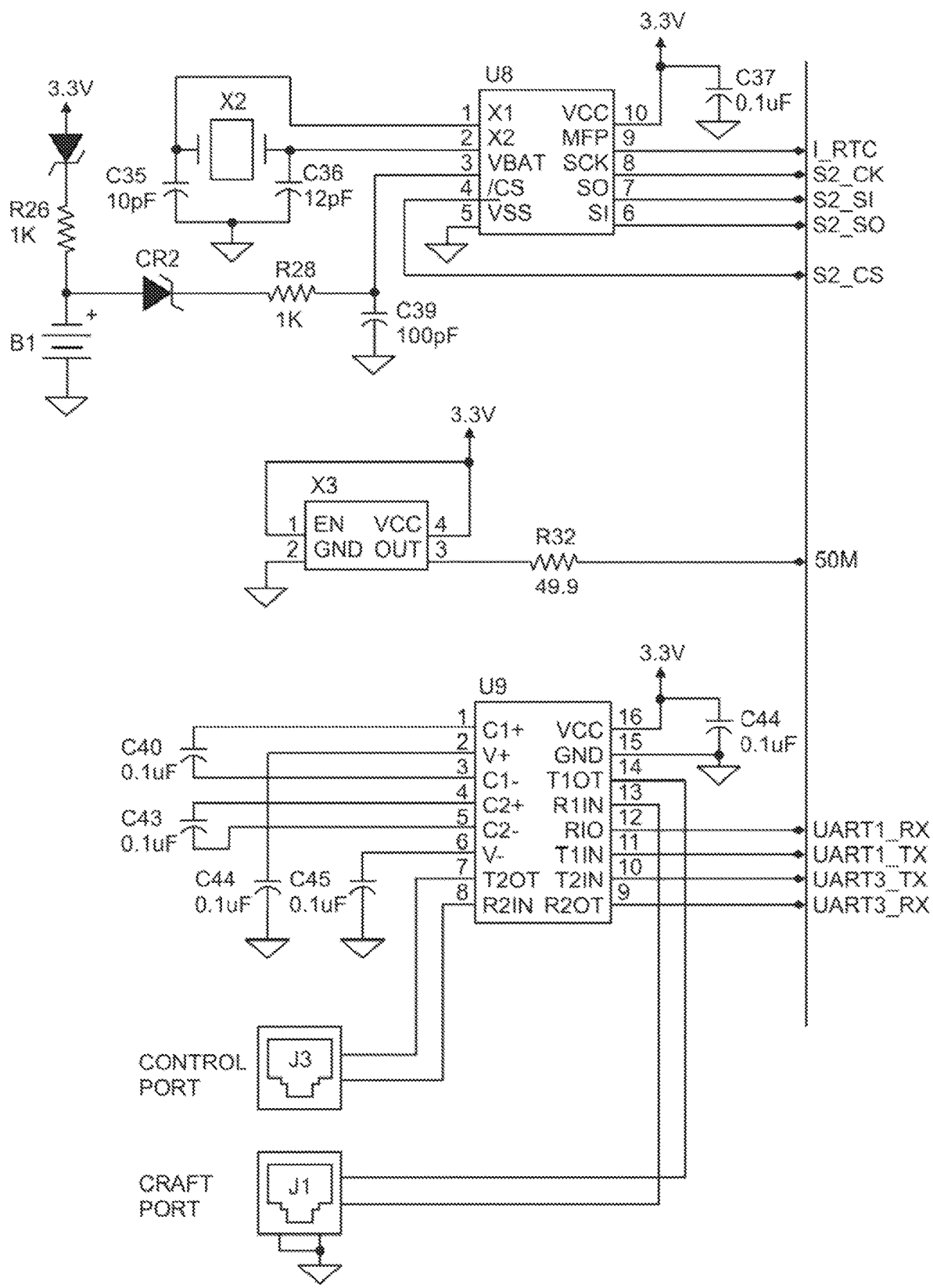
FIG. 43 is a circuit diagram of an integrated chip of the present disclosure functioning as clocking and RS232 interface of the communication equipment.

FIG. 43 is a circuit diagram of the real-time clock circuitry, the processor clock circuitry, and the craft port interface circuitry. The real-time clock provides timing and timing stamps for the communication equipment and communication service events. Integrated circuit U8 is represented by a Microchip MCP79510 real-time clock calendar with battery switchover. A 32.768 kHz crystal X2 is provided for timing reference for the MCP79510 device U8. Integrated circuit X3 is a 50 MHz clock oscillator for the Kinetis K66P144M180SF5V2 processor U10. Integrated circuit U9 and connectors J1 and J3 provide the craft interface and controller module communication functionality. The craft interface provides an external local connection for communication equipment and service status and provisioning. U9 is represented by an Fxar SP3232.EY Dual RS-232 Transceivers. 31 and 33 are represented by a standard RJ45 and RJ12 jack, respectively.

Figure 44:
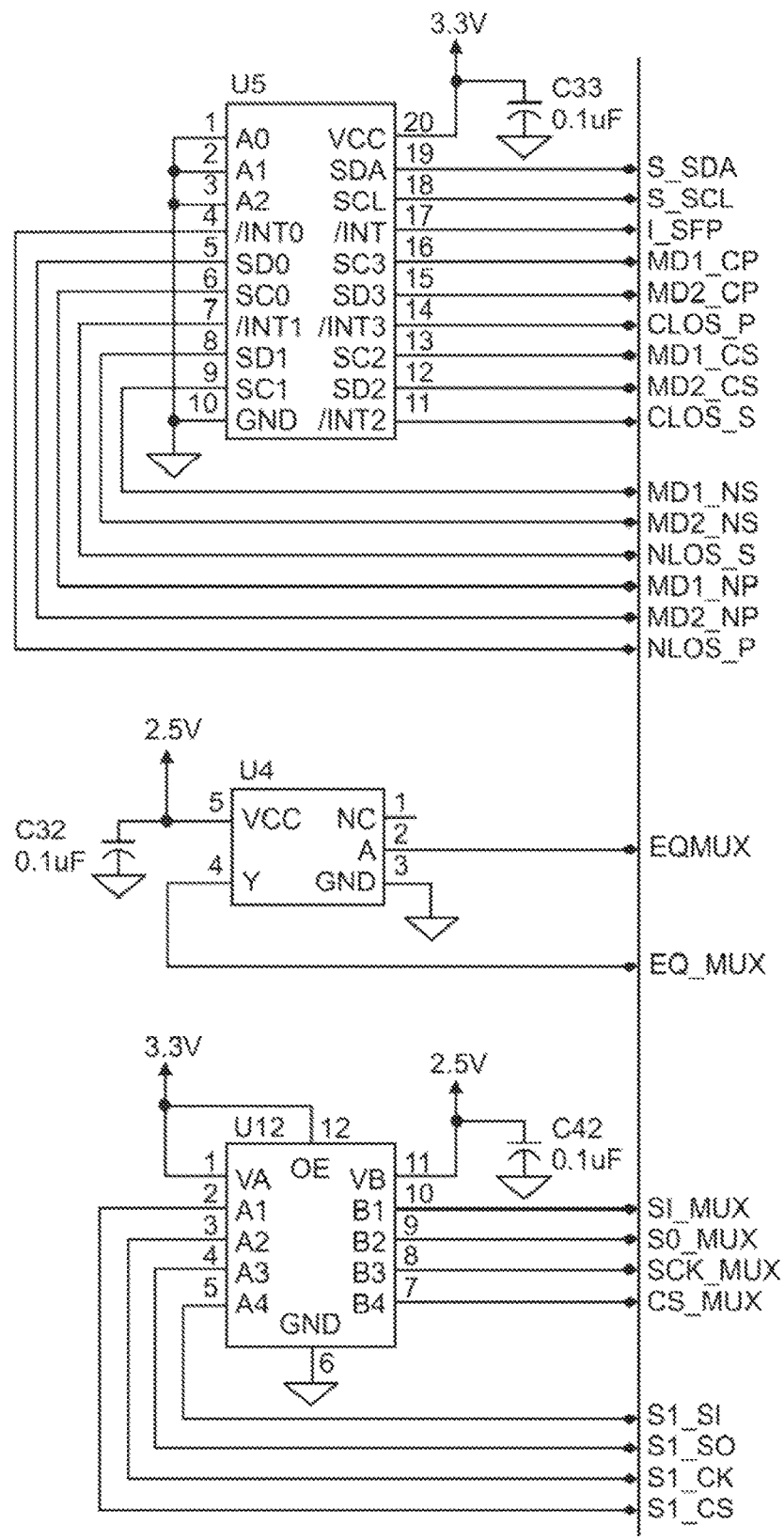
FIG. 44 is a circuit diagram of an integrated chip of the present disclosure functioning as integrated circuit drivers for the microprocessor.

FIG. 44 is a circuit diagram of integrated circuit drivers U4, U5, and U12, which the Kinetis K66P144M180SF5V2 processor U10 uses to communicate and control other integrated circuits. Integrated circuit US is represented by an NXP PCA9544 4-Channel 12C and SMBus Multiplexer. Using the NXP PCA9544 device US, the Kinetis K66P144M180SF5V2 processor U10 can use a single 12C module to communicate to each of the four SFP ports. Integrated circuit U4 is represented by a Texas Instrument (TI) SN74LV1T34 Single Power Supply Single Buffer Gate CMOS Logic Level Shifter. Using the TI SN74LV1T34 device U4, the Kinetis K66P144M180SF5V2 processor U10 33V GPIO lines can interface to the Microsemi VSC711 1/7113 2.5V control line. Integrated circuit U12 is represented by a Texas Instrument (TI) TXB0304U 4-Bit Bidirectional Level-Shifter/Voltage Translator. Using the TI TXB0304U device U12, the Kinetis K66P144M180SFSV2 processor 110 3.3V SPI module can interface to the Microsemi VSC7111/7113 2.5V SPI module U3.

Figure 45:
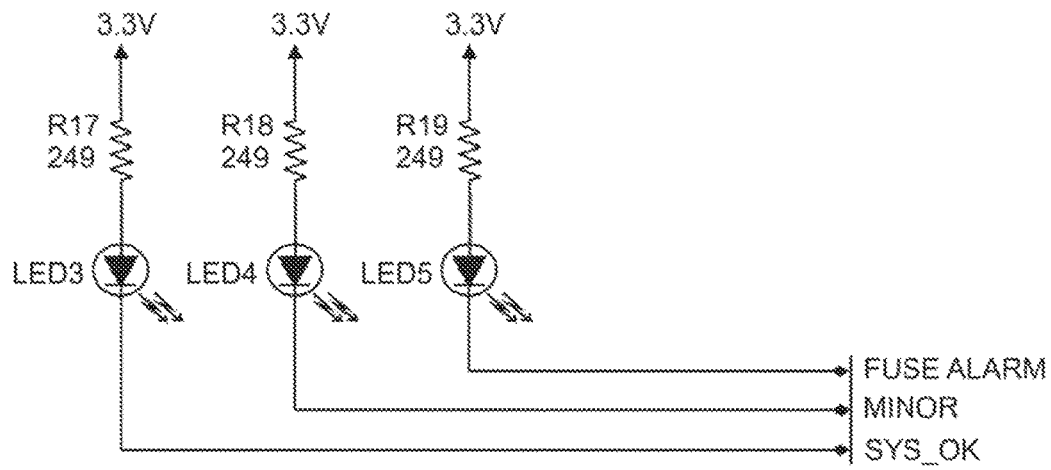
FIG. 45 is a circuit diagram of a first set of LED indicators of the communication equipment of the present disclosure.
Figure 45:
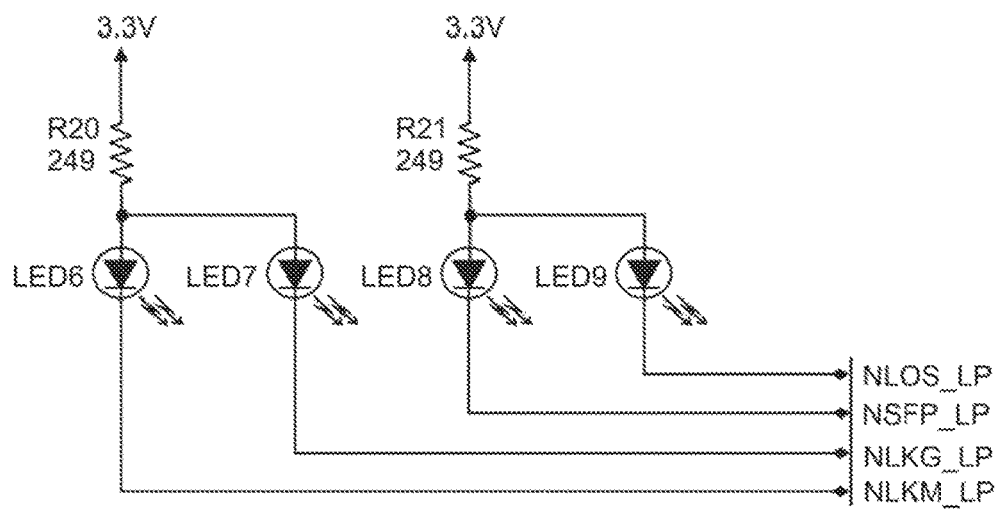
Figure 45:
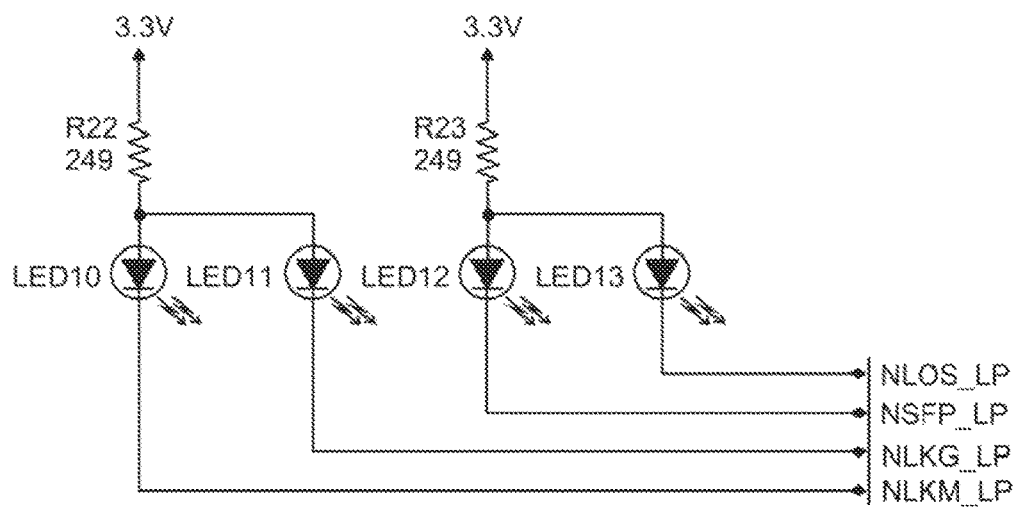
Figure 46:
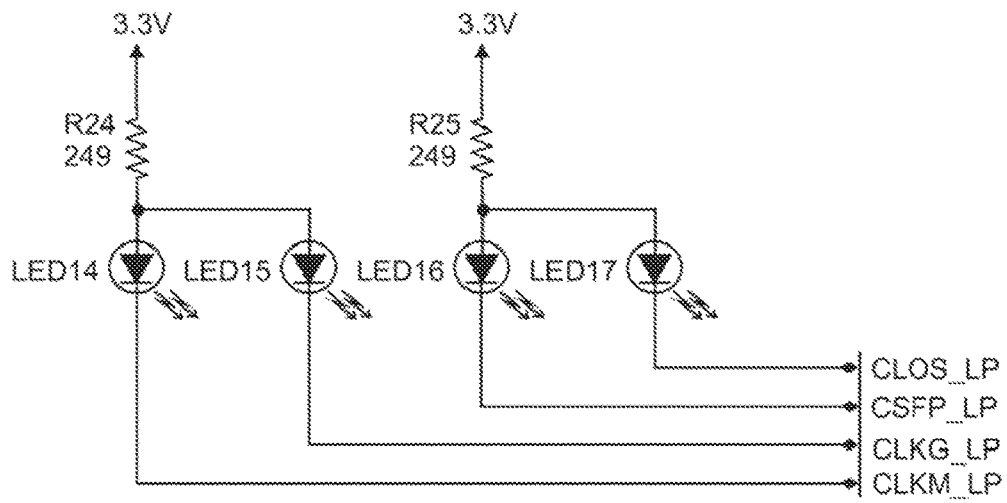
FIG. 46 is a circuit diagram of second set of LED indicators of the communication equipment of the present disclosure.
Figure 46:
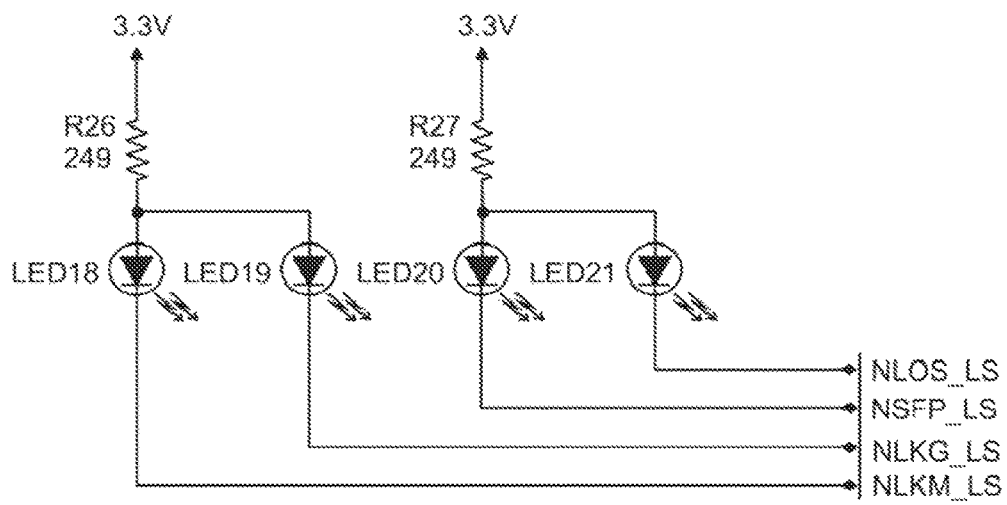
Figure 46:
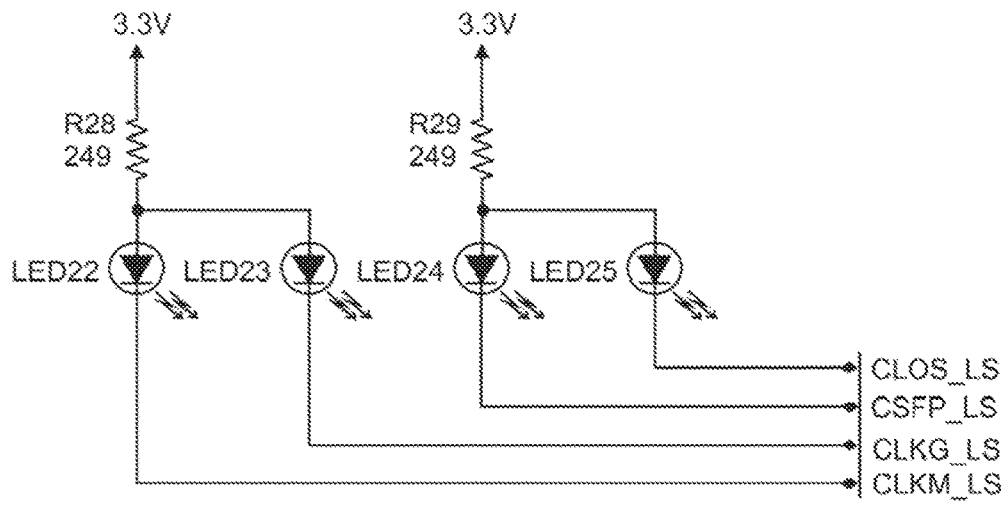

FIGS. 45 and 46 are circuit diagrams of visual indicators, light emitting diodes (LEDs). LEDs are used to convey visual status and provisioning indication on the communication equipment, communication service, and SFP devices. The Kinetis K66P144M180SF5V2 processor U10 controls the LEDs.

Figure 47:
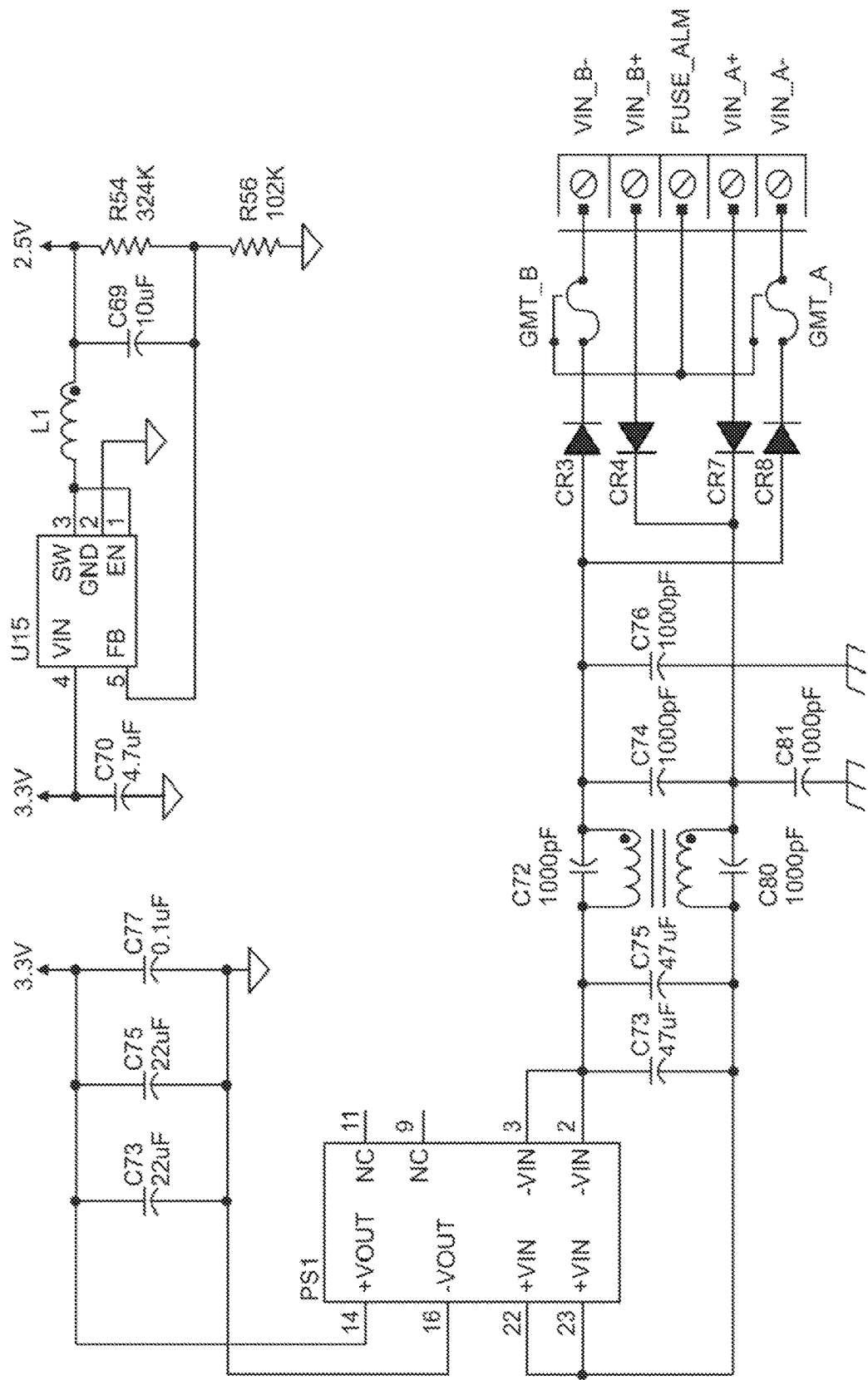
FIG. 47 is a circuit diagram of the power management of the communication equipment of the present disclosure.

FIG. 47 is a circuit diagram of the power management circuitry. Power supply PS1 is represented by a standard DIP24 power supply module 7-10 watts with a 4:1 wide power input 18-72 and a 3.3V output. A DC-DC buck converter U15 provides 2.5V for the Microsemi VSC7111/ 7113 U3 device. Standard diode rectifiers CR3, CR4, CR7, and CR8 provide A-B input DC power redundancy.

Figure 48A:
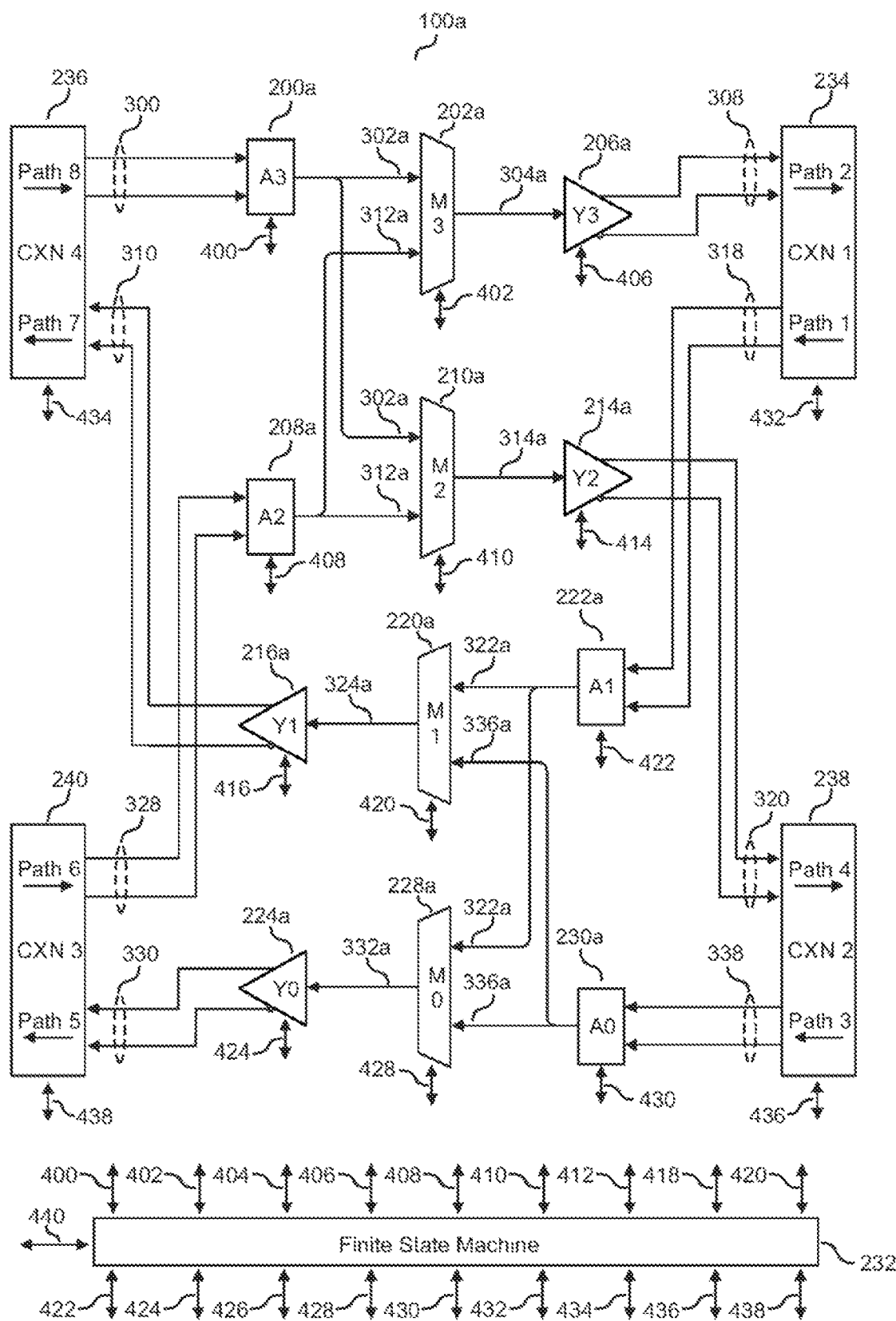
FIG. 48a is a block diagram illustrating a first version 100a of the preferred embodiment of the present disclosure.

In the circuitry, system(s), and method(s) of the present disclosure, the embodiments as illustrated in FIGS. 48a-48ah represent a group of related block diagrams, versions 100a-100ah of the circuitry of the present disclosure involving four connections; CXN1, CXN2. CXN3, and CXN4 and eight differential signal paths. CXN 1 has two differential signal paths, Path1 and Path2. CXN 2 has two differential signal paths Path 3 and Path 4. CXN 3 has two differential signal paths Path 5 and Path 6. CXN 4 has two differential signal paths Path 7 and Path 8. FIGS. 48a-48h representing embodiments 100a-100h are comprised of input broadband differential amplifiers (A), multiplexer switches (M), output differential amplifiers (Y), a finite state machine (FSM), and connections (CXN). FIGS. 48i-48ah representing embodiments 100i-100ah are also comprised of input broadband differential amplifiers (A), multiplexer switches (M), output differential amplifiers (Y), a finite state machine (FSM), connections (CXN), and additionally includes clock and data recover circuitries (CDR). There are four input broadband differential amplifiers A0, A1, A2, and A3. The broadband differential amplifiers provide amplification and conditioning of the input signal. The broadband differential amplifiers condition the input signal through equalization. Equalization involves removing inter-symbol interference (ISI), crosstalk, phase errors, and other signal impairments resulting from the signal impaired from traversing through long length printed circuit boards (PCB) traces, signal interface connectors, SFP variant devices, wired cables, optical fiber cables, or a combination of some or all. The input broadband differential amplifiers provide equalization on the signal to ensure the signal's integrity and reliability. Continuous-time linear equalizer (CTLE), feed-forward equalizer (FFE), and decision feedback equalizer (DFE) are the typical equalization schemes.

There are four multiplexer switches M0, M1, M2, and M3. The multiplexer switches functions as a crosspoint switch, demultiplexer, multiplexer, or fanout for routing the signals. There are four high speed output differential amplifiers Y0, Y1, Y2, and Y3. The high speed output differential amplifiers provide fixed, variable output voltages, or buffering. The high speed output differential amplifiers may also provide pre-emphasis or pre-equalization to the transmitted signal to interface different media such as cable, other devices, or printed circuit board traces to compensate for impairments from the path connections. A digital signal processor (DSP) can be used as an integrated high speed output differential amplifier by providing input and output signal equalization, amplification, retiming, and multiplexer switching.

There is a finite state machine (FSM). A finite state machine (FSM) is defined by a list of its states, its initial state, and the inputs that trigger each transition or state. The finite state machine circuitry can be any microprocessor, microcontroller, digital signal processors (DSP), configurable logic devices (PLD, FPGA, etc), fixed stored data device (ASIC), or memory device (EEPROM, NVRAM, etc), that provides changes from one state to another. In the circuitry, system(s), and method(s) of the present disclosure, the Finite State Machine (FSM) can communicate with the input broadband differential amplifiers A0, A1, A2, and A3, the multiplexer switches M0, M1, M2, and M3, the high speed output differential amplifiers Y0, Y1, Y2, and Y3, and circuitry or devices connected to connections CXN1, CXN2, CXN3, and CXN4.

More specifically, the Finite State Machine (FSM) can initial, provision, and determine operational status of the input broadband amplifiers (A0-A3). The FSM can initialize and provision the multiplexer switches (M0-M3) to route the signals as a crosspoint switch, demultiplexer, multiplexer, or fanout. FSM can initialize and provision the output broadband amplifiers (Y0-Y3) for signal equalization butTering, amplification, or fanout. For embodiments 100i-100ah, the finite state machine (FSM) can communicate a series of commands to the clock data recovery circuitries (CDR0-CDR3) for initialization and provisioning the communication bit rate settings, signal output patterns and control, and to determine CDR0-CDR3 performance and status. The FSM can determine performance and status by reading the CDR0-CDR3 software registers or by sensing a voltage level from the CDR0-CDR3 circuitry. If connection CXN 1-CXN 4 support an SFP port, the finite state machine (FSM) can communicate to SFP variant device installed in CXN 1-CXN 4. The FSM can initialize and provision the SFP variant device and determine the SFP variant device performance and operational status. SFP variant device initialization, provisioning, performance, and operational status are defined by the appropriate SFF, MSA, or vendor proprietary documentation. SFF-8472 Rev 12.4 Diagnostic Monitoring Interface for Optical Transceivers and SFF-8636 Rev 2.10a Management Interface for 4-lane Modules and Cables is an example of such documentation. SFP variant devices are defined as SFP, SFP+, SFP28, SFP56, SFP-DD, SFP-DD112, QSFP, QSFP+, QSFP28, QSFP56, QSFP-D), QSFP-DD800. OSFP, OSFP-DD, OSFP-DD800, OSFP-XD, and all future derivative devices.

In the circuitry, system(s), and method(s) of the present disclosure, the embodiments 100i-100ah as illustrated in FIGS. 48i-48ah represent versions of the embodiment which additionally include four clock data recover circuitry CDR0, CDR1, CDR2, and CDR3. The CDRs detects the bit transitions in the communication signal data stream to align and lock its internal voltage controlled oscillator (VCO) or other equivalent circuitry to produce an extracted or recovered clock. The CDR will then re-clock the incoming communication signal with the extracted or recovered clock to reduce timing impairments such as jitter. The CDR circuitry will regenerated the communication signal during the re-clocking process. The re-clocked and regenerated communication signal provides a very accurate and quality signal for other circuitry, devices, and/or networks to reliably interface. CDRs with input equalizers and output drivers or with input and output equalizers are referred to as retimers.

In the circuitry, system(s), and method(s) of the present disclosure, Connection (CXN) is defined as any medium to interface other circuitry, devices, or equipment. A Connection (CXN) can be defined as printed circuit board (PCB) traces on a PCB assembly or metal interconnects within an integrated circuit to interface other circuitry to process the communication signal. These other circuitries can be an electrical-to-optical conversion integrated circuit, microprocessor, crosspoint switch, retimer, digital signal processors (DSP), field programmable gate-array (FPGA), application specific integrated circuits (ASIC), or other signal interface circuitry. Connection (CXN) can also be defined as a mechanical component to interconnect and interface a PCB circuitry assembly to process the communication. Connection (CXN) is additionally be defined as an SFP port to interconnect and house SFP variant devices.

These SFP variant devices interface communication equipment and networks through wired cables, coax cables, fiber optic cables, or wireless signals. SFP variant devices are defined as SFP, SFP+, SFP28, SFP56, SFP-DD, SFP-DD112, QSFP, QSFP+, QSFP28, QSFP-DD, QSFP-DD800, OSFP, OSFP800, and other future variants. These SFP variant devices can be a single or multiple channel or lane operation for each direction. Where SFP variant devices are implemented Connections (CXN) can also be comprised of an SFP cage (housing) and device connector when SFP variant devices are used. The SFP cage and device connector must be compatible with the SFP variant device operation.

The Table of FIG. 53 illustrates SFP connections recommended backward compatibility with SFP devices operating at rated or maximum speed. A S-P28 CXN can accommodate a SFP28, SFP+ and SFP devices. A SFP28 CXN may accommodate a SFP56 or SFP112 devices operating at the 25 Gb/s or 10 Gb/s, but the SFP 28 CXN will not support the SFP56 and SFP112 devices operating at 50 Gb/s and 100 Gb/s, respectively. The SFP28 CXN was not designed to operate at higher speeds whose signal spectral density is higher than the SFP28 CXN's ability. The SFP28 CXN will introduce signal impairments to the communication signal when SFP56 and SFP112 devices are operating at their maximum or nominal rate. In the future. SFP56, SFP112, and other newer variants may interoperate with lower rated SFP CXNs using higher signal modulations such as PAM8 and PAM16 and SFP devices with lower power dissipation. The higher signal modulation allows the signal spectral density content to be lower than a non-return to zero (NRZ) signal modulation at the same bit rate. In other words SFP56 devices with PAM4 modulation will have the ability to operate in a SFP28 CXN. SFP Devices in this embodiment can provide different media interfaces such as RJ45, Coax, SC, LC. Duplex LC, MPO-12, SN-Dual, MDC-Dual, and PCB traces. The multi-wave fiber optic and fiber X CXNs in this embodiment are defined as having an SC, LC, Duplex LC, MPO-12, SN-Dual, or MDC-Dual connector. Communication equipment can be communication convergence systems, communication transport systems, data center equipment, communication servers, communication testing and monitoring equipment, passive optical network equipment (OLT and ONU), edge access system equipment, routers, switches, media converters, panels, splitters, and other communication equipment used within the communication networks.

In the circuitry, system(s), and method(s) of the present disclosure, the embodiments as illustrated in FIGS. 48a-48aj represent versions 100a-100aj of the embodiment design architectures describing various different signal interconnection types between and among elements. These signal interconnection types are represented as exclusively single-ended, a combination of single-ended and differential, or exclusively differential. Single-ended connections are input and/or output connections using an analog signal referenced to a ground. Differential connections are input and/or output connections using two complementary analog signals, typically two complementary analog signals. The input broadband differential amplifiers are represented as various elements with different output signal interfaces. The input broadband differential amplifier (A) as illustrated in FIGS. 49a-49d represent a group of four related input broadband differential amplifiers (A) with single-ended and differential interfaces. The multiplexer switch (M) as illustrated in FIGS. 50a-50d represent a group of four related multiplexer switches (M) with different combinations of single-ended and differential input and output interfaces. The clock data recovery circuitry (CDR) as illustrated in Figure 51a-51h represent a group of eight related clock data recovery circuitry (CDR) with different combinations of single-ended and differential input and output interfaces. The high speed output differential amplifier (Y) as illustrated in FIGS. 52a and 52b represent a group of two related high speed output differential amplifiers (Y) with input single-ended and differential interfaces, respectively.

These elements, the broadband differential amplifiers (A), multiplexer switches (M), output differential amplifiers (Y), and if applicable the clock and data recovery (CDR) circuitries, can be designed and implemented with discreet integrated circuit components placed on a printed circuit board (PCB), implemented on a system-on-chip (SoC), a digital signal processor (DSP), an integrated into a programmable integrated circuit field programmable gate array (FPGA), or a combination of any or all of the aforementioned design and implementation techniques.

The embodiments 100a-100aj can individually be implemented in various design architectures categories to address different design applications, technology implementation, electrical, mechanical, or environmental advantages, space savings, cost effectiveness, and/or supply-chain benefits. Embodiment 100a-100aj use single-ended signals, differential signals, or a combination of both to connect the input broadband differential amplifiers (A), the multiplexer switches (M), the high speed output differential amplifiers (Y), and for applicable embodiments the clock data recovery circuitry (CDR) elements through discrete integrated chips, within highly integrated into chips, or a combination of both. The embodiment 100i-100v and 100w-ah also implement the clock data recovery circuitry (CDR) to connect with the output or input of the multiplexer switch (M), respectively. As such, the embodiments 100a-100aj are individually implemented through or as a part of various design architectures such as system-on-a-chip (SoC), chip2module (C2M), chip2chip (C2C), chip2fabric (C2F), chip2embedded optics (C2EO) or co-packaged optics (CPO). These design architectures represent different techniques to implement functionality through combining and connecting discrete integrated circuits, incorporating functionality into an integrated circuit, or a combination of both architectures.

FIG. 48a illustrates version 100a of the present disclosure. The input broadband differential amplifiers (A), multiplexer switches (M), and output differential amplifiers (Y) circuitries are interconnected with single-ended signals.

Connection (CXN) 1 comprises a Path PI representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (100a) input differential signals 318 connect to the input differential amplifier A1 222a. The output signal 322a from differential amplifier A1 222a is a single-ended signal. This output signal 322a from differential amplifier A1 222a connects to the input of Multiplexer Switch M1 220a and M0 228a.

Path 2 (100a) output differential signals 308 connect to the output differential amplifier Y3 206a. The input signal 304a to differential amplifier Y3 206a is a single-ended signal. This input signal 304a connects to the output of Multiplexer Switch M3 202a.

Path 3 (100a) input differential signals 338 connect to the input differential amplifier A0 230a. The output signal 336a from differential amplifier A. 230a is a single-ended signal. This output signal 336a from differential amplifier A0 230a connects to the input of Multiplexer Switch M0 228a and M1 220a.

Path 4 (100a) output differential signals 320 connect to the output differential amplifier Y2 214a. The input signal 314a to differential amplifier Y2 214a is a single-ended signal. This input signal 314a connects to the output of Multiplexer Switch M2 210a.

Path 5 (100a) output differential signals 330 connect to the output differential amplifier Y0 224a. The input signal 332a to differential amplifier Y0 224a is a single-ended signal. This input signal 332a connects to the output of Multiplexer Switch M0 228a.

Path 6 (100a) input differential signals 328 connect to the input differential amplifier A2 208a. The output signal 312a from differential amplifier A2 208a is a single-ended signal. This output signal 312a from differential amplifier A2 208a connects to the input of Multiplexer Switch M2 210a and M3 202a.

Path 7 (100a) output differential signals 310 connect to the output differential amplifier Y1 216a. The input signal 324a to differential amplifier Y1 216a is a single-ended signal. This input signal 324a connects to the output of Multiplexer Switch M1 220a.

Path 8 (100a) input differential signals 300 connect to the input differential amplifier A3 200a. The output signal 302a from differential amplifier A3 200a is a single-ended signal. This output signal 302a from differential amplifier A3 200a connects to the input of Multiplexer Switch M2 210a and M3 202a.

A finite state machine (FSM) 232 connects to the input broadband amplifiers A0 230a, A1 222a, A2, 208a, and A3 200a (A0-A3) through connections 430, 422, 408, and 400 respectively. FSM 232 connects to the Multiplexer Switches M0 228a, M1 220a, M2 210a, and M3 202a (M0-M3) through connections 428, 420, 410, and 402 respectively, FSM 232 connects to the output broadband amplifiers Y0 224a, Y1 216a, Y2 214a, and Y3 206a (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

Figure 48B:
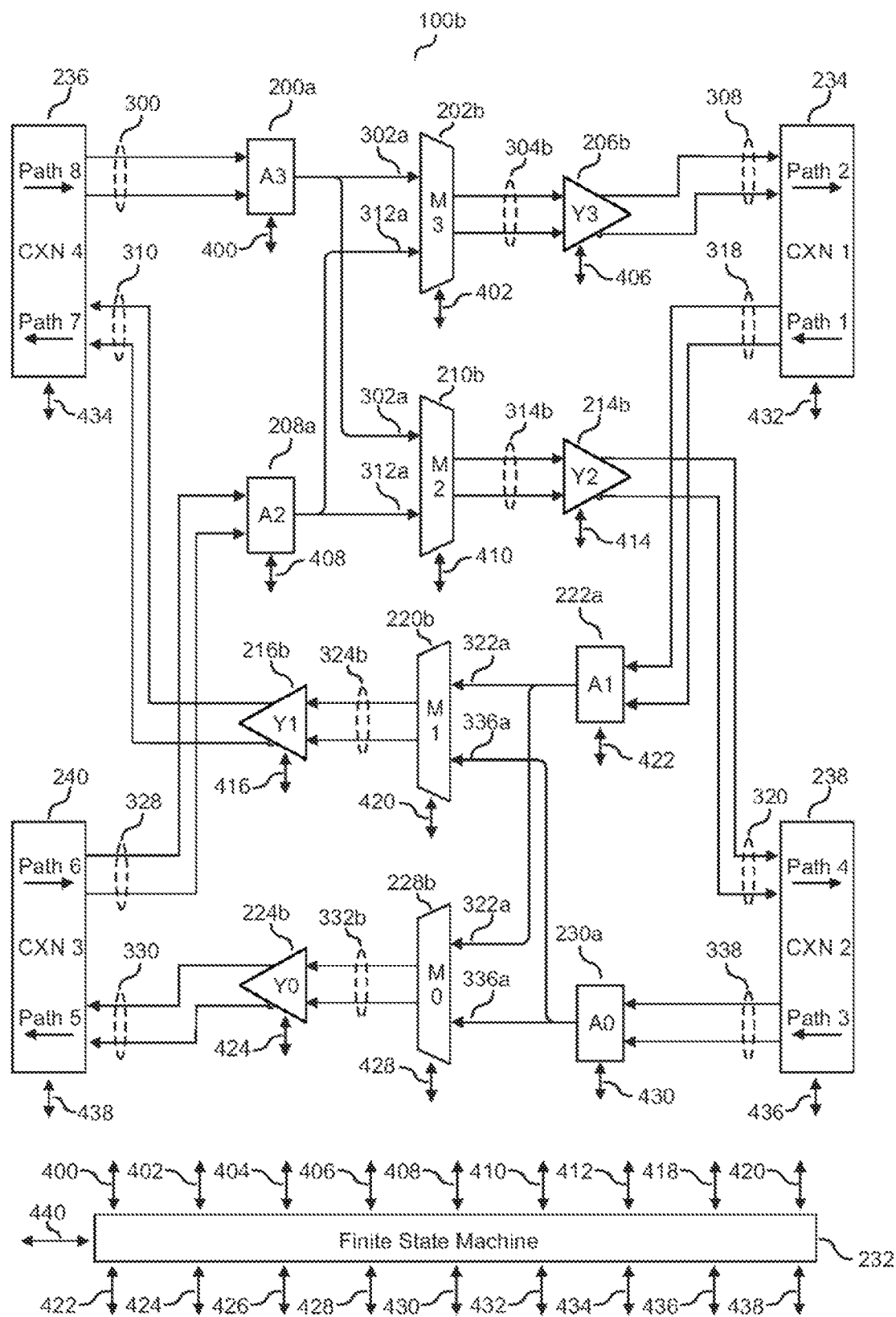
FIG. 48b is a block diagram illustrating a second version 100b of the preferred embodiment of the present disclosure.

FIG. 48b illustrates version 100b of the present disclosure. The input broadband differential amplifiers (A), multiplexer switches (M), and output differential amplifiers (Y) circuitries are interconnected with single-ended signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (100b) input differential signals 318 connect to the input differential amplifier A1 222a. The output signal 322a from differential amplifier A1 222a is a single-ended signal. Ibis output signal 322a from differential amplifier A1 222a connects to the input of Multiplexer Switch M1 220b and M0 228b.

Path 2 (100b) output differential signals 308 connect to the output differential amplifier Y3 206b. The input signal 304b to differential amplifier Y3 206b is a differential signal. This input signal 304b connects to the output of Multiplexer Switch M3 202b.

Path 3 (100b) input differential signals 338 connect to the input differential amplifier A0 230a. The output signal 336a from differential amplifier A0 230a is a single-ended signal. This output signal 336a from differential amplifier A0 230a connects to the input of Multiplexer Switch M0 228b and M1 220b.

Path 4 (100b) output differential signals 320 connect to the output differential amplifier Y2 214b. The input signal 314b to differential amplifier Y2 214b is a differential signal. This input signal 314b connects to the output of Multiplexer Switch M2 210b.

Path 5 (100b) output differential signals 330 connect to the output differential amplifier Y0 224b. The input signal 332b to differential amplifier Y0 224b is a differential signal. This input signal 332b connects to the output of Multiplexer Switch M0 228b.

Path 6 (100b) input differential signals 328 connect to the input differential amplifier A2 208a. The output signal 312a from differential amplifier A2 208a is a single-ended signal. This output signal 312a from differential amplifier A2 208a connects to the input of Multiplexer Switch M2 210b and M3 202b.

Path 7 (100b) output differential signals 310 connect to the output differential amplifier Y1 216b. The input signal 324b to differential amplifier Y1 216b is a differential signal. This input signal 324b connects to the output of Multiplexer Switch M1 220b.

Path 8 (100b) input differential signals 300 connect to the input differential amplifier A3 200a. The output signal 302a from differential amplifier A3 200a is a single-ended signal. This output signal 302a from differential amplifier A3 200a connects to the input of Multiplexer Switch M2 210b and M3 202b.

A finite state machine (FSM) 232 connects to the input broadband amplifiers A0 230a, A1 222a, A2, 208a, and A3 200a (A0-A3) through connections 430, 422, 408, and 400 respectively. FSM 232 connects to the Multiplexer Switches M0 228b. M1 220b, M2 210b, and M3 202b (M0-M3) through connections 428, 420, 410, and 402 respectively. FSM 232 connects to the output broadband amplifiers Y0 224b, Y1 216b, Y2 214b, and Y3 206b (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

Figure 48C:
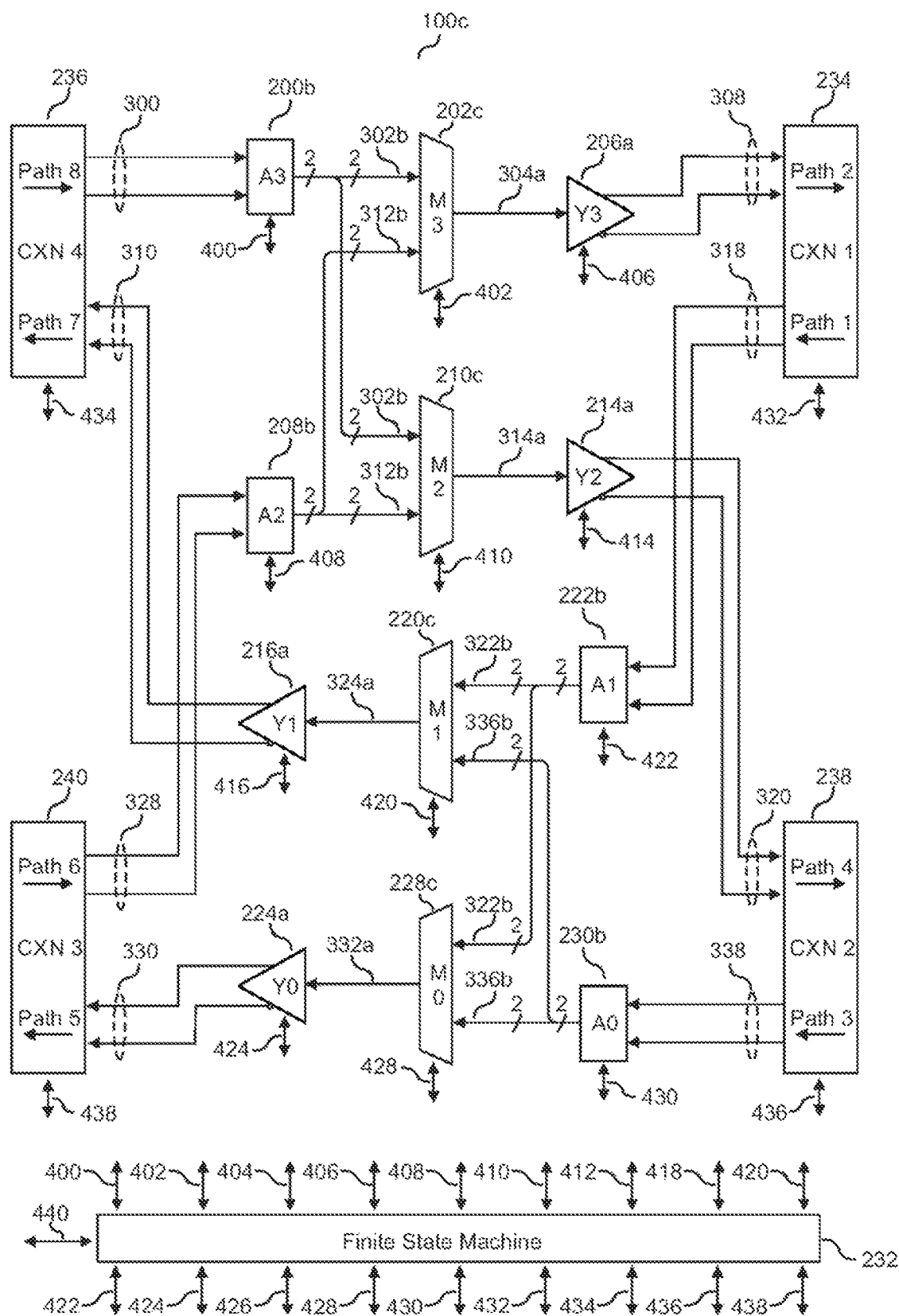
FIG. 48c is a block diagram illustrating a third version 100c of the preferred embodiment 100c of the present disclosure.

FIG. 48c illustrates version 100c of the present, disclosure. The input broadband differential amplifiers (A) are connected to multiplexer switches (M) with differential signals. The output differential amplifiers (Y) are connected to the multiplexer switches (M) with single-ended signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100c) input differential signals 318 connect to the input differential amplifier A1 222b. The output signal 322b from differential amplifier A1 222b is a differential signal. This output signal 322b from differential amplifier A1 222b connects to the input of Multiplexer Switch M1220c and M0 228c.

Path 2 (Version 100c) output differential signals 308 connect to the output differential amplifier Y3 206a. The input signal 304a to differential amplifier Y3 206a is a single-ended signal. This input signal 304a connects to the output of Multiplexer Switch M3 202c.

Path 3 (Version 100c) input differential signals 338 connect to the input differential amplifier A0 230b. The output signal 336b from differential amplifier A0 230b is a differential signal. This output signal 336b from differential amplifier A0 230*b* connects to the input of Multiplexer Switch M0 228*c* and M1 220*c*.

Path 4 (Version 100*c*) output differential signals 320 connect to the output differential amplifier Y2 214*a*. The input signal 314*a* to differential amplifier Y2 214*a* is a single-ended signal. This input signal 314*a* connects to the output of Multiplexer Switch M2 210*c*.

Path 5 (Version 10(*k*) output differential signals 330 connect to the output differential amplifier Y0 224*a*. The input signal 332*a* to differential amplifier Y0 224*a* is a single-ended signal. This input signal 332*a* connects to the output of Multiplexer Switch M0 228*c*.

Path 6 (Version 100*c*) input differential signals 328 connect to the input differential amplifier A2 208*b*. The output signal 312*b* from differential amplifier A2 208*b* is a differential signal. This output signal 312*b* from differential amplifier A2 208*b* connects to the input of Multiplexer Switch M2 210*c* and M3 202*c*.

Path P7 (Version 100*c*) output differential signals 310 connect to the output differential amplifier Y1 216*a*. The input signal 324*a* to differential amplifier Y1 216*a* is a single-ended signal. This input signal 324*a* connects to the output of Multiplexer Switch M1 220*c*.

Path P8 (Version 100*c*) input differential signals 300 connect to the input differential amplifier A3 200*b*. The output signal 302*b* from differential amplifier A3 200*b* is a differential signal. This output signal 302*b* from differential amplifier A3 200*b* connects to the input of Multiplexer Switch M2 210*c* and M3 202*c*.

A finite state machine (FSM) 232 connects to the input broadband amplifiers A0 230*b*, A1 222*b*, A2, 208*b*, and A3 200*b* (A0-A3) through connections 430, 422, 408, and 400 respectively. FSM 232 connects to the Multiplexer Switches M0 228*c*, M1 220*c*, M2 210*c*, and M3 202*c* (M0-M3) through connections 428, 420, 410, and 402 respectively, FSM 232 connects to the output broadband amplifiers Y0 224*a*, Y1 216*a*, Y2 214*a*, and Y3 206*a* (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

Figure 48D:
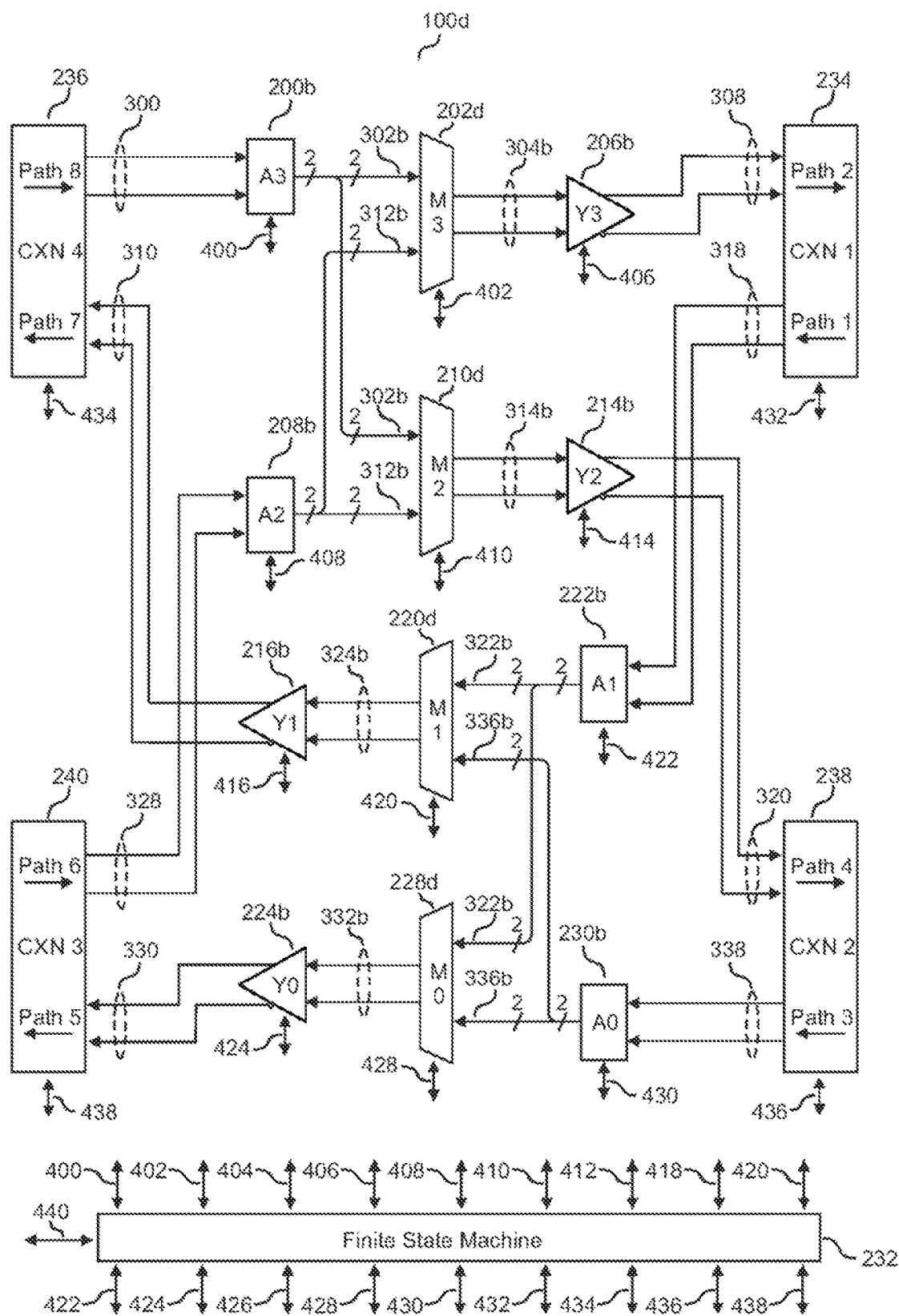
FIG. 48d is a block diagram illustrating a fourth version 100d of the preferred embodiment of the present disclosure.

FIG. 48*d* illustrates version 100*d* of the present disclosure. The input broadband differential amplifiers (A), multiplexer switches (M), and output differential amplifiers (Y) circuitries are interconnected with differential signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100*d*) input differential signals 318 connect to the input differential amplifier A1 222*b*. The output signals 322*b* from differential amplifier A1 222*b* is a differential signal. This output signal 322*b* from differential amplifier A1 222*b* connects to the input of Multiplexer Switch M1 220*d* and M0 228*d*.

Path 2 (Version 100*d*) output differential signals 308 connect to the output differential amplifier Y3 206*b*. The input signal 304*b* to differential amplifier Y3 206*b* is a differential signal. This input signal 304*b* connects to the output of Multiplexer Switch M3 202*d*.

Path 3 (Version 100*d*) input differential signals 338 connect to the input differential amplifier A0 230*b*. The output signal 336*b* from differential amplifier A0 230*b* is a differential signal. This output signal 336*b* from differential amplifier A0 230*b* connects to the input of Multiplexer Switch M0 228*d* and M1 220*d*.

Path 4 (Version 100*d*) output differential signals 320 connect to the output differential amplifier Y2 214*b*. The input signal 314*b* to differential amplifier Y2 214*b* is a differential signal. This input signal 314*b* connects to the output of Multiplexer Switch M2 210*d*.

Path 5 (Version 100*d*) output differential signals 330 connect to the output differential amplifier Y0 224*b*. The input signal 332*b* to differential amplifier Y0 224*b* is a differential signal. This input signal 332*b* connects to the output of Multiplexer Switch M0 228*d*.

Path 6 (Version 100*d*) input differential signals 328 connect to the input differential amplifier A2 208*b*. The output signal 312*b* from differential amplifier A2 208*b* is a differential signal. This output signal 312*b* from differential amplifier A2 208*b* connects to the input of Multiplexer Switch M2 210*d* and M3 202*d*.

Path P7 (Version 100*d*) output differential signals 310 connect to the output differential amplifier Y1 216*b*. The input signal 324*b* to differential amplifier Y1 216*b* is a differential signal. This input signal 324*b* connects to the output of Multiplexer Switch M1 220*d*.

Path P8 (Version 100*d*) input differential signals 300 connect to the input differential amplifier A3 200*b*. The output signal 302*b* from differential amplifier A3 200*b* is a differential signal. This output signal 302*b* from differential amplifier A3 2006 connects to the input of Multiplexer Switch M2 210*d* and M3 202*d*.

A finite state machine (FSM) 232 connects to the input broadband amplifiers A0 230*b*, A1 222*b*, A2, 208*b*, and A3 200*b* (A0-A3) through connections 430, 422, 408, and 400 respectively. FSM 232 connects to the Multiplexer Switches M0 228*d*, M1 220*d*, M2 210*d*, and M3 202*d* (M0-M3) through connections 428, 420, 410, and 402 respectively. FSM 232 connects to the output broadband amplifiers Y0 224*b*, Y1 216*b*, Y2 214*b*, and Y3 206*b* (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

Figure 48E:
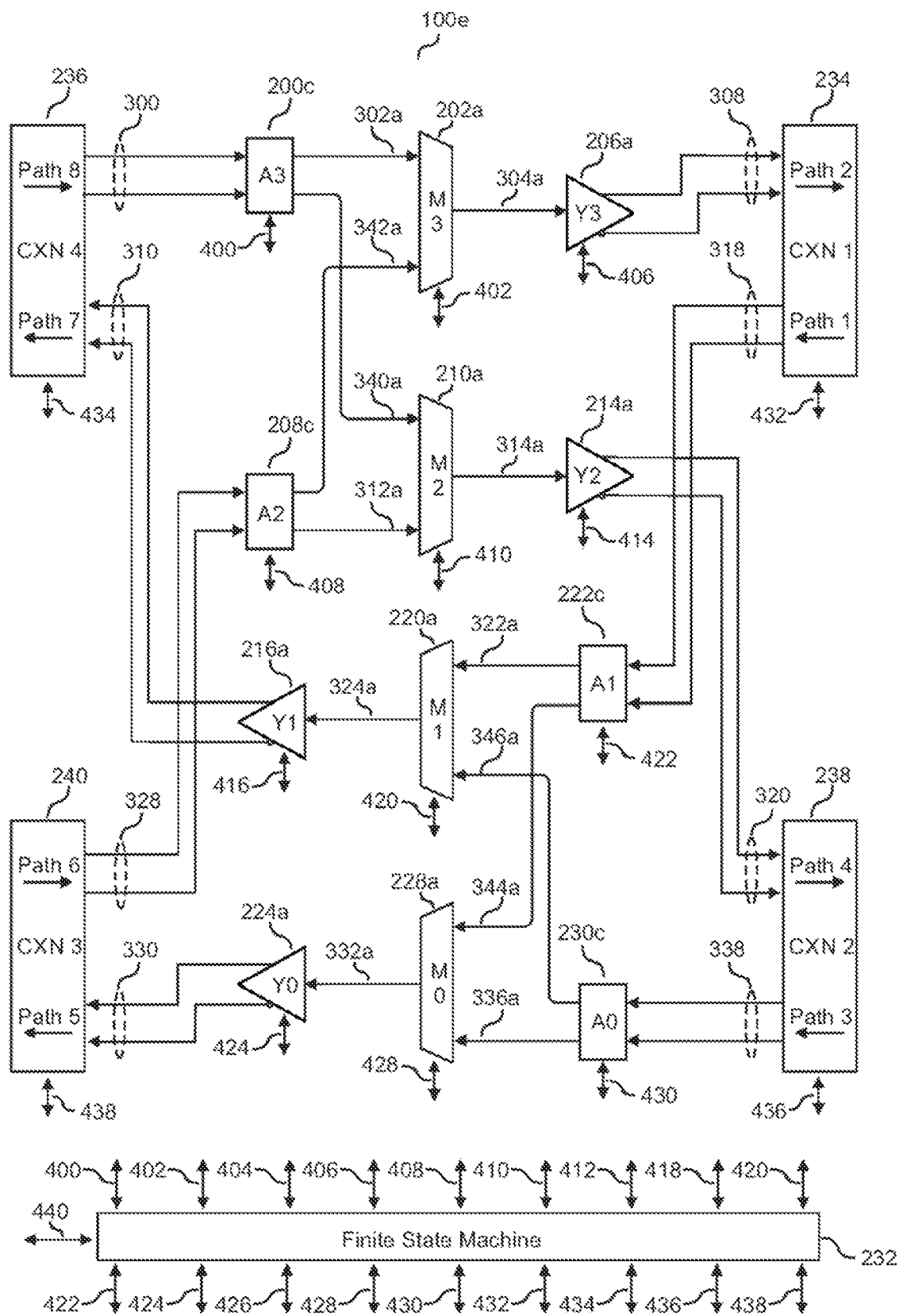
FIG. 48e is a block diagram illustrating a fifth version 100e of the preferred embodiment of the present disclosure.

FIG. 48*e* illustrates version 100*e* of the present disclosure. The input broadband differential amplifiers (A), multiplexer switches (M), and output differential amplifiers (Y) circuitries are interconnected with single-ended signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 30) and a Path P7 representing an output differential signal 310.

Path 1 (Version 100*e*) input differential signals 318 connect to the input differential amplifier A1 222*c*. The output signals 322*a* and 344*a* from differential amplifier A1 222*c* are single-ended signals. The differential amplifier A1 222*c* has a fanout buffer where the output signals 322*a* and 334*a* are copies of the input differential signals 318. These output signal 322*a* and 344*a* from differential amplifier A1 222*c* connect to the input of Multiplexer Switch M1 220*a* and M0 228*a*, respectively.

Path 2 (Version 100*e*) output differential signals 308 connect to the output differential amplifier Y3 206*a*. The input signal 304*a* to differential amplifier Y3 206*a* is a single-ended signal. This input signal 304*a* connects to the output of Multiplexer Switch M3 202*a*.

Path 3 (Version 100*e*) input differential signals 338 connect to the input differential amplifier A0 230*c*. The output signals 336*a* and 346*a* from differential amplifier A0 230*c* are single-ended signals. The differential amplifier A0 230*c* has a fanout buffer where the output signals 336*a* and 346*a* are copies of the input differential signals 338. These output signal 336*a* and 346*a* from differential amplifier A0 23*c* connect to the input of Multiplexer Switch M1 220*a* and M0 228*a*, respectively.

Path 4 (Version 100*e*) output differential signals 320 connect to the output differential amplifier Y2 214*a*. The input signal 314*a* to differential amplifier Y2 214*a* is a single-ended signal. This input signal 314*a* connects to the output of Multiplexer Switch M2 210*a*.

Path 5 (Version 100*e*) output differential signals 330 connect to the output differential amplifier Y0 224*a*. The input signal 332*a* to differential amplifier Y0 224*a* is a single-ended signal. This input signal 332*a* connects to the output of Multiplexer Switch M0 228*a*.

Path 6 (Version 100*e*) input differential signals 328 connect to the input differential amplifier A2 208*c*. The output signals 312*a* and 342*a* from differential amplifier A2 208*c* are single-ended signals. The differential amplifier A2 208*c* has a fanout buffer where the output signals 312*a* and 342*a* are copies of the input differential signals 328. These output signal 312*a* and 342*a* from differential amplifier A1 208*c* connect to the input of Multiplexer Switch M2 210*a* and M3 202*a*, respectively.

Path P7 (Version 100*e*) output differential signals 310 connect to the output differential amplifier Y1 216*a*. The input signal 324*a* to differential amplifier Y1 216*a* is a single-ended signal. This input signal 324*a* connects to the output of Multiplexer Switch M1 220*a*.

Path 8 (Version 100*e*) input differential signals 300 connect to the input differential amplifier A3 200*c*. The output signals 302*a* and 340*a* from differential amplifier A3 202*c* are single-ended signals. The differential amplifier A3 200*c* has a fanout buffer where the output signals 302*a* and 340*a* are copies of the input differential signals 300. These output signal 302*a* and 340*a* from differential amplifier A1 202*c* connect to the input of Multiplexer Switch M3 202*a* and M2 210*a*, respectively.

A finite state machine (FSM) 232 connects to the input broadband amplifiers A0 230*c*, A1 222*c*, A2, 208*c*, and A3 200*c* (A0-A3) through connections 430, 422, 408, and 400 respectively. FSM 232 connects to the Multiplexer Switches M0 228*a*. M1220*a*. M2 210*a*, and M3 202*a* (M0-M3) through connections 428, 420, 410, and 402 respectively. FSM 232 connects to the output broadband amplifiers Y0 224*a*, Y1 216*a*, Y2 214*a*, and Y3 206*a* (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

Figure 48F:
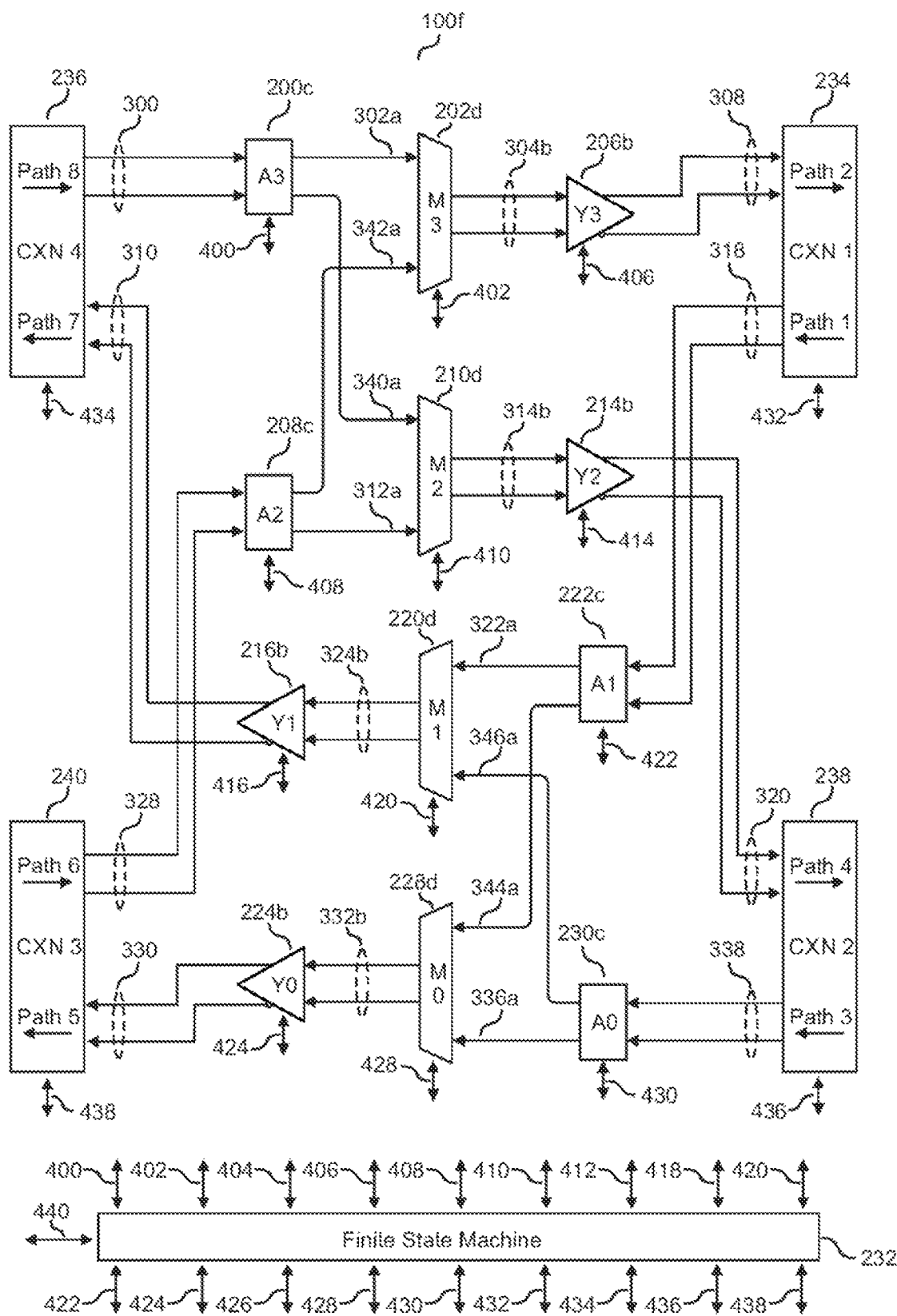
FIG. 48f is a block diagram illustrating a sixth version 100f of the preferred embodiment of the present disclosure.

FIG. 48f illustrates version 100*f* of the present disclosure. The input broadband differential amplifiers (A) are connected to the multiplexer switches (M) with single-ended signals. The output differential amplifiers (Y) are connected to the multiplexer switches (M) with differential signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100*f*) input differential signals 318 connect to the input differential amplifier A1 222*c*, The output signals 322*a* and 344*a* from differential amplifier A1 222*c* are single-ended signals. The differential amplifier A1 222*c* has a fanout buffer where the output signals 322*a* and 334*a* are copies of the input differential signals 318. These output signal 322*a* and 344*a* from differential amplifier A1 222*c* connect to the input of Multiplexer Switch M1 220*d* and M0 228*d*, respectively.

Path 2 (Version 100*f*) output differential signals 308 connect to the output differential amplifier Y3 206*b*. The input signal 304*b* to differential amplifier Y3 206*b* is a differential signal. This input signal 304*b* connects to the output of Multiplexer Switch M3 202*d*.

Path 3 (Version 100*f*) input differential signals 338 connect to the input differential amplifier A0 230*c*. The output signals 336*a* and 346*a* from differential amplifier A0 230*c* are single-ended signals. The differential amplifier A0 230*c* has a fanout buffer where the output signals 336*a* and 346*a* are copies of the input differential signals 338. These output signal 336*a* and 346*a* from differential amplifier A0 230*c* connect to the input of Multiplexer Switch M1 220*d* and M0 228*d*, respectively.

Path 4 (Version 100*f*) output differential signals 320 connect to the output differential amplifier Y2 214*b*. The input signal 314*b* to differential amplifier Y2 214*b* is a differential signal. This input signal 314*b* connects to the output of Multiplexer Switch M2 210*d*.

Path 5 (Version 100*f*) output differential signals 330 connect to the output differential amplifier Y0 224*b*. The input signal 332*b* to differential amplifier Y0 224*b* is a differential signal. This input signal 332*b* connects to the output of Multiplexer Switch M0 228*d*.

Path 6 (Version 100*f*) input differential signals 328 connect to the input differential amplifier A2 208*c*. The output signals 312*a* and 342*a* from differential amplifier A2 208*c* are single-ended signals. The differential amplifier A2 208*c* has a fanout buffer where the output signals 312*a* and 342*a* are copies of the input differential signals 328. These output signal 312*a* and 342*a* from differential amplifier A1 208*c* connect to the input of Multiplexer Switch M2 210*d* and M3 202*d*, respectively.

Path P7 (Version 100*f*) output differential signals 310 connect to the output differential amplifier Y1 216*b*. The input signal 324*b* to differential amplifier Y1 216*b* is a differential signal. This input signal 324*b* connects to the output of Multiplexer Switch M1 220*d*.

Path 8 (Version 100*t*) input differential signals 300 connect to the input differential amplifier A3 200*c*. The output signals 302*a* and 340*a* from differential amplifier A3 202*c* are single-ended signals. The differential amplifier A3 200*c* has a fanout buffer where the output signals 302*a* and 340*a* are copies of the input differential signals 300. These output signal 302*a* and 340*a* from differential amplifier A1 202*c* connect to the input of Multiplexer Switch M3 202*d* and M2 210*d*, respectively.

A finite state machine (FSM) 232 connects to the input broadband amplifiers A0 230c, A1 222c, A2, 208c, and A3 200c (A0-A3) through connections 430, 422, 408, and 400 respectively. FSM 232 connects to the Multiplexer Switches M0 228d, M1 220d, M2 210d, and M3 202d (M0-M3) through connections 428, 420, 410, and 402 respectively. FSM 232 connects to the output broadband amplifiers Y0 224b, Y1 216b, Y2 214b, and Y3 206b (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

Figure 48G:
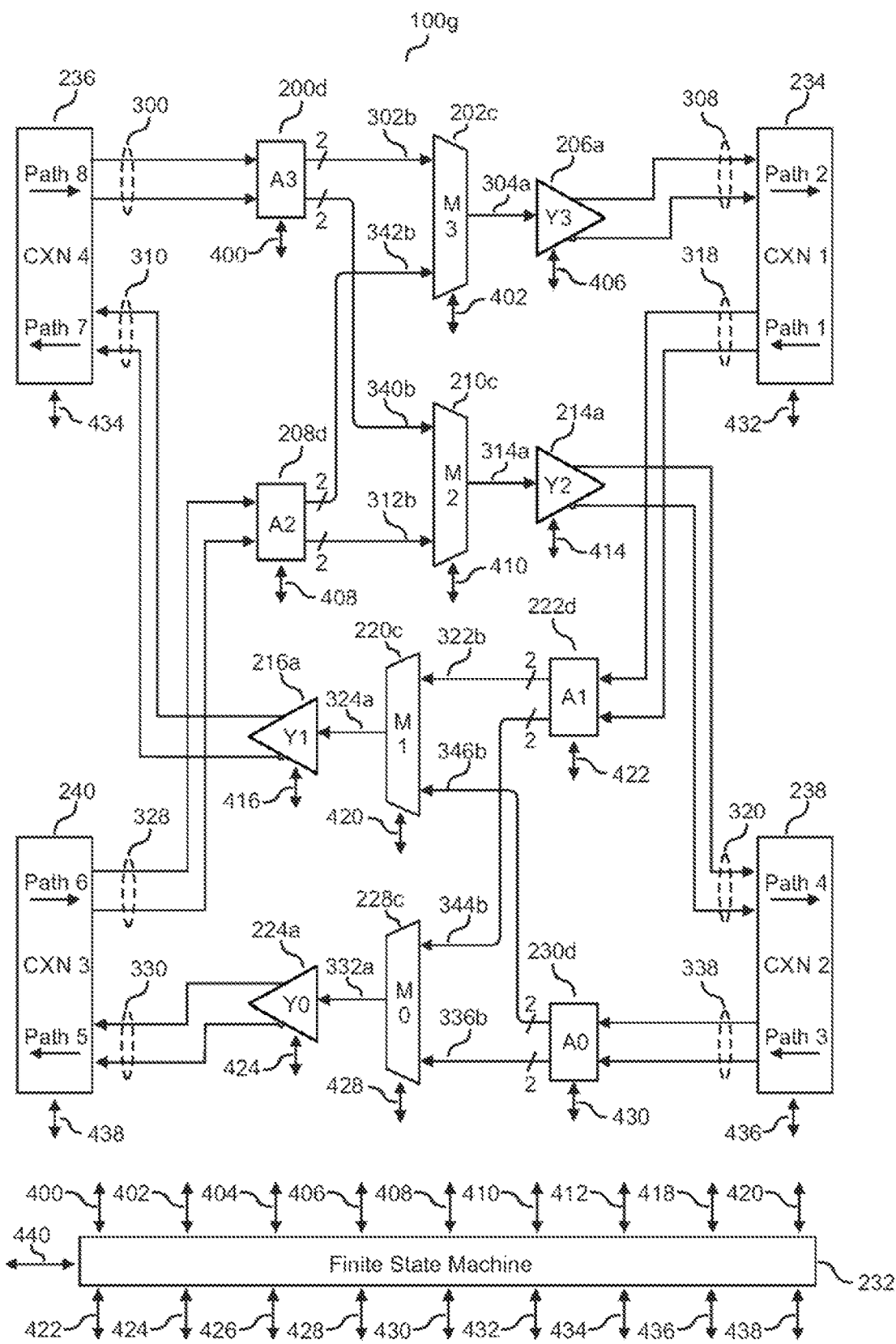
FIG. 48g is a block diagram illustrating a seventh version 100g of the preferred embodiment of the present disclosure.

FIG. 48g illustrates version 100g of the present disclosure. The input broadband differential amplifiers (A) are connected to the multiplexer switches (M) with differential signals. The output differential amplifiers (Y) are connected to the multiplexer switches (M) with single-ended signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100g) input differential signals 318 connect to the input differential amplifier A1 222d. The output signals 322b and 344b from differential amplifier A1 222d are differential signals. The differential amplifier A1 222d has a fanout buffer where the output signals 322b and 344b are copies of the input differential signals 318. These output signal 322b and 344b from differential amplifier A1 222d connect to the input of Multiplexer Switch M1 220c and M0 228c, respectively.

Path 2 (Version 100g) output differential signals 308 connect to the output differential amplifier Y3 206a. The input signal 304a to differential amplifier Y3 206a is a single-ended signal. This input signal 304a connects to the output of Multiplexer Switch M3 202c.

Path 3 (Version 100g) input differential signals 338 connect to the input differential amplifier A0 230d. The output signals 336b and 346b from differential amplifier A0 230d are differential signals. The differential amplifier A0 230d has a fanout buffer where the output signals 336b and 346b are copies of the input differential signals 338. These output signal 336b and 346b from differential amplifier A0 230d connect to the input of Multiplexer Switch M1 220c and M0 228c, respectively.

Path 4 (Version 100g) output differential signals 320 connect to the output differential amplifier Y2 214a. The input signal 314a to differential amplifier Y2 214a is a single-ended signal. This input signal 314a connects to the output of Multiplexer Switch M2 210c.

Path 5 (Version 100g) output differential signals 330 connect to the output differential amplifier Y0 224a. The input signal 332a to differential amplifier Y0 224a is a single-ended signal. This input signal 332a connects to the output of Multiplexer Switch M0 228c.

Path 6 (Version 100g) input differential signals 328 connect to the input differential amplifier A2 208d. The output signals 312b and 342b from differential amplifier A2 208d are differential signals. The differential amplifier A2 208d has a fanout buffer where the output signals 312b and 342b are copies of the input differential signals 328. These output signal 312b and 342b from differential amplifier A1 208d connect to the input of Multiplexer Switch M2 210c and M3 202c, respectively.

Path P7 (Version 100g) output differential signals 310 connect to the output differential amplifier Y1 216a. The input signal 324a to differential amplifier Y1 216a is a single-ended signal. This input signal 324a connects to the output of Multiplexer Switch M1 220c.

Path 8 (Version 100g) input differential signals 300 connect to the input differential amplifier A3 200d. The output signals 302b and 340b from differential amplifier A3 202c are differential signals. The differential amplifier A3 200d has a fanout buffer where the output signals 302b and 340b are copies of the input differential signals 300. These output signal 302b and 340b from differential amplifier A1 202d connect to the input of Multiplexer Switch M3 202c and M2 210c, respectively.

A finite state machine (FSM) 232 connects to the input broadband amplifiers A0 230d, A1222d. A2, 208d, and A3 200d (A0-A3) through connections 430, 422, 408, and 400 respectively. FSM 232 connects to the Multiplexer Switches M0 228c, M1 220c, M2 210c, and M3 202c (M0-M3) through connections 428, 420, 410, and 402 respectively. FSM 232 connects to the output broadband amplifiers Y0 224a. Y1 216a, Y2 214a, and Y3 206a (Y0-Y3), through connections 424, 416, 414, and 406. FSM 232 connects to Connection CXN 1 234, CXN 2 238. CXN 3 240, and CXN 4 236 (CXN 1-4) through connections 432, 436, 438, and 434.

Figure 48H:
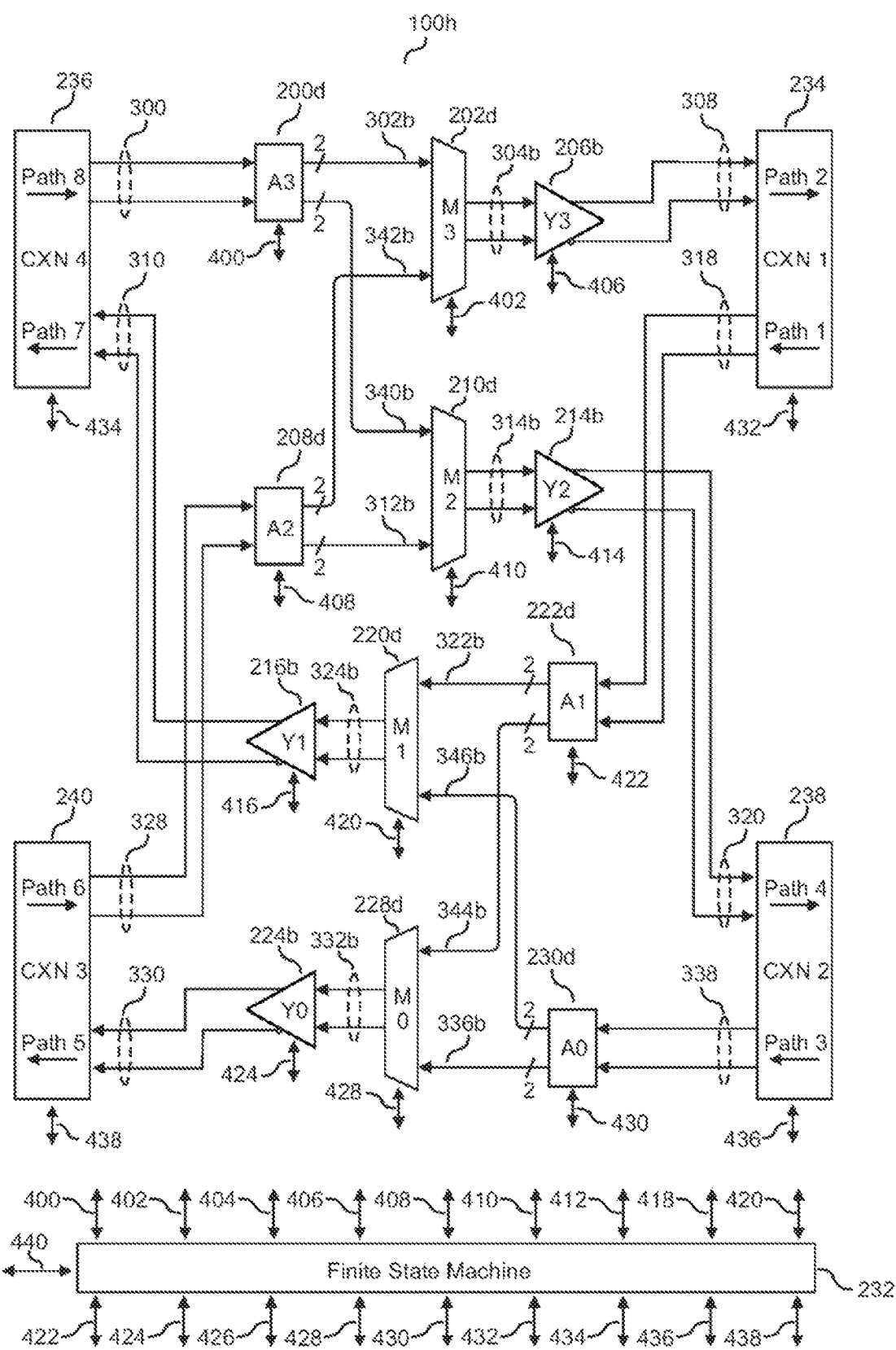
FIG. 48h is a block diagram illustrating an eighth version 100h of the preferred embodiment of the present disclosure.
Figure 48I:
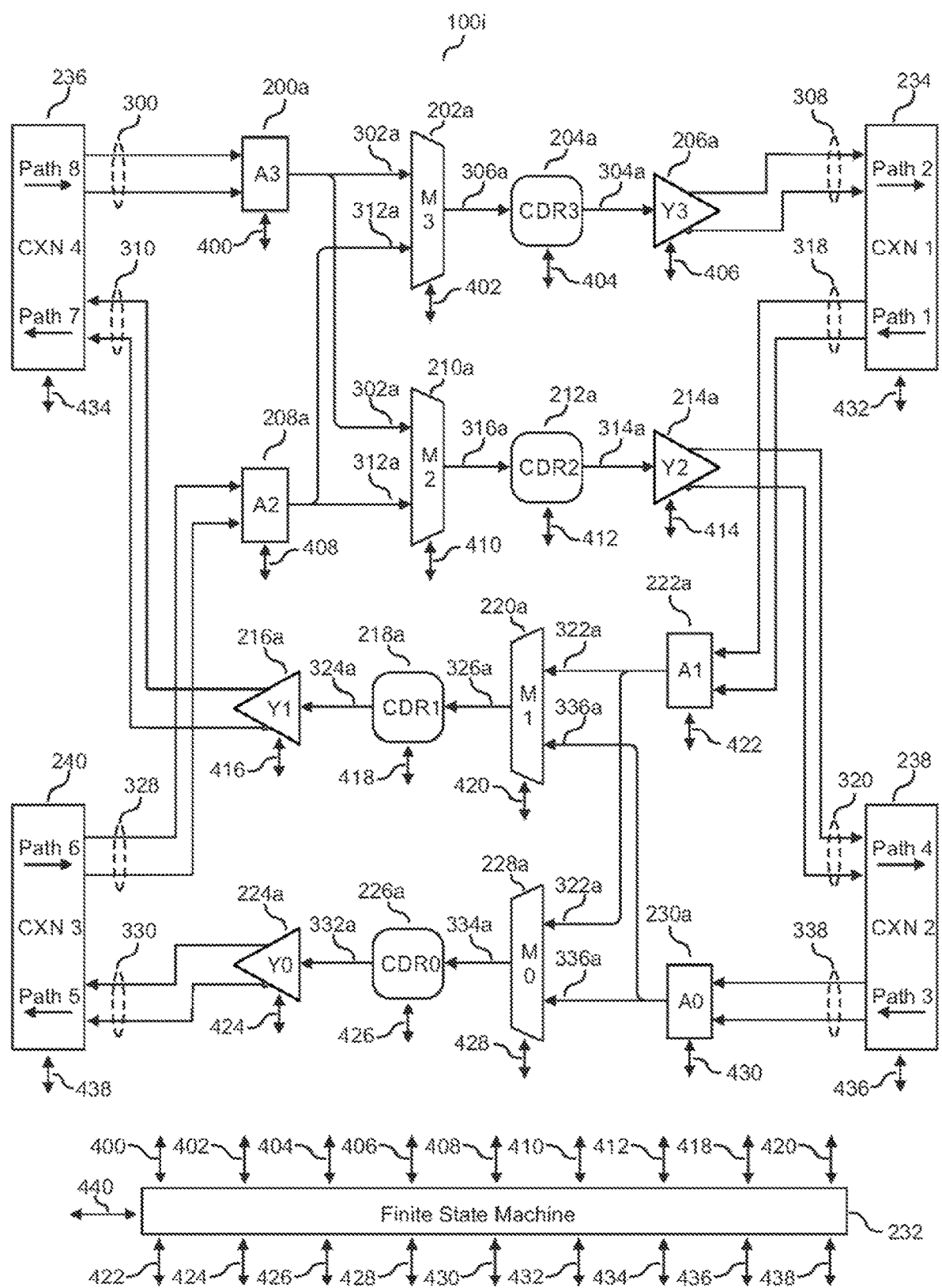
FIG. 48i is a block diagram illustrating a ninth version 1ii of the preferred embodiment of the present disclosure.

FIG. 48h illustrates version 100h of the present disclosure. The input broadband differential amplifiers (A), multiplexer switches (M), and output differential amplifiers (Y) are interconnected with differential signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100h) input differential signals 318 connect to the input differential amplifier A1 222d. The output signals 322b and 344b from differential amplifier A1 222d are differential signals. The differential amplifier A1 222d has a fanout buffer where the output signals 322b and 344b are copies of the input differential signals 318. These output signal 322b and 344b from differential amplifier A1 222d connect to the input of Multiplexer Switch M1 220d and M0 228d, respectively.

Path 2 (Version 100h) output differential signals 308 connect to the output differential amplifier Y3 206b. The input signal 304b to differential amplifier Y3 206b is a differential signal. This input signal 304b connects to the output of Multiplexer Switch M3 202d.

Path 3 (Version 100h) input differential signals 338 connect to the input differential amplifier A0 230d. The output signals 336b and 346b from differential amplifier A0 230d are differential signals. The differential amplifier A0 230d has a fanout buffer where the output signals 336b and 346b are copies of the input differential signals 338. These output signal 336b and 346b from differential amplifier A0 230d connect to the input of Multiplexer Switch M1 220d and M0 228d, respectively.

Path 4 (Version 100h) output differential signals 320 connect to the output differential amplifier Y2 214b. The input signal 314b to differential amplifier Y2 214b is a differential signal. This input signal 314b connects to the output of Multiplexer Switch M2 210d.

Path 5 (Version 100h) output differential signals 330 connect to the output differential amplifier Y0 224b. The input signal 332b to differential amplifier Y0 224b is a differential signal. This input signal 332b connects to the output of Multiplexer Switch M0 228d.

Path 6 (Version 100h) input differential signals 328 connect to the input differential amplifier A2 208d. The output signals 312b and 342b from differential amplifier A2 208d are differential signals. The differential amplifier A2 208d has a fanout buffer where the output signals 312b and 342b are copies of the input differential signals 328. These output signal 312b and 342b from differential amplifier A1 208d connect to the input of Multiplexer Switch M2 210d and M3 202d, respectively.

Path P7 (Version 100h) output differential signals 310 connect to the output differential amplifier Y1 216b. The input signal 324b to differential amplifier Y1 216b is a differential signal. This input signal 324b connects to the output of Multiplexer Switch M1 220d.

Path 8 (Version 100h) input differential signals 300 connect to the input differential amplifier A3 200d. The output signals 302b and 340b from differential amplifier A3 202c are differential signals. The differential amplifier A3 200d has a fanout buffer where the output signals 302b and 340b are copies of the input differential signals 300. These output signal 302b and 340b from differential amplifier A1 202d connect to the input of Multiplexer Switch M3 202d and M2 210d, respectively.

A finite state machine (FSM) 232 connects to the input broadband amplifiers A0 230d, A1 222d, A2, 208d, and A3 200d (A0-A3) through connections 430, 422, 408, and 400 respectively. FSM 232 connects to the Multiplexer Switches M0 228d, M1 220d, M2 210d, and M3 202d (M0-M3) through connections 428, 420, 410, and 402 respectively, FSM 232 connects to the output broadband amplifiers Y0 224b, Y1 216b, Y2 214b, and Y3 206b (Y0-Y3), through connections 424, 416, 414, and 406. FSM 232 connects to Connection CXN 1 234, CXN 2 238. CXN 3 240, and CXN 4 236 (CXN 1-4) through connections 432, 436, 438, and 434.

Figure 48J:
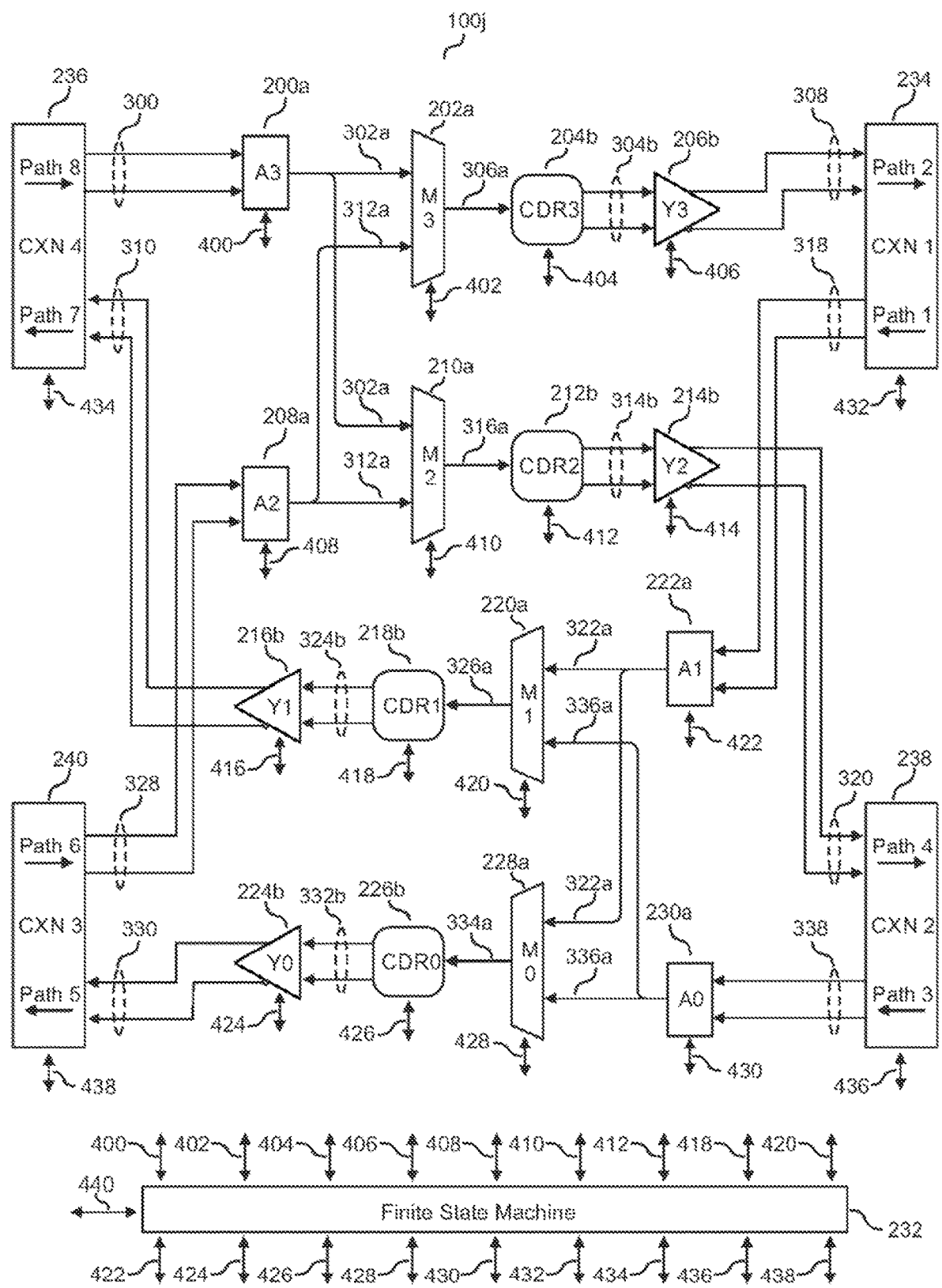
FIG. 48j is a block diagram illustrating a tenth version 100j of the preferred embodiment of the present disclosure.
Figure 48K:
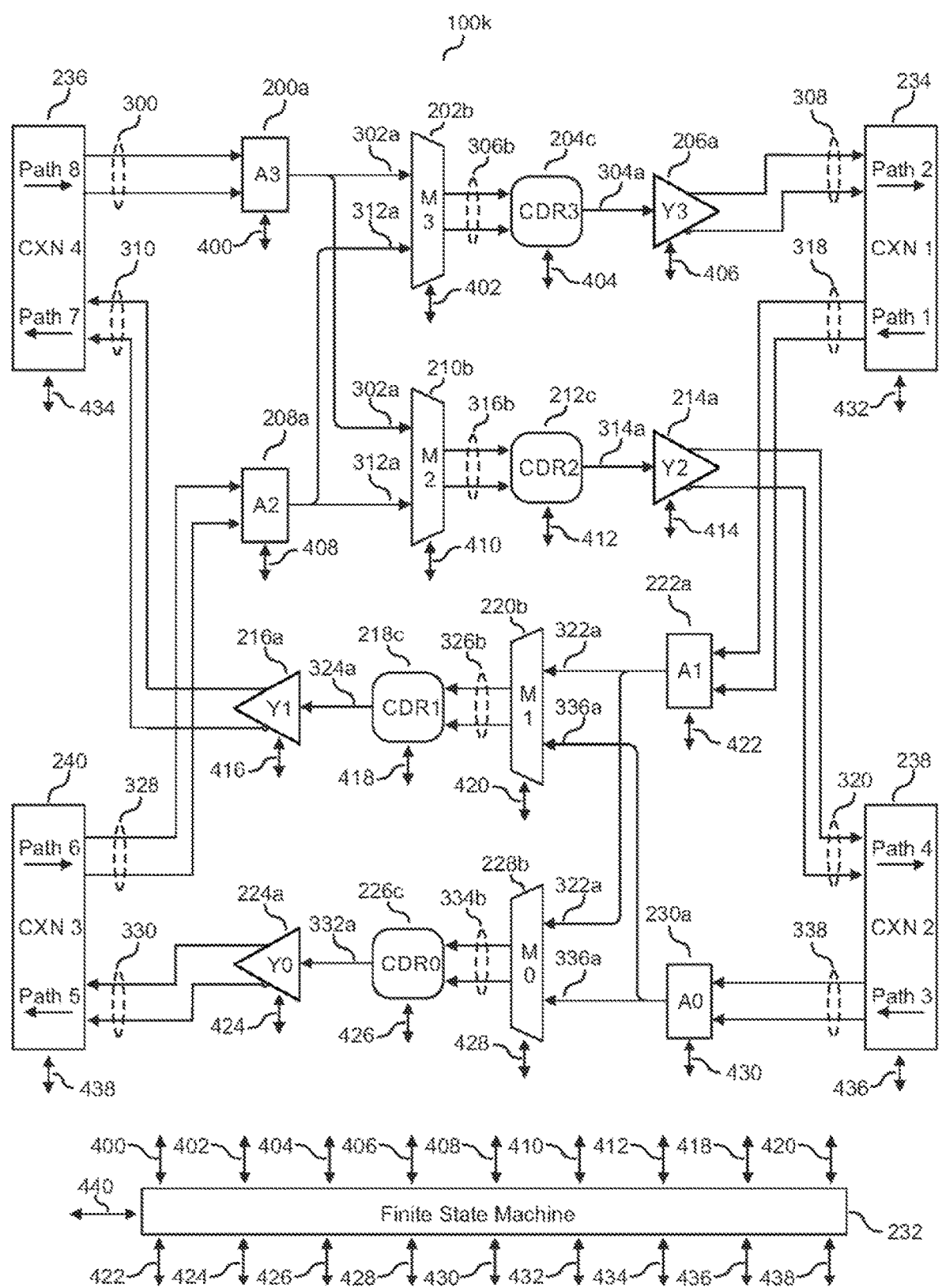
FIG. 48k is a block diagram illustrating an eleventh version 100k of the preferred embodiment of the present disclosure.
Figure 48L:
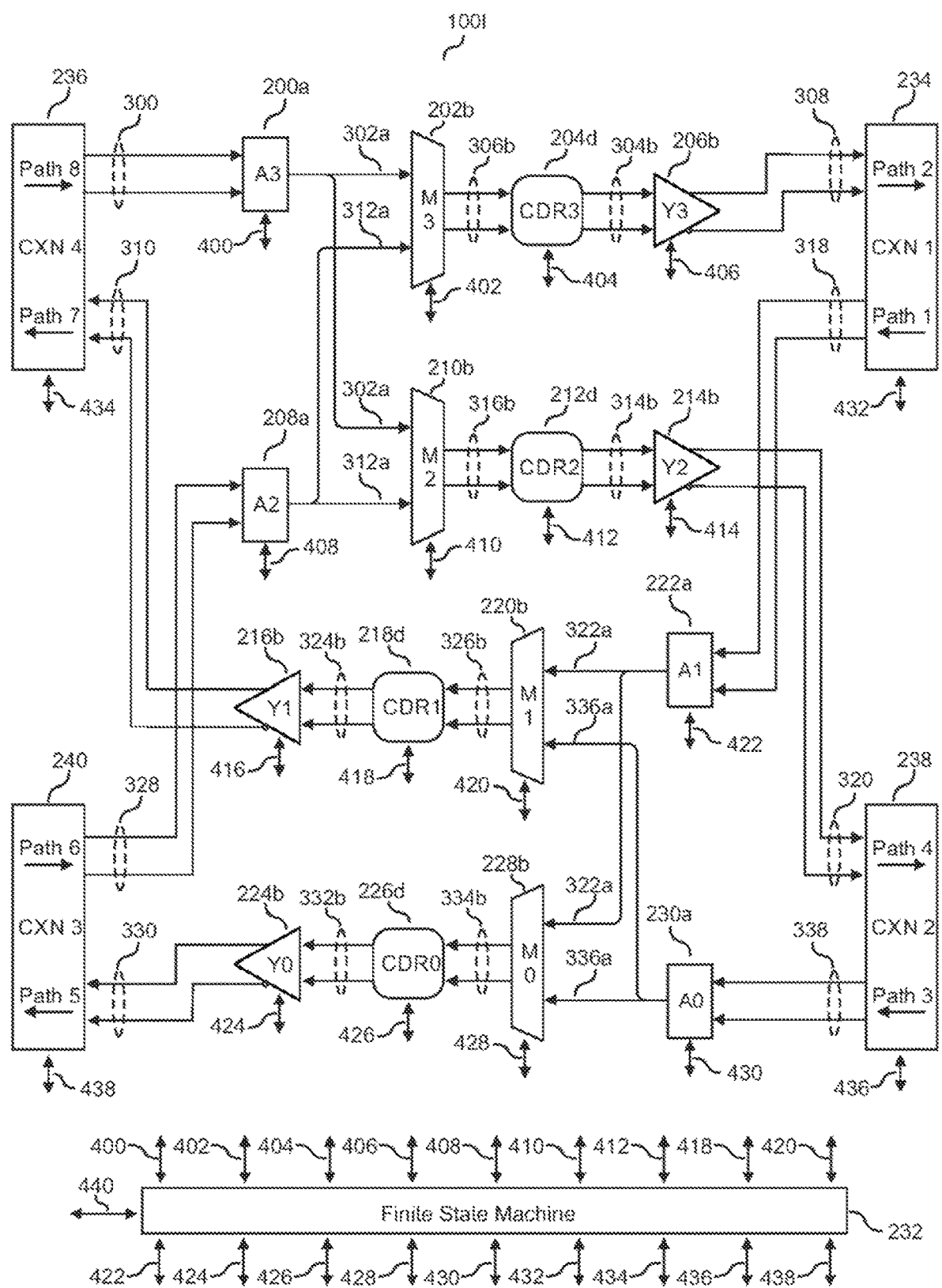
FIG. 48l is a block diagram illustrating a twelfth version 100l of the preferred embodiment of the present disclosure.
Figure 48M:
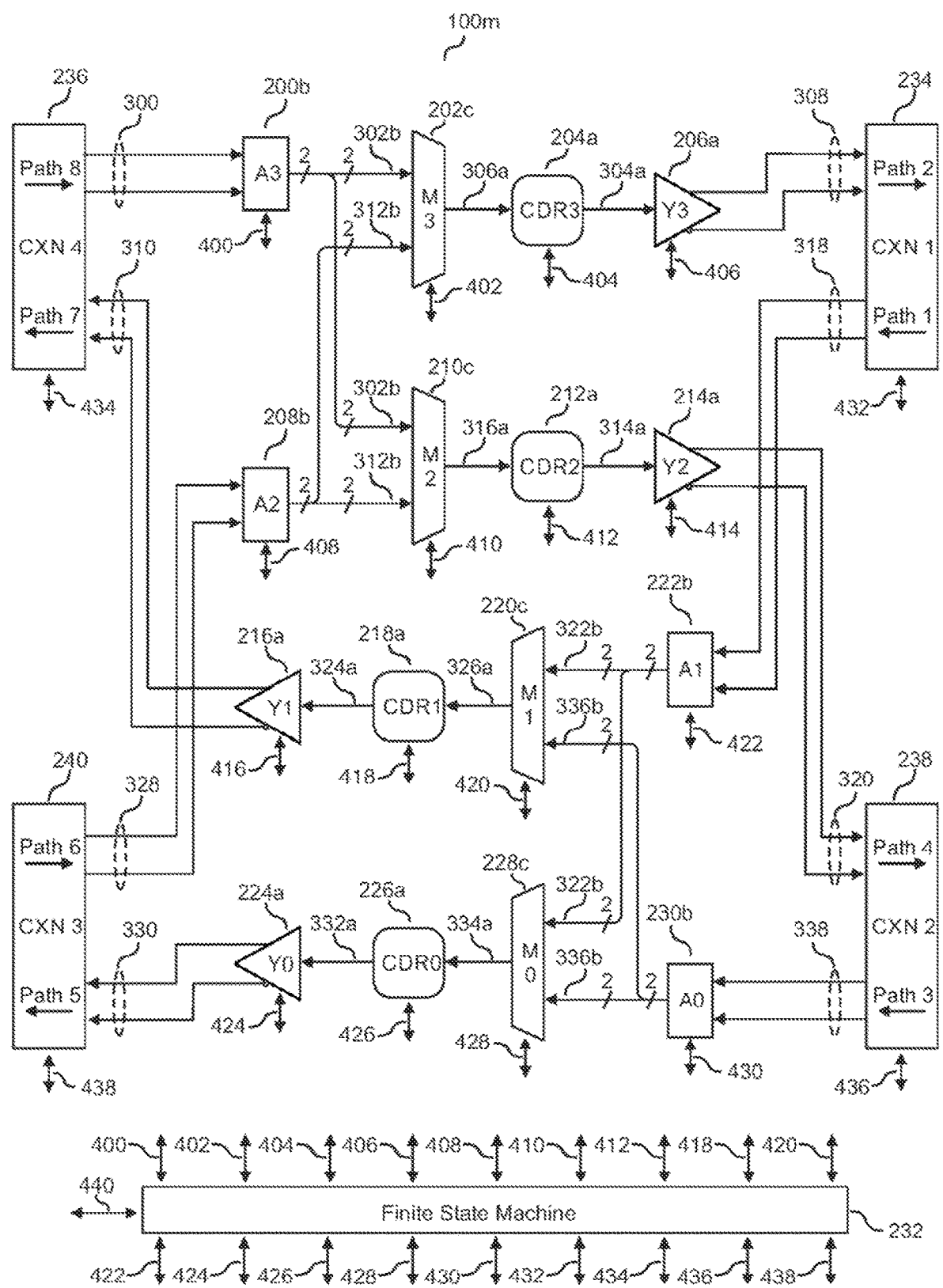
FIG. 48m is a block diagram illustrating a thirteenth version 100m of the preferred embodiment of the present disclosure.
Figure 48N:
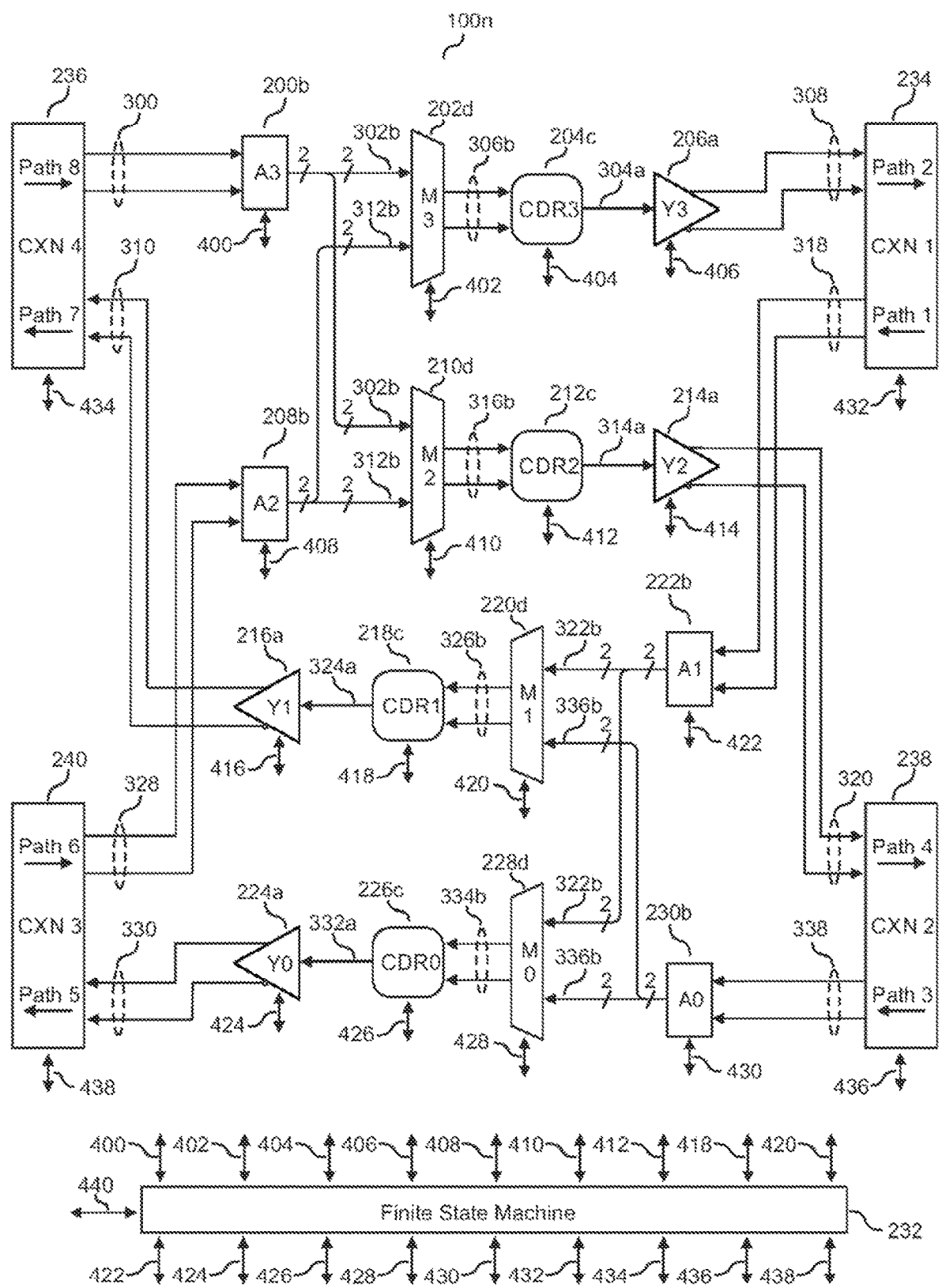
FIG. 48n is a block diagram illustrating a fourteenth version 100n of the preferred embodiment of the present disclosure.
Figure 48O:
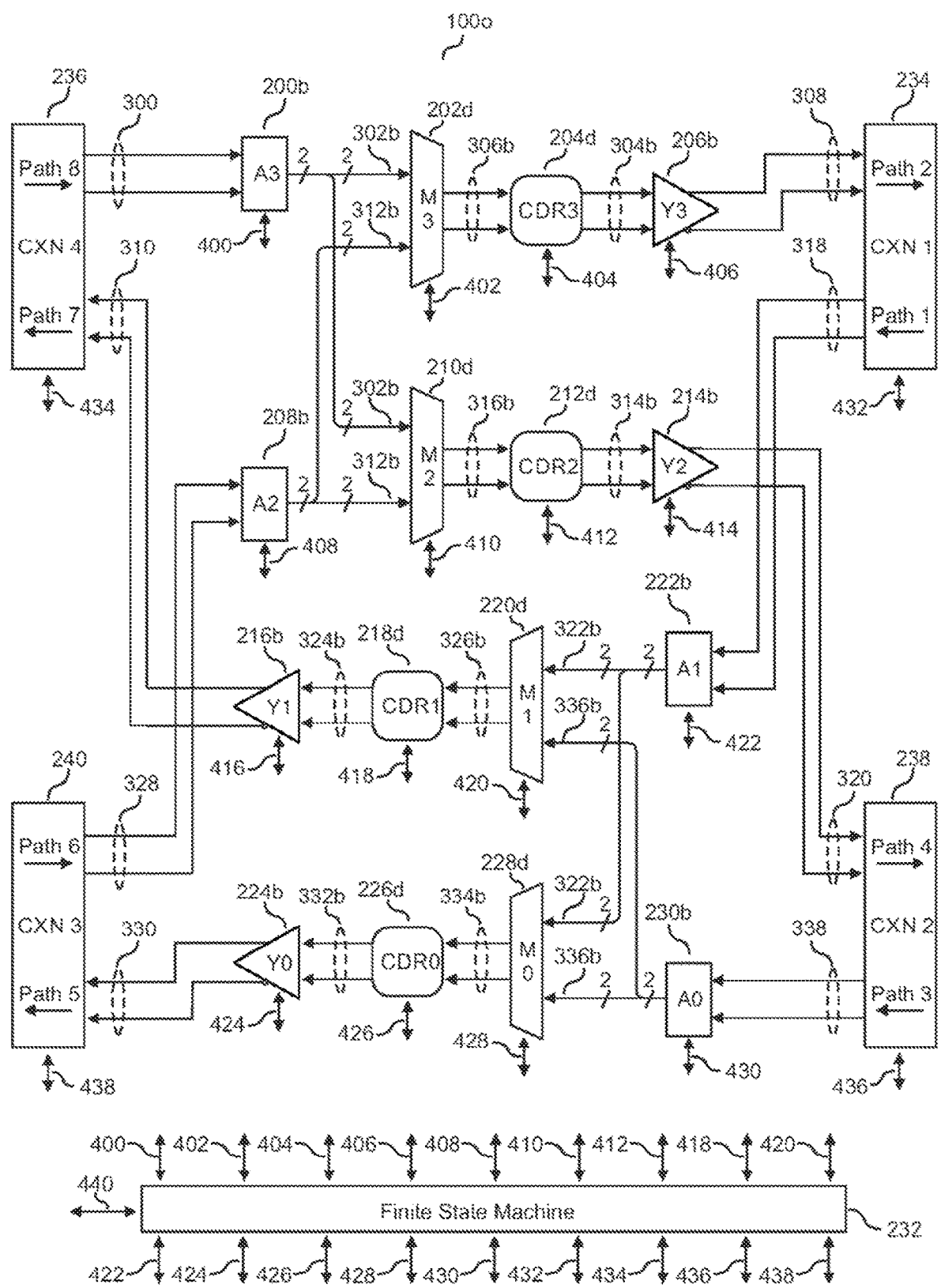
FIG. 48o is a block diagram illustrating a fifteenth version 100o of the preferred embodiment of the present disclosure.
Figure 48P:
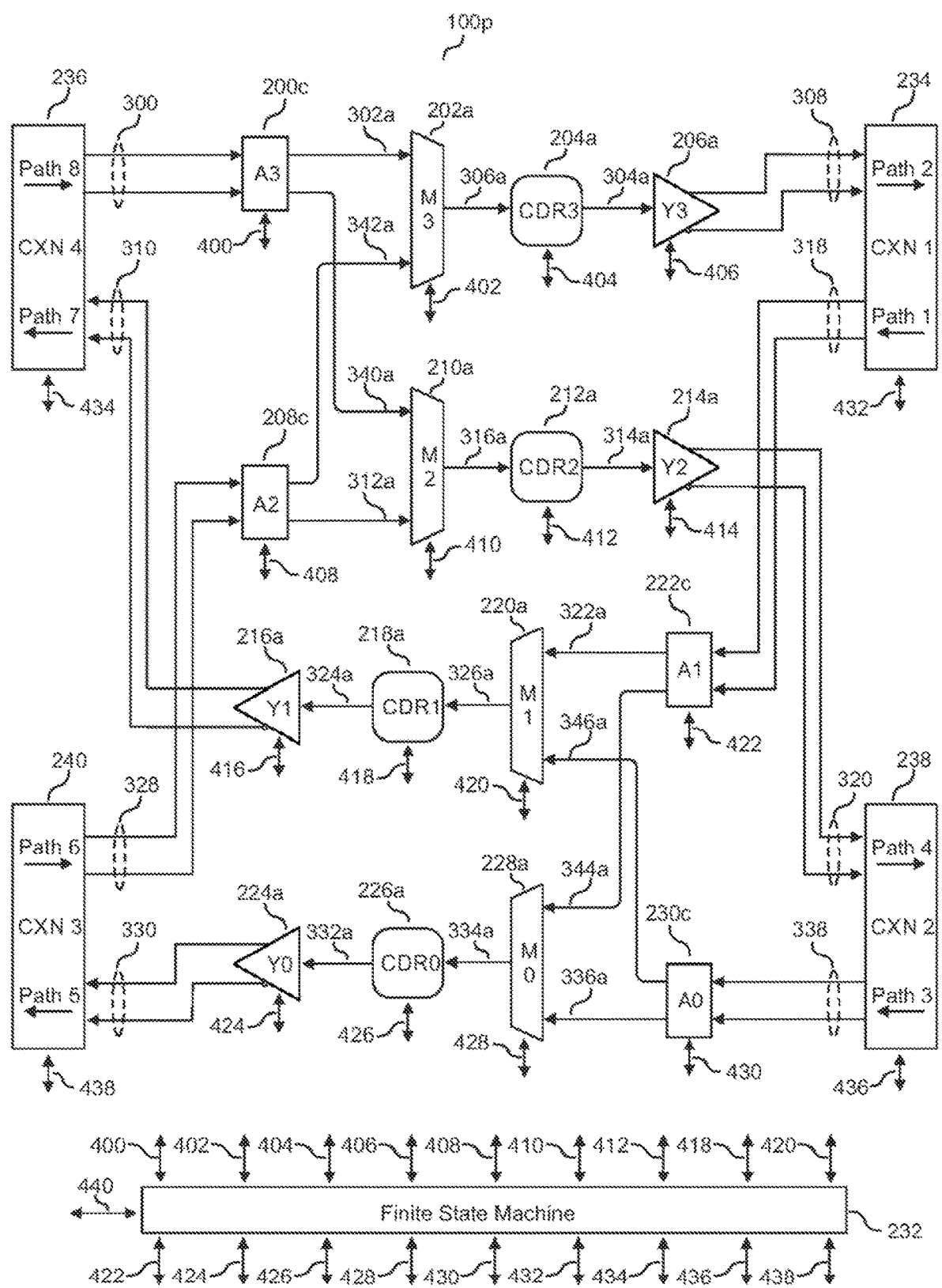
FIG. 48p is a block diagram illustrating a sixteenth version 100p of the preferred embodiment of the present disclosure.
Figure 48Q:
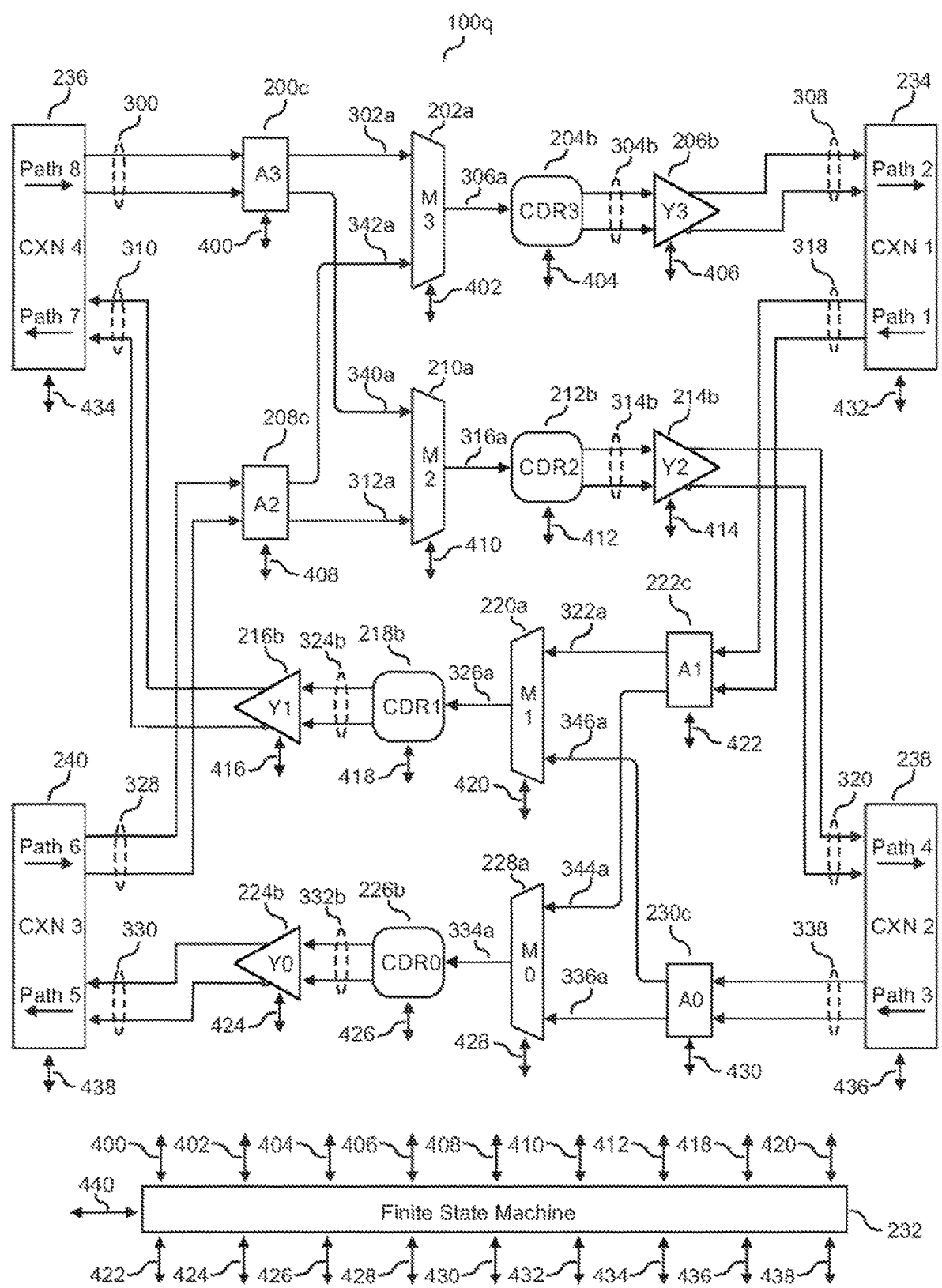
FIG. 48q is a block diagram illustrating a seventeenth version 100q of the preferred embodiment of the present disclosure.
Figure 48R:
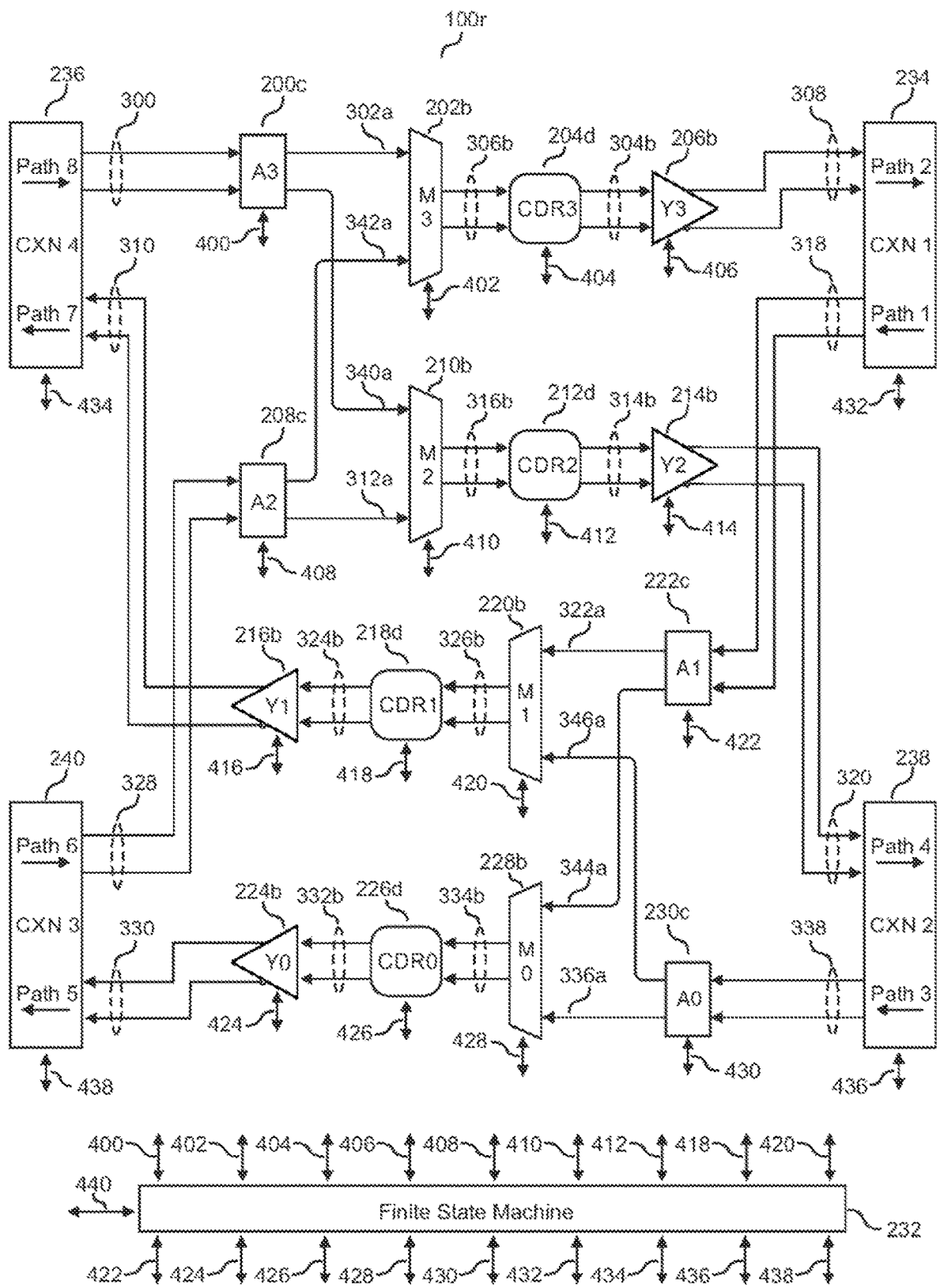
FIG. 48r is a block diagram illustrating an eighteenth version 100r of the preferred embodiment of the present disclosure.
Figure 48S:
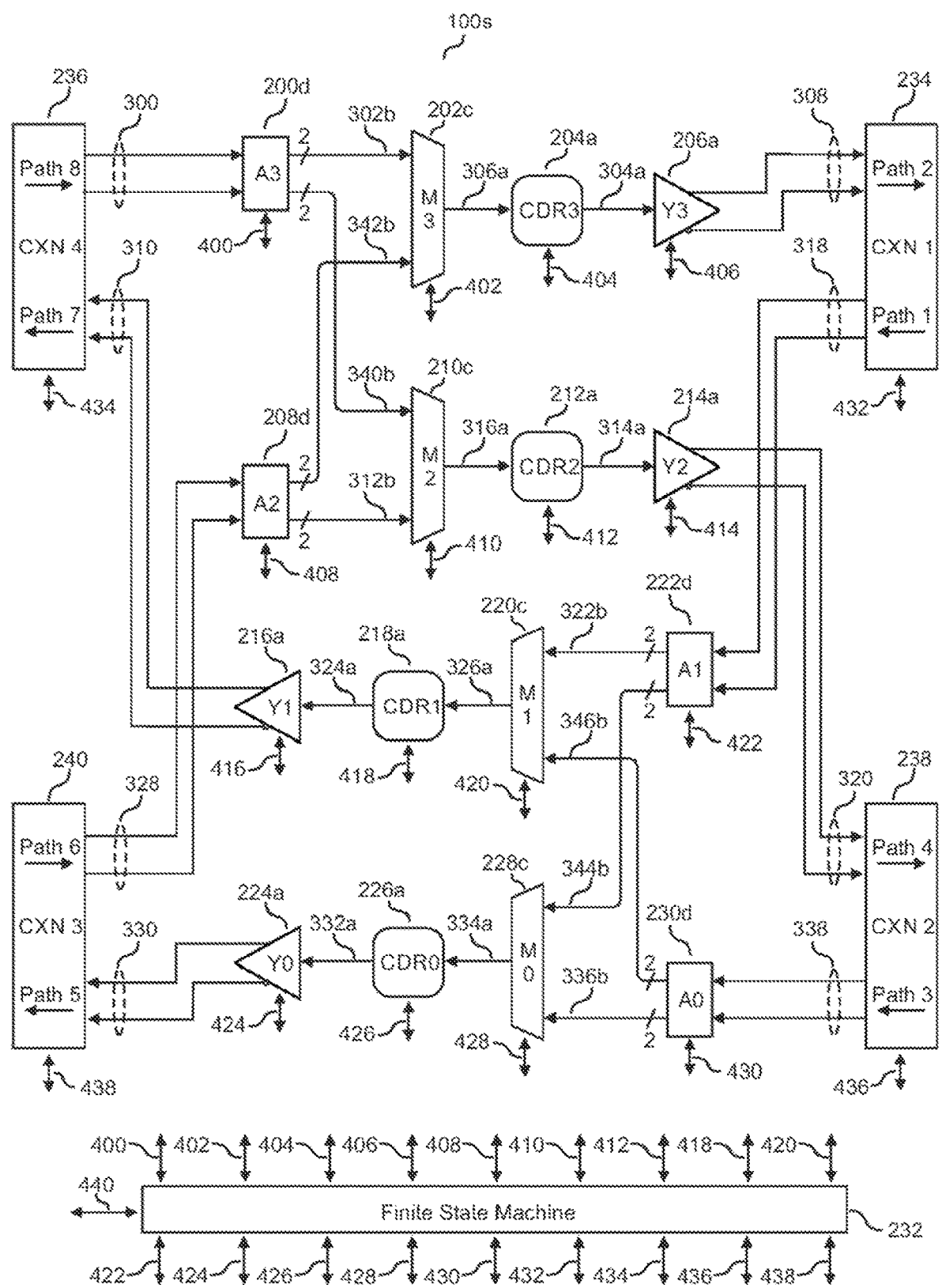
FIG. 48s is a block diagram illustrating a nineteenth version 100s of the preferred embodiment of the present disclosure.
Figure 48T:
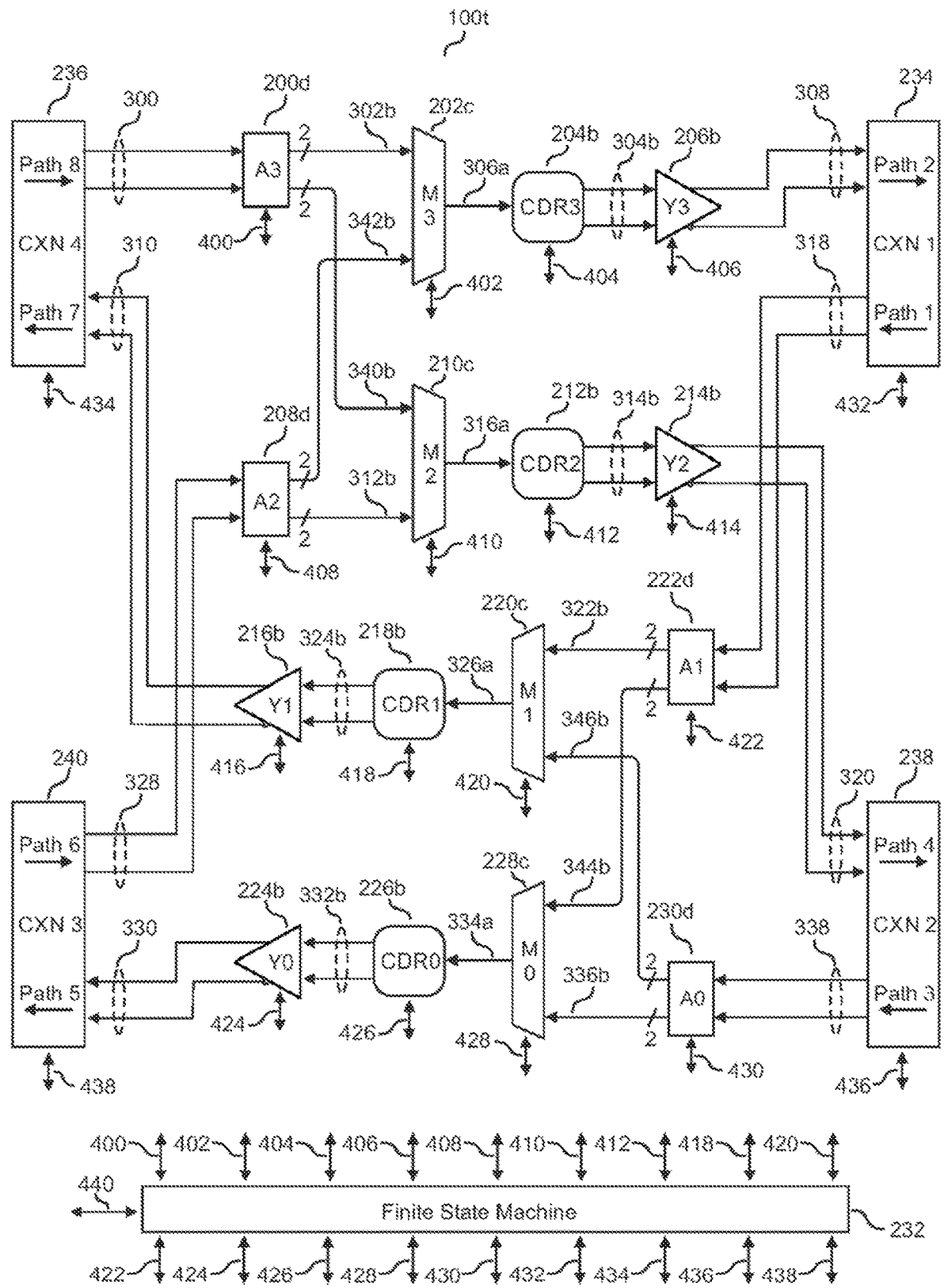
FIG. 48t is a block diagram illustrating a twentieth version 100t of the preferred embodiment of the present disclosure.
Figure 48U:
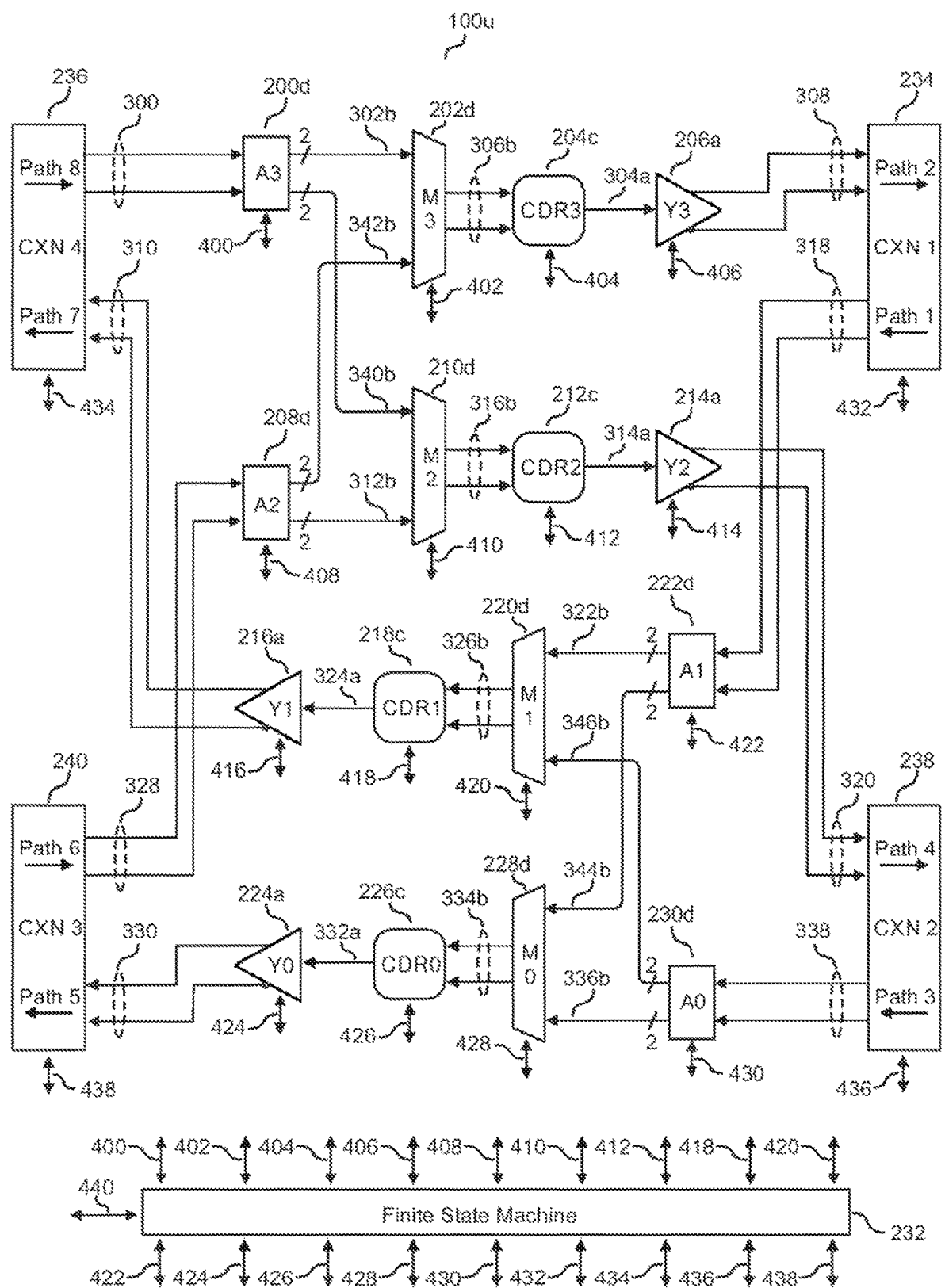
FIG. 48u is a block diagram illustrating a twenty first version 100u of the preferred embodiment of the present disclosure.
Figure 48V:
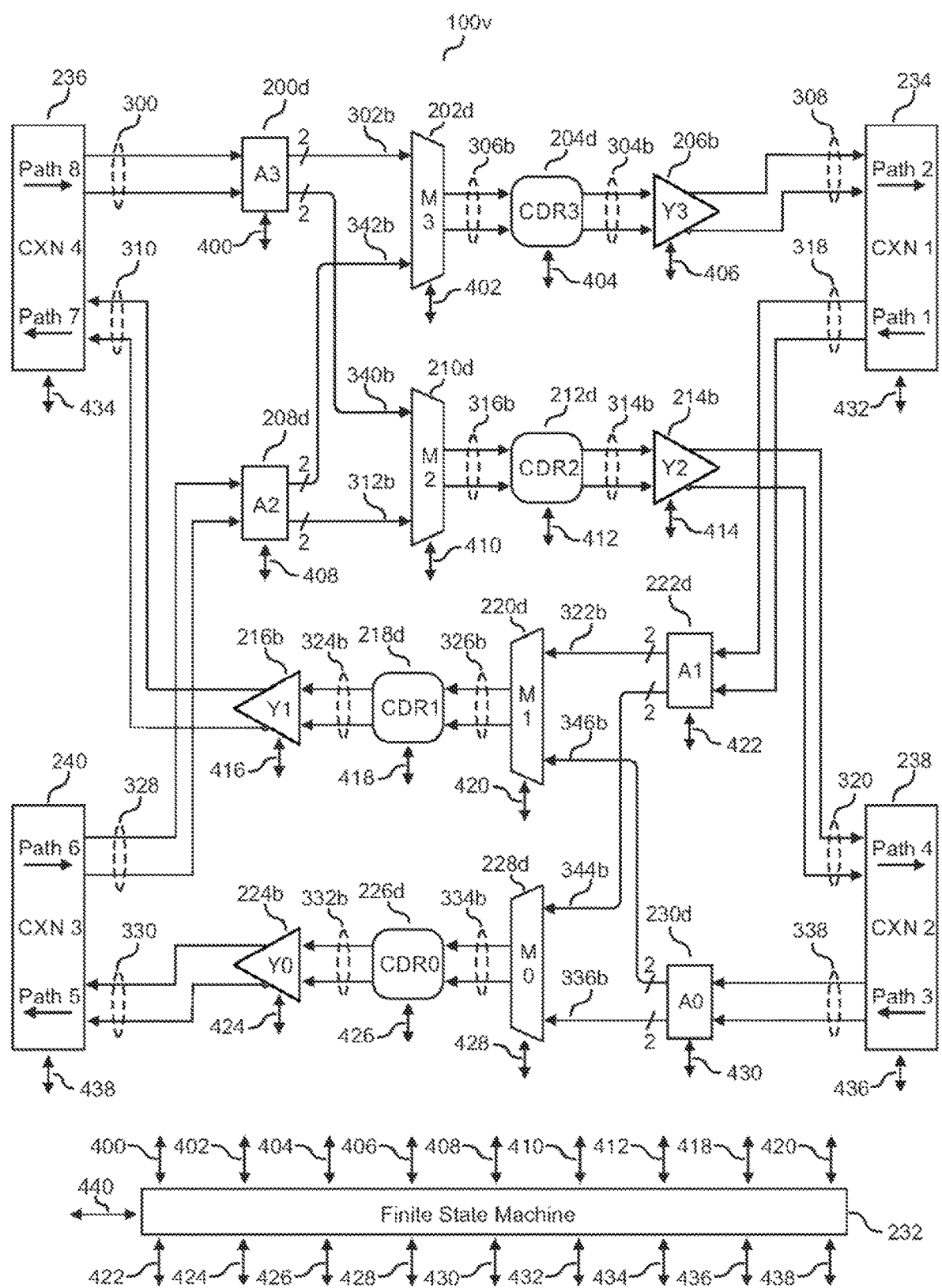
FIG. 48v is a block diagram illustrating a twenty second version 100v of the preferred embodiment of the present disclosure.

FIGS. 48i-48v illustrates versions 100i-100v of the present disclosure where the input differential signal interfaces the elements in this sequence or order, the broadband differential amplifier (A), multiplexer switch (M), clock data recovery circuitry (CDR), and the output differential amplifier (Y).

FIG. 48i illustrates version 100i of the present disclosure. The input broadband differential amplifiers (A), multiplexer switches (M), clock and data recovery (CDR), and output differential amplifiers (Y) circuitries are interconnected with single-ended signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (100i) input differential signals 318 connect to the input differential amplifier A1 222a. The output signal 322a from differential amplifier A1 222a is a single-ended signal. This output signal 322a from differential amplifier A1 222a connects to the input of Multiplexer Switch M1 220a and M0 228a.

Path 2 (100i) output differential signals 308 connect to the output differential amplifier Y3 206a. The input signal 304a to differential amplifier Y3 206a is a single-ended signal. This input signal 304a connects to the output of CDR3 204a. The input signal 306a to CDR3 204a is a single-ended signal. This input signal 306a to CDR3 204a connects to the output of Multiplexer Switch M3 202a.

Path 3 (100i) input differential signals 338 connect to the input differential amplifier A0 230a. The output signal 336a from differential amplifier A0 230a is a single-ended signal. This output signal 336a from differential amplifier A0 230a connects to the input of Multiplexer Switch M0 228a and M1 220a.

Path 4 (100i) output differential signals 320 connect to the output differential amplifier Y2 214a. The input signal 314a to differential amplifier Y2 214a is a single-ended signal. This input signal 314a connects to the output of CDR2 212a. The input signal 316a to CDR2 212a is a single-ended signal. This input signal 316a to CDR2 212a connects to the output of Multiplexer Switch M2 210a.

Path 5 (100i) output differential signals 330 connect to the output differential amplifier Y0 224a. The input signal 332a to differential amplifier Y0 224a is a single-ended signal. This input signal 332a connects to the output of CDR0 226a. The input signal 334a to CDR0 226a is a single-ended signal. This input signal 334a to CDR0 226a connects to the output of Multiplexer Switch M0 228a.

Path 6 (100i) input differential signals 328 connect to the input differential amplifier A2 208a. The output signal 312a from differential amplifier A2 208a is a single-ended signal. This output signal 312a from differential amplifier A2 208a connects to the input of Multiplexer Switch M2 210a and M3 202a.

Path 7 (100i) output differential signals 310 connect to the output differential amplifier Y1 216a. The input signal 324a to differential amplifier Y1 216a is a single-ended signal. This input signal 324a connects to the output of CDR1 218a. The input signal 326a to CDR1 218a is a single-ended signal. This input signal 326a to CDR1 218a connects to the output of Multiplexer Switch M1 220a.

Path 8 (100i) input differential signals 300 connect to the input differential amplifier A3 200a. The output signal 302a from differential amplifier A3 200a is a single-ended signal. Ibis output signal 302a from differential amplifier A3 200a connects to the input of Multiplexer Switch M2 210a and M3 202a.

A finite state machine (FSM) 232 connects to the input broadband amplifiers A0 230a, A1 222a, A2, 208a, and A3 200a (A0-A3) through connections 430, 422, 408, and 400 respectively. FSM 232 connects to the Multiplexer Switches M0 228a, M1 220a, M2 210a, and M3 202a (M0-M3) through connections 428, 420, 410, and 402 respectively. FSM 232 connects to CDR0 226a, CDR1 218a, CDR2 212a, and CDR3 204a (CDR0-CDR3) through connections 426, 418, 412, and 404, respectively. FSM 232 connects to the output broadband amplifiers Y0 224a, Y1 216a, Y2 214a, and Y3 206a (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48j illustrates version 100j of the present disclosure. The input broadband differential amplifiers (A), multiplexer switches (M), clock and data recovery (CDR) circuitries are interconnected with single-ended signals. Output differential amplifiers (Y) are connected to CDR circuitries with differential signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100j) input differential signals 318 connect to the input differential amplifier A1 222a. The output signal 322a from differential amplifier A1 222a is a single-ended signal. This output signal 322a from differential amplifier A1 222a connects to the input of Multiplexer Switch M1 220a and M0 228a.

Path 2 (Version 100j) output differential signals 308 connect to the output differential amplifier Y3 206b. The input signal 304b to differential amplifier Y3 206b is a differential signal. This input signal 304b connects to the output of CDR3 204b. The input signal 306a to CDR3 204b is a single-ended signal. This input signal 306a to CDR3 204b connects to the output of Multiplexer Switch M3 202a.

Path 3 (Version 100j) input differential signals 338 connect to the input differential amplifier A0 230a. The output signal 336a from differential amplifier A0 230a is a single-ended signal. This output signal 336a from differential amplifier A0 230a connects to the input of Multiplexer Switch M0 228a and M1 220a.

Path 4 (Version 100j) output differential signals 320 connect to the output differential amplifier Y2 214b, The input signal 314b to differential amplifier Y2 214b is a differential signal. This input signal 314b connects to the output of CDR2 212b. The input signal 316a to CDR2 212b is a single-ended signal. This input signal 316a to CDR2 212b connects to the output of Multiplexer Switch M2 210a.

Path 5 (Version 100j) output differential signals 330 connect to the output differential amplifier Y0 224b. The input signal 332b to differential amplifier Y0 224b is a differential signal. This input signal 332b connects to the output of CDR0 226b. The input signal 334a to CDR0 226b is a single-ended signal. This input signal 334a to CDR0 226b connects to the output of Multiplexer Switch M0 228a.

Path 6 (Version 100j) input differential signals 328 connect to the input differential amplifier A2 208a. The output signal 312a from differential amplifier A2 208a is a single-ended signal. This output signal 312a from differential amplifier A2 208a connects to the input of Multiplexer Switch M2 210a and M3 202a.

Path P7 (Version 100j) output differential signals 310 connect to the output differential amplifier Y1 216b. The input signal 324b to differential amplifier Y1216b is a differential signal. This input signal 324b connects to the output of CDR1 218b. The input signal 326a to CDR1 218b is a single-ended signal. This input signal 326a to CDR1 218b connects to the output of Multiplexer Switch M1 220a.

Path P8 (Version 100j) input differential signals 300 connect to the input differential amplifier A3 200a. The output signal 302a from differential amplifier A3 200a is a single-ended signal. This output signal 302a from differential amplifier A3 200a connects to the input of Multiplexer Switch M2 210a and M3 202a.

A finite state machine (FSM) 232 connects to the input broadband amplifiers A0 230a, A1 222a, A2, 208a, and A3 200a (A0-A3) through connections 430, 422, 408, and 400 respectively. FSM 232 connects to the Multiplexer Switches M0 228a, M1220a, M2 210a, and M3 202a (M0-M3) through connections 428, 420, 410, and 402 respectively. FSM 232 connects to CDR0 226b, CDR1 218b, CDR2 212b, and CDR3 204b (CDR0-CDR3) through connections 426, 418, 412, and 404, respectively. FSM 232 connects to the output broadband amplifiers Y0 224b, Y1 216b, Y2 214b, and Y3 206b (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48k illustrates version 100k of the present disclosure. The input broadband differential amplifiers (A) are connected to multiplexer switches (M) with single-ended signals. Multiplexer switches (M) are connected to the clock and data recovery (CDR) circuitries with differential signals. The output differential amplifiers (Y) are connected to the clock and data recovery (CDR) circuitries with single-ended signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 30) and a Path P7 representing an output differential signal 310.

Path 1 (Version 100k) input differential signals 318 connect to the input differential amplifier A1 222a. The output signal 322a from differential amplifier A1 222a is a single-ended signal. This output signal 322a from differential amplifier A1 222a connects to the input of Multiplexer Switch M1 220b and M0 228b.

Path 2 (Version 100k) output differential signals 308 connect to the output differential amplifier Y3 206b. The input signal 304a to differential amplifier Y3 206b is a single-ended. This input signal 304a connects to the output of CDR3 204c. The input signal 306b to CDR3 204c is a differential signal. This input signal 306b to CDR3 204c connects to the output of Multiplexer Switch M3 202b.

Path 3 (Version 100k) input differential signals 338 connect to the input differential amplifier A0 230a. The output signal 336a from differential amplifier A0 230a is a single-ended signal. This output signal 336a from differential amplifier A0 230a connects to the input of Multiplexer Switch M0 228b and M1 220b.

Path 4 (Version 100k) output differential signals 320 connect to the output differential amplifier Y2 214a. The input signal 314a to differential amplifier Y2 214a is a single-ended signal. This input signal 314a connects to the output of CDR2 212c. The input signal 316b to CDR2 212c is a differential signal. This input signal 316b to CDR2 212c connects to the output of Multiplexer Switch M2 210b.

Path 5 (Version 100k) output differential signals 330 connect to the output differential amplifier Y0 224a. The input signal 332a to differential amplifier Y0 224a is a single-ended. This input signal 332a connects to the output of CDR0 226c. The input signal 334b to CDR0 226c is a differential signal. This input signal 334b to CDR0 226c connects to the output of Multiplexer Switch M0 228b.

Path 6 (Version 100k) input differential signals 328 connect to the input differential amplifier A2 208a. The output signal 312a from differential amplifier A2 208a is a single-ended signal. This output signal 312a from differential amplifier A2 208a connects to the input of Multiplexer Switch M2 210b and M3 202b.

Path P7 (Version 100k) output differential signals 310 connect to the output differential amplifier Y1 216a. The input signal 324a to differential amplifier Y1 216a is a single-ended signal. This input signal 324a connects to the output of CDR 1 218c. The input signal 326b to CDR1 218c is a differential signal. This input signal 326b to CDR1 218c connects to the output of Multiplexer Switch M1 220b.

Path P8 (Version 100k) input differential signals 300 connect to the input differential amplifier A3 200a. The output signal 302a from differential amplifier A3 200a is a single-ended signal. This output signal 302a from differential amplifier A3 200a connects to the input of Multiplexer Switch M2 210b and M3 202b.

A finite state machine (FSM) 232 connects to the input broadband amplifiers A0 230a, A1 222a, A2, 208a, and A3 200a (A0-A3) through connections 430, 422, 408, and 400 respectively. FSM 232 connects to the Multiplexer Switches M0 228b, M1 220b, M2 210b, and M3 202b (M0-M3) through connections 428, 420, 410, and 402 respectively. FSM 232 connects to CDR0 226c, CDR1 218c, CDR2 212c, and CDR3 204c (CDR0-CDR3) through connections 426, 418, 412, and 404, respectively. FSM 232 connects to the output broadband amplifiers Y0 224a, Y1 216a. Y2 214a, and Y3 206a (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48l illustrates version 100l of the present disclosure. The input broadband differential amplifiers (A) are connected to multiplexer switches (M) with single-ended signals. Multiplexer switches (M), clock and data recovery (CDR), and output differential amplifiers (Y) circuitries are interconnected with differential signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100l) input differential signals 318 connect to the input differential amplifier A1 222a. The output signal 322a from differential amplifier A1 222a is a single-ended signal. This output signal 322a from differential amplifier A1 222a connects to the input of Multiplexer Switch M1220b and M0 228b.

Path 2 (Version 100l) output differential signals 308 connect to the output differential amplifier Y3 206b. The input signal 304b to differential amplifier Y3 206b is a differential signal. This input signal 304b connects to the output of CDR3 204d. The input signal 306b to CDR3 204d is a differential signal. This input signal 306b to CDR3 204d connects to the output of Multiplexer Switch M3 202b.

Path 3 (Version 100l) input differential signals 338 connect to the input differential amplifier A0 230a. The output signal 336a from differential amplifier A0 230a is a single-ended signal. This output signal 336a from differential amplifier A0 230a connects to the input of Multiplexer Switch M0 228b and M1 220b.

Path 4 (Version 100l) output differential signals 320 connect to the output differential amplifier Y2 214b. The input signal 314b to differential amplifier Y2 214b is a differential signal. This input signal 314b connects to the output of CDR2 212d. The input signal 316b to CDR2 212d is a differential signal. This input signal 316b to CDR2 212d connects to the output of Multiplexer Switch M2 210b.

Path 5 (Version 100l) output differential signals 330 connect to the output differential amplifier Y0 224b. The input signal 332b to differential amplifier Y0 224b is a differential signal. This input signal 332b connects to the output of CDR0 226d. The input signal 334b to CDR0 226c is a differential signal. This input signal 334b to CDR0 226d connects to the output of Multiplexer Switch M0 228b.

Path 6 (Version 100l) input differential signals 328 connect to the input differential amplifier A2 208a. The output signal 312a from differential amplifier A2 208a is a single-ended signal. This output signal 312a from differential amplifier A2 208a connects to the input of Multiplexer Switch M2 2/0b and M3 202b.

Path P7 (Version 100l) output differential signals 310 connect to the output differential amplifier Y1 216b. The input signal 324b to differential amplifier Y1 216b is a differential signal. This input signal 324b connects to the output of CDR1 218d. The input signal 326b to CDR1 218d is a differential signal. This input signal 326b to CDR1 218d connects to the output of Multiplexer Switch M1 220b.

Path P8 (Version 100l) input differential signals 300 connect to the input differential amplifier A3 200a. The output signal 302a from differential amplifier A3 200a is a single-ended signal. This output signal 302a from differential amplifier A3 200a connects to the input of Multiplexer Switch M2 210b and M3 202b.

A finite state machine (FSM) 232 connects to the input broadband amplifiers A0 230a, A1 222a, A2, 208a, and A3 200a (A0-A3) through connections 430, 422, 408, and 400 respectively. FSM 232 connects to the Multiplexer Switches M0 228b, M1 220b, M2 210b, and M3 202b (M0-M3) through connections 428, 420, 410, and 402 respectively. FSM 232 connects to CDR0 226d, CDR1 218d, CDR2 212d, and CDR3 204d (CDR0-CDR3) through connections 426, 418, 412, and 404, respectively. FSM 232 connects to the output broadband amplifiers Y0 224b, Y1 216b, Y2 214b, and Y3 206b (Y0-Y3), through connections 424, 416, 414, and 406. FSM 232 connects to Connection CXN 1 234. CXN 2 238, CXN 3 240, and CXN 4 236 (CXN 1-4) through connections 432, 436, 438, and 434.

FIG. 48m illustrates version 100m of the present disclosure. The input broadband differential amplifiers (A) are connected to multiplexer switches (M) with differential signals. Multiplexer switches (M), clock and data recovery (CDR), and output differential amplifiers (Y) circuitries are interconnected with single-ended signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 30) and a Path P7 representing an output differential signal 310.

Path 1 (Version 100m) input differential signals 318 connect to the input differential amplifier A1 222b. The output signal 322b from differential amplifier A1 222b is a differential signal. This output signal 322b from differential amplifier A1 222b connects to the input of Multiplexer Switch M1 220c and M0 228c.

Path 2 (Version 100m) output differential signals 308 connect to the output differential amplifier Y3 206a. The input signal 304a to differential amplifier Y3 206a is a single-ended signal. This input signal 304a connects to the output of CDR3 204a. The input signal 306a to CDR3 204a is a single-ended signal. This input signal 306a to CDR3 204a connects to the output of Multiplexer Switch M3 202c.

Path 3 (Version 100m) input differential signals 338 connect to the input differential amplifier A0 230b. The output signal 336b from differential amplifier A0 230b is a differential signal. This output signal 336b from differential amplifier A0 230b connects to the input of Multiplexer Switch M0 228c and M1 220c.

Path 4 (Version 100m) output differential signals 320 connect to the output differential amplifier Y2 214a. The input signal 314a to differential amplifier Y2 214a is a single-ended signal. This input signal 314a connects to the output of CDR2 212a. The input signal 316a to CDR2 212a is a single-ended signal. This input signal 316a to CDR2 212a connects to the output of Multiplexer Switch M2 210c.

Path 5 (Version 100m) output differential signals 330 connect to the output differential amplifier Y0 224a. The input signal 332a to differential amplifier Y0 224a is a single-ended signal. This input signal 332a connects to the output of CDR0 226a. The input signal 334a to CDR0 226a is a single-ended signal. This input signal 334a to CDR0 226a connects to the output of Multiplexer Switch M0 228c.

Path 6 (Version 100m) input differential signals 328 connect to the input differential amplifier A2 208b. The output signal 312b from differential amplifier A2 208b is a differential signal. This output signal 312b from differential amplifier A2 208b connects to the input of Multiplexer Switch M2 210c and M3 202c.

Path P7 (Version 100m) output differential signals 310 connect to the output differential amplifier Y1 216a. The input signal 324a to differential amplifier Y1 216a is a single-ended signal. This input signal 324a connects to the output of CDR1 218a. The input signal 326a to CDR1 218a is a single-ended signal. This input signal 326a to CDR1 218a connects to the output of Multiplexer Switch M1220c.

Path P8 (Version 100m) input differential signals 300 connect to the input differential amplifier A3 200b. The output signal 302b from differential amplifier A3 200b is a differential signal. This output signal 302b from differential amplifier A3 200b connects to the input of Multiplexer Switch M2 210c and M3 202c.

A finite state machine (FSM) 232 connects to the input broadband amplifiers A0 230b, A1 222b, A2, 208b, and A3 200b (A0-A3) through connections 430, 422, 408, and 400 respectively. FSM 232 connects to the Multiplexer Switches M0 228c, M1 220c, M2 210c, and M3 202c (M0-M3) through connections 428, 420, 410, and 402 respectively. FSM 232 connects to CDR0 226a, CDR1 218a, CDR2 212a, and CDR3 204a (CDR0-CDR3) through connections 426, 418, 412, and 404, respectively. FSM 232 connects to the output broadband amplifiers Y0 224a, Y1 216a, Y2 214a, and Y3 206a (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48n illustrates version 100n of the present disclosure. The input broadband differential amplifiers (A), multiplexer switches (M), clock and data recovery (CDR) circuitries are interconnected with differential signals. The output differential amplifiers (Y) are connected to clock and data recovery (CDR) circuitries with single-ended signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100n) input differential signals 318 connect to the input differential amplifier A1 222b. The output signal 322b from differential amplifier A1 222b is a differential signal. This output signal 322b from differential amplifier A1 222b connects to the input of Multiplexer Switch M1 220d and M0 228d.

Path 2 (Version 100n) output differential signals 308 connect to the output differential amplifier Y3 206a. The input signal 304a to differential amplifier Y3 206a is a single-ended signal. This input signal 304a connects to the output of CDR3 204c. The input signal 306b to CDR3 204c is a differential signal. This input signal 306b to CDR3 204c connects to the output of Multiplexer Switch M3 202d.

Path 3 (Version 100n) input differential signals 338 connect to the input differential amplifier A0 230b. The output signal 336b from differential amplifier A0 230b is a differential signal. This output signal 336b from differential amplifier A0 230b connects to the input of Multiplexer Switch M0 228d and M1 220d.

Path 4 (Version 100n) output differential signals 320 connect to the output differential amplifier Y2 214a. The input signal 314a to differential amplifier Y2 214a is a single-ended signal. This input signal 314a connects to the output of CDR2 212c. The input signal 316b to CDR2 212c is a differential signal. This input signal 316b to CDR2 212c connects to the output of Multiplexer Switch M2 210d.

Path 5 (Version 100n) output differential signals 330 connect to the output differential amplifier Y0 224a. The input signal 332a to differential amplifier Y0 224a is a single-ended signal. This input signal 332a connects to the output of CDR0 226c. The input signal 334b to CDR0 226c is a differential signal. This input signal 334b to CDR0 226c connects to the output of Multiplexer Switch M0 228d.

Path 6 (Version 100n) input differential signals 328 connect to the input differential amplifier A2 208b. The output signal 312b from differential amplifier A2 208b is a differential signal. This output signal 312b from differential amplifier A2 208b connects to the input of Multiplexer Switch M2 210d and M3 202d.

Path P7 (Version 100n) output differential signals 310 connect to the output differential amplifier Y1 216a. The input signal 324a to differential amplifier Y1 216a is a single-ended signal. This input signal 324a connects to the output of CDR1 218c. The input signal 326b to CDR1 218c is a differential signal. This input signal 324b to CDR 218c connects to the output of Multiplexer Switch M1 220d.

Path P8 (Version 100n) input differential signals 300 connect to the input differential amplifier A3 200b. The output signal 302b from differential amplifier A3 200b is a differential signal. This output signal 302b from differential amplifier A3 200b connects to the input of Multiplexer Switch M2 210d and M3 202d.

A finite state machine (FSM) 232 connects to the input broadband amplifiers A0 230b, A1 222b, A2, 208b, and A3

200b (A0-A3) through connections 430, 422, 408, and 400 respectively. FSM 232 connects to the Multiplexer Switches M0 228d, M1 220d, M2 210d, and M3 202d (M0-M3) through connections 428, 420, 410, and 402 respectively. FSM 232 connects to CDR0 226c, CDR1 218c, CDR2 212c, and CDR3 204c (CDR0-CDR3) through connections 426, 418, 412, and 404, respectively. FSM 232 connects to the output broadband amplifiers Y0 224a, Y1 216a, Y2 214a, and Y3 206a (Y0-Y3), through connections 424, 416, 414, and 406.

FSM 232 connects to Connection CXN 1 234. CXN 2 238, CXN 3 240, and CXN 4 236 (CXN 1-4) through connections 432, 436, 438, and 434.

FIG. 48o illustrates version 100o of the present disclosure. The input broadband differential amplifiers (A), multiplexer switches (M), clock and data recovery (CDR), and output differential amplifiers (Y) circuitries are interconnected with differential signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100o) input differential signals 318 connect to the input differential amplifier A1 222b. The output signals 322b from differential amplifier A1 222b is a differential signal. This output signal 322b from differential amplifier A1 222b connects to the input of Multiplexer Switch M1 220d and M0 228d.

Path 2 (Version 100o) output differential signals 308 connect to the output differential amplifier Y3 206b. The input signal 304b to differential amplifier Y3 206b is a differential signal. This input signal 304b connects to the output of CDR3 204d. The input signal 306b to CDR3 204d is a differential signal. This input signal 306b to CDR3 204d connects to the output of Multiplexer Switch M3 202d.

Path 3 (Version 100o) input differential signals 338 connect to the input differential amplifier A0 230b. The output signal 336b from differential amplifier A0 230b is a differential signal. This output signal 336b from differential amplifier A0 230b connects to the input of Multiplexer Switch M0 228d and M1 220d.

Path 4 (Version 100o) output differential signals 320 connect to the output differential amplifier Y2 214b. The input signal 314b to differential amplifier Y2 214b is a differential signal. This input signal 314b connects to the output of CDR2 212d. The input signal 316b to CDR2 212d is a differential signal. This input signal 316b to CDR2 212d connects to the output of Multiplexer Switch M2 210d.

Path 5 (Version 100o) output differential signals 330 connect to the output differential amplifier Y0 224b. The input signal 332b to differential amplifier Y0 224b is a differential signal. This input signal 332b connects to the output of CDR0 226d. The input signal 334b to CDR0 226d is a differential signal. This input signal 334b to CDR0 226d connects to the output of Multiplexer Switch M0 228d.

Path 6 (Version 100o) input differential signals 328 connect to the input differential amplifier A2 208b. The output signal 312b from differential amplifier A2 208b is a differential signal. This output signal 312b from differential amplifier A2 208b connects to the input of Multiplexer Switch M2 210d and M3 202d.

Path P7 (Version 100o) output differential signals 310 connect to the output differential amplifier Y1 216b. The input signal 324b to differential amplifier Y1 216b is a differential signal. This input signal 324b connects to the output of CDR1 218d. The input signal 326b to CDR1 218d is a differential signal. This input signal 326b to CDR1 218d connects to the output of Multiplexer Switch M1 220d.

Path P8 (Version 100o) input differential signals 300 connect to the input differential amplifier A3 200b. The output signal 302b from differential amplifier A3 200b is a differential signal. This output signal 302b from differential amplifier A3 200b connects to the input of Multiplexer Switch M2 210d and M3 202d.

A finite state machine (FSM) 232 connects to the input broadband amplifiers A0 230b, A1 222b. A2, 208b, and A3 200b (A0-A3) through connections 430, 422, 408, and 400 respectively. FSM 232 connects to the Multiplexer Switches M0 228d, M1 220k, M2 210d, and M3 202d (M0-M3) through connections 428, 420, 410, and 402 respectively. FSM 232 connects to CDR0 226d, CDR1 218d, CDR2 212d, and CDR3 204d (CDR0-CDR3) through connections 426, 418, 412, and 404, respectively. FSM 232 connects to the output broadband amplifiers Y0 224b, Y1 216b. Y2 214b, and Y3 206b (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48p illustrates version RXDp of the present disclosure. The input broadband differential amplifiers (A), multiplexer switches (M), clock and data recovery (CDR), and output differential amplifiers (Y) circuitries are interconnected with single-ended signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100p) input differential signals 318 connect to the input differential amplifier A1 222c. The output signals 322a and 344a from differential amplifier A1 222c are single-ended signals. The differential amplifier A1 222c has a fanout buffer where the output signals 322a and 334a are copies of the input differential signals 318. The output signal 322a from differential amplifier A1222c connects to the input of Multiplexer Switch M1 220a.

The output signal 344a from differential amplifier A1 222c connects to the input of Multiplexer Switch M0 228a.

Path 2 (Version 100p) output differential signals 308 connect to the output differential amplifier Y3 206a. The input signal 304a to differential amplifier Y3 206a is a single-ended signal. This input signal 304a connects to the output of CDR3 204a. The input signal 306a to CDR3 204a is a single-ended signal. This input signal 306a to CDR3 204a connects to the output of Multiplexer Switch M3 202a.

Path 3 (Version 100p) input differential signals 338 connect to the input differential amplifier A0 230c. The output signals 336a and 346a from differential amplifier A0 230c are single-ended signals. The differential amplifier A0 230c has a fanout buffer where the output signals 336a and 346a are copies of the input differential signals 338. The output signal 336a from differential amplifier A0 230c connects to the input of Multiplexer Switch M0 228a. The output signal 346*a* from differential amplifier A0 230*c* connects to the input of Multiplexer Switch M1 220*a*.

Path 4 (Version 100*p*) output differential signals 320 connect to the output differential amplifier Y2 214*a*. The input signal 314*a* to differential amplifier Y2 214*a* is a single-ended signal. This input signal 314*a* connects to the output of CDR2 212*a*. The input signal 316*a* to CDR2 212*a* is a single-ended signal. This input signal 316*a* to CDR2 212*a* connects to the output of Multiplexer Switch M2 210*a*.

Path 5 (Version 100*p*) output differential signals 330 connect to the output differential amplifier Y0 224*a*. The input signal 332*a* to differential amplifier Y0 224*a* is a single-ended signal. This input signal 332*a* connects to the output of CDR0 226*a*. The input signal 334*a* to CDR0 226*a* is a single-ended signal. This input signal 334*a* to CDR0 226*a* connects to the output of Multiplexer Switch M0 228*a*.

Path 6 (Version 100*p*) input differential signals 328 connect to the input differential amplifier A2 208*c*. The output signals 312*a* and 342*a* from differential amplifier A2 208*c* are single-ended signals. The differential amplifier A2 208*c* has a fanout buffer where the output signals 312*a* and 342*a* are copies of the input differential signals 328. The output signal 312*a* from differential amplifier A2 208*c* connects to the input of Multiplexer Switch M2 210*a*.

The output signal 342*a* from differential amplifier A2 208*c* connects to the input of Multiplexer Switch M3 202*a*.

Path P7 (Version 100*p*) output differential signals 310 connect to the output differential amplifier Y1 216*a*. The input signal 324*a* to differential amplifier Y1 216*a* is a single-ended signal. This input signal 324*a* connects to the output of CDR1 218*a*. The input signal 326*a* to CDR1 218*a* is a single-ended signal. This input signal 326*a* to CDR1 218*a* connects to the output of Multiplexer Switch M1 220*a*.

Path 8 (Version 100*p*) input differential signals 300 connect to the input differential amplifier A3 200*c*. The output signals 302*a* and 340*a* from differential amplifier A3 202*c* are single-ended signals. The differential amplifier A3 200*c* has a fanout buffer where the output signals 302*a* and 340*a* are copies of the input differential signals 300. The output signal 302*a* from differential amplifier A3 200*c* connects to the input of Multiplexer Switch M3 202*a*.

The output signal 340*a* from differential amplifier A3 200*c* connects to the input of Multiplexer Switch M2210*a*.

A finite state machine (FSM) 232 connects to the input broadband amplifiers A0 230*c*, A1 222*c*, A2, 208*c*, and A3 200*c* (A0-A3) through connections 430, 422, 408, and 400 respectively. FSM 232 connects to the Multiplexer Switches M0 228*a*, M1 220*a*, M2 210*a*, and M3 202*a* (M0-M3) through connections 428, 420, 410, and 402 respectively. FSM 232 connects to CDR0 226*a*, CDR1 218*a*, CDR2 212*a*, and CDR3 204*a* (CDR0-CDR3) through connections 426, 418, 412, and 404, respectively. FSM 232 connects to the output broadband amplifiers Y0 224*a*, Y1 216*a*, Y2 214*a*, and Y3 206*a* (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48*q* illustrates version 100*q* of the present disclosure. The input broadband differential amplifiers (A), multiplexer switches (M), and clock and data recovery (CDR) are interconnected with single-ended signals. The output differential amplifiers (Y) are connected to the clock and data recovery (CDR) circuitries with differential signals.

Connection (CXN) 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100*q*) input differential signals 318 connect to the input differential amplifier A1 222*c*, The output signals 322*a* and 344*a* from differential amplifier A1 222*c* are single-ended signals. The differential amplifier A1 222*c* has a fanout buffer where the output signals 322*a* and 334*a* are copies of the input differential signals 318. The output signal 322*a* from differential amplifier A1 222*c* connects to the input of Multiplexer Switch M1 220*a*. The output signal 344*a* from differential amplifier A1 222*c* connects to the input of Multiplexer Switch M0 228*a*.

Path 2 (Version 100*q*) output differential signals 308 connect to the output differential amplifier Y3 206*b*. The input signal 304*b* to differential amplifier Y3 206*b* is a differential signal. This input signal 304*b* connects to the output of CDR3 204*b*. The input signal 306*a* to CDR3 204*b* is a single-ended signal. This input signal 306*a* to CDR3 204*b* connects to the output of Multiplexer Switch M3 202*a*.

Path 3 (Version 100*q*) input differential signals 338 connect to the input differential amplifier A0 230*c*. The output signals 336*a* and 346*a* from differential amplifier A0 230*c* are single-ended signals. The differential amplifier A0 230*c* has a fanout buffer where the output signals 336*a* and 346*a* are copies of the input differential signals 338. The output signal 336*a* from differential amplifier A0 230*c* connects to the input of Multiplexer Switch M0 228*a*. The output signal 346*a* from differential amplifier A0 230*c* connects to the input of Multiplexer Switch M1 220*a*.

Path 4 (Version 100*q*) output differential signals 320 connect to the output differential amplifier Y2 214*b*. The input signal 314*b* to differential amplifier Y2 214*b* is a differential signal. This input signal 314*b* connects to the output of CDR2 212*b*. The input signal 316*a* to CDR2 212*b* is a single-ended signal. This input signal 316*a* to CDR2 212*b* connects to the output of Multiplexer Switch M2 210*a*.

Path 5 (Version 100*q*) output differential signals 330 connect to the output differential amplifier Y0 224*b*. The input signal 332*b* to differential amplifier Y0 224*b* is a differential signal. This input signal 332*b* connects to the output of CDR0 226*b*. The input signal 334*a* to CDR0 226*b* is a single-ended signal. This input signal 334*a* to CDR0 226*b* connects to the output of Multiplexer Switch M0 228*a*.

Path 6 (Version 100*q*) input differential signals 328 connect to the input differential amplifier A2 208*c*. The output signals 312*a* and 342*a* from differential amplifier A2 208*c* are single-ended signals. The differential amplifier A2 208*c* has a fanout buffer where the output signals 312*a* and 342*a* are copies of the input differential signals 328. The output signal 312*a* from differential amplifier A2 208*c* connects to the input of Multiplexer Switch M2 210*a*. The output signal 342*a* from differential amplifier A2 208*c* connects to the input of Multiplexer Switch M3 202*a*.

Path P7 (Version 100*q*) output differential signals 310 connect to the output differential amplifier Y1 216*b*. The input signal 324*b* to differential amplifier Y1 216*b* is a differential signal. This input signal 324*b* connects to the output of CDR1 218*b*. The input signal 326*a* to CDR1 218*b* is a single-ended signal. This input signal 326*a* to CDR1 218*b* connects to the output of Multiplexer Switch M1 220*a*.

Path 8 (Version 100*q*) input differential signals 300 connect to the input differential amplifier A3 200*c*. The output signals 302*a* and 340*a* from differential amplifier A3 202*c* are single-ended signals. The differential amplifier A3 200c has a fanout buffer where the output signals 302a and 340a are copies of the input differential signals 300. The output signal 302a from differential amplifier A3 200c connects to the input of Multiplexer Switch M3 202a. The output signal 340a from differential amplifier A3 200c connects to the input of Multiplexer Switch M2 210a.

A finite state machine (FSM) 232 connects to the input broadband amplifiers A) 230c, A1 222c, A2, 208c, and A3 200c (A0-A3) through connections 430, 422, 408, and 400 respectively. FSM 232 connects to the Multiplexer Switches M0 228a, M1 220a, M2 210a, and M3 202a (M0-M3) through connections 428, 420, 410, and 402 respectively. FSM 232 connects to CDR0 226b, CDR1 218b, CDR2 212b, and CDR3 204b (CDR0-CDR3) through connections 426, 418, 412, and 404, respectively. FSM 232 connects to the output broadband amplifiers Y0 224b, Y1 216b, Y2 214b, and Y3 206b (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48r illustrates version 100r of the present disclosure. The input broadband differential amplifiers (A) are connected to the multiplexer switches (M) with single-ended signals. The multiplexer switches (M), clock and data recovery (CDR), and output differential amplifiers (Y) are interconnected with differential signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100r) input differential signals 318 connect to the input differential amplifier A1 222c. The output signals 322a and 344a from differential amplifier A1 222c are single-ended signals. The differential amplifier A1 222b has a fanout buffer where the output signals 322a and 334a are copies of the input differential signals 318. The output signal 322a from differential amplifier A1 222c connects to the input of Multiplexer Switch M1 220b. The output signal 344a from differential amplifier A1 222c connects to the input of Multiplexer Switch M0 228b.

Path 2 (Version 100r) output differential signals 308 connect to the output differential amplifier Y3 206b. The input signal 304b to differential amplifier Y3 206b is a differential signal. This input signal 304b connects to the output of CDR3 204d. The input signal 306b to CDR3 204d is a differential signal. This input signal 306b to CDR3 204d connects to the output of Multiplexer Switch M3 202b.

Path 3 (Version 100r) input differential signals 338 connect to the input differential amplifier A0 230c. The output signals 336a and 346a from differential amplifier A0 230c are single-ended signals. The differential amplifier A0 230c has a fanout buffer where the output signals 336a and 346a are copies of the input differential signals 338. The output signal 336a from differential amplifier A0 230c connects to the input of Multiplexer Switch M0 228b. The output signal 346a from differential amplifier A0 230c connects to the input of Multiplexer Switch M1 220b.

Path 4 (Version 100r) output differential signals 320 connect to the output differential amplifier Y2 214b. The input signal 314b to differential amplifier Y2 214b is a differential signal. This input signal 314b connects to the output of CDR2 212d. The input signal 316b to CDR2 212d is a differential signal. This input signal 316b to CDR2 212d connects to the output of Multiplexer Switch M2 210b.

Path 5 (Version 100r) output differential signals 330 connect to the output differential amplifier Y0 224b. The input signal 332b to differential amplifier Y0 224b is a differential signal. This input signal 332b connects to the output of CDR0 226d. The input signal 334b to CDR0 226d is a differential signal. This input signal 334b to CDR0 226d connects to the output of Multiplexer Switch M0 228b.

Path 6 (Version 100r) input differential signals 328 connect to the input differential amplifier A2 208c. The output signals 312a and 342a from differential amplifier A2 208c are single-ended signals. The differential amplifier A2 208c has a fanout buffer where the output signals 312a and 342a are copies of the input differential signals 328. The output signal 312a from differential amplifier A2 208c connects to the input of Multiplexer Switch M2 210b. The output signal 342a from differential amplifier A2 208c connects to the input of Multiplexer Switch M3 202b.

Path P7 (Version 100r) output differential signals 310 connect to the output differential amplifier Y1 216b. The input signal 324b to differential amplifier Y1 216b is a differential signal. This input signal 324b connects to the output of CDR1 218d. The input signal 326b to CDR 1 218d is a differential signal. This input signal 326b to CDR1 218d connects to the output of Multiplexer Switch M1 220b.

Path 8 (Version 100r) input differential signals 300 connect to the input differential amplifier A3 200c. The output signals 302a and 340a from differential amplifier A3 202c are single-ended signals. The differential amplifier A3 200c has a fanout buffer where the output signals 302a and 340a arc copies of the input differential signals 300. The output signal 302a from differential amplifier A3 200c connects to the input of Multiplexer Switch M3 202b. The output signal 340a from differential amplifier A3 200c connects to the input of Multiplexer Switch M2 210b.

A finite state machine (FSM) 232 connects to the input broadband amplifiers A0 230c, A1 222c, A2, 208c, and A3 200c (A0-A3) through connections 430, 422, 408, and 400 respectively. FSM 232 connects to the Multiplexer Switches M0 228b, M1 220b. M2 210b, and M3 202b (M0-M3) through connections 428, 420, 410, and 402 respectively. FSM 232 connects to CDR0 226d, CDR1 218d, CDR2 212d, and CDR3 204d (CDR0-CDR3) through connections 426, 418, 412, and 404, respectively. FSM 232 connects to the output broadband amplifiers Y0 224b, Y1 216b, Y2 214b, and Y3 206b (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48s illustrates version 100s of the present disclosure. The input broadband differential amplifiers (A) are connected to the multiplexer switches (M) with differential signals. The multiplexer switches (M), clock and data recovery (CDR), and output differential amplifiers (Y) circuitries are interconnected with single-ended signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330.

CXN 4 comprises a Path P8 representing an input differential signal 300 and a Path P7 representing an output differential signal 310.

Path 1 (Version 100s) input differential signals 318 connect to the input differential amplifier A1 222d. The output signals 322b and 344b from differential amplifier A1 222d are differential signals. The differential amplifier A1 222d has a fanout buffer where the output signals 322b and 334b are copies of the input differential signals 318. The output signal 322b from differential amplifier A1 222d connects to the input of Multiplexer Switch M1 220c. The output signal 344b from differential amplifier A1 222d connects to the input of Multiplexer Switch M0 228c.

Path 2 (Version 100s) output differential signals 308 connect to the output differential amplifier Y3 206a. The input signal 304a to differential amplifier Y3 206a is a single-ended signal. This input signal 304a connects to the output of CDR3 204a. The input signal 306a to CDR3 204a is a single-ended signal. This input signal 306a to CDR3 204a connects to the output of Multiplexer Switch M3 202c.

Path 3 (Version 100s) input differential signals 338 connect to the input differential amplifier A0 230d. The output signals 336b and 346b from differential amplifier A0 230d are differential signals. The differential amplifier A0 230d has a fanout buffer where the output signals 336b and 346b are copies of the input differential signals 338. The output signal 336b from differential amplifier A0 230d connects to the input of Multiplexer Switch M0 228c.

The output signal 346b from differential amplifier A0 230d connects to the input of Multiplexer Switch M1 220c.

Path 4 (Version 100s) output differential signals 320 connect to the output differential amplifier Y2 214a. The input signal 314a to differential amplifier Y2 214a is a single-ended signal. This input signal 314a connects to the output of CDR2 212a. The input signal 316a to CDR2 212a is a single-ended signal. This input signal 316a to CDR2 212a connects to the output of Multiplexer Switch M2 210c.

Path 5 (Version 100s) output differential signals 330 connect to the output differential amplifier Y0 224a. The input signal 332a to differential amplifier Y0 224a is a single-ended signal. This input signal 332a connects to the output of CDR0 226a. The input signal 334a to CDR0 226a is a single-ended signal. This input signal 334a to CDR0 226a connects to the output of Multiplexer Switch M0 22gc.

Path 6 (Version 100s) input differential signals 328 connect to the input differential amplifier A2 208d. The output signals 312b and 342b from differential amplifier A2 208d are differential signals. The differential amplifier A2 208d has a fanout buffer where the output signals 312b and 342b are copies of the input differential signals 328. The output signal 312b from differential amplifier A2 208d connects to the input of Multiplexer Switch M2 210c. The output signal 342b from differential amplifier A2 208d connects to the input of Multiplexer Switch M3 202c.

Path P7 (Version 100s) output differential signals 310 connect to the output differential amplifier Y1 216a. The input signal 324a to differential amplifier Y1 216a is a single-ended signal. This input signal 324a connects to the output of CDR1 218a. The input signal 326a to CDR1 218a is a single-ended signal. This input signal 326a to CDR1 218a connects to the output of Multiplexer Switch M1 220c.

Path 8 (Version 100s) input differential signals 300 connect to the input differential amplifier A3 200d. The output signals 302b and 340b from differential amplifier A3 202d are differential signals. The differential amplifier A3 200d has a fanout buffer where the output signals 302b and 340b are copies of the input differential signals 300. The output signal 302b from differential amplifier A3 200d connects to the input of Multiplexer Switch M3 202c.

The output signal 340b from differential amplifier A3 2004d connects to the input of Multiplexer Switch M3 210c.

A finite state machine (FSM) 232 connects to the input broadband amplifiers A0 230d, A1 222d, A2, 208d, and A3 200d (A0-A3) through connections 430, 422, 408, and 400 respectively. FSM 232 connects to the Multiplexer Switches M0 228c, M1 220c, M2 210c, and M3 202c (M0-M3) through connections 428, 420, 410, and 402 respectively. FSM 232 connects to CDR0 226a, CDR1 218a, CDR2 212a, and CDR3 204a (CDR0-CDR3) through connections 426, 418, 412, and 404, respectively. FSM 232 connects to the output broadband amplifiers Y0 224a, Y1 216a, Y2 214a, and Y3 206a (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48t illustrates version 100t of the present disclosure. The input broadband differential amplifiers (A) are connected to the multiplexer switches (M) with differential signals. The multiplexer switches (M) are connected to the clock and data recovery (CDR) circuitries with single-ended signals. The clock and data recovery (CDR) circuitries are connected to the output differential amplifiers (Y) with differential signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100t) input differential signals 318 connect to the input differential amplifier A1 222d. The output signals 322b and 344b from differential amplifier A1 222d are differential signals. The differential amplifier A1 222d has a fanout buffer where the output signals 322b and 334b are copies of the input differential signals 318. The output signal 322b from differential amplifier A1 222d connects to the input of Multiplexer Switch M1 220c. The output signal 344b from differential amplifier A1 222d connects to the input of Multiplexer Switch M0 228c.

Path 2 (Version 100t) output differential signals 308 connect to the output differential amplifier Y3 206b. The input signal 304b to differential amplifier Y3 206b is a differential signal. This input signal 304b connects to the output of CDR3 204b. The input signal 306a to CDR3 204b is a single-ended signal. This input signal 306a to CDR3 204b connects to the output of Multiplexer Switch M3 202c.

Path 3 (Version 100t) input differential signals 338 connect to the input differential amplifier A0 230d. The output signals 336b and 346b from differential amplifier A0 230d are differential signals. The differential amplifier A0 230d has a fanout buffer where the output signals 336b and 346b are copies of the input differential signals 338. The output signal 336b from differential amplifier A0 230d connects to the input of Multiplexer Switch M0 228c. The output signal 346b from differential amplifier A0 230d connects to the input of Multiplexer Switch M1 220c.

Path 4 (Version 100t) output differential signals 320 connect to the output differential amplifier Y2 214b. The input signal 314b to differential amplifier Y2 214b is a differential signal. This input signal 314b connects to the output of CDR2 212*b*. The input signal 316*a* to CDR2 212*b* is a single-ended signal. This input signal 316*a* to CDR2 212*b* connects to the output of Multiplexer Switch M2 210*c*.

Path 5 (Version 100M) output differential signals 330 connect to the output differential amplifier Y0 224*b*. The input signal 332*b* to differential amplifier Y0 224*b* is a differential signal. This input signal 332*b* connects to the output of CDR0 226*b*. The input signal 334*a* to CDR0 226*b* is a single-ended signal. This input signal 334*a* to CDR0 226*b* connects to the output of Multiplexer Switch M0 228*c*.

Path 6 (Version 100*t*) input differential signals 328 connect to the input differential amplifier A2 208*d*. The output signals 312*b* and 342*b* from differential amplifier A2 208*d* are differential signals. The differential amplifier A2 208*d* has a fanout buffer where the output signals 312*b* and 342*b* are copies of the input differential signals 328. The output signal 312*b* from differential amplifier A2 208*d* connects to the input of Multiplexer Switch M2 210*c*. The output signal 342*b* from differential amplifier A2 208*d* connects to the input of Multiplexer Switch M3 202*c*.

Path P7 (Version 100*t*) output differential signals 310 connect to the output differential amplifier Y1216*b*. The input signal 324*b* to differential amplifier Y1 216*b* is a differential signal. This input signal 324*b* connects to the output of CDR1 218*b*. The input signal 326*a* to CDR1 218*b* is a single-ended signal. This input signal 326*a* to CDR1 218*b* connects to the output of Multiplexer Switch M1 220*c*.

Path 8 (Version 100*t*) input differential signals 300 connect to the input differential amplifier A3 200*d*. The output signals 302*b* and 340*b* from differential amplifier A3 202*d* are differential signals. The differential amplifier A3 200*d* has a fanout buffer where the output signals 302*b* and 340*b* am copies of the input differential signals 300. The output signal 302*b* from differential amplifier A3 200*d* connects to the input of Multiplexer Switch M3 202*c*. The output signal 340*b* from differential amplifier A3 200d connects to the input of Multiplexer Switch M3 210*c*.

A finite state machine (FSM) 232 connects to the input broadband amplifiers A0 230*d*, A1 222*d*, A2, 208*d*, and A3 200*d* (A0-A3) through connections 430, 422, 408, and 400 respectively. FSM 232 connects to the Multiplexer Switches M0 228*c*, M1 220*c*, M2 210*c*, and M3 202*c* (M0-M3) through connections 428, 420, 410, and 402 respectively. FSM 232 connects to CDR0 226*b*, CDR1 218*b*, CDR2 212*b*, and CDR3 204*b* (CDR0-CDR3) through connections 426, 418, 412, and 404, respectively. FSM 232 connects to the output broadband amplifiers Y0 224*b*, Y1 216*b*, Y2 214*b*, and Y3 206*b* (Y0-Y3), through connections 424, 416, 414, and 406. FSM 232 connects to Connection CXN 1 234. CXN 2 238, CXN 3 240, and CXN 4 236 (CXN 1-4) through connections 432, 436, 438, and 434.

FIG. 48*u* illustrates version 100*u* of the present disclosure. The input broadband differential amplifiers (A), multiplexer switches (M), and clock and data recovery (CDR) circuitries are interconnected with differential signals. The clock and data recover (CDR) is connected to the output amplifiers (Y) with single-end signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100*u*) input differential signals 318 connect to the input differential amplifier A1 222*d*. The output signals 322*b* and 344*b* from differential amplifier A1 222*d* are differential signals. The differential amplifier A1 222*d* has a fanout buffer where the output signals 322*b* and 334*b* are copies of the input differential signals 318. The output signal 322*b* from differential amplifier A1 222*d* connects to the input of Multiplexer Switch M1 220*d*. The output signal 344*b* from differential amplifier A1 222*d* connects to the input of Multiplexer Switch M0 228*d*.

Path 2 (Version 100*u*) output differential signals 308 connect to the output differential amplifier Y3 206*a*. The input signal 304*a* to differential amplifier Y3 206*a* is a single-ended signal. This input signal 304*a* connects to the output of CDR3 204*c*. The input signal 306*b* to CDR3 204*c* is a differential signal. This input signal 306*b* to CDR3 204*c* connects to the output of Multiplexer Switch M3 202*d*.

Path 3 (Version 100*i*) input differential signals 338 connect to the input differential amplifier A0 230*d*. The output signals 336*b* and 346*b* from differential amplifier A0 230*d* are differential signals. The differential amplifier A0 230*d* has a fanout buffer where the output signals 336*b* and 346*b* are copies of the input differential signals 338. The output signal 336*b* from differential amplifier A0 230*d* connects to the input of Multiplexer Switch M0 228*d*. The output signal 346*b* from differential amplifier A0 230*d* connects to the input of Multiplexer Switch M1220*d*.

Path 4 (Version 100*u*) output differential signals 320 connect to the output differential amplifier Y2 214*a*. The input signal 314*a* to differential amplifier Y2 214*a* is a single-ended signal. This input signal 314*a* connects to the output of CDR2 212*c*. The input signal 316*b* to CDR2 212*c* is a differential signal. This input signal 316*b* to CDR2 212*c* connects to the output of Multiplexer Switch M2 210*d*.

Path 5 (Version 100*u*) output differential signals 330 connect to the output differential amplifier Y0 224*a*. The input signal 332*a* to differential amplifier Y0 224*a* is a single-ended signal. This input signal 332*a* connects to the output of CDR0 226*c*. The input signal 334*b* to CDR0 226*c* is a differential signal. This input signal 334*b* to CDR0 226*c* connects to the output of Multiplexer Switch M0 228*d*.

Path 6 (Version 100*u*) input differential signals 328 connect to the input differential amplifier A2 208*d*. The output signals 312*b* and 342*b* from differential amplifier A2 208*d* are differential signals. The differential amplifier A2 208*d* has a fanout buffer where the output signals 312*b* and 342*b* are copies of the input differential signals 328. The output signal 312*b* from differential amplifier A2 208*d* connects to the input of Multiplexer Switch M2 210*d*. The output signal 342*b* from differential amplifier A2 208*d* connects to the input of Multiplexer Switch M3 202*d*.

Path P7 (Version 100*u*) output differential signals 310 connect to the output differential amplifier Y1 216*a*. The input signal 324*a* to differential amplifier Y1 216*a* is a single-ended signal. This input signal 324*a* connects to the output of CDR1 218*c*. The input signal 326*b* to CDR1 218*c* is a differential signal. This input signal 326*b* to CDR1 218*c* connects to the output of Multiplexer Switch M1 220*d*.

Path 8 (Version 100*u*) input differential signals 300 connect to the input differential amplifier A3 200*d*. The output signals 302*b* and 340*b* from differential amplifier A3 202*d* are differential signals. The differential amplifier A3 200*d* has a fanout buffer where the output signals 302*b* and 340*b* are copies of the input differential signals 300. The output signal 302*b* from differential amplifier A3 200*d* connects to the input of Multiplexer Switch M3 202*d*. The output signal 340*b* from differential amplifier A3 200*d* connects to the input of Multiplexer Switch M3 210*d*.

A finite state machine (FSM) 232 connects to the input broadband amplifiers A0 230*d*, A1 222*d*, A2, 208*d*, and A3 200*d* (A0-A3) through connections 430, 422, 408, and 400 respectively. FSM 232 connects to the Multiplexer Switches M0 228*d*, M1 220*d*, M2 210*d*, and M3 202*d* (M0-M3) through connections 428, 420, 410, and 402 respectively. FSM 232 connects to CDR0 226*c*, CDR1 218*c*, CDR2 212*c*, and CDR3 204*c* (CDR0-CDR3) through connections 426, 418, 412, and 404, respectively. FSM 232 connects to the output broadband amplifiers Y0 224*a*, Y1 216*a*, Y2 214*a*, and Y3 206*a* (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48*v* illustrates version 100*v* of the present disclosure. The input broadband differential amplifiers (A), multiplexer switches (M), clock and data recovery (CDR), and output amplifiers (Y) circuitries are interconnected with differential signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330, CXN 4 comprises a Path P8 representing an input differential signal 300 and a Path P7 representing an output differential signal 310.

Path 1 (Version 100*v*) input differential signals 318 connect to the input differential amplifier A1 222*d*. The output signals 322*b* and 344*b* from differential amplifier A1 222*d* are differential signals. The differential amplifier A1 222*d* has a fanout buffer where the output signals 322*b* and 334*b* are copies of the input differential signals 318. This output signal 322*b* from differential amplifier A1 222*d* connects to the input of Multiplexer Switch M1 220*d*. The output signal 344*b* from differential amplifier A1 222*d* connects to the input of Multiplexer Switch M0 228*d*.

Path 2 (Version 100*v*) output differential signals 308 connect to the output differential amplifier Y3 206*b*. The input signal 304*b* to differential amplifier Y3 206*b* is a differential signal. This input signal 304*b* connects to the output of CDR3 204*d*. The input signal 306*b* to CDR3 204*d* is a differential signal. This input signal 306*b* to CDR3 204*d* connects to the output of Multiplexer Switch M3 202*d*.

Path 3 (Version 100*v*) input differential signals 338 connect to the input differential amplifier A0 230*d*. The output signals 336*b* and 346*b* from differential amplifier A0 230*d* are differential signals. The differential amplifier A0 230*d* has a fanout buffer where the output signals 336*b* and 346*b* are copies of the input differential signals 338. This output signal 336*b* from differential amplifier A0 230*d* connects to the input of Multiplexer Switch M0 228*d*. The output signal 346*b* from differential amplifier A0 230*d* connects to the input of Multiplexer Switch M1 220*d*.

Path 4 (Version 100*v*) output differential signals 320 connect to the output differential amplifier Y2 214*b*. The input signal 314*b* to differential amplifier Y2 214*b* is a differential signal. This input signal 314*b* connects to the output of CDR2 212*d*. The input signal 316*b* to CDR2 212*d* is a differential signal. This input signal 316*b* to CDR2 212*d* connects to the output of Multiplexer Switch M2 210*d*.

Path 5 (Version 100*v*) output differential signals 330 connect to the output differential amplifier Y0 224*b*. The input signal 332*b* to differential amplifier Y0 224*b* is a differential signal. This input signal 332*b* connects to the output of CDR0 226*d*. The input signal 334*b* to CDR0 226*d* is a differential signal. This input signal 334*b* to CDR0 226*d* connects to the output of Multiplexer Switch M0 228*d*.

Path 6 (Version 100*v*) input differential signals 328 connect to the input differential amplifier A2 208*d*. The output signals 312*b* and 342*b* from differential amplifier A2 208*d* are differential signals. The differential amplifier A2 208*d* has a fanout buffer where the output signals 312*b* and 342*b* are copies of the input differential signals 328. This output signal 312*b* from differential amplifier A2 208*d* connects to the input of Multiplexer Switch M2 210*d*. The output signal 342*b* from differential amplifier A2 208*d* connects to the input of Multiplexer Switch M3 202*d*.

Path P7 (Version 100*v*) output differential signals 310 connect to the output differential amplifier Y1 216*b*. The input signal 324*b* to differential amplifier Y1 216*b* is a differential signal. This input signal 324*b* connects to the output of CDR1 218*d*. The input signal 326*b* to CDR1 218*d* is a differential signal. This input signal 326*b* to CDR1 218*d* connects to the output of Multiplexer Switch M1 220*d*.

Path 8 (Version 100*v*) input differential signals 300 connect to the input differential amplifier A3 200*d*. The output signals 302*b* and 340*b* from differential amplifier A3 202*d* are differential signals. The differential amplifier A3 200*d* has a fanout buffer where the output signals 302*b* and 340*b* are copies of the input differential signals 300. This output signal 302*b* from differential amplifier A3 200*d* connects to the input of Multiplexer Switch M3 202*d*. The output signal 340*b* from differential amplifier A3 200*d* connects to the input of Multiplexer Switch M3 210*d*.

A finite state machine (FSM) 232 connects to the input broadband amplifiers A0 230*d*, A1 222*d*, A2, 208*d*, and A3 200*d* (A0-A3) through connections 430, 422, 408, and 400 respectively. FSM 232 connects to the Multiplexer Switches M0 228*d*. M1 220*d*, M2 210*d*, and M3 202*d* (M0-M3) through connections 428, 420, 410, and 402 respectively. FSM 232 connects to CDR0 226*d*, CDR1 218*d*, CDR2 212*d*, and CDR3 204*d* (CDR0-CDR3) through connections 426, 418, 412, and 404, respectively. FSM 232 connects to the output broadband amplifiers Y0 224*b*, Y1 216*b*, Y2 214*b*, and Y3 206*b* (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

Figure 48W:
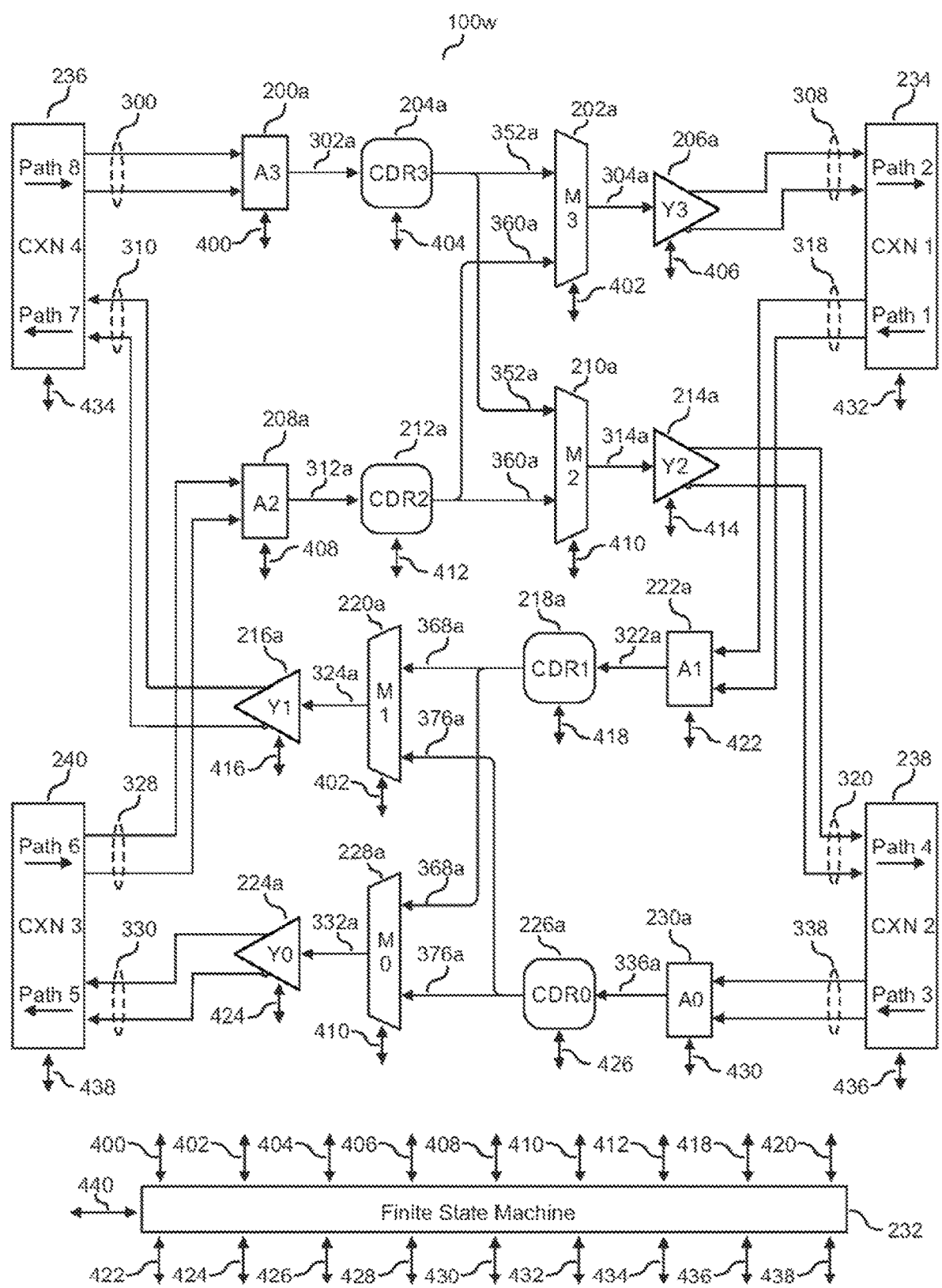
FIG. 48w is a block diagram illustrating a twenty third version 100w of the preferred embodiment of the present disclosure.

FIGS. 48*w*-48*ah* illustrates versions 100*w*-100*ah* of the present disclosure where the input differential signal interfaces the elements in this sequence or order, the broadband differential amplifier (A), clock data recovery circuitry (CDR), multiplexer switch (M), and the output differential amplifier (Y).

FIG. 48*w* illustrates version 100*w* of the present disclosure. The input broadband differential amplifiers (A), multiplexer switches (M), clock and data recovery (CDR), and output differential amplifiers (Y) circuitries are interconnected with single-ended signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100w) input differential signals 318 connect to the input differential amplifier A1 222a. The output signal 322a from differential amplifier A1 222a is a single-ended signal. This output signal 322a from differential amplifier A1 222a connects to the input of clock data recovery CDR1 218a. The output signal 368a from CDR1 218a is a single-ended signal. This output signal 368a from CDR1 218a connects to the input of Multiplexer Switch M1 220a and M0 228a.

Path 2 (Version 100w) output differential signals 308 connect to the output differential amplifier Y3 206a. The input signal 304a to differential amplifier Y3 206a is a single-ended signal. This input signal 304a connects to the output of Multiplexer Switch M3 202a.

Path 3 (Version 100w) input differential signals 338 connect to the input differential amplifier A0 230a. The output signal 336a from differential amplifier A0 230a is a single-ended signal. This output signal 336a from differential amplifier A0 230a connects to the input of clock data recovery CDR0 226a. The output signal 376a from CDR0 226a is a single-ended signal. This output signal 376a from CDR0 226a connects to the input of Multiplexer Switch M1 220a and M0 228a.

Path 4 (Version 100w) output differential signals 320 connect to the output differential amplifier Y2 214a. The input signal 314a to differential amplifier Y2 214a is a single-ended signal. This input signal 314a connects to the output of Multiplexer Switch M2 210a.

Path 5 (Version 100w) output differential signal 330 connect to the output differential amplifier Y0 224a. The input signal 332a to differential amplifier Y0 224a is a single-ended signal. This input signal 332a connects to the output of Multiplexer Switch M0 228a.

Path 6 (Version 100w) input differential signals 328 connect to the input differential amplifier A2 208a. The output signal 312a from differential amplifier A2 208a is a single-ended signal. This output signal 312a from differential amplifier A2 208a connects to the input of clock data recovery CDR2 212a. The output signal 360a from CDR2 212a is a single-ended signal. This output signal 360a from CDR2 212a connects to the input of Multiplexer Switch M3 202a and M2 210n.

Path 7 (Version 100w) output differential signals 310 connect to the output differential amplifier Y1 216a. The input signals 324a to differential amplifier Y1 216a is a single-ended signal. This input signal 324a connects to the output of Multiplexer Switch M1 220a.

Path 8 (Version 100w) input differential signals 300 connect to the input differential amplifier A3 200a. The output signals 302a from differential amplifier A3 200a is a single-ended signal. This output signal 302a from differential amplifier A3 200a connects to the input of clock data recovery CDR3 204a. The output signals 352a from CDR3 204a is a single-ended signal. This output signal 352a from CDR3 204a connects to the input of Multiplexer Switch M3 202a and M2 210a.

A finite state machine (FSM) 232 connects to the input broadband amplifiers A0 230a, A1 222a, A2, 208a, and A3 200a (A0-A3) through connections 430, 422, 408, and 400 respectively. FSM 232 connects to the Multiplexer Switches M0 228a, M1 220a, M2 210a, and M3 202a (M0-M3) through connections 428, 420, 410, and 402 respectively. FSM 232 connects to CDR0 226a, CDR1 218a, CDR2 212a, and CDR3 204a (CDR0-CDR3) through connections 426, 418, 412, and 404, respectively. FSM 232 connects to the output broadband amplifiers Y0 224a, Y1 216a, Y2 214a, and Y3 206a (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

Figure 48X:
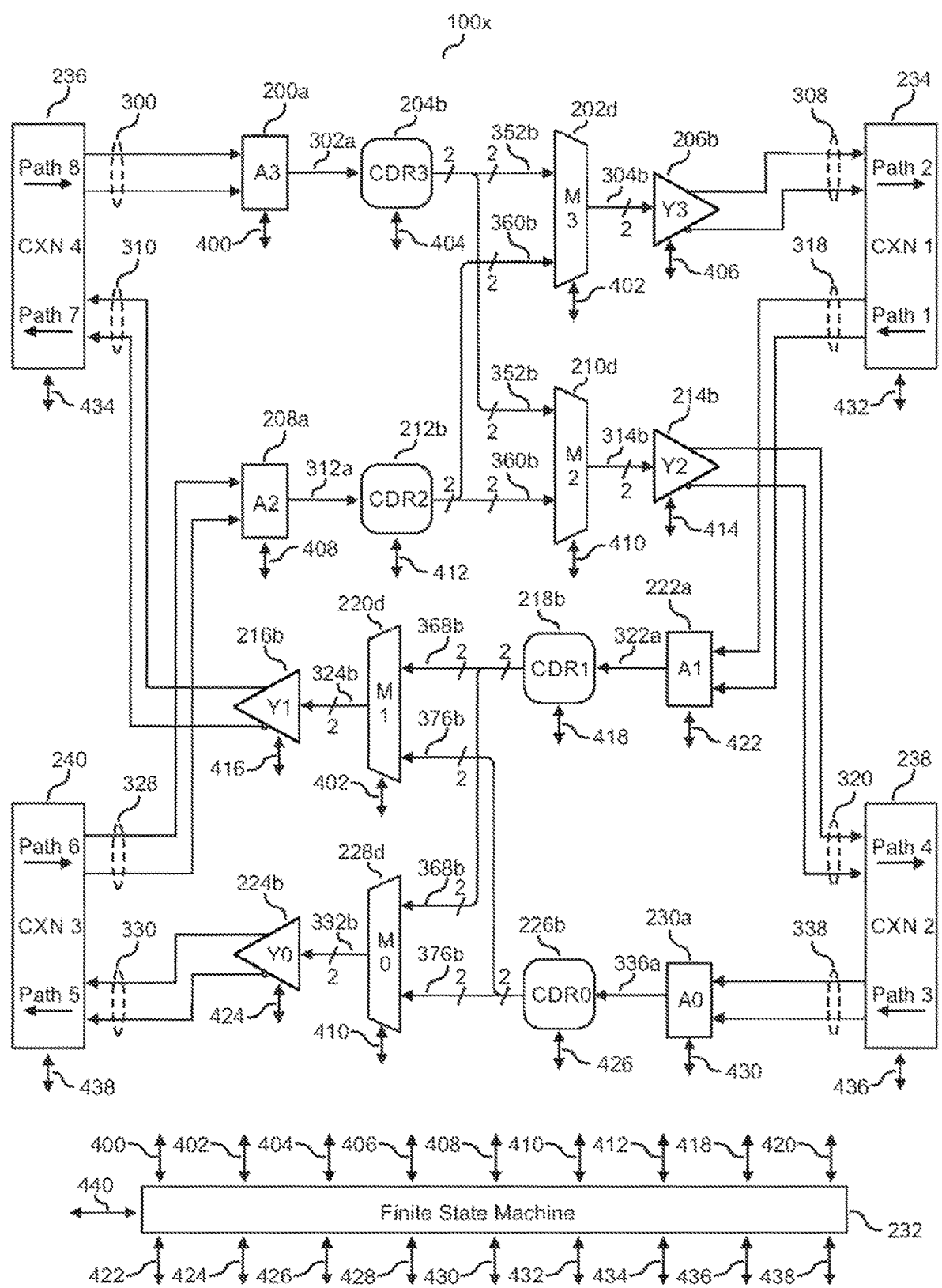
FIG. 48x is a block diagram illustrating a twenty fourth version 100x of the preferred embodiment of the present disclosure.

FIG. 48x illustrates version 100x of the present disclosure. The input broadband differential amplifiers (A) and the clock and data recovery (CDR) circuitries are connected with single-end signals, the multiplexer switches (M) and the output differential amplifiers (Y) are interconnected with differential signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100x) input differential signals 318 connect to the input differential amplifier A1 222a. The output signals 322a from differential amplifier A1 222b is a single-ended signal. This output signals 322a from differential amplifier A1 222a connects to the input of clock data recovery CDR1 218b. The output signal 368b from CDR1 218b is a differential signal. This output signal 368b from CDR1 218b connects to the input of Multiplexer Switch M1 220d and M0 228d.

Path 2 (Version 100x) output differential signals 308 connect to the output differential amplifier Y3 206b. The input signals 304b to differential amplifier Y3 206d is a differential signal. This input signal 304b connects to the output of Multiplexer Switch M3 202d.

Path 3 (Version 100x) input differential signals 338 connect to the input differential amplifier A0 230a. The output signals 336a from differential amplifier A0 230a is a single-ended signal. This output signals 336a from differential amplifier A0 230a connects to the input of clock data recovery CDR0 226b. The output signal 376b from CDR0 226b is a differential signal. This output signal 376b from CDR0 226b connects to the input of Multiplexer Switch M1 220d and M0 228d.

Path 4 (Version 100x) output differential signals 320 connect to the output differential amplifier Y2 214b. The input signals 314b to differential amplifier Y2 214b is a differential signal. This input signal 314b connects to the output of Multiplexer Switch M2 210d.

Path 5 (Version 100x) output differential signals 330 connect to the output differential amplifier Y0 224b. The input signals 332b to differential amplifier Y0 224b is a differential signal. This input signal 332b connects to the output of Multiplexer Switch M0 228d.

Path 6 (Version 100x) input differential signals 328 connect to the input differential amplifier A2 208a. The output signals 312a from differential amplifier A2 208a is a single-ended signal. This output signals 312a from differential amplifier A2 208a connects to the input of clock data recovery CDR2 212b. The output signals 360b from CDR2 212b is a differential signal. This output signal 360b from CDR2 212d connects to the input of Multiplexer Switch M3 202d and M2 210d.

Path 7 (Version 100x) output differential signals 310 connect to the output differential amplifier Y1 216b. The input signals 324b to differential amplifier Y1 216b is a differential signal. This input signal 324b connects to the output of Multiplexer Switch M1 220d.

Path 8 (Version 100x) input differential signals 300 connect to the input differential amplifier A3 200a. The output signals 302a from differential amplifier A3 200a is a single-ended signal. This output signals 302a from differential amplifier A3 200a connects to the input of clock data recovery CDR3 204b. The output signals 352b from CDR3 204b is a differential signal. This output signal 352b from CDR3 204b connects to the input of Multiplexer Switch M3 202d and M2 210d.

A finite state machine (FSM) 232 connects to the input broadband amplifiers A0 230a, A1 222a, A2, 208a, and A3 200a (A0-A3) through connections 430, 422, 408, and 400 respectively. FSM 232 connects to the Multiplexer Switches M0 228d, M1 22k, M2 210d, and M3 202d (M0-M3) through connections 428, 420, 410, and 402 respectively. FSM 232 connects to CDR0 226b, CDR1 218b, CDR2 212b, and CDR3 204b (CDR0-CDR3) through connections 426, 418, 412, and 404, respectively. FSM 232 connects to the output broadband amplifiers Yt) 224b, Y1 216b, Y2 214b, and Y3 206b (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

Figure 48Y:
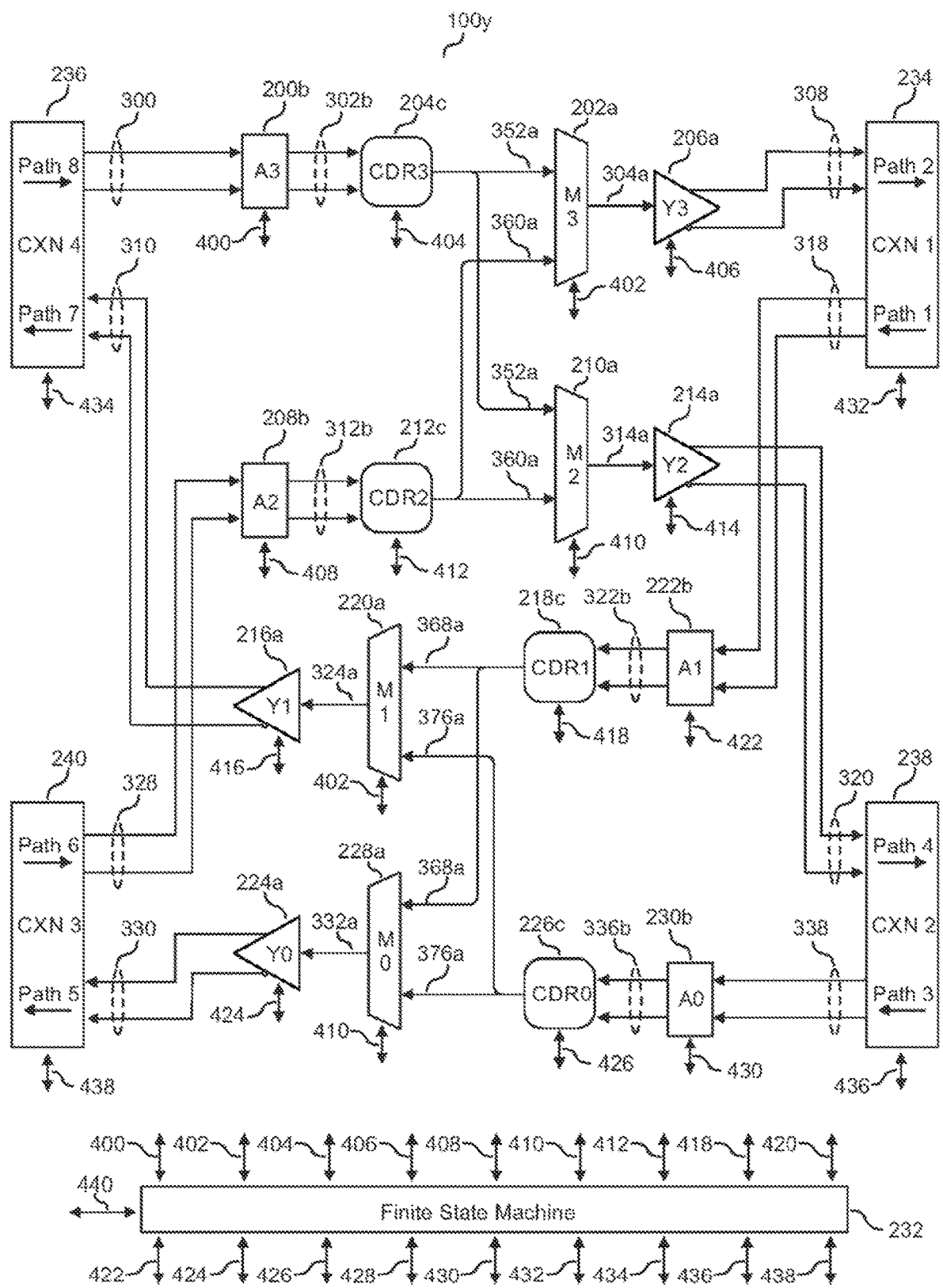
FIG. 48y is a block diagram illustrating a twenty fifth version 100y of the preferred embodiment of the present disclosure.

FIG. 48y illustrates version 100y of the present disclosure. The input broadband differential amplifiers (A) connects to the clock and data recovery (CDR) circuitries with differential signals, the multiplexer switches (M) connects to the clock and data recovery (CDR) circuitries and output differential amplifiers (Y) with single-ended signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100y) input differential signals 318 connect to the input differential amplifier A1 222b. The output signals 322b from differential amplifier A1 222a is a differential signal. This output signals 322b from differential amplifier A t 222b connects to the input of clock data recovery CDR1 218c. The output signal 368a from CDR1 218c is a single-ended signal. This output signal 368a from CDR1 218c connects to the input of Multiplexer Switch M1 220a and M0 228a.

Path 2 (Version 100y) output differential signals 308 connect to the output differential amplifier Y3 206a. The input signals 304a to differential amplifier Y3 206a is a single-ended signal. This input signal 304a connects to the output of Multiplexer Switch M3 202a.

Path 3 (Version 100y) input differential signals 338 connect to the input differential amplifier A0 230b. The output signals 336b from differential amplifier A) 230b is a differential signal. This output signals 336b from differential amplifier A0 230b connects to the input of clock data recovery CDR0 226c. The output signal 376a from CDR0 226c is a single-ended signal. This output signal 376a from CDR0 226c connects to the input of Multiplexer Switch M1220a and M0 228a.

Path 4 (Version 100y) output differential signals 320 connect to the output differential amplifier Y2 214a. The input signals 314a to differential amplifier Y2 214a is a single-ended signal. This input signal 314a connects to the output of Multiplexer Switch M2 210a.

Path 5 (Version 100y) output differential signals 330 connect to the output differential amplifier Y0 224a. The input signals 332a to differential amplifier Y0 224a is a single-ended signal. This input signal 332a connects to the output of Multiplexer Switch M0 228a.

Path 6 (Version 100y) input differential signals 328 connect to the input differential amplifier A2 208b. The output signals 312b from differential amplifier A2 208b is a differential signal. This output signals 312b from differential amplifier A2 208b connects to the input of clock data recovery CDR2 212c. The output signals 360a from CDR2 212c is a single-ended signal. This output signal 360a from CDR2 212c connects to the input of Multiplexer Switch M3 202a and M2 210a.

Path 7 (Version 100y) output differential signals 310 connect to the output differential amplifier Y1 216a. The input signals 324a to differential amplifier Y1 216a is a single-ended signal. This input signal 324a connects to the output of Multiplexer Switch M1 220a.

Path 8 (Version 100y) input differential signals 300 connect to the input differential amplifier A3 200b. The output signals 302b from differential amplifier A3 200b is a differential signal. This output signals 302b from differential amplifier A3 200b connects to the input of clock data recovery CDR3 204c, The output signals 352a from CDR3 204c is a single-ended signal. This output signal 352a from CDR3 204c connects to the input of Multiplexer Switch M3 202a and M2 210a.

A finite state machine (FSM) 232 connects to the input broadband amplifiers A0 230b, A1 222b, A2, 208b, and A3 200b (A0-A3) through connections 430, 422, 408, and 400 respectively. FSM 232 connects to the Multiplexer Switches M0 228a, M1 220a, M2 210a, and M3 202a (M0-M3) through connections 428, 420, 410, and 402 respectively. FSM 232 connects to CDR0 226c, CDR1 218c, CDR2 212c, and CDR3 204c (CDR0-CDR3) through connections 426, 418, 412, and 404, respectively. FSM 232 connects to the output broadband amplifiers Y0 224a, Y1 216a, Y2 214a, and Y3 206a (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

Figure 48Z:
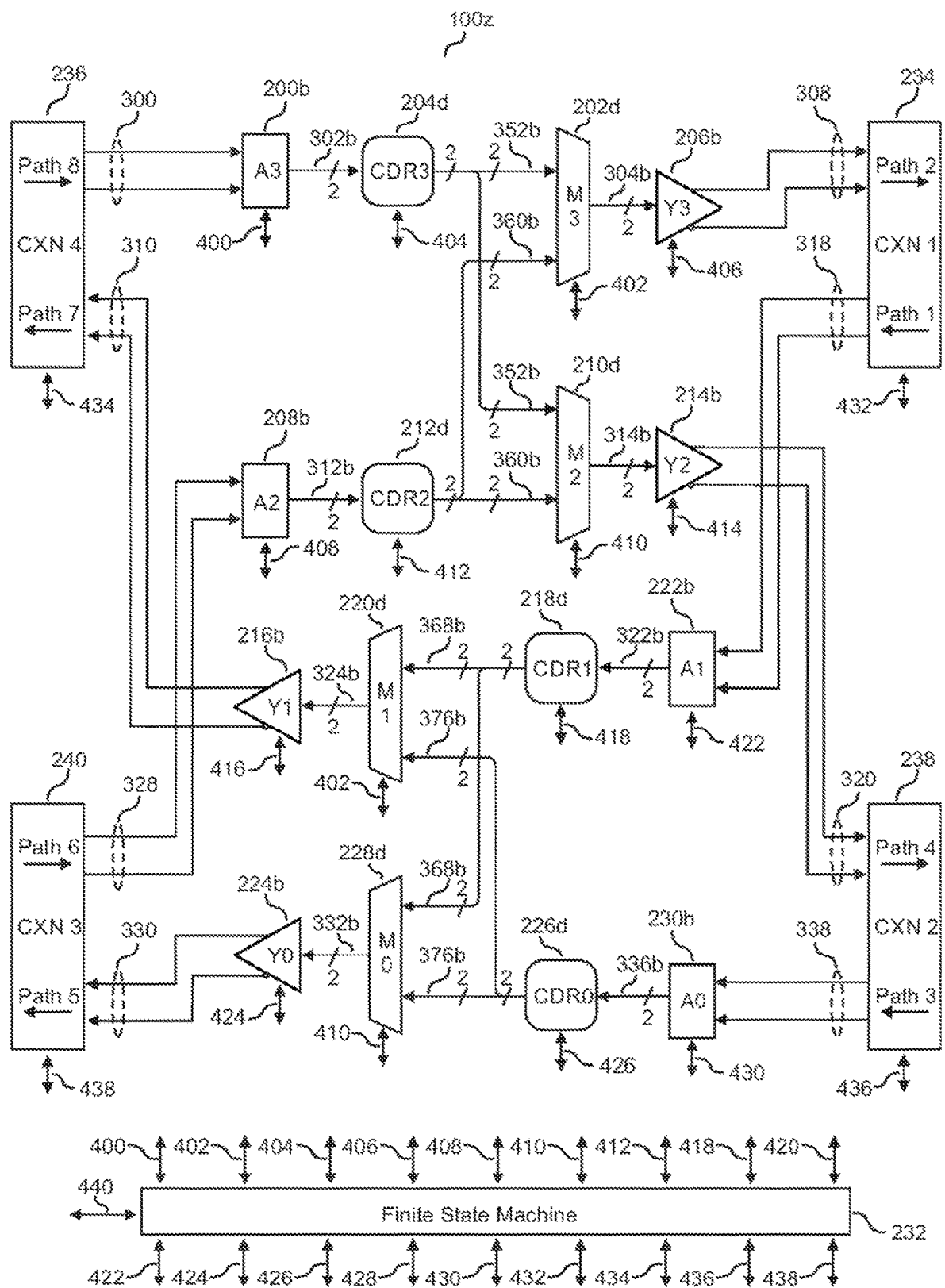
FIG. 48z is a block diagram illustrating a twenty sixth version 100z of the preferred embodiment of the present disclosure.
Figure 48A:
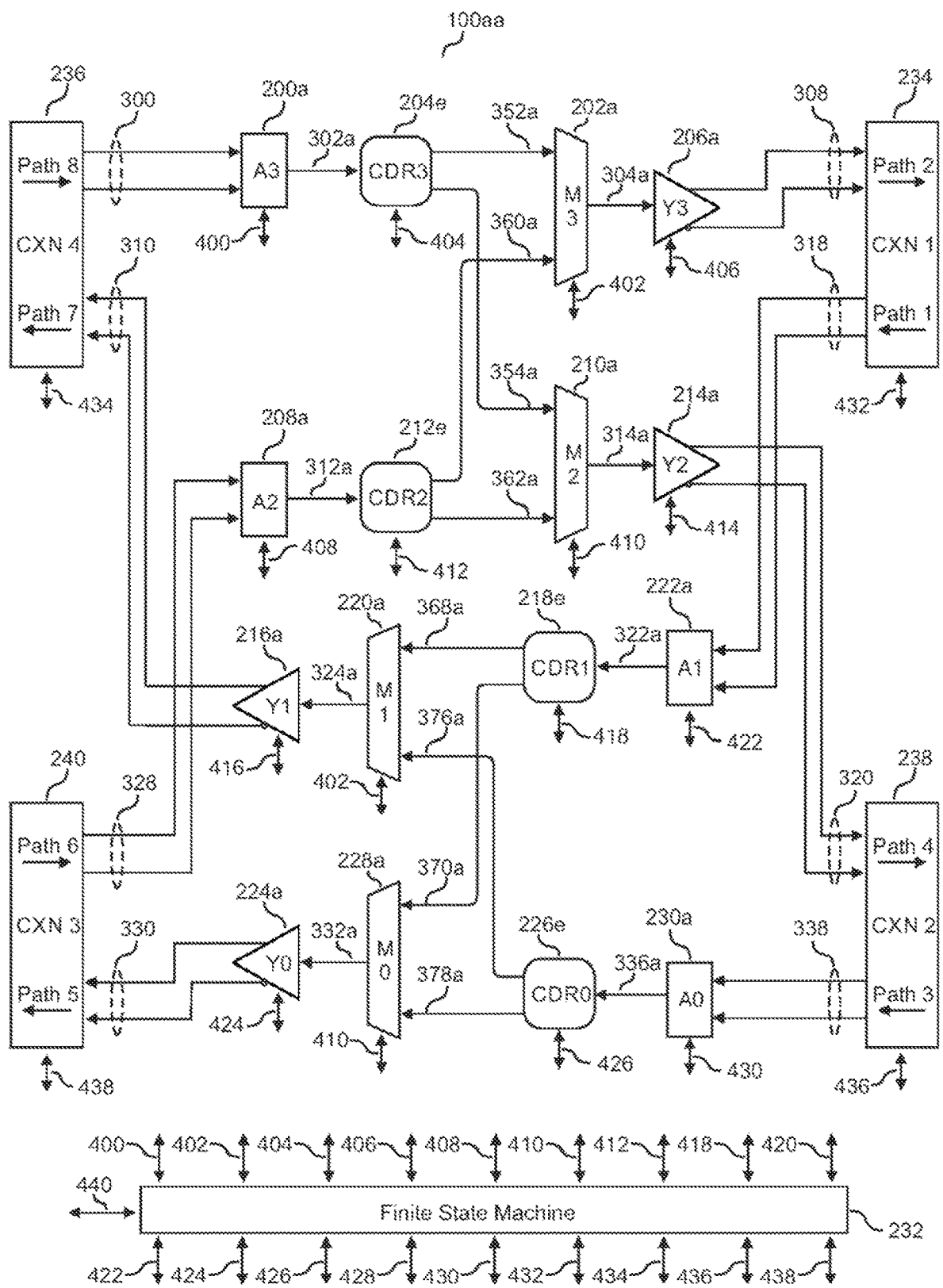
Figure 48A:
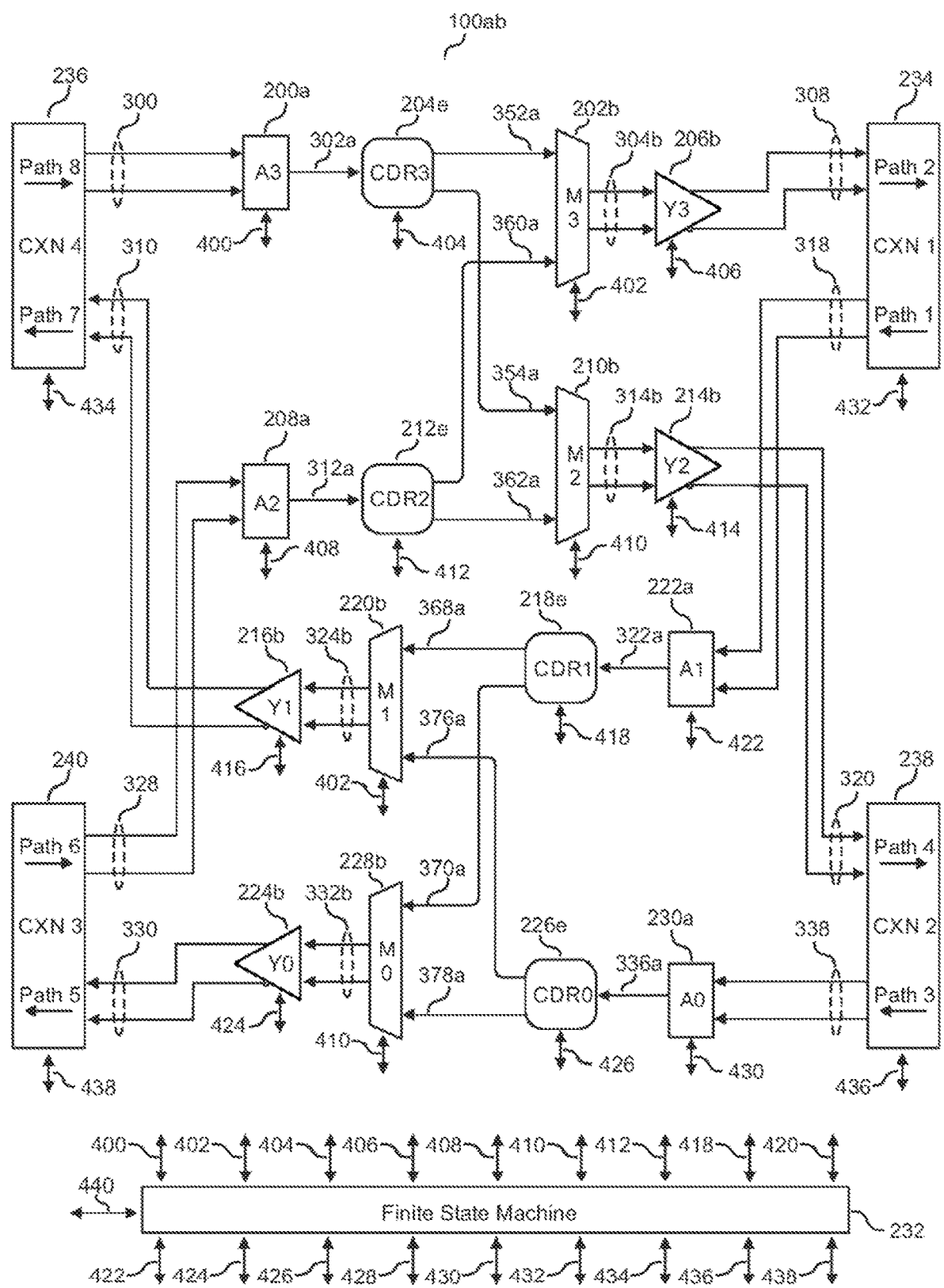
Figure 48A:
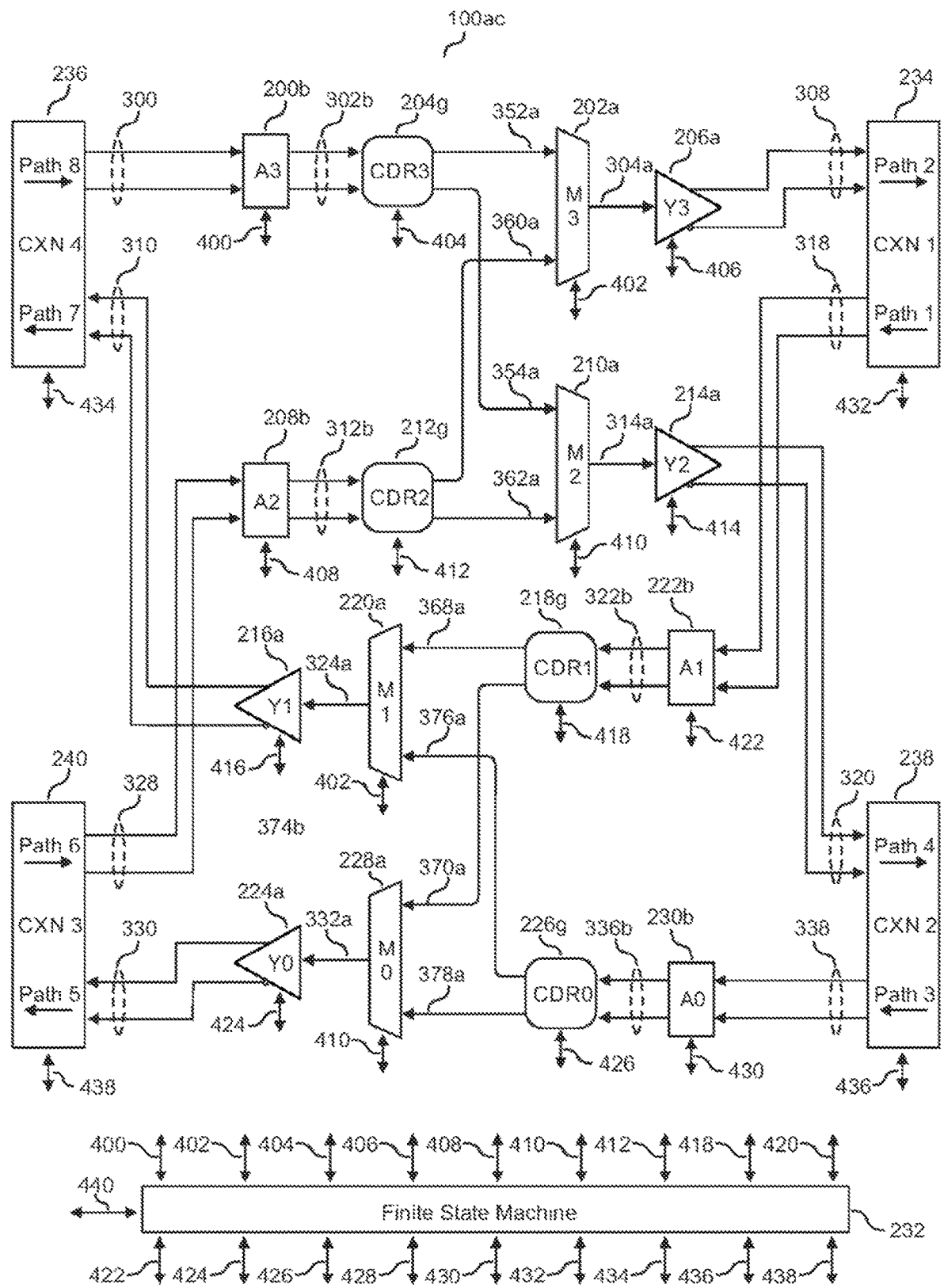
Figure 48A:
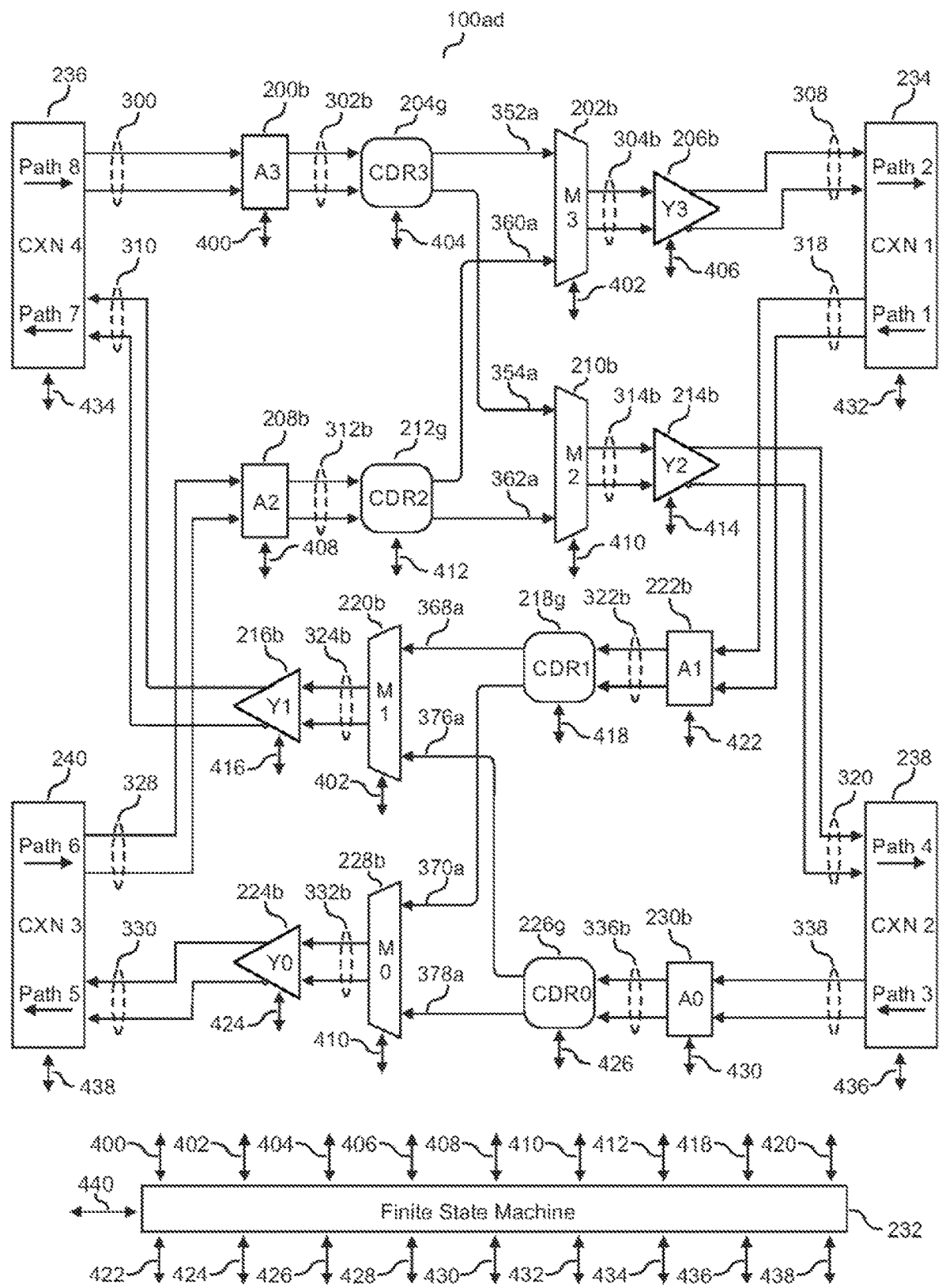
Figure 48A:
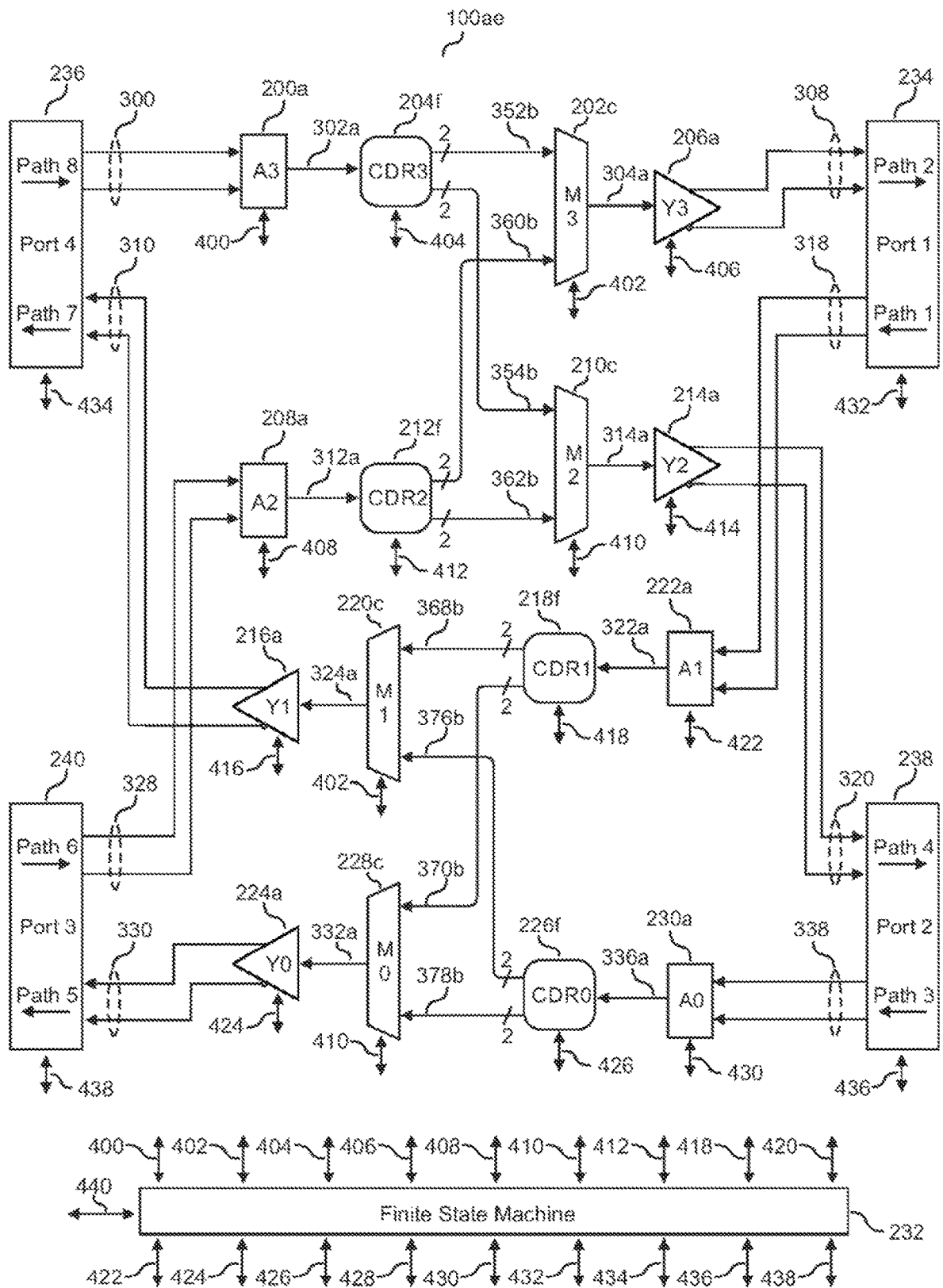
Figure 48A:
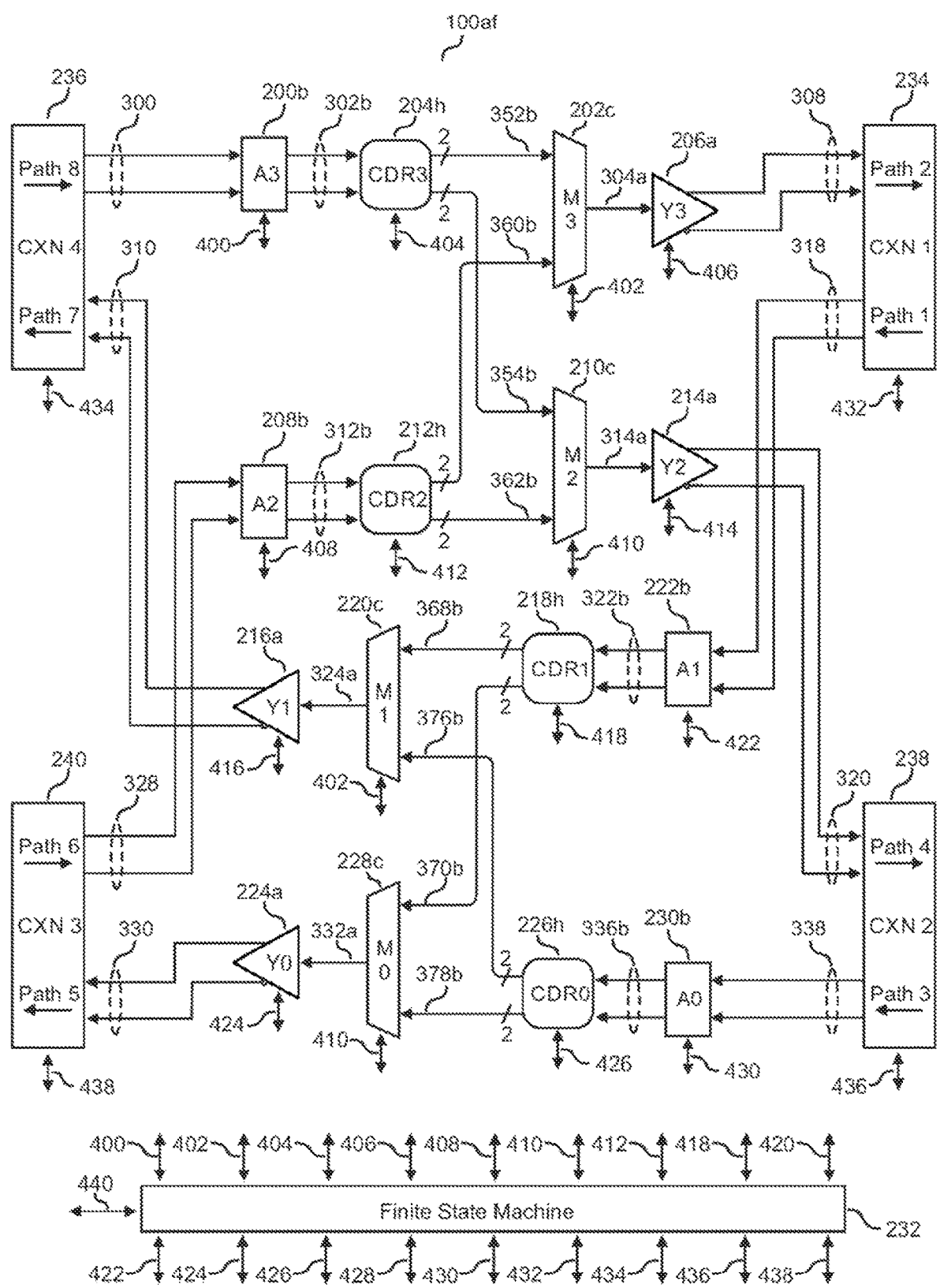
Figure 48A:
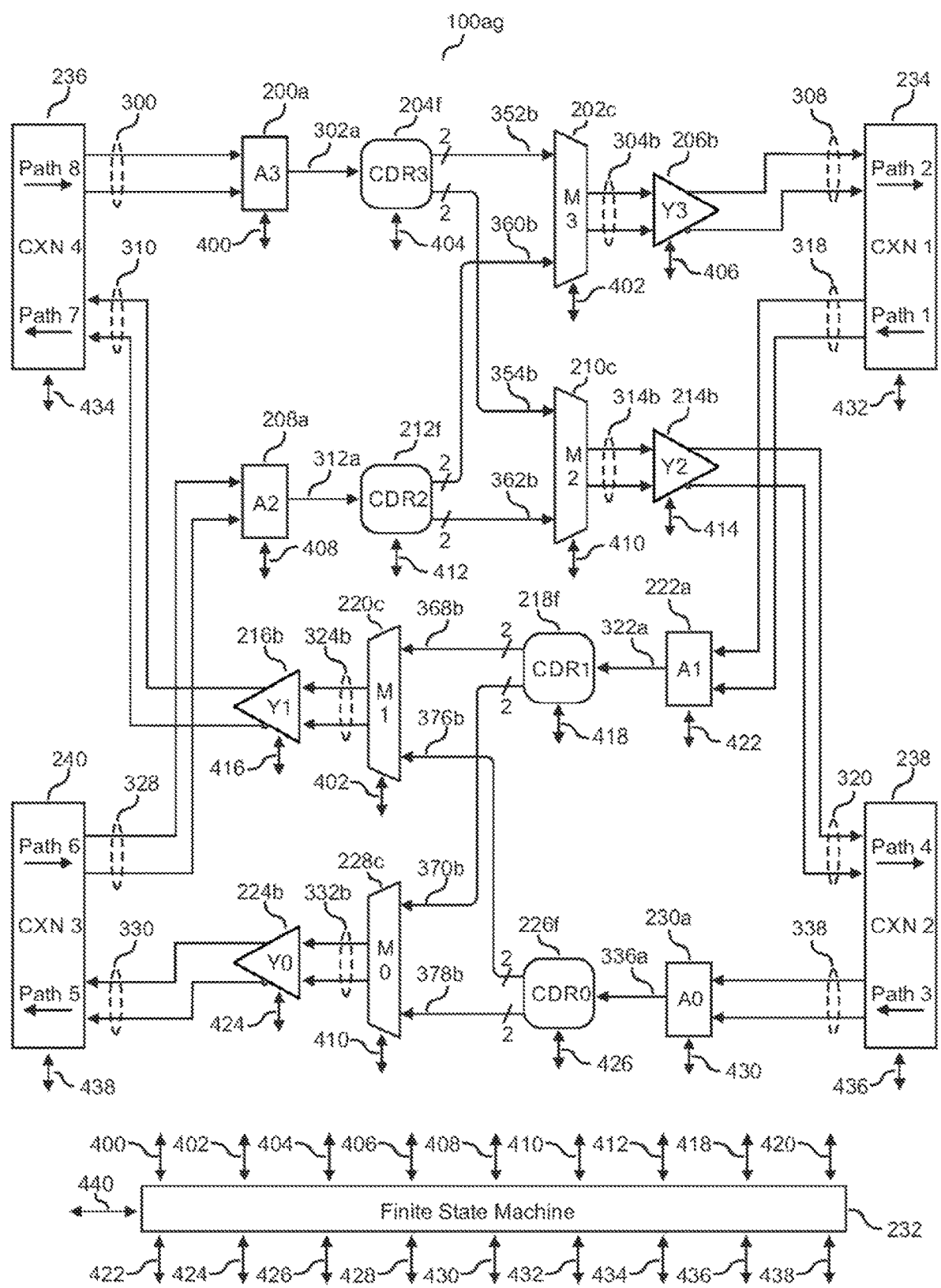
Figure 48A:
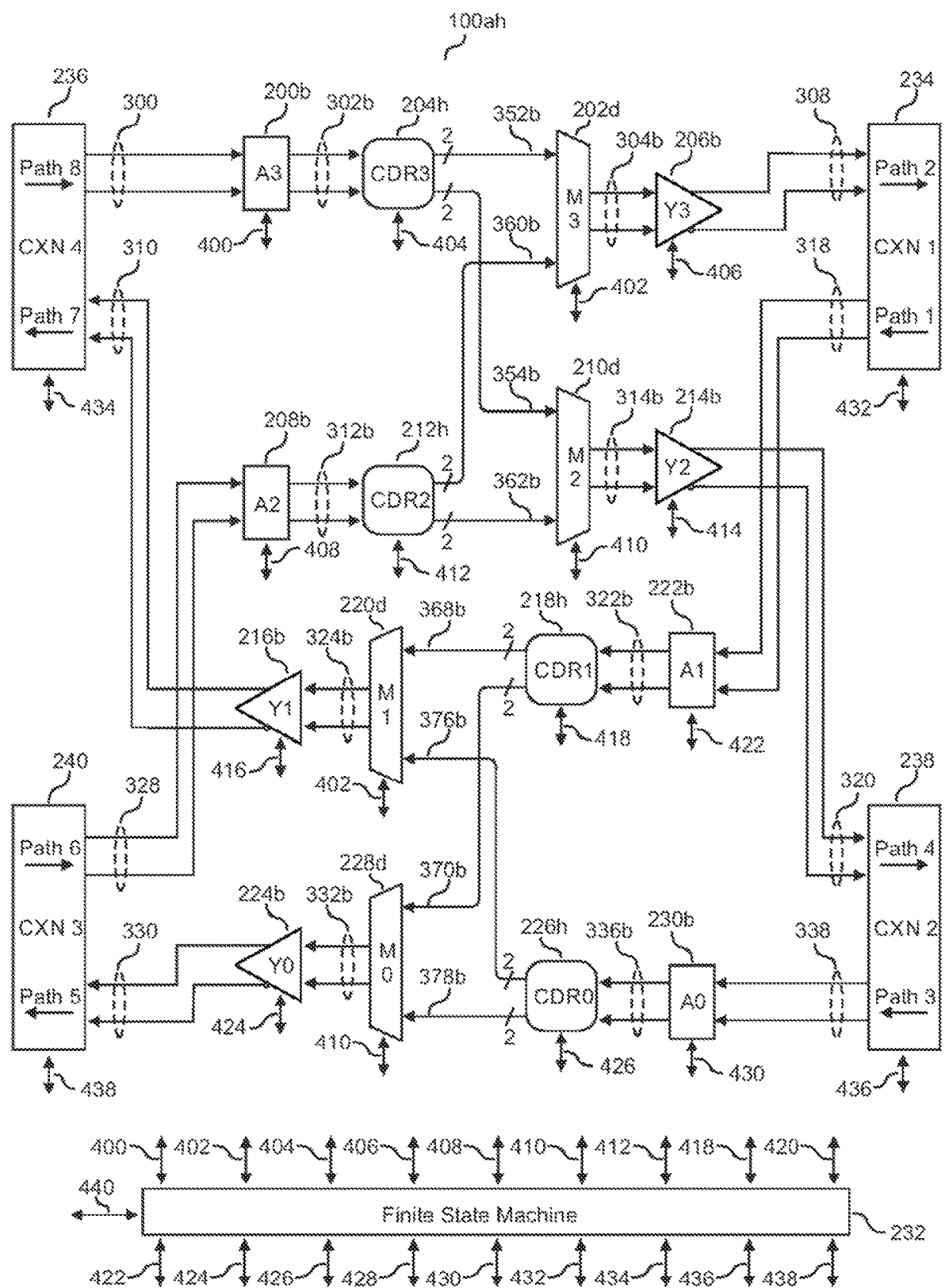
Figure 48A:
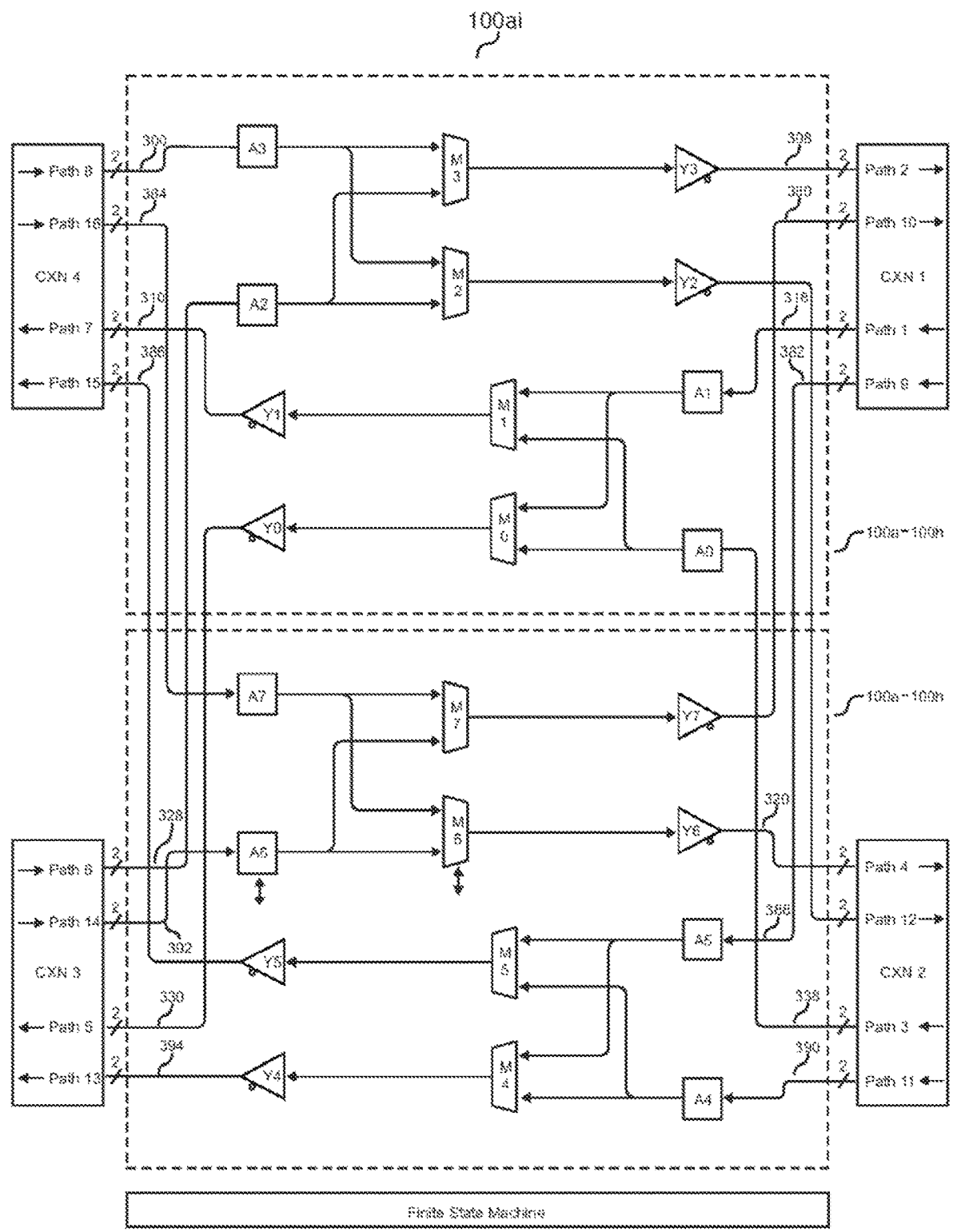
Figure 48A:
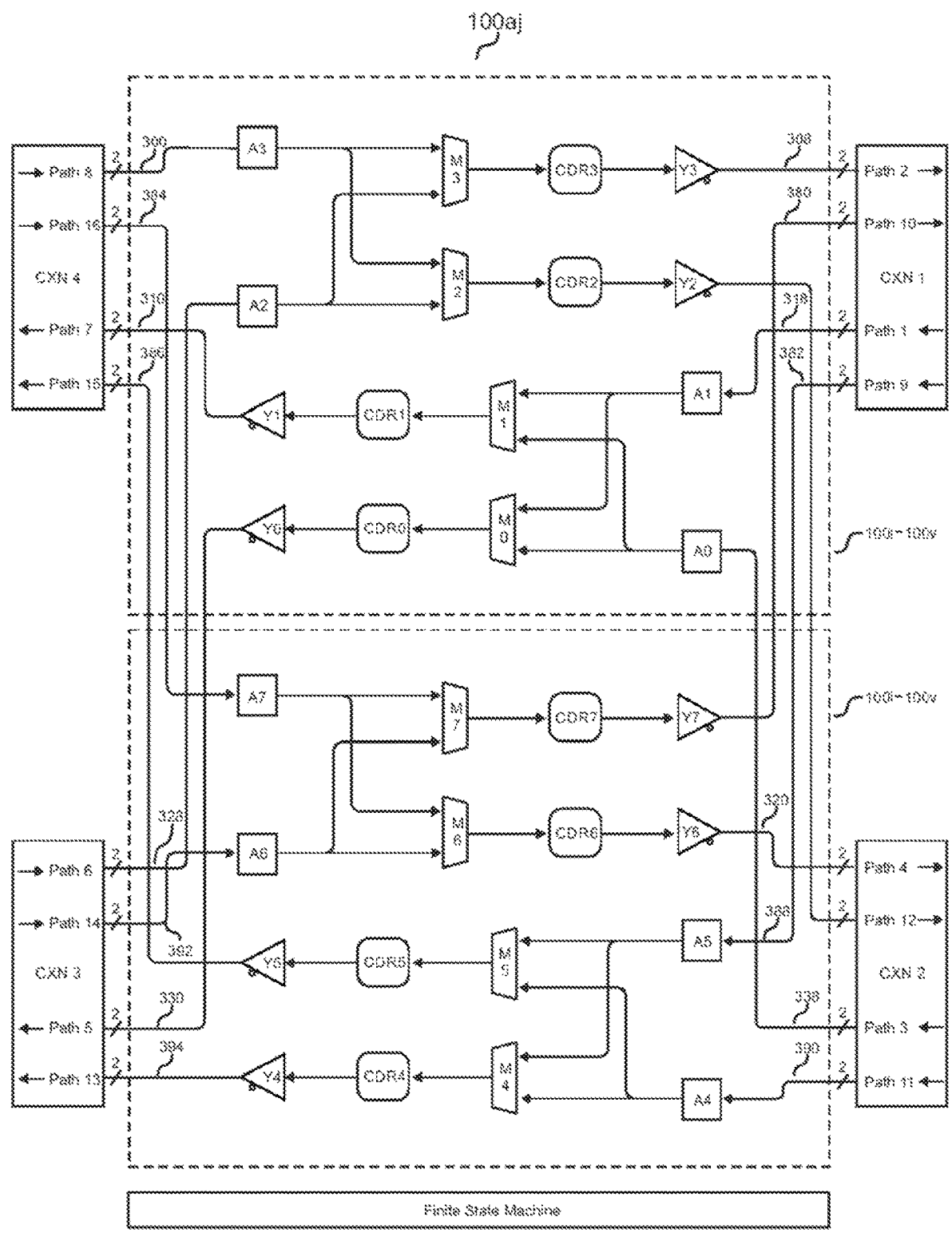
Figure 48A:
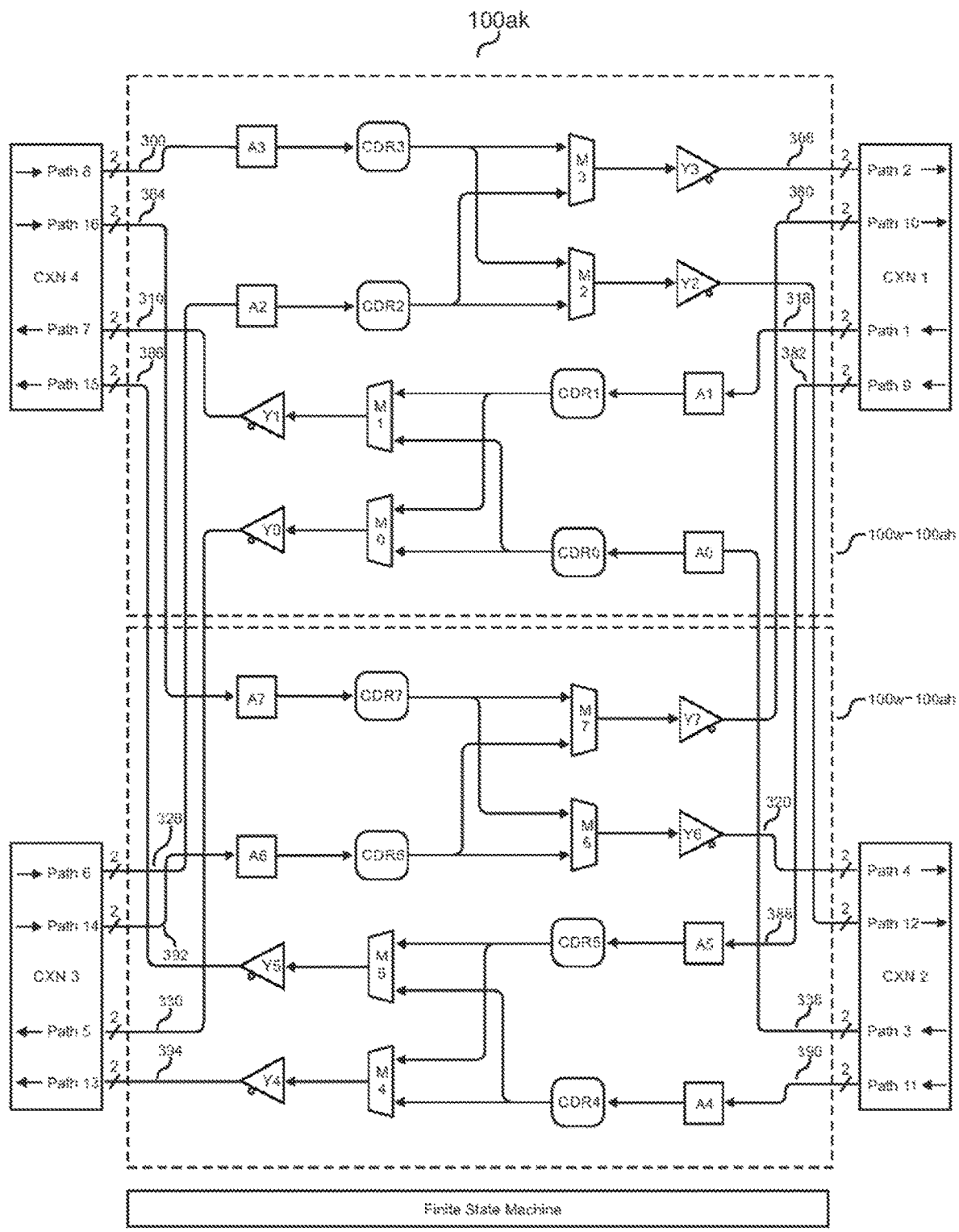

FIG. 48z illustrates version 100z of the present disclosure. The input broadband differential amplifiers (A), the clock and data recovery (CDR) circuitries, the multiplexer switches (M), and the output differential amplifiers (Y) are interconnected with differential signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100z) input differential signals 318 connect to the input differential amplifier A1 222b. The output signals 322b from differential amplifier A1 222b is a differential signal. This output signals 322b frim differential amplifier A1 222b connects to the input of clock data recovery CDR 1 218d. The output signal 368b from CDR 1 218d is a differential signal. This output signal 368b from CDR1 218d connects to the input of Multiplexer Switch M1 220d and M0 228d.

Path 2 (Version 100z) output differential signals 308 connect to the output differential amplifier Y3 206b. The input signals 304b to differential amplifier Y3 206d is a differential signal. This input signal 304b connects to the output of Multiplexer Switch M3 202d.

Path 3 (Version 100z) input differential signals 338 connect to the input differential amplifier A0 230b. The output signals 336b from differential amplifier A0 230b is a differential signal. This output signals 336b from differential amplifier A0 230b connects to the input of clock data recovery CDR0 226d. The output signal 376b from CDR0 226d is a differential signal. This output signal 376b from CDR0 226d connects to the input of Multiplexer Switch M1220d and M0 228d.

Path 4 (Version 100z) output differential signals 320 connect to the output differential amplifier Y2 214b. The input signals 314b to differential amplifier Y2 214b is a differential signal. This input signal 314b connects to the output of Multiplexer Switch M2 210d.

Path 5 (Version 100z) output differential signals 330 connect to the output differential amplifier Y0 224b. The input signals 332b to differential amplifier Y0 224b is a differential signal. This input signal 332b connects to the output of Multiplexer Switch M0 228d.

Path 6 (Version 100z) input differential signals 328 connect to the input differential amplifier A2 208b. The output signals 312b from differential amplifier A2 208b is a differential signal. This output signals 312b from differential amplifier A2 208b connects to the input of clock data recovery CDR2 212d. The output signals 360b from CDR2 212d is a differential signal. This output signal 360b from CDR2 212d connects to the input of Multiplexer Switch M3 202d and M2 210d.

Path 7 (Version 100z) output differential signals 310 connect to the output differential amplifier Y1 216b. The input signals 324b to differential amplifier Y1 216b is a differential signal. This input signal 324b connects to the output of Multiplexer Switch M1 220d.

Path 8 (Version 100z) input differential signals 300 connect to the input differential amplifier A3 200b. The output signals 302b from differential amplifier A3 200b is a differential signal. This output signals 302b from differential amplifier A3 200b connects to the input of clock data recovery CDR3 204d. The output signals 352b from CDR3 204d is a differential signal. This output signal 352b from CDR3 204d connects to the input of Multiplexer Switch M3 202d and M2 210d.

A finite state machine (PSM) 232 connects to the input broadband amplifiers A0 230b. A1 222b. A2, 208b, and A3 200b (A0-A3) through connections 430, 422, 408, and 400 respectively. FSM 232 connects to the Multiplexer Switches M0 228d, M1 220d, M2 210d, and M3 202d (M0-M3) through connections 428, 420, 410, and 402 respectively. FSM 232 connects to CDR0 226d, CDR 1 218d, CDR2 212d, and CDR3 204d (CDR0-CDR3) through connections 426, 418, 412, and 404, respectively. FSM 232 connects to the output broadband amplifiers Y0 224b, Y1 216b, Y2 214b, and Y3 206b (Y0-Y3), through connections 424, 416, 414, and 406. FSM 232 connects to Connection CXN 1 234. CXN 2 238, CXN 3 240, and CXN 4 236 (CXN 1-4) through connections 432, 436, 438, and 434.

FIG. 48aa illustrates version 100aa of the present disclosure. The input broadband differential amplifiers (A), multiplexer switches (M), clock and data recovery (CDR), and output differential amplifiers (Y) circuitries are interconnected with single-ended signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100aa) input differential signals 318 connect to the input differential amplifier A1 222a. The output signals 322a from differential amplifier A1 222a is a single-ended signal. This output signal 322a from differential amplifier A1 222a connects to the input of clock data recovery CDR1 218e. The output signals 368a and 370a from CDR1 218e are single-ended signals. The clock data recovery CDR1 218e has a fanout buffer where the output signals 368a and 370a are copies of the output signal 322a from differential amplifier A1 222a. These output signals 368a and 370a from CDR1 218e connect to the input of Multiplexer Switch M1 220a and M0 228a, respectively.

Path 2 (Version 100aa) output differential signals 308 connect to the output differential amplifier Y3 206a. The input signal 304a to differential amplifier Y3 206a is a single-ended signal. This input signal 304a connects to the output of Multiplexer Switch M3 202a.

Path 3 (Version 100aa) input differential signals 338 connect to the input differential amplifier A0 230a. The output signals 336a from differential amplifier A0 230a is a single-ended signal. This output signal 336a from differential amplifier A0 230a connects to the input of clock data recovery CDR0 226e. The output signals 376a and 378a from CDR0 226e are single-ended signals. The clock data recovery CDR0 226e has a fanout buffer where the output signals 376a and 378a are copies of the output signal 336a from differential amplifier A0 230a. These output signals 376a and 378a.frm CDR0 226e connect to the input of Multiplexer Switch M1220a and M0 228a, respectively.

Path 4 (Version 100aa) output differential signals 320 connect to the output differential amplifier Y2 214a. The input signal 314a to differential amplifier Y2 214a is a single-ended signal. This input signal 314a connects to the output of Multiplexer Switch M2 210a.

Path 5 (Version 100aa) output differential signals 330 connect to the output differential amplifier Y0 224a. The input signal 332a to differential amplifier Y0 224a is a single-ended signal. This input signal 332a connects to the output of Multiplexer Switch M0 228a.

Path 6 (Version 100)aa) input differential signals 328 connect to the input differential amplifier A2 208a. The output signals 312a from differential amplifier A2 208a is a single-ended signal. This output signal 312a from differential amplifier A2 208a connects to the input of clock data recovery CDR2 212e. The output signals 360a and 362a from CDR2 212c are single-ended signals. The clock data recovery CDR0 226e has a fanout buffer where the output signals 360a and 362a are copies of the output signal 312a from differential amplifier A2 208a. These output signals 360a and 362a from CDR2 212e connect to the input of Multiplexer Switch M3 202a and M2 210a, respectively.

Path 7 (Version 100aa) output differential signals 310 connect to the output differential amplifier Y1 216a. The input signal 324a to differential amplifier Y1 216a is a single-ended signal. This input signal 324a connects to the output of Multiplexer Switch M1 220a.

Path 8 (Version 100aa) input differential signals 300 connect to the input differential amplifier A3 200a. The output signals 302a from differential amplifier A3 200a is a single-ended signal. This output signal 302a from differential amplifier A3 200a connects to the input of clock data recovery CDR3 204e. The output signals 352a and 354a from CDR3 204e are single-ended signals. The clock data recovery CDR3 204e has a fanout buffer where the output signals 352a and 354a are copies of the output signal 302a from differential amplifier A3 200a. These output signal 352a and 345a connects to the input of Multiplexer Switch M3 202a and M2 210a, respectively.

A finite state machine (FSM) 232 connects to the input broadband amplifiers A0 230a, A1 222a, A2, 208a, and A3 200a (A0-A3) through connections 430, 422, 408, and 400 respectively. FSM 232 connects to the Multiplexer Switches M0 228a, M1 220a, M2 210a, and M3 202a (M0-M3) through connections 428, 420, 410, and 402 respectively. FSM 232 connects to CDR0 226e, CDR1 218e, CDR2 212e, and CDR3 204e (CDR0-CDR3) through connections 426, 418, 412, and 404, respectively. FSM 232 connects to the output broadband amplifiers Y0 224a, Y1 216a. Y2 214a, and Y3 206a (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48ab illustrates version 100ab of the present disclosure. The input broadband amplifiers (A), multiplexer switches (M), and clock and data recovery (CDR) are interconnected with single-ended signals. The output differential amplifiers (Y) and the multiplexer switches (M) are connected with differential signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100ab) input differential signals 318 connect to the input differential amplifier A1 222a. The output signals 322a from differential amplifier A1 222a is a single-ended signal. This output signal 322a from differential amplifier A1 222a connects to the input of clock data recovery CDR1 218e. The output signals 368a and 370a from CDR1 218e are single-ended signals. The clock data recovery CDR1 218e has a fanout buffer where the output signals 368a and 370a are copies of the output signal 322a from differential amplifier A1 222a. These output signals 368a and 370a from CDR1 218e connect to the input of Multiplexer Switch M1 220b and 228b, respectively.

Path 2 (Version 100ab) output differential signals 308 connect to the output differential amplifier Y3 206b. The input signal 304b to differential amplifier Y3 206b is a differential signal. This input signal 304b connects to the output of Multiplexer Switch M3 202b.

Path 3 (Version 100ab) input differential signals 338 connect to the input differential amplifier A0 230a. The output signals 336a from differential amplifier A0 230a is a single-ended signal. Thise output signal 336a from differential amplifier A0 230a connects to the input of clock data recovery CDR0 226c. The output signals 376a and 378a from CDR0 226e are single-ended signals. The clock data recovery CDR0 226e has a fanout buffer where the output signals 376a and 378a are copies of the output signal 336a from differential amplifier A0 230a. These output signal 376a and 378a from CDR0 226e connect to the input of Multiplexer Switch M1 220b and M0 228b, respectively.

Path 4 (Version 100ab) output differential signals 320 connect to the output differential amplifier Y2 214b. The input signal 314b to differential amplifier Y2 214b is a differential signal. This input signal 314b connects to the output of Multiplexer Switch M2 210b.

Path 5 (Version 100ab) output differential signals 330 connect to the output differential amplifier Y0 224b. The input signal 332b to differential amplifier Y0 224b is a differential signal. This input signal 332b connects to the output of Multiplexer Switch M0 228b.

Path 6 (Version 100ab) input differential signals 328 connect to the input differential amplifier A2 208a. The output signals 312a from differential amplifier A2 208a is a single-ended signal. This output signal 312a from differential amplifier A2 208a connects to the input of clock data recovery CDR2 212c. The output signals 360a and 362a from CDR2 212e are single-ended signals. The clock data recovery CDR0 226e has a fanout buffer where the output signals 360a and 362a are copies of the output signal 312a from differential amplifier A2 208a. These output signal 360a and 362a from CDR2 212e connect to the input of Multiplexer Switch M3 202b and 210b, respectively.

Path 7 (Version 10aa) output differential signals 310 connect to the output differential amplifier Y1 216b. The input signal 324b to differential amplifier Y1 216b is a differential signal. This input signal 324b connects to the output of Multiplexer Switch M1 220b.

Path 8 (Version 100ab) input differential signals 300 connect to the input differential amplifier A3 200a. The output signals 302a from differential amplifier A3 200a is a single-ended signal. This output signal 302a from differential amplifier A3 200a connects to the input of clock data recovery CDR3 204e. The output signals 352a and 354a from CDR3 204e are single-ended signals. The clock data recovery CIDR3 204e has a fanout buffer where the output signals 352a and 354a are copies of the output signal 302a from differential amplifier A3 200a. These output signals 352a and 354a from CDR3 204e connects to the input of Multiplexer Switch M3 202b and M2 210b, respectively.

A finite state machine (FSM) 232 connects to the input broadband amplifiers A0 230a, A1 222a, A2, 208a, and A3 200a (A0-A3) through connections 430, 422, 408, and 400 respectively. FSM 232 connects to the Multiplexer Switches M0 228b, M1 220b, M2 210b, and M3 202b (M0-M3) through connections 428, 420, 410, and 402 respectively. FSM 232 connects to CDR0 226e, CDR1 218e, CDR2 212e, and CDR3 204e (CDR0-CDR3) through connections 426, 418, 412, and 404, respectively. FSM 232 connects to the output broadband amplifiers Y0 224b, Y1 216b, Y2 214b, and Y3 206b (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48ac illustrates version 100ac of the present disclosure. The input broadband differential amplifiers (A) and the clock and data recovery (CDR) circuitries are connected with differential signals. The multiplexer switches (M), clock and data recovery (CDR), and output differential amplifiers (Y) circuitries are interconnected with single-ended signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100*ac*) input differential signals 318 connect to the input differential amplifier A1 222*b*. The output signals 322*b* from differential amplifier A1 222*b* is a differential signal. This output signal 322*b* from differential amplifier A1 222*b* connects to the input of clock data recovery CDR1 218*g*. The output signals 368*a* and 370*a* from CDR1 218*g* are single-ended signals. The clock data recovery CDR1 218*g* has a fanout buffer where the output signals 368*a* and 370*a* are copies of the output signal 322*b* from differential amplifier A1 222*b*. These output signals 368*a* and 370*a* from CDR1 218*g* connect to the input of Multiplexer Switch M1 220*a* and M0 228*a*, respectively.

Path 2 (Version 100*ac*) output differential signals 308 connect to the output differential amplifier Y3 206*a*. The input signal 304*a* to differential amplifier Y3 206*a* is a single-ended signal. This input signal 304*a* connects to the output of Multiplexer Switch M3 202*a*.

Path 3 (Version 100*ac*) input differential signals 338 connect to the input differential amplifier A0 230*b*. The output signals 336*b* from differential amplifier A0 230*b* is a differential signal. This output signal 336*b* from differential amplifier A0 230*b* connects to the input of clock data recovery CDR0 226*g*. The output signals 376*a* and 378*a* from CDR0 226*g* are single-ended signals. The clock data recovery CDR0 226*g* has a fanout buffer where the output signals 376*a* and 378*a* are copies of the output signal 336*b* from differential amplifier A0 230b. These output signal 376*a* and 378*a* from CDR0 226*g* connects to the input of Multiplexer Switch M1 220*a* and M0 228*a*, respectively.

Path 4 (Version 100*ac*) output differential signals 320 connect to the output differential amplifier Y2 214*a*. The input signal 314*a* to differential amplifier Y2 214*a* is a single-ended signal. This input signal 314*a* connects to the output of Multiplexer Switch M2 210*a*.

Path 5 (Version 100*ac*) output differential signals 330 connect to the output differential amplifier Y0 224*a*. The input signal 332*a* to differential amplifier Y0 224*a* is a single-ended signal. This input signal 332*a* connects to the output of Multiplexer Switch M0 228*a*.

Path 6 (Version 100*ac*) input differential signals 328 connect to the input differential amplifier A2 208*b*. The output signals 312*b* from differential amplifier A2 208*b* is a differential signal. This output signal 312*b* from differential amplifier A2 208*b* connects to the input of clock data recovery CDR2 212*g*. The output signals 360*a* and 362*a* from CDR2 212*g* are single-ended signals. The clock data recovery CDR0 226*g* has a fanout buffer where the output signals 360*a* and 362*a* are copies of the output signal 312*b* from differential amplifier A2 208*b*. These output signals 360*a* and 362*a* from CDR2 212*g* connect to the input of Multiplexer Switch M3 202*a* and M2 210*a*, respectively.

Path 7 (Version 100*ac*) output differential signals 310 connect to the output differential amplifier Y1 216*a*. The input signal 324*a* to differential amplifier Y1 216*a* is a single-ended signal. This input signal 324*a* connects to the output of Multiplexer Switch M1 220*a*.

Path 8 (Version 100*ac*) input differential signals 300 connect to the input, differential amplifier A3 200*b*. The output signals 302*b* from differential amplifier A3 200*b* is a differential signal. This output signal 302*b* from differential amplifier A3 200*b* connects to the input of clock data recovery CDR3 204*g*. The output signals 352*a* and 354*a* from CDR3 204*g* are single-ended signals. The clock data recovery CDR3 204*g* has a fanout buffer where the output signals 352*a* and 354*a* are copies of the output signal 302*b* from differential amplifier A3 200*b*. These output signals 352*a* and 354*a* fmm CDR3 204*g* connect to the input of Multiplexer Switch M3 202*a* and 210*a*, respectively.

A finite state machine (FSM) 232 connects to the input broadband amplifiers A0 230*b*, A1 222*b*, A2, 208*b*, and A3 200*b* (A0-A3) through connections 430, 422, 408, and 400 respectively. FSM 232 connects to the Multiplexer Switches M0 228*a*, M1 220*a*, M2 210*a*, and M3 202*a* (M0-M3) through connections 428, 420, 410, and 402 respectively. FSM 232 connects to CDR0 226*g*, CDR1 218*g*. CDR2 212*g*, and CDR3 204*g* (CDR0-CDR3) through connections 426, 418, 412, and 404, respectively. FSM 232 connects to the output broadband amplifiers Y0 224*a*, Y1 216*a*, Y2 214*a*, and Y3 206*a* (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48*ad* illustrates version 100*ad* of the present disclosure. The input broadband amplifiers (A) are connected to clock and data recovery (CDR) circuitries with differential signals. The multiplexer switches (M) are connected to the clock and data recovery (CDR) circuitries with single-end signals. The output differential amplifiers (Y) are connected to the multiplexer switches (M) with differential signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100*ad*) input differential signals 318 connect to the input differential amplifier A1 222*b*. The output signals 322*b* from differential amplifier A1 222*b* is a differential signal. This output signal 322*b* from differential amplifier A1 222*b* connects to the input of clock data recovery CDR1 218*g*. The output signals 368*a* and 370*a* from CDR1 218*g* are single-ended signals. The clock data recovery CDR1 218*g* has a fanout buffer where the output signals 368*a* and 370*a* are copies of the output signal 322*b* from differential amplifier A1 222*b*. These output signals 368*a* and 370*a* from CDR1 218*g* connect to the input of Multiplexer Switch M1 220*b* and M0 228*b*, respectively.

Path 2 (Version 100*ad*) output differential signals 308 connect to the output differential amplifier Y3 206*b*. The input signal 304*b* to differential amplifier Y3 206*b* is a differential signal. This input signal 304*b* connects to the output of Multiplexer Switch M3 202*b*.

Path 3 (Version 100*ad*) input differential signals 338 connect to the input differential amplifier A0 230*b*. The output signals 336*b* from differential amplifier A0 230*b* is a differential signal. This output signal 336*b* from differential amplifier A0 230*b* connects to the input of clock data recovery CDR0 226*g*. The output signals 376*a* and 378*a* from CDR0 226*g* are single-ended signals. The clock data recovery CDR0 226*g* has a fanout buffer where the output signals 376*a* and 378*a* are copies of the output signal 336*b* from differential amplifier A0 230*b*. These output signals 376*a* and 378*a* from CDR0 226*g* connects to the input of Multiplexer Switch M1220*b* and M0 228*b*, respectively.

Path 4 (Version 100*ad*) output differential signals 320 connect to the output differential amplifier Y2 214*b*. The input signal 314*b* to differential amplifier Y2 214*b* is a differential signal. This input signal 314*b* connects to the output of Multiplexer Switch M2 210*b*.

Path 5 (Version 100*ad*) output differential signals 330 connect to the output differential amplifier Y0 224*b*. The input signal 332*b* to differential amplifier Y0 224*b* is a differential signal. This input signal 332*b* connects to the output of Multiplexer Switch M0 228*b*.

Path 6 (Version 100*ad*) input differential signals 328 connect to the input differential amplifier A2 208*b*. The output signals 312*b* from differential amplifier A2 208*b* is a differential signal. This output signal 312*b* from differential amplifier A2 208*b* connects to the input of clock data recovery CDR2 212*g*. The output signals 360*a* and 362*a* from CDR2 212*g* are single-ended signals. The clock data recovery CDR0 226*g* has a fanout buffer where the output signals 360*a* and 362*a* are copies of the output signal 312*b* from differential amplifier A2 208*b*. These output signals 360*a* and 362*a* from CDR2 212*g* connect to the input of Multiplexer Switch M3 202*b* and M2 210*b*, respectively.

Path 7 (Version 100*ad*) output differential signals 310 connect to the output differential amplifier Y1 216*b*. The input signal 324*b* to differential amplifier Y1 216*b* is a differential signal. This input signal 324*b* connects to the output of Multiplexer Switch M1 220*b*.

Path 8 (Version 100*ad*) input differential signals 300 connect to the input differential amplifier A3 200*b*. The output signals 302*b* from differential amplifier A3 200*b* is a differential signal. This output signal 302*b* from differential amplifier A3 200*b* connects to the input of clock data recovery CDR3 204*g*. The output signals 352*a* and 354*a* from CDR3 204*g* are single-ended signals. The clock data recovery CDR3 204*g* has a fanout buffer where the output signals 352*a* and 354*a* are copies of the output signal 302*b* from differential amplifier A3 200*b*. These output signals 352*a* and 354*a* from CDR3 204*g* connect to the input of Multiplexer Switch M3 202*b* and M2 210*b*, respectively.

A finite state machine (FSM) 232 connects to the input broadband amplifiers A0 230*b*, A1 222*b*, A2, 208*b*, and A3 200*b* (A0-A3) through connections 430, 422, 408, and 400 respectively. FSM 232 connects to the Multiplexer Switches M0 228*b*, M1 220*b*, M2 210*b*, and M3 202*b* (M0-M3) through connections 428, 420, 410, and 402 respectively. FSM 232 connects to CDR0 226*g*, CDR1 218*g*, CDR2 212*g*, and CDR3 204*g* (CDR0-CDR3) through connections 426, 418, 412, and 404, respectively. FSM 232 connects to the output broadband amplifiers Y0 224*b*, Y1 216*b*. Y2 214*b*, and Y3 206*b* (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48*ae* illustrates version 100*ae* of the present disclosure. The input broadband amplifiers (A) are connected to the clock and data recovery (CDR) with single-ended signals. The output differential amplifiers (Y) are connected to the multiplexer switches (M) with single-ended signals. The multiplexer switches (M) are connected to the clock and data recovery (CIR) circuitries with differential signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100*ae*) input differential signals 318 connect to the input differential amplifier A1 222*a*. The output signals 322*a* from differential amplifier A1 222*a* is a single-ended signal. Thise output signal 322*a* from differential amplifier A1 222*a* connects to the input of clock data recovery CDR 1 218*f*. The output signals 368*b* and 370*b* from CDR1 218*f* are differential signals. The clock data recovery CDR 1218*f* has a fanout buffer where the output signals 368*b* and 370*b* are copies of the output signal 322*b* from differential amplifier A1 222*b*. These output signals 368*b* and 370*b* from CDR1 218*f* connect to the input of Multiplexer Switch M1 220*c* and M0 228*c*, respectively.

Path 2 (Version 100*ae*) output differential signals 308 connect to the output differential amplifier Y3 206*a*. The input signal 304*a* to differential amplifier Y3 206*a* is a single-ended signal. This input signal 304*a* connects to the output of Multiplexer Switch M3 202*c*.

Path 3 (Version 100*ac*) input differential signals 338 connect to the input differential amplifier A0 230*a*, The output signals 336*a* from differential amplifier A0 230*a* is a single-ended signal. This output signal 336*a* from differential amplifier A0 230*a* connects to the input of clock data recovery CDR0 226*f*. The output signals 376*b* and 378*b* from CDR(O 226*f* are differential signals. The clock data recovery CDR0 226*f* has a fanout buffer where the output signals 376*b* and 378*b* are copies of the output signal 336*a* from differential amplifier A0 230*a*. These output signals 376*b* and 378*b* from CDR0 226*h* connect to the input of Multiplexer Switch M1 220*c* and M0 228*c*, respectively.

Path 4 (Version 100*ae*) output differential signals 320 connect to the output differential amplifier Y2 214*a*. The input signal 314*a* to differential amplifier Y2 214*a* is a single-ended signal. This input signal 314*a* connects to the output of Multiplexer Switch M2 210*c*.

Path 5 (Version 100*ae*) output differential signals 330 connect to the output differential amplifier Y0 224*a*. The input signal 332*a* to differential amplifier Y0 224*a* is a single-ended signal. This input signal 332*a* connects to the output of Multiplexer Switch M0 228*c*.

Path 6 (Version 100*ae*) input differential signals 328 connect to the input differential amplifier A2 208*a*. The output signals 312*a* from differential amplifier A2 208*a* is a single-ended signal. This output signal 312*a* from differential amplifier A2 208*a* connects to the input of clock data recovery CDR2 212*f*. The output signals 360*b* and 362*b* from CDR2 212*f* are differential signals. The clock data recovery CDR0 226*f* has a fanout buffer where the output signals 360*b* and 362*b* are copies of the output signal 312*a* from differential amplifier A2 208*a*. These output signals 360*b* and 362*b* from CDR2 212*f* connect to the input of Multiplexer Switch M3 202*c* and M2 210*c*, respectively.

Path 7 (Version 100*ae*) output differential signals 310 connect to the output differential amplifier Y1 216*a*. The input signal 324*a* to differential amplifier Y1 216*a* is a single-ended signal. This input signal 324*a* connects to the output of Multiplexer Switch M1 220*c*.

Path 8 (Version 100*ae*) input differential signals 300 connect to the input differential amplifier A3 200*a*. The output signals 302*a* from differential amplifier A3 200*a* is a single-ended signal. This output signal 302*a* from differential amplifier A3 200*a* connects to the input of clock data recovery CDR3 204*f*. The output signals 352*b* and 354*b* from CDR3 204*f* are differential signals. The clock data recovery CDR 204*f* has a fanout buffer where the output signals 352*b* and 354*b* are copies of the output signal 302*b* from differential amplifier A3 200*b*. These output signals 352*b* and 354*b* from CDR3 204*f* connect to the input of Multiplexer Switch M3 202*c* and M2 210*c*, respectively.

A finite state machine (FSM) 232 connects to the input broadband amplifiers A0 230*a*, A1 222*a*, A2, 208*a*, and A3 200*a* (A0-A3) through connections 430, 422, 408, and 400 respectively. FSM 232 connects to the Multiplexer Switches M0 228*c*, M1 220*c*, M2 210*c*, and M3 202*c* (M0-M3) through connections 428, 420, 410, and 402 respectively. FSM 232 connects to CDR0 226*f*, CDR1 218*f*, CDR2 212*f*, and CDR3 204*f* (CDR0-CDR3) through connections 426, 418, 412, and 404, respectively. FSM 232 connects to the output broadband amplifiers Y0 224*a*, Y1 216*a*, Y2 214*a*, and Y3 206*a* (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48*af* illustrates version 100*af* of the present disclosure. The input broadband amplifiers (A), clock and data recovery (CDR), and multiplexer switches (M) circuitries are interconnected with differential signals. The output differential amplifiers (Y) are connected to the multiplexer switches (M) with single-ended signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100*af*) input differential signals 318 connect to the input differential amplifier A1 222*b*. The output signals 322*b* from differential amplifier A1 222*b* is a differential signal. This output signal 322*b* from differential amplifier A1 222*b* connects to the input of clock data recovery CDR 1 218*h*. The output signals 368*b* and 370*b* from CDR1 218*h* are differential signals. The clock data recovery CDR1 218*h* has a fanout buffer where the output signals 368*b* and 370*b* are copies of the output signal 322*b* from differential amplifier A1 222*b*. These output signals 368*b* and 370*b* from CDR 1218*h* connect to the input of Multiplexer Switch M1 220*c* and M0 228*c*, respectively.

Path 2 (Version 100*af*) output differential signals 308 connect to the output differential amplifier Y3 206*a*. The input signal 304*a* to differential amplifier Y3 206*a* is a single-ended signal. This input signal 304*a* connects to the output of Multiplexer Switch M3 202*c*.

Path 3 (Version 100*af*) input differential signals 338 connect to the input differential amplifier A0 230*b*. The output signals 336*b* from differential amplifier A0 230*b* is a differential signal. This output signal 336*b* from differential amplifier A0 230*b* connects to the input of clock data recovery CDR0 226*h*. The output signals 376*b* and 378*b* from CDR0 226*h* are differential signals. The clock data recovery CDR0 226*h* has a fanout buffer where the output signals 376*b* and 378*b* are copies of the output signal 336*b* from differential amplifier A0 230*b*. These output signals 376*b* and 378*b* from CDR0 226*h* connect to the input of Multiplexer Switch M1 220*c* and M0 228*c*, respectively.

Path 4 (Version 100*af*) output differential signals 320 connect to the output differential amplifier Y2 214*a*. The input signal 314*a* to differential amplifier Y2 214*a* is a single-ended signal. This input signal 314*a* connects to the output of Multiplexer Switch M2 210*c*.

Path 5 (Version 100*af*) output differential signals 330 connect to the output differential amplifier Y0 224*a*. The input signal 332*a* to differential amplifier Y0 224*a* is a single-ended signal. This input signal 332*a* connects to the output of Multiplexer Switch M0 228*c*.

Path 6 (Version 100*af*) input differential signals 328 connect to the input differential amplifier A2 208*b*. The output signals 312*b* from differential amplifier A2 208*b* is a differential signal. This output signal 312*b* from differential amplifier A2 208*b* connects to the input of clock data recovery CDR2 212*h*. The output signals 360*b* and 362*b* from CDR2 212*h* are differential signals. The clock data recovery CDR0 226*h* has a fanout buffer where the output signals 360*b* and 362*b* are copies of the output signal 312*b* from differential amplifier A2 208*b*. These output signals 360*b* and 362*b* from CDR2 212*h* connects to the input of Multiplexer Switch M3 202*c* and 210*c*, respectively.

Path 7 (Version 100*af*) output differential signals 310 connect to the output differential amplifier Y1 216*a*. The input signal 324*a* to differential amplifier Y1 216*a* is a single-ended signal. This input signal 324*a* connects to the output of Multiplexer Switch M1 220*c*.

Path 8 (Version 100*af*) input differential signals 300 connect to the input differential amplifier A3 200*b*. The output signals 302*b* from differential amplifier A3 200*b* is a differential signal. This output signal 302*b* from differential amplifier A3 200*b* connects to the input of clock data recovery CDR3 204*h*. The output signals 352*b* and 354*b* from CDR3 204*h* are differential signals. The clock data recovery CDR 204*h* has a fanout buffer where the output signals 352*b* and 354*b* are copies of the output signal 302*b* from differential amplifier A3 200*b*. These output signals 352*b* and 354*b* from CDR3 204*h* connects to the input of Multiplexer Switch M3 202*c* and M2 210*c*, respectively.

A finite state machine (FSM) 232 connects to the input broadband amplifiers A0 230*b*, A1 222*b*, A2, 208*b*, and A3 200*b* (A0-A3) through connections 430, 422, 408, and 400 respectively. FSM 232 connects to the Multiplexer Switches M0 228*c*, M1 220*c*, M2 210*c*, and M3 202*c* (M0-M3) through connections 428, 420, 410, and 402 respectively. FSM 232 connects to CDR0 226*h*, CDR1 218*h*, CDR2 212*h*, and CDR3 204*h* (CDR0-CDR3) through connections 426, 418, 412, and 404, respectively. FSM 232 connects to the output broadband amplifiers Y0 224*a*, Y1 216*a*, Y2 214*a*, and Y3 206*a* (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48*ag* illustrates version 100*ag* of the present disclosure. The input broadband amplifiers (A) are connected to the clock and data recovery (CDR) with single-ended signals. The multiplexer switches (M), output amplifiers (A), and the clock and data recovery (CDR) circuitries are interconnected with differential signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100*ag*) input differential signals 318 connect to the input differential amplifier A1 222*a*. The output signals 322*a* from differential amplifier A1 222*a* is a single-ended signal. This output signal 322*a* from differential amplifier A1 222*a* connects to the input of clock data recovery CDR 1 218*f*. The output signals 368*b* and 370*b* from CDR1 218*f* are differential signals. The clock data recovery CDR1 218*f* has a fanout buffer where the output signals 368*b* and 370*b* are copies of the output signal 322*a* from differential amplifier A1 222*a*. These output signals 368*b* and 370*b* from CDR 1 218*f* connect to the input of Multiplexer Switch M1 220*c* and M0 228*c*, respectively.

Path 2 (Version 100*ag*) output differential signals 308 connect to the output differential amplifier Y3 206*b*. The input signal 304*b* to differential amplifier Y3 206*b* is a differential signal. This input signal 304*b* connects to the output of Multiplexer Switch M3 202*c*.

Path 3 (Version 100*ag*) input differential signals 338 connect to the input differential amplifier A0 230*a*. The output signals 336*a* from differential amplifier A0 230*a* is a single-ended signal. This output signal 336*a* from differential amplifier A0 230*a* connects to the input of clock data recovery CDR0 226*f*. The output signals 376*b* and 378*b* from CDR0 226*f* are differential signals. The clock data recovery CDR0 226*f* has a fanout buffer where the output signals 376*b* and 378*b* are copies of the output signal 336*a* from differential amplifier A0 230*a*. These output signals 376*b* and 378*b* from CDR0 226*f* connect to the input of Multiplexer Switch M1 220*c* and M0 228*c*, respectively.

Path 4 (Version 100*ag*) output differential signals 320 connect to the output differential amplifier Y2 214*b*. The input signal 314*b* to differential amplifier Y2 214*b* is a differential signal. This input signal 314*b* connects to the output of Multiplexer Switch M2 210*c*.

Path 5 (Version 100*ag*) output differential signals 330 connect to the output differential amplifier Y0 224*b*. The input signal 332*b* to differential amplifier Y0 224*b* is a differential signal. This input signal 332*b* connects to the output of Multiplexer Switch M0 228*c*.

Path 6 (Version 100ag) input differential signals 328 connect to the input, differential amplifier A2 208*a*. The output signals 312*a* from differential amplifier A2 208*a* is a single-ended signal. This output signal 312*a* from differential amplifier A2 208*a* connects to the input of clock data recovery CDR2 212*f*. The output signals 360*b* and 362*b* from CDR2 212*f* are differential signals. The clock data recovery CDR0 226*f* has a fanout buffer where the output signals 360*b* and 362*b* are copies of the output signal 312*a* from differential amplifier A2 208*a*.

These output signals 360*b* and 362*b* from CDR2 212*f* connect to the input of Multiplexer Switch M3 202*c* and M210*c*, respectively.

Path 7 (Version 100*ag*) output differential signals 310 connect to the output differential amplifier Y1 216*b*. The input signal 324*b* to differential amplifier Y1 216*b* is a differential signal. This input signal 324*b* connects to the output of Multiplexer Switch M1 220*c*.

Path 8 (Version 100*ag*) input differential signals 300 connect to the input differential amplifier A3 200*a*. The output signals 302*a* from differential amplifier A3 200*a* is a single-ended signal. This output signal 302*a* from differential amplifier A3 200*a* connects to the input of clock data recovery CDR3 204*f*. The output signals 352*b* and 354*b* from CDR3 204*f* are differential signals. The clock data recovery CDR 204*f* has a fanout buffer where the output signals 352*b* and 354*b* are copies of the output signal 302*a* from differential amplifier A3 200*a*. These output signals 352*b* and 354*b* from CDR3 204*f* connect to the input of Multiplexer Switch M3 202*c* and M2 210*c*, respectively.

A finite state machine (FSM) 232 connects to the input broadband amplifiers A0 230*a*, A1 222*a*, A2, 208*a*, and A3 200*a* (A0-A3) through connections 430, 422, 408, and 400 respectively. FSM 232 connects to the Multiplexer Switches M0 228*c*, M1 220*c*, M2 210*c*, and M3 202*c* (M0-M3) through connections 428, 420, 410, and 402 respectively. FSM 232 connects to CDR0 226*f*, CDR1 218*f*, CDR2 212*f*, and CDR3 204*f* (CDR0-CDR3) through connections 426, 418, 412, and 404, respectively. FSM 232 connects to the output broadband amplifiers Y0 224*b*, Y1 216*b*. Y2 214*b*, and Y3 206*b* (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

FIG. 48*ah* illustrates version 100*ah* of the present disclosure. The input broadband amplifiers (A), multiplexer switches (M), output differential amplifiers (Y), and clock and data recovery (CDR) circuitries are interconnected with differential signals.

CXN 1 comprises a Path P1 representing an input differential signal 318 and a Path P2 representing an output differential signal 308. CXN 2 comprises a Path P3 representing an input differential signal 338 and a Path P4 representing an output differential signal 320. CXN 3 comprises a Path P6 representing an input differential signal 328 and a Path P5 representing an output differential signal 330. CXN 4 comprises a Path P8 representing an input differential signal 300 and a Path P7 representing an output differential signal 310.

Path 1 (Version 100*ah*) input differential signals 318 connect to the input differential amplifier A1 222*b*. The output signals 322*b* from differential amplifier A1222*b* is a differential signal. This output signal 322*b* from differential amplifier A1 222*b* connects to the input of clock data recovery CDR 1218*h*. The output signals 368*b* and 370*b* from CDR1 218*h* are differential signals. The clock data recovery CDR1 218*h* has a fanout buffer where the output signals 368*b* and 370*b* are copies of the output signal 322*b* from differential amplifier A1 222*b*. These output signals 368*b* and 370*b* from CDR1 218*h* connect to the input of Multiplexer Switch M1 220*d* and M0 228*d*, respectively.

Path 2 (Version 100*ah*) output differential signals 308 connect to the output differential amplifier Y3 206*b*. The input signal 304*b* to differential amplifier Y3 206*b* is a differential signal. This input signal 304*b* connects to the output of Multiplexer Switch M3 202*d*.

Path 3 (Version 100ah) input differential signals 338 connect to the input differential amplifier A0 230*b*. The output signals 336*b* from differential amplifier A0 230*b* is a differential signal. This output signal 336*b* from differential amplifier A0 230*b* connects to the input of clock data recovery CDR0 226*h*. The output signals 376*b* and 378*b* from CDR0 226*h* are differential signals. The clock data recovery CDR0 226*h* has a fanout buffer where the output signals 376*b* and 378*b* are copies of the output signal 336*b* from differential amplifier A0 230*b*. These output signals 376*b* and 378*b* from CDR0 226*h* connect to the input of Multiplexer Switch M1 220*d* and M0 228*d*, respectively.

Path 4 (Version 100*ah*) output differential signals 320 connect to the output differential amplifier Y2 214*b*. The input signal 314*b* to differential amplifier Y2 214*b* is a differential signal. This input signal 314*b* connects to the output of Multiplexer Switch M2 210*d*.

Path 5 (Version 100*ah*) output differential signals 330 connect to the output differential amplifier Y0 224*b*. The input signal 332*b* to differential amplifier Y0 224*b* is a differential signal. This input signal 332*b* connects to the output of Multiplexer Switch M0 228*d*.

Path 6 (Version 100*ah*) input differential signals 328 connect to the input differential amplifier A2 208*b*. The output signals 312*b* from differential amplifier A2 208*b* is a differential signal. This output signal 312*b* from differential amplifier A2 208*b* connects to the input of clock data recovery CDR2 212*h*. The output signals 360*b* and 362*b* from CDR2 212*h* are differential signals. The clock data recovery CDR0 226*h* has a fanout buffer where the output signals 360*b* and 362*b* are copies of the output signal 312*b* from differential amplifier A2 208*b*. These output signals 360*b* and 362*b* from CDR2 212*h* connect to the input of Multiplexer Switch M3 202*d* and M2 210*d*, respectively.

Path 7 (Version 100*ah*) output differential signals 310 connect to the output differential amplifier Y1 216*b*. The input signal 324*b* to differential amplifier Y1 216*b* is a differential signal. This input signal 324*h* connects to the output of Multiplexer Switch M1 220*d*.

Path 8 (Version 100*ah*) input differential signals 300 connect to the input differential amplifier A3 200*b*. The output signals 302*b* from differential amplifier A3 200*b* is a differential signal. This output signal 302*b* from differential amplifier A3 200*b* connects to the input of clock data recovery CDR3 204*h*. The output signals 352*b* and 354*b* from CDR3 204*h* are differential signals. The clock data recovery CDR 204*h* has a fanout buffer where the output signals 352*b* and 354*b* are copies of the output signal 302*b* from differential amplifier A3 200*b*. These output signals 352*b* and 354*b* from CDR3 204*h* connect to the input of Multiplexer Switch M3 202*d* and M2 210*d*, respectively.

A finite state machine (FSM) 232 connects to the input broadband amplifiers A0 230*b*, A1 222*b*, A2, 208*b*, and A3 200*b* (A0-A3) through connections 430, 422, 408, and 400 respectively. FSM 232 connects to the Multiplexer Switches M0 228*d*. M1 220*d*, M2 210*d*, and M3 202*d* (M0-M3) through connections 428, 420, 410, and 402 respectively. FSM 232 connects to CDR0 226*h*, CDR1 218*h*, CDR2 212*h*, and CDR3 204*h* (CDR0-CDR3) through connections 426, 418, 412, and 404, respectively. FSM 232 connects to the output broadband amplifiers Y0 224*b*, Y1 216*b*, Y2 214*b*, and Y3 206*b* (Y0-Y3), through connections 424, 416, 414, and 406. FSM 232 connects to Connection CXN 1 234, CXN 2 238, CXN 3 240, and CXN 4 236 (CXN 1-4) through connections 432, 436, 438, and 434.

In the circuitry, system(s), and method(s) of the present disclosure, the embodiments as illustrated in FIGS. 48*ai*-48*ak* represent a group of three related block diagrams versions 100*ai*-100*ak* of the circuitry of the present disclosure involving four connections; CXN1, CXN2, CXN3, and CXN4 and sixteen differential signal paths. CXN 1 has four differential signal paths. Path 1, Path 2, Path 9, and Path 10. CXN 2 has four differential signal paths Path 3, Path 4, path 11, and Path 12. CXN 3 has four differential signal paths Path 5, Path 6, Path 13, and Path 14. CXN 4 has four differential signal paths Path 7, Path 8, Path 15, and Path 16. FIGS. 48*ai*-48*ak* are comprised of input broadband differential amplifiers (A), multiplexer switches (M), clock data recovery circuitries (CDR), output differential amplifiers (Y), a finite state machine (FSM), and connections (CXN).

There are eight input broadband differential amplifiers A0, A1, A2, A3, A4, A5, A6, and A7, eight multiplexer switches M0, M1, M2, M3, M4, M5, M6, and M7, and eight high speed output differential amplifiers Y0, Y1, Y2, Y3, Y4, Y5, Y6, and Y7. For embodiments 100*aj* and 100*ak*, there are eight clock data recovery circuitries CDR0, CDR1, CDR2, CDR3, CDR4, CDR5, CDR6, and CDR7. A finite state machine (FSM) connects to the input broadband amplifiers (A0-A7), multiplexer switches (M0-M7), and output broadband amplifiers (Y0-Y7). For embodiments 100*aj* and 100*ak*, the finite state machine (FSM) connects to the clock date recovery circuitries (CDR0-CDR7).

Connection (CXN1) comprises a Path 1 and Path 9 each representing an input differential signal and a Path 2 and Path 10 each representing an output differential signal. Connection (CXN2) comprises a Path 3 and Path 11 each representing an input differential signal and a Path 4 and Path 12 each representing an output differential signal. Connection (CXN3) comprises a Path 6 and Path 14 each representing an input differential signal and a Path 5 and Path 13 each representing an output differential signal. Connection (CXN4) comprises a Path 8 and Path 16 each representing an input differential signal and a Path 7 and Path 15 each representing an output differential signal. Connection (CXN) 1 comprises a Path P1 and Path P9 representing an input differential signal 318 and 382, and a Path P2 and Path P10 representing an output differential signal 308 and 380, respectively. Connection (CXN) 2 comprises a Path P3 and Path P11 representing an input differential signal 338 and 390, and a Path P4 and Path P12 representing an output differential signal 320 and 388, respectively. Connection (CXN) 3 comprises a Path P6 and Path P14 representing an input differential signal 328 and 392, and a Path P5 and Path P13 representing an output differential signal 330 and 392, respectively.

Connection (CXN) 4 comprises a Path P8 and Path P16 representing an input differential signal 300 and 384, and a Path P7 and Path P15 representing an output differential signal 310 and 386, respectively. Embodiments 100*ai*-100*ak* have applications involving higher differential signal capacity connections (CXN). An example involves connections (CXN) as SFP ports supporting SFP-DD or SFP-DD112 devices. SFP-DD and SFP-DD112 support four lanes of differential signals.

Embodiment 100*ai* of FIG. 48*ai* can be comprised of eight versions of two duplicate embodiments of 100*a*-100*h* as illustrated in FIG. 48*a*-48*h*, respectively. A first version of embodiment 100*ai* with two embodiments of 100*a*, a second version of embodiment 100*ai* with two embodiments of 100*b*, a third version of embodiment 100*ai* with two embodiments of 100*c*, a fourth version of embodiment 100*ai* with two embodiments of 100*d*, a fifth version of embodiment 100*ai* with two embodiments of 100*e*, a sixth version of embodiment 100*ai* with two embodiments of 100*f*, a seventh version of embodiment 100*ai* with two embodiments of 100*g*, and an eighth version of embodiment 100*ai* with two embodiments of 100h. Descriptions for the signal interconnections between and among the elements Connection (CXN), input broadband amplifier (A), multiplexer switches (M), and output broadband amplifiers (Y) are described in the appropriate embodiment 100*a*-100*h* illustrated in FIG. 48*a*-48*h*.

Embodiment 100*aj* of FIG. 48*aj* can be comprised of two duplicate embodiments of 100*i*-100*v* or fourteen versions. A first version of embodiment 100*aj* with two embodiments of 100*i*, a second version of embodiment 100*aj* with two embodiments of 100*j*, a third version of embodiment lW0*aj* with two embodiments of 100*k*, a fourth version of embodiment 100*aj* with two embodiments of 100*l*, a fifth version of embodiment 100*aj* with two embodiments of 100*m*, a sixth version of embodiment 100*aj* with two embodiments of 100*n*, a seventh version of embodiment 100*j* with two embodiments of 100*o*, an eighth version of embodiment 100*aj* with two embodiments of 100*p*, a ninth version of embodiment 100*aj* with two embodiments of 1004, a tenth version of embodiment 100*aj* with two embodiments of 100*r*, an eleventh version of embodiment 100*aj* with two embodiments of 100*s*, a twelfth version of embodiment 100*aj* with two embodiments of 100*t*, a thirteenth version of embodiment 100*aj* with two embodiments of 100*u*, and a fourteenth version of embodiment 100*aj* with two embodiments of 100*v*. Descriptions for the signal interconnections between and among the elements Connection (CXN), input broadband amplifier (A), multiplexer switches (M), clock data recovery circuitries (CDR), and output broadband amplifiers (Y) are described in the appropriate embodiment 100*i*-100*v* illustrated in FIG. 48*i*-48*v*.

Embodiment 100*ak* of FIG. 48*ak* can be comprised of two duplicate embodiments of 100*w*-100*ah* or twelve versions. A first version of embodiment 100*ak* with two embodiments of 100*w*, a second version of embodiment 100*ak* with two embodiments of 100*x*, a third version of embodiment 100*ak* with two embodiments of 100*y*, a fourth version of embodiment 100*ak* with two embodiments of 100*z*, a fifth version of embodiment 100*ak* with two embodiments of 100*aa*, a sixth version of embodiment 100*ak* with two embodiments of 100*ab*, a seventh version of embodiment 100*ak* with two embodiments of 100*ac*, an eighth version of embodiment 100*ak* with two embodiments of 100*ad*, a ninth version of embodiment 100*ak* with two embodiments of 100*ae*, a tenth version of embodiment 100*ak* with two embodiments of 100*af*, an eleventh version of embodiment 100*ak* with two embodiments of 100*ag*, and a twelfth version of embodiment 100*ak* with two embodiments of 100*ah*. Descriptions for the signal interconnections between and among the elements Connection (CXN), input broadband amplifier (A), multiplexer switches (M), clock data recovery circuitries (CDR), and output broadband amplifiers (Y) are described in the appropriate embodiment 100*w*-100*ah* illustrated in FIG. 48*w*-48*ah*.

The embodiments as illustrated in FIGS. 49*a*-49*d* represent a group of related input broadband differential amplifiers (A) with single-ended or differential signal output interface.

Figure 49A:
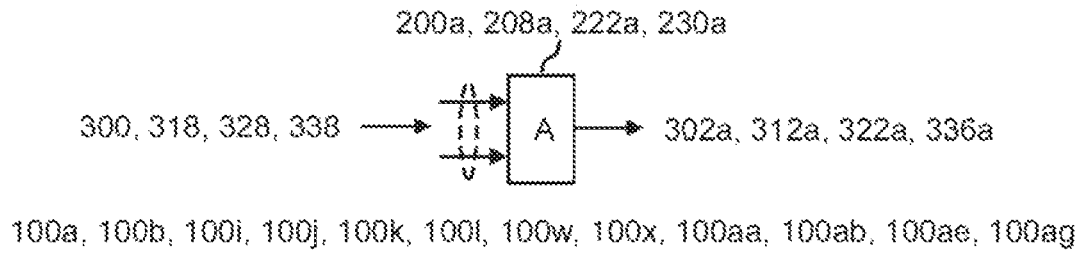
FIG. 49a is a diagram illustrating an input broadband differential amplifiers (A) and a single-ended signal output interface.

As illustrated in FIG. 49*a*, the input broadband differential amplifier (A) 200*a*. 208*a*, 222*a*. 230*a* described in embodiment 100*a*, 100*b*, 100*i*, 100*j*, 100*k*, 100*l*, 100*w*, 100*aa*, 100*ab*, 100*ae*, 100*ag* interface an input differential signal 300, 318, 328, 338 and output a single-ended signal 302*a*, 312*a*, 322*a*, 336*a*.

Figure 49B:
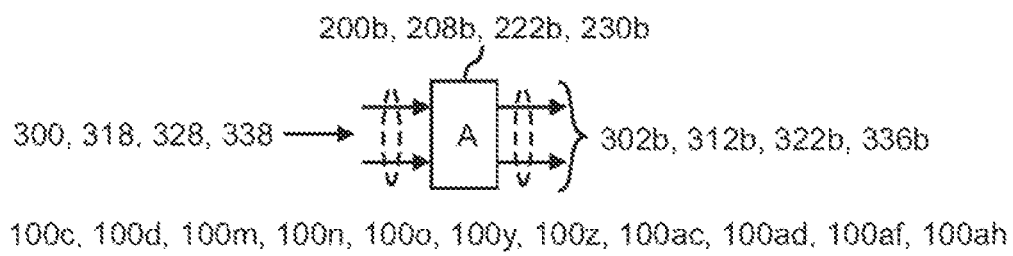
FIG. 49b is a diagram illustrating an input broadband differential amplifiers (A) and a differential signal output interface.

As illustrated in FIG. 49*b*, the input broadband differential amplifier (A) 200*b*, 208*b*, 222*b*, 230*b* described in embodiment 100*c*, 100*d*, 100*m*, 1.00*n*, 100*o*, 100*y*, 100, 100*ac*, 100*ad*, 100*af*, 100*ah* interface an input differential signal 300, 318, 328, 338 and output a differential signal 302*b*, 213*b*, 322*b*. 336*b*.

Figure 49C:
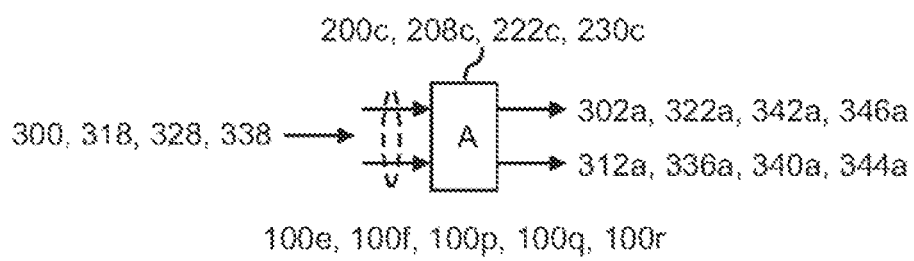
FIG. 49c is a diagram illustrating an input broadband differential amplifiers (A) and two single-ended signal output interfaces.

As illustrated in FIG. 49*c*, the input broadband differential amplifier (A) 200*c*, 208*c*, 222*c*, 230*c* described in embodiment 100*e*, 100*f*, 100*p*, 100*q*, 100*r* interface an input differential signal 3W0, 318, 328, 338 and output a single-ended signal 302*a*, 322*a*, 342*a*, 346*a* and output another single-ended signal 312*a*, 336*a*, 340*a*, 344*a*. Both output single-ended signals are copies of the input differential signal 300, 318, 328, 338.

Figure 49D:
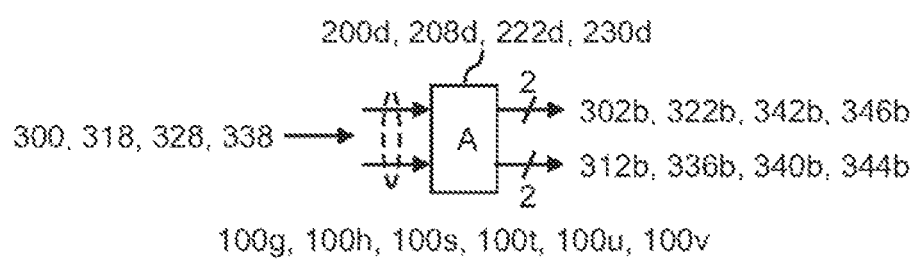
FIG. 49d is a diagram illustrating an input broadband differential amplifiers (A) and two differential signal output interfaces.

As illustrated in FIG. 49*d*, the input broadband differential amplifier (A) 200*d*, 208*d*, 222*d*, 230*d* described in embodiment 100*g*, 100*h*, 100*s*, 100*t*, 100*u*, Iftv interface an input differential signal 300, 318, 328, 338 and output a differential signal 302*b*, 322*b*, 342*b*, 346*b* and another output differential signal 312*b*, 336*b*, 340*b*, 344*b*. Both output differential signals are copies of the input differential signal 300, 318, 328, 338.

The embodiments as illustrated in FIGS. 50*a*-50*d* represent a group of related multiplexer switches (M) with single-ended or differential signal input and output interfaces.

Figure 50A:
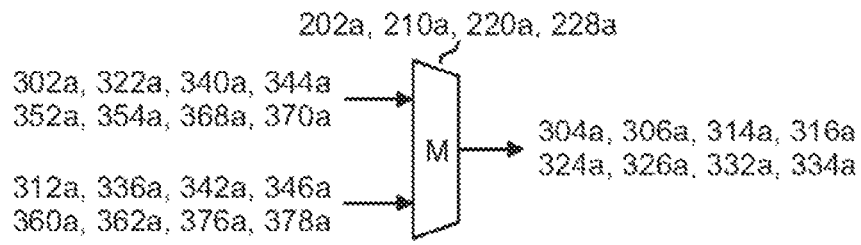
FIG. 50a is a diagram illustrating a multiplexer switch with two single-ended signal input interfaces and a single-ended signal output interface.

As illustrated in FIG. 50*a*, the multiplexer switches (M) 202*a*, 210*a*. 220*a*, 228*a* described in embodiments 100*a*. 100*e*, 100*i*. 100*j*. 100*p*, 100*q*, 100*w*, 100*y*, 100*aa*, 100*ac* interfaces an input single-ended signal 302*a*, 322*a*, 340*a*, 344*a*, 352*a*, 354*a*, 368*a*, 370*a* and another input single-ended signal 312*a*, 336*a*, 342*a*, 346*a*, 360*a*, 362*a*. 376*a*, 378*a* and output a single-ended signal 304*a*, 306*a*, 314*a*, 316*a*, 324*a*, 326*a*, 332*a*, 334*a*.

Figure 50B:
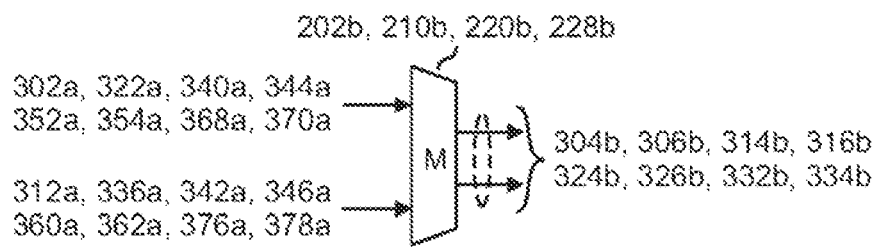
FIG. 50b is a diagram illustrating a multiplexer switch with two single-ended signal input interfaces and a differential signal output interface.

As illustrated in FIG. 50*b*, the multiplexer switches (M) 202*b*, 210*b*, 220*b*, 228*b* described in embodiments 100*b*, 100*k*, 100*i*, 100*r*, 100*ab*, 100*ad* interfaces an input single-ended signal 302*a*, 322*a*, 340*a*, 344*a*, 352*a*, 354*a*, 368*a*, 370*a* and another input single-ended signal 312*a*, 336*a*, 342*a*, 346*a*, 360*a*, 362*a*, 376*a*, 378*a* and output a differential signal 304*b*, 306*b*, 314*b*, 316*b*, 324*b*. 326*b*, 332*b*, 334*b*.

Figure 50C:
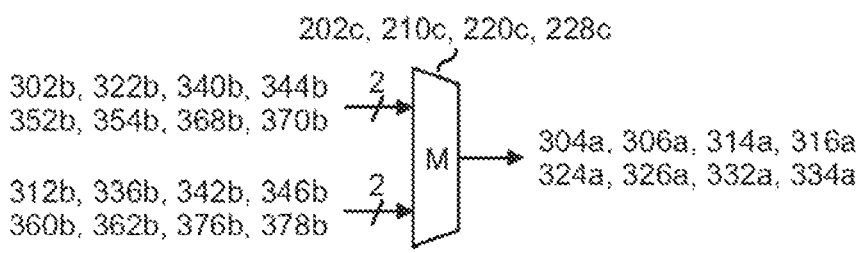
FIG. 50c is a diagram illustrating a multiplexer switch with two differential signal input interfaces and a single-ended signal output interface.

As illustrated in FIG. 50*c*, the multiplexer switches (M) 202*c*, 210*c*, 220*c*, 228*c* described in embodiments 100*c*, 100*g*, 100*m*, 100*s*, 100*t*, 100*ae*, 100*af*, 100*ag* interfaces an input differential signal 302*b*, 322*b*, 340*b*, 344*b*, 352*b*, 354*b*, 368*b*, 370*b* and another input differential signal 312*b*, 336*b*. 342*b*, 346*b*, 360*b*, 362*b*. 376*b*, 378*b* and output a single-ended signal 304*a*, 306*a*, 314*a*. 324*a*, 326*a*, 332*a*, 334*a*.

Figure 50D:
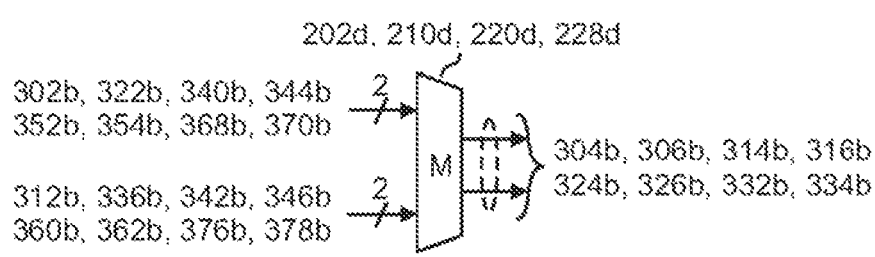
FIG. 50d is a diagram illustrating a multiplexer switch with two differential signal input interfaces and a differential signal output interface.

As illustrated in FIG. 50*d*, the multiplexer switches (M)202*d*, 210*d*, 220*d*, 228*d* described in embodiments 100*d*, 100*f*, 100*h*, 100*o*, 100*u*, 100*v*, R00*x*, 1 0*z*, 100*ah* interfaces an input differential signal 302*b*, 322*b*, 340*b*, 344*b*, 352*b*, 354*b*. 368*b*, 370*b* and another input differential signal 312*b*, 336*b*, 342*b*, 346*b*, 360*b*, 362*b*, 376*b*, 378*b* and output a differential signal 304*b*, 306*b*, 314*b*, 316*b*. 324*b*, 326*b*, 332*b*, 334*b*.

The embodiments as illustrated in FIGS. 51*a*-51*h* represent a group of related clock data recovery (CDR) circuitry with single-ended or differential signal input and output interfaces.

As illustrated in Figure Sla, the clock data recovery (CDR) circuitry 204*a*, 212*a*, 218*a*, 226*a* described in embodiment 100*i*, 100*m*, 100*p*, 100*s*, 100*w* interface an input single-ended signal 302*a*, 306*a*, 312*a*, 316*a*, 322*a*, 326*a*, 334*a*, 336*a* and output a single-ended signal 304*a*, 314*a*, 324*a*, 332*a*, 352*a*. 360*a*, 368*a*, 376*a*.

Figure 51A:
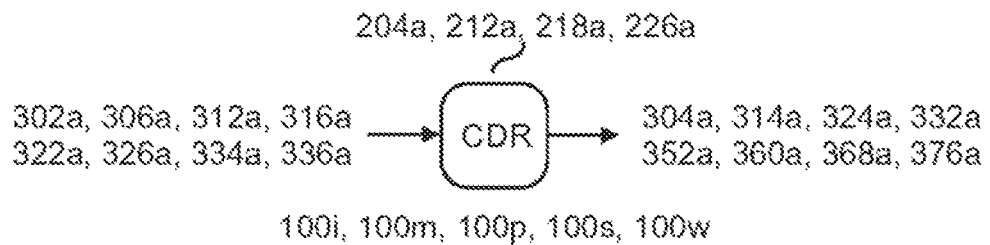
FIG. 51a is a diagram illustrating a clock data recovery circuitry (CDR) with a single-ended signal input interface and a single-end signal output interface.
Figure 51B:
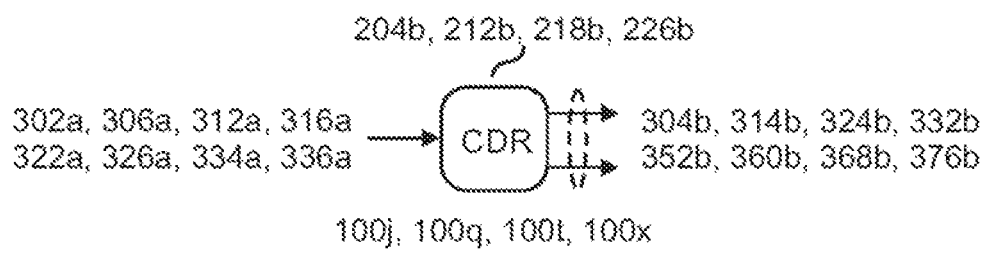
FIG. 51b is a diagram illustrating a clock data recovery circuitry (CDR) with a single-ended signal input interface and a differential signal output interface.
Figure 52A:
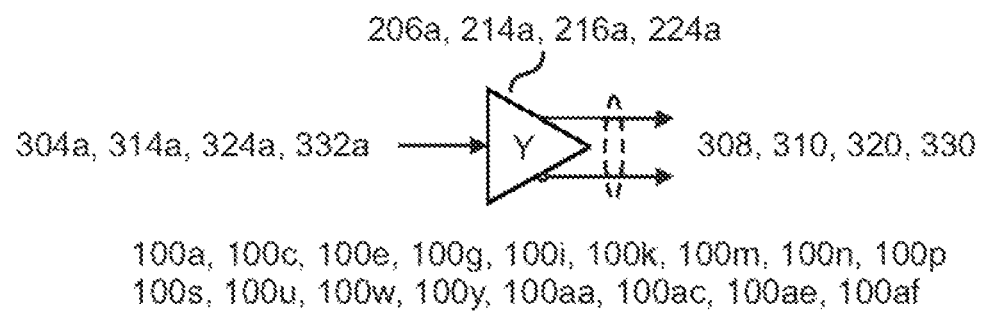
FIG. 52a is a diagram illustrating a high speed output differential amplifiers (Y) with a single-ended signal input interface and a single-end signal output interface.
Figure 52B:
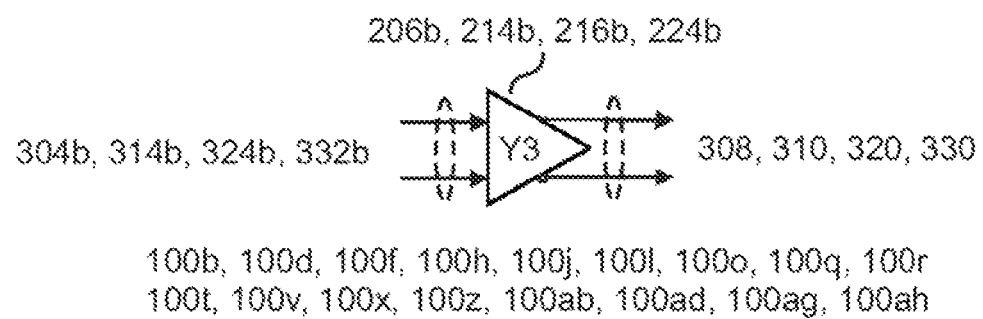
FIG. 52b is a diagram illustrating a high speed output differential amplifiers (Y) with a differential signal input interface and a differential signal output interface.

As illustrated in FIG. 51*b*, the clock data recovery (CDR) circuitry 204*b*, 212*b*, 218*b*. 226*b* described in embodiment 100*j*, 100*q*, 100*t*, 100*x* interface an input single-ended signal 304*a*, 306*a*, 312*a*, 316*a*, 322*a*, 326*a*, 334*a*, 336*a* and output a differential signal 304*b*, 314*b*, 324*b*, 332*b*, 352*b*, 360*b*, 368*b*, 376*b*.

Figure 51C:
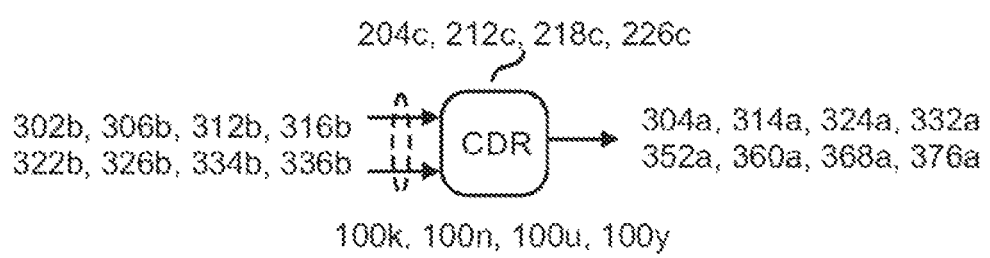
FIG. 51c is a diagram illustrating a clock data recovery circuitry (CDR) with a differential signal input interface and a single-ended output interface.

As illustrated in FIG. 51*c*, the clock data recovery (CDR) circuitry 204*c*, 212*c*, 218*c*, 226*c* described in embodiment 100*k*. 100*n*, 100*u*, 100*y* interface an input differential signal 302*b*, 306*b*, 312*b*, 316*b*, 322*b*, 326*b*, 334*b*, 336*b* and output a single-ended signal 304*a*, 314*a*, 324*a*, 332*a*, 352*a*, 360*a*, 368*a*, 376*a*.

Figure 51D:
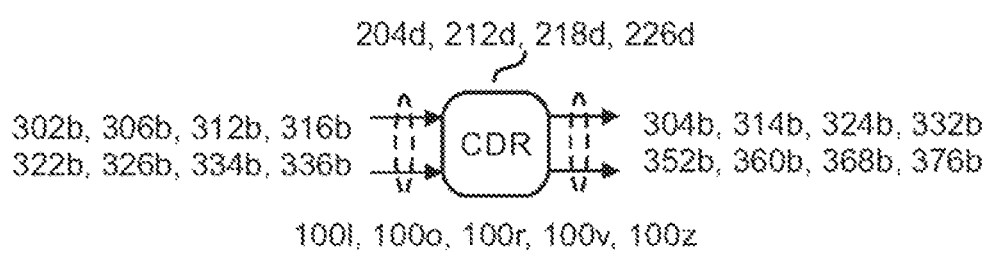
FIG. 51d is a diagram illustrating a clock data recovery circuitry (CDR) with a differential signal input interface and a differential signal output interface.
Figure 51E:
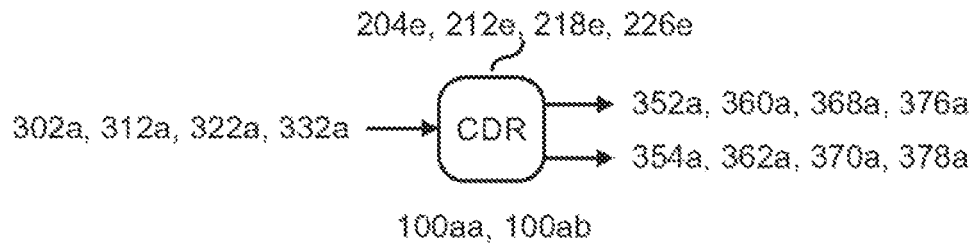
FIG. 51e is a diagram illustrating a clock data recovery circuitry (CDR) with a single-ended signal input interface and two single-end signal output interfaces.

As illustrated in FIG. 51*d*, the clock data recovery (CDR) circuitry 204*d*, 212*d*. 218*d*, 226*d* described in embodiment 100*l*, 100*o*, 100*r*, 100*v*, 100*z* interface an input differential signal 302*b*, 306*b*, 312*b*, 316*b*, 322*b*, 326*b*, 334*b*, 336*b* and output a differential signal 304*b*, 314*b*, 324*b*, 332*b*, 352*b*. 360*b*, 368*b*, 376*b*.

As illustrated in Figure S1*e*, the clock data recovery (CDR) circuitry 204*e*, 212*e*, 218*e*, 226*e* described in embodiment 100*aa*, 100*ab* interface an input single-ended signal 302*a*, 312*a*, 322*a*, 332*a* and output a single-ended signal 352*a*, 360*a*, 368*a*, 376*a* and output another single-ended signal 354*a*, 362*a*, 370*a*, 378*a*. Both output single-ended signals are copies of the input single-ended signal 302*a*, 312*a*, 322*a*, 332*a*.

Figure 51F:
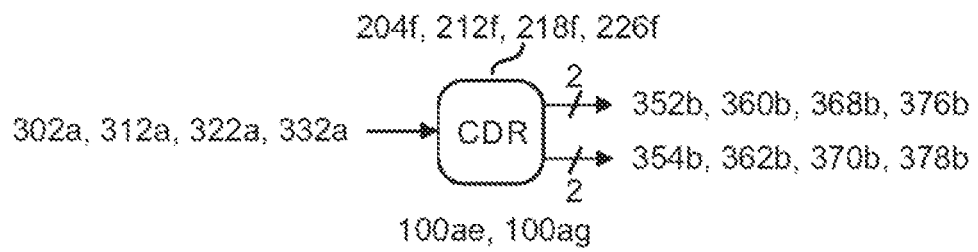
FIG. 51f is a diagram illustrating a clock data recovery circuitry (CDR) with a single-ended signal input interface and two differential signal output interfaces.

As illustrated in FIG. 51*f*, the clock data recovery (CDR) circuitry 204*f*, 212*f*, 218*f*, 226*f* described in embodiment 100*ae*, 100*ag* interface an input single-ended signal 302*a*, 312*a*, 322*a*, 332*a* and output a differential signal 352*b*, 360*b*, 366*b*, 376*b* and output another differential signal 354*b*. 362*b*, 370*b*. 378*b*. Both output differential signals are copies of the input single-ended signal 302*a*, 312*a*, 322*a*, 332*a*.

Figure 51G:
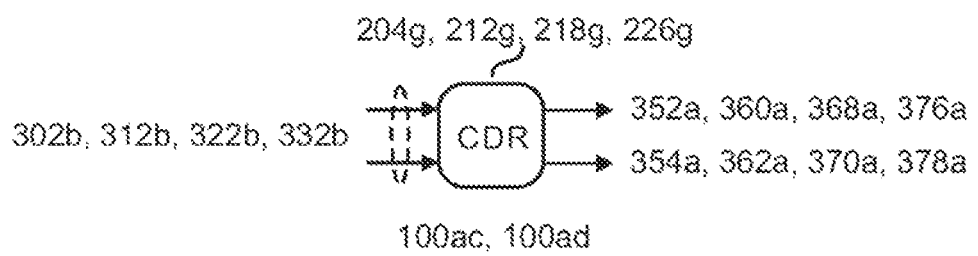
FIG. 51g is a diagram illustrating a clock data recovery circuitry (CDR) with a differential signal input interface and two single-ended output interfaces.

As illustrated in FIG. 51*g*, the clock data recovery (CDR) circuitry 204*g*, 212*g*, 218*g*. 226*g* described in embodiment 100*ac*, 100*ad* interface an input differential signal 302*b*, 312*b*, 322*b*, 332*b* and output a single-ended signal 352*a*, 360*a*, 366*a*, 376*a* and output another single-ended signal 354*a*, 362*a*, 370*a*, 378*a*. Both output single-ended signals are copies of the input differential signal 302*b*, 312*b*, 322*b*, 332*b*.

Figure 51H:
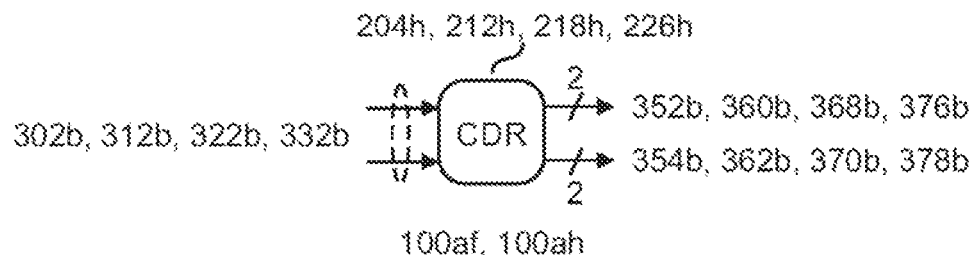
FIG. 51h is a diagram illustrating a clock data recovery circuitry (CDR) with a differential signal input interface and two differential signal output interfaces.

As illustrated in FIG. 51*h*, the clock data recovery (CDR) circuitry 204*h*, 212*h*, 218*h*, 226*h* described in embodiment 100*ac*, 100*ad* interface an input differential signal 302*b*, 312*b*, 322*b*, 332*b* and output a differential signal 352*b*, 360*b*, 366*b*, 376*b* and output another differential signal 354*b*, 362*b*, 370*b*, 378*b*. Both output differential output signals are copies of the input differential signal 302*b*, 312*b*, 322*b*, 332*b*.

The embodiments as illustrated in FIGS. 52*a* and 52*b* represent a group of related high speed output differential amplifiers (Y) with single-ended or differential signal input interface.

As illustrated in FIG. 52*a*, the related high speed output differential amplifiers (Y) 206*a*, 214*a*, 216*a*, 224*a* described in embodiment 100*a*, 100*c*, 10*e*, 100, 100*i*, 100*k*, 100*m*, 100*n*. 100*p*, 100*s*, 100*u*, 100*w*, 100*y*, 100*a*, 100*ac*, 100*ae*; 100*af* interface an input single-ended signal 304*a*, 314*a*, 324*a*, 332*a* and output a differential signal 308, 310, 320, 330.

As illustrated in FIG. 52*b*, the related high speed output differential amplifiers (Y) 206*b*, 214*b*, 216*b*, 224*b* described in embodiment 100*b*, 100*d*, 100*f*, 100*h*, 100*j*, 100*l*, 100*o*, 100*q*, 100*r*, 100*t*, 100*v*, 100*x*, 100*z*, 100*ab*, 100*ad*, 100*ag*, 100*ah* interface an input differential signal 304*b*, 314*b*, 324*b*, 332*b* and output a differential signal 308, 310, 320, 330.

While the embodiment(s) disclosed herein are illustrative of the structure, function and operation of the exemplary method(s), circuitry, equipment and device(s), it should be understood that various modifications may be made thereto with departing from the teachings herein. Further, the components of the method(s), circuitry, equipment and device(s) disclosed herein can take any suitable form, including any suitable hardware, software, circuitry or other components capable of adequately performing their respective intended functions, as may be known in the at. It should also be understood that all commercially available parts identified herein can be interchanged with other similar commercially available parts capable of providing the same function and results.

While the foregoing discussion presents the teachings in an exemplary fashion with respect to the disclosed method(s), circuitry, equipment, and device(s) for communication services, it will be apparent to those skilled in the art that the present disclosure may apply to other method(s), system(s), device(s), equipment and circuitry for communication services. Further, while the foregoing has described what are considered to be the best mode and/or other examples, it is understood that various modifications may be made therein and that the subject matter disclosed herein may be implemented in various forms and examples, and that the method(s), system(s), device(s), equipment and circuitry may be applied in numerous applications, only some of which have been described herein.

What is claimed is:

1. A system for communications networks, comprising:
   a communications device having communication circuitry comprising:
      a plurality of connections defining at least a first network connection configured to transmit and receive communication service, and a second network connection configured to monitor the communication service and to selectively inject the communication service or test signal;
      a plurality of input differential amplifiers;
      a plurality of multiplexer switchers or resistive dividers; and
      a plurality output differential amplifiers;
      wherein the circuitry defines a plurality of differential signal paths between the plurality of connections; and
   a first Small Form-factor Pluggable SFP variant device at the first connection, and a second Small Form-factor Pluggable SFPT variant device at the second connection;
   wherein each of the plurality of multiplexer switches is selectively determinative of the differential signal paths between an input path of each of the plurality of connections and an output path of at least two other connections simultaneously though one input differential amplifier, one multiplexer switch and two output differential amplifiers.

2. The system of claim 1, wherein the first connection defines a first path representing an input differential signal and a second path representing an output differential signal.

3. The system of claim 2, wherein the second connection defines a third path representing an input differential signal and a fourth path representing an output differential signal.

4. The system of claim 3, wherein a third connection defines a fifth path representing an output differential signal and a sixth path representing an input differential signal.

5. The system of claim 4, wherein a fourth connection defines a seventh path representing an output differential signal and an eighth path representing an input differential signal.

6. The system of claim 1, wherein each differential amplifier includes a retimer.

7. The system of claim 1, wherein each of the plurality of connections are adapted to connect an SFP variant device.

8. The system of claim 1, wherein the circuitry is configured to interface media independent SFP variant devices to provide interchangeable interfaces.

9. The system of claim 1, wherein the circuitry is adapted to provide at least one of service monitoring, service protection switching, redundancy, on-demand service, security, testing, troubleshooting and service upgrades.

10. The system of claim 1, wherein the circuitry further comprises at least one of differential signal interconnections and single-ended signal interconnections connecting at least two of the plurality of input differential amplifiers, the plurality of multiplexer switches, the plurality of output differential amplifiers and clock data recovery CDR circuitry.

11. A communication device, comprising:
a plurality of connections defining at least a first network Small Form-factor Pluggable SFP variant device connection configured to transmit and receive communication service, and a second network Small Form-factor Pluggable SFP variant device connection configured to monitor the communication service and to selectively inject the communication service or test signal; and
circuitry defining a plurality of differential signaling paths between the connections, wherein the circuitry comprises a plurality of input differential amplifiers, a plurality of multiplexer switchers or resistive dividers, and a plurality output differential amplifiers;
wherein each of the plurality of multiplexer switches is selectively determinative of the differential signal paths between an input path of each SFP variant connection and an output path of at least two other SFP variant device connections simultaneously though one input differential amplifier, one multiplexer switch and two output differential amplifiers;
wherein the plurality of differential signaling paths provide at least one of service monitoring, service protection switching, redundancy, on-demand service, security, testing, troubleshooting and service upgrades.

12. The device of claim 11, wherein the first connection defines a first path representing an input differential signal and a second path representing an output differential signal.

13. The device of claim 12, wherein the second connection defines a third path representing an input differential signal and a fourth path representing an output differential signal.

14. The device of claim 13, wherein a third connection defines a fifth path representing an output differential signal and a sixth path representing an input difterential signal.

15. The device of claim 14, wherein a fourth connection defines a seventh path representing an output differential signal and an eight path representing an input differential signal.

16. The device of claim 11, wherein each of the plurality of connections are SFP variant device connections.

17. The device of claim 11, wherein each differential amplifier includes a retimer.

18. The device of claim 11, further comprising a processor, timing LED indicators, a status and provisioning interface, and power management.

19. The device of claim 11, wherein the device is one of monitoring equipment, a network interface device, a router and an Ethernet switch.

20. The device of claim 11, wherein the circuitry further comprises at least one of differential signal interconnections and single-ended signal interconnections connecting at least two of the plurality of input differential amplifiers, the plurality of multiplexer switches, the plurality of output differential amplifiers and clock data recovery CDR circuitry.

21. A method of providing media independent, multifunctional services in communication equipment, comprising the steps of:
providing a plurality of Small Form-factor Pluggable SFP variant device connections defining at least a first network Small Form-factor Pluggable SFP variant device connection configured to transmit and receive communication service, and a second network Small Form-factor Pluggable SFP variant device connection configured to monitor the communication service and to selectively inject the communication service or test signal;
providing circuitry defining a plurality of differential signaling paths between the connections, the circuitry comprising a plurality of input differential amplifiers, a plurality of multiplexer switchers, and a plurality output differential amplifiers;
providing at least one of service monitoring, service protection switching, redundancy, on-demand service, security, testing, troubleshooting and service upgrades via the plurality of differential signaling paths; and
selectively determining the differential signal paths between an input path of each SFP variant device connection and an output path of at least two other SFP variant device connections simultaneously though one input differential amplifier, one multiplexer switch and two output differential amplifiers.

22. The method of claim 21, further comprising the step of performing service monitoring by duplicating a communication service differential signal to a combination of at least one of differential signals and single-ended signals, and then selectively injecting the communication service or test signal via the communication equipment.

23. The method of claim 21, further comprising the step of connecting at least two of the plurality of input differential amplifiers, the plurality of multiplexer switches, the plurality of output differential amplifiers and clock data recovery CDR circuitry via at least one of differential signal interconnections and single-ended signal interconnections.

\* \* \* \* \*